United States Patent
Hanan et al.

(10) Patent No.: US 12,338,320 B2
(45) Date of Patent: Jun. 24, 2025

(54) POLY(ETHYLENE TEREPHTHALATE)-GRAPHENE NANOCOMPOSITES FROM IMPROVED DISPERSION

(71) Applicant: NIAGARA BOTTLING, LLC, Diamond Bar, CA (US)

(72) Inventors: Jay Clarke Hanan, Glendora, CA (US); Vahid Shabafrooz, Diamond Bar, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 868 days.

(21) Appl. No.: 17/497,495

(22) Filed: Oct. 8, 2021

(65) Prior Publication Data

US 2022/0081508 A1 Mar. 17, 2022

Related U.S. Application Data

(63) Continuation of application No. 16/408,213, filed on May 9, 2019, now abandoned.

(Continued)

(51) Int. Cl.
*C08L 67/02* (2006.01)
*C08G 63/183* (2006.01)
(Continued)

(52) U.S. Cl.
CPC .......... *C08G 63/183* (2013.01); *C08G 63/86* (2013.01); *C08K 3/042* (2017.05); *C08L 67/02* (2013.01);
(Continued)

(58) Field of Classification Search
CPC .......... C08L 67/02; C08L 67/00; C08K 3/042
See application file for complete search history.

(56) References Cited

U.S. PATENT DOCUMENTS 3,487,049 A 12/1969 Busot
3,675,180 A 4/1972 Cohn
(Continued)

FOREIGN PATENT DOCUMENTS

CA 2992816 A1 1/2017
CN 103242630 A 8/2013
(Continued)

OTHER PUBLICATIONS

Ayoma et al., Melt crystallization of poly(ethylene terephthalate): Comparing addition of graphene vs. carbon nanotubes; Polymer 2014, vol. 55, No. 8, p. 2080.
(Continued)

*Primary Examiner* — Rip A Lee
(74) *Attorney, Agent, or Firm* — Michael Best & Friedrich LLP

(57) ABSTRACT

A composition and a method are provided for graphene reinforced polyethylene terephthalate (PET). Graphene nanoplatelets comprising a suitable surface area are added to a dispersion medium for producing graphene reinforced PET. The average surface area may range between substantially 15 m²/g and 750 m²/g. In some embodiments, the dispersion medium may be comprised of ethylene glycol. The dispersion medium and graphene nanoplatelets are sonicated to disperse the nanoplatelets within the dispersion medium. The dispersion medium and graphene nanoplatelets are centrifuged to remove larger nanoplatelets that are not suitably dispersed within the dispersion medium. A supernatant solution of dispersed graphene nanoplatelets and dispersion medium is decanted and then used for polymerization of the graphene reinforced PET. The resultant graphene reinforced PET is comprised of a continuous matrix of PET with a reinforcement material comprising dispersed phase graphene nanoplatelets.

7 Claims, 60 Drawing Sheets

Related U.S. Application Data

(60) Provisional application No. 62/669,282, filed on May 9, 2018.

(51) Int. Cl.

| | | |
|---|---|---|
| *C08G 63/86* | (2006.01) | |
| *C08K 3/04* | (2006.01) | |
| *C08L 67/00* | (2006.01) | |
| *B82Y 30/00* | (2011.01) | |
| *B82Y 40/00* | (2011.01) | |

(52) U.S. Cl.
CPC .............. *B82Y 30/00* (2013.01); *B82Y 40/00* (2013.01); *C08K 2201/006* (2013.01); *C08K 2201/011* (2013.01); *C08L 67/00* (2013.01)

(56) References Cited

U.S. PATENT DOCUMENTS

| | | |
|---|---|---|
| 3,709,859 A | 1/1973 | Hrach et al. |
| 3,907,754 A | 9/1975 | Tershansy et al. |
| 3,951,905 A | 4/1976 | Sano et al. |
| 3,962,189 A | 6/1976 | Russin et al. |
| 4,010,145 A | 3/1977 | Russin et al. |
| 4,107,149 A | 8/1978 | Bier et al. |
| 4,244,910 A | 1/1981 | Yui et al. |
| 4,501,878 A | 2/1985 | Adams |
| 5,019,640 A | 5/1991 | Engel-Badar et al. |
| 6,063,465 A | 5/2000 | Charbonneau et al. |
| 6,713,600 B1 | 3/2004 | Isayev et al. |
| 7,608,652 B2 | 10/2009 | Bashir et al. |
| 8,859,668 B2 | 10/2014 | Morishita et al. |
| 9,550,206 B2 * | 1/2017 | Kagawa .................. C09D 7/61 |
| 9,636,855 B2 | 5/2017 | Hanan |
| 9,890,263 B2 * | 2/2018 | Hanan ..................... C08K 3/04 |
| 9,957,360 B2 | 5/2018 | Hanan et al. |
| 10,087,302 B2 | 10/2018 | Hanan |
| 10,118,724 B2 | 11/2018 | Hanan et al. |
| 10,737,418 B2 | 8/2020 | Hanan et al. |
| 10,738,167 B2 | 8/2020 | Hanan et al. |
| 10,808,098 B2 | 10/2020 | Hanan |
| 11,472,938 B2 * | 10/2022 | Hanan ................... C08K 3/042 |
| 11,472,940 B2 | 10/2022 | Hanan et al. |
| 2005/0065318 A1 | 3/2005 | Jernigan et al. |
| 2005/0255330 A1 | 11/2005 | Meyer |
| 2005/0267285 A1 | 12/2005 | Kulkarni et al. |
| 2006/0148959 A1 | 7/2006 | Isayev et al. |
| 2007/0216067 A1 | 9/2007 | Bahr et al. |
| 2009/0140213 A1 | 6/2009 | Sen et al. |
| 2009/0275689 A1 | 11/2009 | Isayev |
| 2010/0204072 A1 | 8/2010 | Kwon et al. |
| 2010/0233458 A1 | 9/2010 | Sun et al. |
| 2011/0014492 A1 | 1/2011 | Joshi |
| 2011/0017585 A1 | 1/2011 | Zhamu et al. |
| 2011/0204281 A1 | 8/2011 | Rouse |
| 2012/0098163 A1 | 4/2012 | Avila-Orta et al. |
| 2012/0121840 A1 | 5/2012 | Aksay et al. |
| 2012/0237749 A1 | 9/2012 | Aksay et al. |
| 2013/0015409 A1 | 1/2013 | Fugetsu |
| 2013/0302588 A1 | 11/2013 | Aksay et al. |
| 2014/0065402 A1 | 3/2014 | Suckeveriene et al. |
| 2014/0080962 A1 | 3/2014 | Hanan |
| 2014/0323002 A1 | 10/2014 | Qin et al. |
| 2016/0024283 A1 | 1/2016 | Shahverdi-shahraki et al. |
| 2017/0009030 A1 * | 1/2017 | Hanan ..................... C08K 3/04 |
| 2017/0009046 A1 | 1/2017 | Hanan et al. |
| 2017/0081482 A1 | 3/2017 | Hanan et al. |
| 2017/0103826 A1 | 4/2017 | Al-Harthi et al. |
| 2017/0218166 A1 | 8/2017 | Hanan |
| 2018/0171099 A1 | 6/2018 | Hanan et al. |
| 2018/0215881 A1 | 8/2018 | Hanan |
| 2020/0308366 A1 * | 10/2020 | Hanan .................... B29B 11/08 |
| 2021/0023479 A1 * | 1/2021 | Lee ........................ B01D 29/15 |

FOREIGN PATENT DOCUMENTS

| | | | | |
|---|---|---|---|---|
| CN | 103710790 A | | 4/2014 | |
| CN | 109096497 A | * | 12/2018 | .......... C08G 83/001 |
| CN | 109391880 A | * | 2/2019 | .............. H04R 9/06 |
| EP | 3319935 A1 | | 5/2018 | |
| GB | 1417738 A | | 12/1975 | |
| GB | 1522656 A | | 2/1985 | |
| JP | 2002531614 A | | 9/2002 | |
| JP | 2004156055 A | | 6/2004 | |
| JP | 2008-184590 A | | 8/2008 | |
| KR | 100964561 B1 | * | 6/2010 | ............ C08K 3/042 |
| KR | 101614318 B1 | * | 2/2011 | .......... B82B 3/0095 |
| KR | 20110123383 A | | 11/2011 | |
| PT | 107398 A | | 7/2015 | |
| WO | WO2007145918 A2 | | 12/2007 | |
| WO | WO2009134492 A2 | | 11/2009 | |
| WO | WO2011008511 A1 | | 1/2011 | |
| WO | WO2011028924 A2 | | 3/2011 | |
| WO | 2011102473 A | | 8/2011 | |
| WO | WO2011102473 A1 | | 8/2011 | |
| WO | WO2013004718 A1 | | 1/2013 | |
| WO | WO2014144139 A1 | | 9/2014 | |
| WO | WO-2014172619 A1 | * | 10/2014 | ............... B32B 9/00 |
| WO | WO-2018109618 A1 | * | 6/2018 | ............. C08K 3/042 |

OTHER PUBLICATIONS

Al-Jabareen, et al., "Improving the oxygen barrier properties of polyethylene terephthalate by graphite nanoplatelets", Journal of Applied Polymer Science, 2012, vol. 128, No. 3, pp. 1534-1539.

Drzal, L.T., Graphene Nanoplatelets: A Multi-funstional Nanomaterial Additive for Polymers and Composistes, Apr. 2013, http://egsciences.comwp-contant/uploads/2013/04/Drzal-Presentation.pdf.

Feng, et al., "In Situ Synthesis of Poly(Ethylene Terephthalate)/Graphene Composites Wsing a Catalyst Support on Graphite Oxide", 2011, pp. 3931-3939, vol. 21, Publisher: Journal of Materials Chemistry, UK.

Li, et al., "Poly(Ethylene Terephthlate)/Exfoliated Graphite Nanocomposites With Mproved Thermal Stability, Mechanical and Electrical Properties", 2011, pp. 560-566, Publisher: Composites: Part A 42, Published in: US.

Liu et al.,"Promoting the dispersion of graphene and crystallization of poly(lactic acid) with a freezing-dried graphene/PEG masterbatch", Composites Science and Technology, vol. 144, Mar. 20, 2017, pp. 215-222.

National Center for Biotechnology Information, "Dimethyl Terephthalate" PubChem Compound Database, 2005, http://pubchem.ncbi.gov/compound/dimethyl_terephthlate#section=Top> pp. 1-8.

Shabafrooz Vahid et al: "Graphene dispersion in a surfactant-free, polar solvent", JournalJE of Terial Science, Kluwer Academic Publishers, Dordrecht, vol. 53, No. 1Sep. 20, 2017 (pp. 559-572).

Wikipedia, "Polythelyen terephthalate", Jun. 25, 2015, https:en.wikipedia.org/w/indx.php?titles=Polythylene_terephthalate&oldid=668611834, p. 5.

World Health Organization, "Cobalt and Cobalt Compounds", IARC Monographs on the Evaluation of Carcinogenic Risks to Humans, vol. 52, pp. 363-472, 1980s, http://monographs.iarc.fr/ENGMonographs/vol52/mom52-16.pdf.

Zhang et al., "Electrically Conductive Polyethylene Terephthalate/Graphene Nanocomposites Prepared by Melt Compounding", 2010, pp. 1191-1196, Publisher: Polymer 51, Published in: US.

International Search Report and Written Opinion, PCT/US2019/131612, mailed Aug. 9, 2019.

Extended Search Report issued from the European Patent Office for related Application No. 19800351.9 dated Jan. 25, 2022 (9 Pages).

Korean Patent Office Action for Related Application No. 10-2018-7003463 dated Nov. 28, 2022 (15 pages, including an English translation).

European Extended Search Report for Related Applciation No. 20782403.8 dated Nov. 21, 2022 (8 pages).

Office Action issued from the European Patent Office for related Application No. 19800351.9 dated Nov. 6, 2023 (6 Pages).

(56) References Cited

OTHER PUBLICATIONS

Mexican Patent Office Action for Application No. MX/a/2018/000003 dated Jul. 3, 2023 (6 pages, English translation included).
Anonymous Graphene et al.: "Graphene Nanoplatelets R10", Dec. 16, 2024, Retrieved from the Internet: URL: https://www.fuelcellstore.com/graphene-nanoplatelets-r10 (8 pages).

* cited by examiner a)  b)

a)  b)

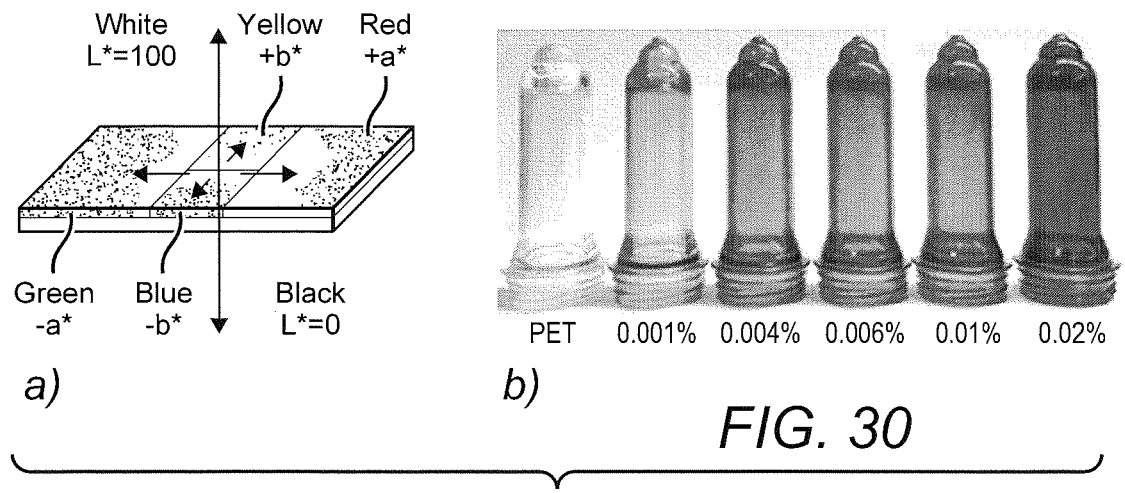
FIG. 30
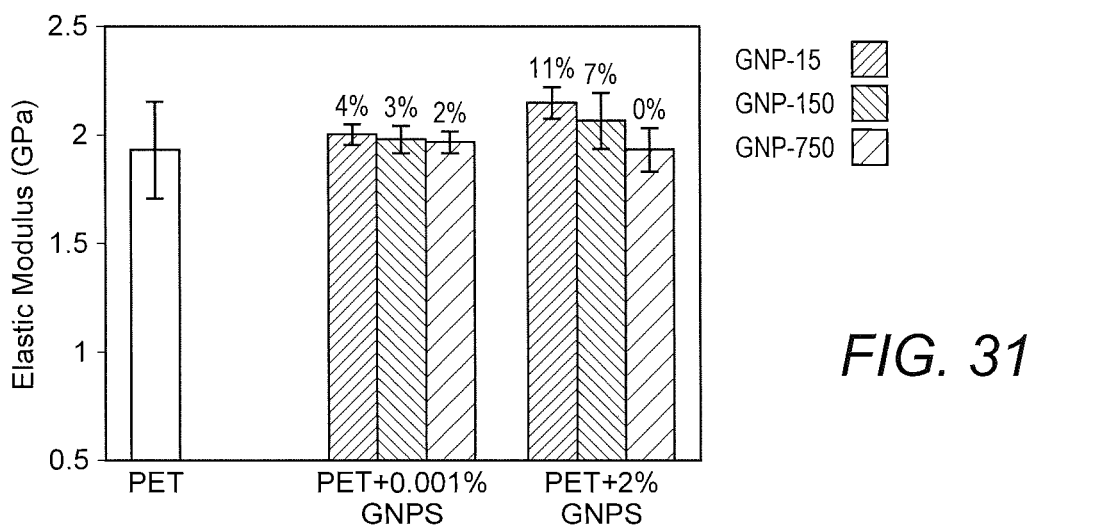
FIG. 31
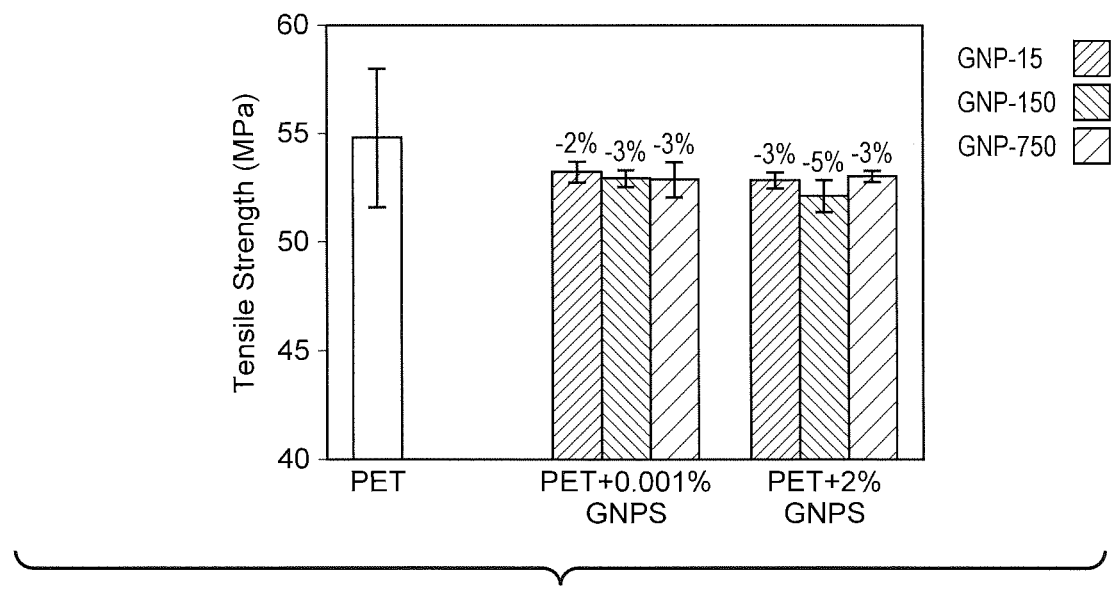

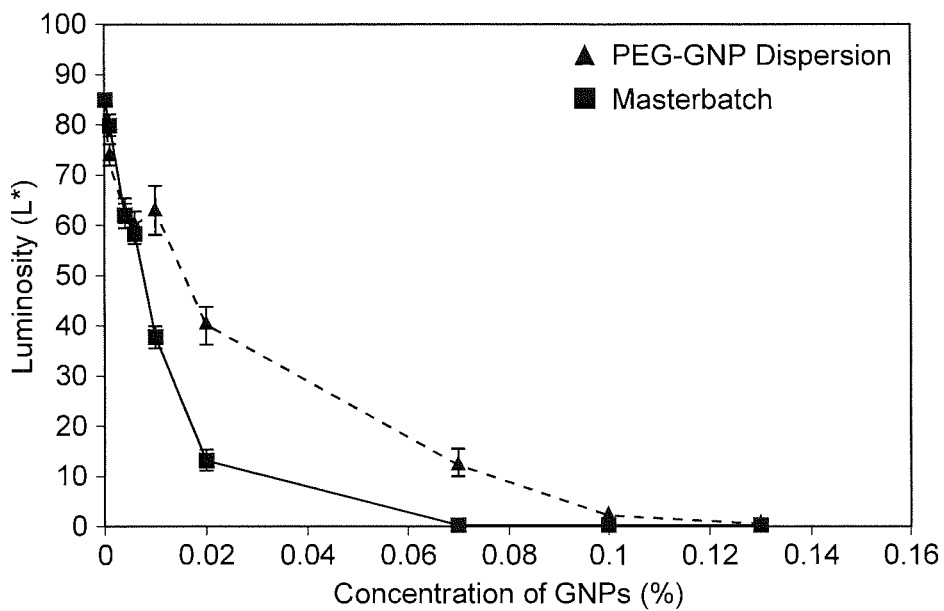
FIG. 82
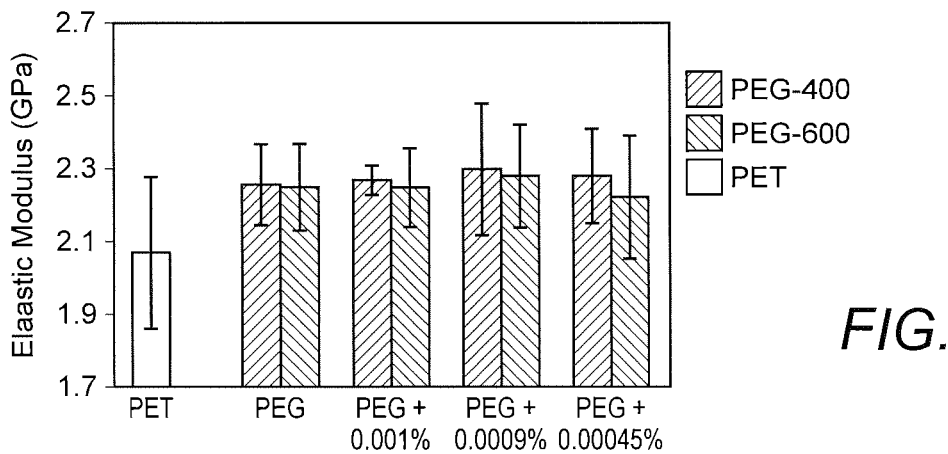
FIG. 83
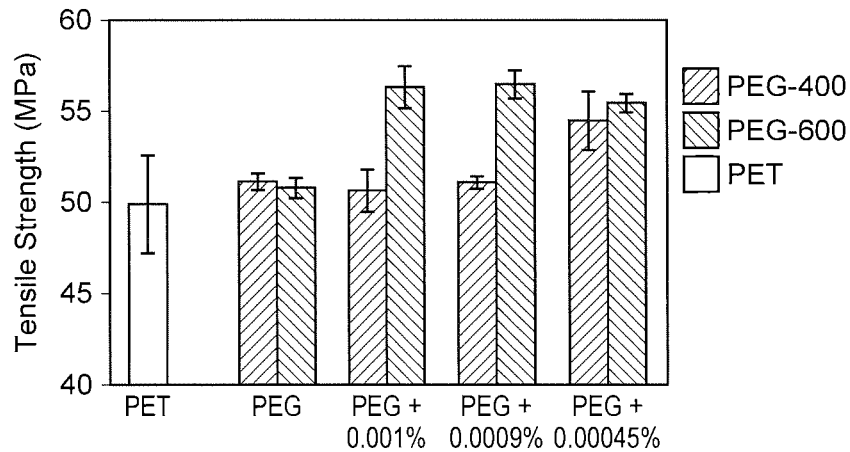

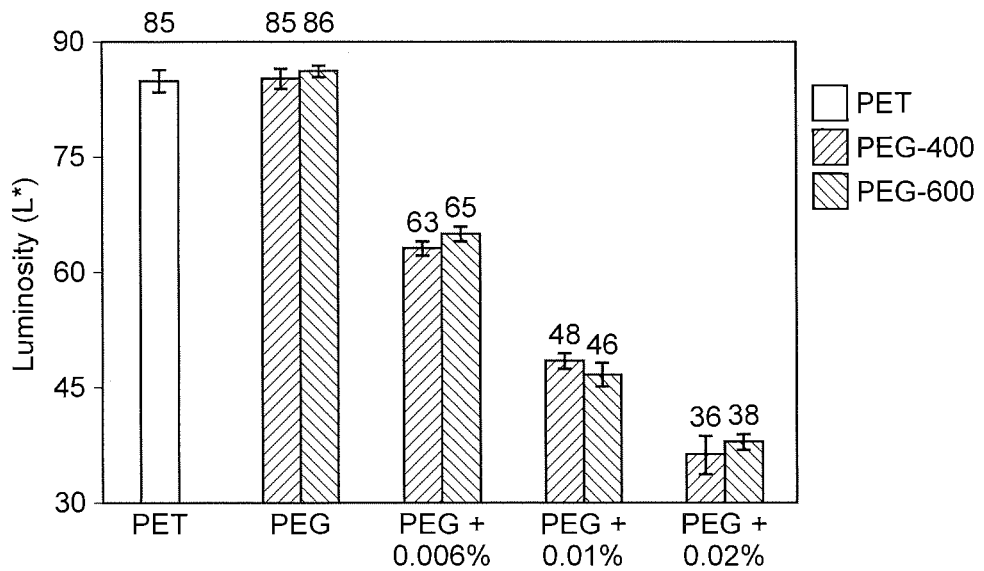
FIG. 88
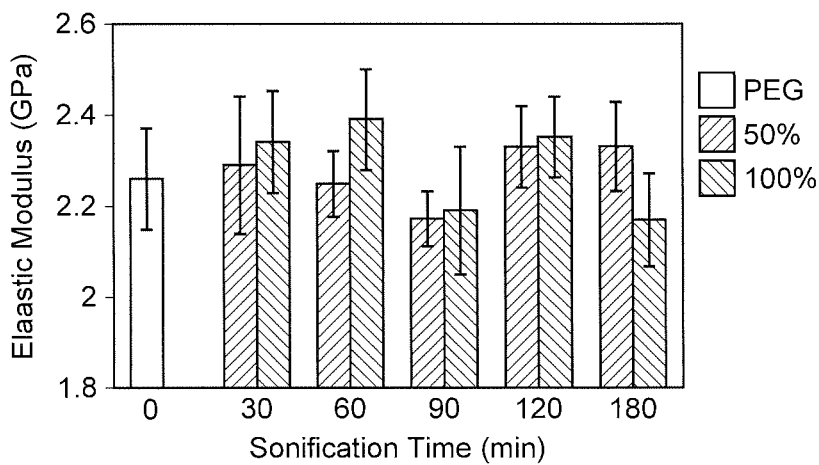
FIG. 89
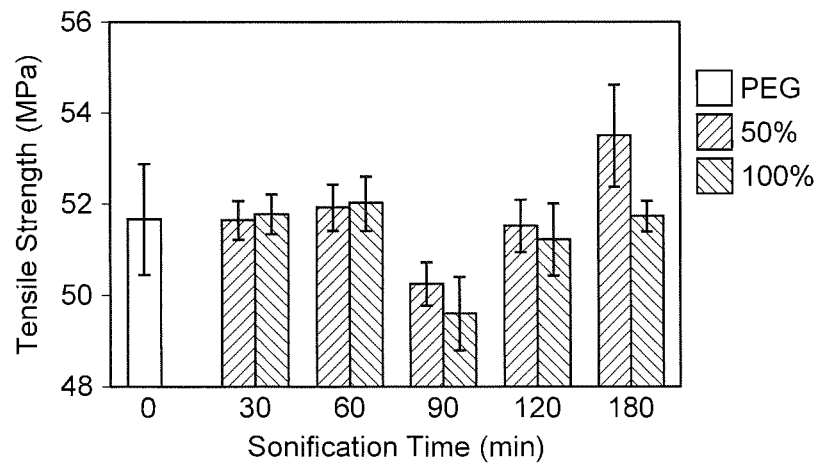

POLY(ETHYLENE TEREPHTHALATE)-GRAPHENE NANOCOMPOSITES FROM IMPROVED DISPERSION

PRIORITY

This application claims the benefit of and priority to U.S. Provisional Application, entitled "Poly(Ethylene Terephthalate)-Graphene Nanocomposites From Improved Dispersion," filed on May 9, 2018 and having application Ser. No. 62/669,282.

FIELD

Embodiments of the present disclosure generally relate to the field of polymer composites. More specifically, embodiments of the disclosure relate to a graphene reinforced polyethylene terephthalate composition and methods for dispersing graphene nanoplatelets within polyethylene terephthalate.

BACKGROUND

Composites are multi-phase materials comprised of a matrix and a reinforcement material. Herein, the matrix is a polymer and the reinforcement a nanofiller dispersed in the matrix. Polymer composites take on characteristics dependent on their reinforcement, including changes in elastic modulus and tensile strength. A broad range of inorganic and organic particles, such as minerals, glass, carbon black, and wood, have been used as fillers in the development of thermoplastic composites. Recent research into nanomaterials has led to the development of nanoscale fillers that can be used to create nanocomposites with enhanced properties compared to conventional composites. The logical progression is to develop polymer nanocomposites, which are defined as a multi-phase, polymer-based material, such as thermoplastics, thermosets, or elastomers, with a filler exhibiting at least one dimension below 100 nm.

Nanofillers characteristically have a high surface-area-to-volume ratio. The material properties of composites depend on the interaction between the matrix and the nanofiller. Nanocomposites often have more significant improvements in properties per volume fraction of filler than conventional composites. This is because of the higher surface-area-to-volume ratio of nanoscale materials, which allows for more interaction between the filler and the matrix per volume fraction. Due to the low fraction of filler, nanomaterials are typically much lighter than conventional composites. They are also more easily incorporated into existing polymer processing methods. This leads to materials that have many potential applications in a variety of industries, such as packaging materials, automotive, and aerospace applications. Over the past two decades, several different types of nanofillers, (e.g. nanoparticles, clay, carbon nanofibers (CNFs), carbon nanotubes (CNTs), graphene, $SiO_2$, $TiO_2$, etc.) have been utilized for the development of polymer nanocomposites. While improvements in various properties of polymer nanocomposites are dependent on the type of nanofiller used, the way they are integrated into the matrix also affects the performance and properties of the finished product. When producing nanocomposites, the most significant challenge is often obtaining a uniform distribution of the nanofiller in the matrix. Several studies describe commonly used methods to fabricate nanocomposites such as solution blending, in-situ polymerization, and melt compounding.

Solution blending consists of the dissolution of the polymer in a suitable solvent followed by mixing with a dispersed suspension of nanofiller. While the production of nanocomposites through this approach is straightforward, one of the limitations is the selection of a suitable solvent. Due to the low solubility of some polymers in various solvents, blending often requires elevated temperatures which can make processing challenging. In addition, the solvent's properties can affect the distribution of the nanofiller, having a negative impact on the properties of nanocomposites prepared by this technique.

In-situ polymerization is another approach for the development of nanocomposites. This technique involves a chemical reaction resulting in the incorporation of a nanofiller within a polymer matrix. For example, for in-situ polymerization of PET nanocomposites, the nanofiller is first dispersed in ethylene glycol (EG), a liquid, PET polymer precursor. The dispersions are then mixed along with terephthalic acid (TPA) through an esterification reaction to create the monomer. The second step, polycondensation reaction, is undertaken to continue the preparation of the polymer with intercalated nanofillers. This technique can result in a more homogenous distribution of nanofiller in the matrix.

Melt compounding consists of mixing the polymer and the nanofiller at high temperatures. In this process, the nanofiller is first compounded with the molten polymer to then fabricate nanocomposites using an injection molding process. Melt compounding utilizes shear forces to incorporate the nanofiller in the matrix. Of the three methods, melt compounding is the most industrially accessible, since it does not require solvents and can be used in existing large-scale processes.

Poly(ethylene terephthalate) (PET) is a thermoplastic polyester. Depending on its processing, such as thermal history (rate of cooling) and mechanical history (stretching), it can exist in both amorphous and semi-crystalline structures. Through a multi-step polymerization process, PET can be synthesized with a specifically desired molecular weight. The molecular structure of PET consists of a phenyl ring and two ester groups and is illustrated in FIG. 1. PET has desirable properties, (e.g. transparency, colorlessness, low density, high strength, and chemical resistance), and is a widely-used polymer in engineering applications including fiber production and filtration. Since its discovery in the 1940s, PET has been used mostly in the food and beverage packaging industry among other thermoplastics.

PET is semi-crystalline. The degree of crystallinity in PET has a dominant influence on the mechanical and thermal properties, meaning that the physical properties of PET can be significantly improved by arrangement and degree of crystallization in the microstructure. In polymer processing, the crystallization half-time (inverse of crystallization rate), $t_{1/2}$, refers to the time at which the extend of crystallization is completed at 50%. The crystallization half-time is often used to estimate the processing conditions of a new polymer by comparing the $t_{1/2}$ with those of known polymers. Compared to other polyesters, PET has a slow crystallization rate. Huang et al. and Chen et al. compared the PET crystallization rate with other polyesters including poly(butylene terephthalate) (PBT) and poly(trimethylene terephthalate) (PTT). They ranked the crystallization rate in the order of PBT>PTT>PET. Based on the results obtained in this research, it was found that the crystallization half-time (inverse of crystallization rate) was 0.95±0.15 min for pristine PET. Additionally, PET has limited barrier performance, which constrains the use of PET in some applications. However, research suggests that the addition of nanofillers increases the crystallinity of PET, which also contributes to enhancement in its mechanical and barrier properties.

Graphene is a relatively new nanofiller that has been used in the development of polymer nanocomposites. Graphene-based nanocomposites consist of single-layer graphene sheets, few-layer graphene sheets, and multi-layer graphene sheets. Within the layers, covalent bonds are strong, whereas between the layers the weaker Van der Waals force dominates. The elastic properties and breaking strength of graphene sheets have been measured and reported as 100 times greater than steel, with a Young's modulus of 1.0±0.1 TPa and tensile strength of 130 GPa. Geim and Novoselov's 2010 Nobel Prize-winning research illustrated that a one-square-meter graphene hammock would support a 4 kg cat while only weighing as much as one of the cat's whiskers. Recent discoveries revealed the thermal conductivity of graphene to be in the range of 1500 to 2500 W/(m·K). When incorporated appropriately, graphene can significantly improve the mechanical, electrical, and thermal properties of the host polymer. This makes it a desirable nanofiller in nanocomposites for a variety of applications.

There is increasing demand for graphene-based nanocomposite materials. Zhao et al., reported a 150% increase in tensile strength by only adding 1.8% (vol. %) graphene nanoplatelets into poly(vinyl alcohol) (PVA). Graphene shows promise in biomedical devices as sensors because of its large surface-area-to-volume ratio. Research suggests that certain molecules are sensitive to disease indicators and are likely to attach to the carbon atoms in graphene. Furthermore, graphene-based materials have been used to develop supercapacitors acting as energy storage materials due to their long cycle life and higher power density. Micromechanical cleavage is a well-known technique to produce graphene using an adhesive tape on graphite. In this approach, graphene is detached from graphite powder. By repeating this procedure, multi-layer graphene can be cleaved into few-layer graphene. Although this method is simple, it is impractical for obtaining larger amounts of graphene. Graphene can also be dispersed in a liquid-phase medium through exfoliation of graphite. However, the size of the dispersed graphene sheet is low compared to micromechanically cleaved graphene. In addition to these approaches, chemical vapor deposition (CVD) has also been reported as a useful process to synthesize graphene on transition metals. In this method, graphene deposited on the metal can be easily transferred to other substrates with PET being a common choice. While the CVD method is efficient to produce graphene with better crystallinity than that formed by any other method, controlling the thickness of graphene during synthesis is a hurdle impacting future applications. Table 1 summarizes the advantages and disadvantages of the techniques used to produce graphene.

TABLE 1

Advantages and disadvantages of currently used techniques to produce graphene.

| Method | Process | Advantages | Disadvantages |
| --- | --- | --- | --- |
| Micromechanical Cleavage | Oxidization, then exfoliation of graphite Result is graphene oxide dispersion Chemically functionalized graphene-like sheets with compounds such as hydroxyl and epoxides | Strongly hydrophilic Concentration of dispersion: In organic solvents, up to 1 mg/mL In water, up to 7 mg/mL Low complexity | Poor electrical conductor due to the disruption in the π-π orbital structure Removing the oxides with thermal or chemical reduction requires high temperatures (1,000° C.) High-yield production is difficult |
| Exfoliation of Graphite | Liquid-phase exfoliation Sonication and centrifugation Result is non-oxidized dispersion of few- to monolayer graphene | Ability to prepare large quantities of dispersions Graphene in dispersion media Higher concentration in organic solvents Cost-effective | Relatively low concentration of graphene dispersion Limit in selecting the solvents due to toxicity of organic solvents |
| Epitaxial Growth | The growth of graphene on metallic or metal carbide substrates CVD of hydrocarbons | Most uniform films (of any method) Large-scale area | Difficult control of morphology and adsorption energy High-temperature process |

Recently, Istrate et al., reported on the fabrication of melt-compounded PET-graphene nanocomposites. They found that at a nanofiller loading as low as 0.07 wt. %, the stiffness increased by 10% compared to pristine PET. In addition to improvements to the mechanical properties, graphene can also enhance the electrical properties of PET. According to Zhang et al., owing to graphene's large surface area, a high electrical conductivity of 2.11 S/m can be achieved by an addition of 3 vol % of graphene. Li et al. found that graphene can also improve thermal degradation temperatures of PET nanocomposites, compared to pure PET, nanocomposites at 7 wt. % showed a thermo-oxidative degradation temperature 32° C. higher for 30% weight loss.

Due to the differences in surface energies of PET and graphene, graphene tends to agglomerate, which negatively impacts the properties of the nanocomposite. To avoid the agglomeration of graphene sheets, functionalizing the graphene's surface chemically helps to reduce the surface energy. However, the addition and removal of the functionalized group adds complexity to the development of nanocomposites.

FIG. 2 illustrates the types of graphene incorporation into the matrix. As shown, in the phase-separated structure (a), the polymer chains do not interact with the graphene sheets. In this case, the bulk of the nanofiller phase, graphene, will not be incorporated into the polymer matrix because of its phase separation and will therefore not be able to modify the properties of the whole composite as much as it could in the other cases because of its minimal incorporation with the matrix. In the second phase (b), intercalated, the graphene sheets have been exfoliated to few- to several-layer sheets that are much smaller than the first phase, but still not monolayer graphene. In this case, more of the graphene is incorporated into the polymer matrix than the first case, but there is still graphene that is not. This intermediate state shows some modification of the matrix's properties due to the better incorporation of the graphene than the first case, but not as much as the third case. In the third case (c), monolayer graphene is maximally incorporated into the polymer matrix, which is the most efficient use of the graphene towards the modification of the properties of the polymer.

The orientation of the graphene inside the matrix can influence the electrical, mechanical, and thermal properties and controlling it is a challenge. According to Vaia et al. and Wang et al., a random distribution of nanofiller inside the matrix provides less enhancement in the matrix compared to aligned distribution. FIG. 3 represents an illustration of a randomly- and aligned-orientated graphene-based nanocomposite both with an exfoliated structure. Although graphene is commercially available, there is still limited information on the effectiveness of graphene-based nanocomposites. Further investigation is required to better understand the effects of the addition of graphene on the properties of the host polymer. As earlier stated, PET is one of the polymers that is preferred for food and beverage packaging. With graphene being an exceptional nanofiller, the creation of PET-graphene nanocomposites could be advantageous and open up several engineering applications.

Several researchers have evaluated the properties of PET-based nanocomposites using different types of nanofillers. Graphene-based materials have attracted significant research interest because of their ability to increase electrical conductivity and stiffness in polymers. Melt compounding is the most studied technique for the preparation of PET nanocomposites. It can be used to incorporate graphene into a PET matrix, resulting in a nanocomposite with improved mechanical, thermal and electrical properties. Unfortunately, it provides limited control over the characteristics of the distribution of the nanofiller in the resulting composite. The high temperature used in melt compounding, which liquefies the polymer phase, increases the intercalation of graphene in PET. However, at high loadings of graphene, the viscosity of the melt increases too much before achieving the intended concentration of graphene. This leads to difficulty in mixing graphene powder uniformly into the melt. Achieving a uniform distribution of graphene in PET is the first obstacle faced in the development of graphene-based polymer nanocomposites. As such, more research efforts are needed to undertake a new method to disperse graphene in PET and to better understand the conditions and optimal parameters involved in the process to improve the level of the distribution of graphene.

What is needed, therefore, is an effective and reliable process whereby graphene nanoplatelets may be uniformly dispersed in PET so as to provide reinforced bulk PET, and micromechanical models whereby the material properties of reinforced bulk PET may be predicted.

SUMMARY

A composition and a method are provided for graphene reinforced polyethylene terephthalate (PET). Graphene nanoplatelets comprising a suitable surface area are added to a dispersion medium for producing graphene reinforced PET. The average surface area may range between substantially 15 $m^2/g$ and 750 $m^2/g$. In some embodiments, the dispersion medium may be comprised of ethylene glycol. The dispersion medium and graphene nanoplatelets are sonicated to disperse the nanoplatelets within the dispersion medium. The dispersion medium and graphene nanoplatelets are centrifuged to remove larger nanoplatelets that are not suitably dispersed within the dispersion medium. A supernatant solution of dispersed graphene nanoplatelets and dispersion medium is decanted and then used for polymerization of the graphene reinforced PET. The resultant graphene reinforced PET is comprised of a continuous matrix of PET with a reinforcement material comprising dispersed phase graphene nanoplatelets.

Polymer nanocomposites are multi-phase materials comprised of a polymer matrix and a reinforcement nanofiller. Graphene is one of the most promising nanofillers with a unique combination of properties. To achieve the maximum enhancement in the properties of nanocomposites, graphene must be well-incorporated within the polymer matrix. In the present research, poly(ethylene terephthalate) (PET) and graphene nanoplatelets (GNPs) were used to fabricate PET-GNP nanocomposites through melt compounding, in-situ polymerization, and dispersion dosing.

Three methods are provided in the present disclosure whereby GNPs may be dispersed in PET. The first method involves melt compounding of a mixture of GNPs with PET pellets and powders. This method was investigated to evaluate the improvements in mechanical and thermal properties of PET. We hypothesize that dispersion of GNPs in a liquid medium, compatible with PET chemistry, can be used to achieve a more uniform distribution of GNPs in the PET matrix. We tested this in two methods: in-situ polymerization and dispersion dosing. In the in-situ polymerization method, GNPs were first dispersed and exfoliated in EG, and the dispersions were used for the development of the PET nanocomposites through in-situ polymerization. Introducing the EG-GNP dispersions, with a sufficient fraction of exfoliated GNPs, to the polymerization reactions creates well-incorporated PET-GNP nanocomposites. In the dispersion dosing method, the GNPs were dispersed in PEG, a dispersion medium with a higher viscosity than EG, and the dispersions were used for the development of the PET nanocomposites through PEG-GNP dispersion dosing via injection molding based on the following hypothesis: The higher viscosity of PEG leads to slower sedimentation of the dispersed GNPs, resulting in a higher concentration of dispersed GNPs in the medium. The addition of dispersions, with a higher concentration of highly exfoliated, few- to monolayer-graphene, to the PET melt creates PET-GNP nanocomposites with a more uniform incorporation of GNPs into the PET matrix, resulting in improved thermal and mechanical properties.

Experimental designs are disclosed whereby the level of distribution of graphene in the matrix may be evaluated as well as the enhancements in the nanocomposites' properties as follows:
1. Fabrication of nanocomposites through melt compounding PET with GNPs: Evaluation of GNP surface area and mixing methods; and characterization of nanocomposites through the addition of GNPs.
2. Fabrication of nanocomposites through in-situ polymerization: Evaluation of the EG-GNP dispersions for their concentration, size distribution, and stability; and characterization of enhanced PET prepared by introducing the EG-GNP dispersions to the polymerization reactions.
3. Fabrication of PET-GNP nanocomposites through injection molding: Evaluation of the PEG-GNP dispersions for their concentration, size distribution, and stability; and characterization of enhanced PET prepared by injection molding via PEG-GNP dispersion method.

GNPs were melt-compounded with both PET pellets and PET powders to create the nanocomposites. At 20 wt. % GNPs, the elastic modulus of PET powders and pellets improved by 182% and 101%, respectively and the tensile strength of PET powders and pellets improved by 35% and 14%, respectively. Confocal microscopy showed that the GNPs inside the PET-GNP nanocomposites, prepared by PET pellets, agglomerated to a degree much greater than PET powders.

With the goal of achieving a more uniform distribution of GNPs in the PET matrix, ultrasonic exfoliation method was employed to disperse the GNPs in ethylene glycol (EG) and poly(ethylene glycol) (PEG). Multiple characterization techniques confirmed the exfoliation and estimated the number of GNP layers dispersed in EG was 5 to 10 layers. GNP dispersions in EG and PEG were used as precursors to develop the PET-GNP nanocomposites through in-situ polymerization and dispersion dosing via injection molding, respectively. The effectiveness of GNPs by weight (c) in the nanocomposite was evaluated by the improvement in elastic modulus. The $\varepsilon$ for the in-situ polymerized nanocomposite at 2 wt. % was estimated to be 21±7, more significant than that for the melt-compounded one at the same concentration ($\varepsilon$=3±4). Interestingly, the c for the dispersion-dosed nanocomposite at 0.006 wt. % was estimated to be 1000±600, much more significant than that for the melt-compounded one at 2 wt. %, with the same improvement in elastic modulus. A review of sampled literature on PET nanocomposite elastic modulus improvement indicates that the effectiveness of GNPs obtained by dispersion dosing is significantly greater. Thus, the early promise of outstanding mechanical reinforcement by graphene in a polymer has been demonstrated.

In an exemplary embodiment, a polymer nanocomposite comprises: a matrix comprising polyethylene terephthalate; and a reinforcement material comprising dispersed phase graphene nanoplatelets. In another exemplary embodiment, the graphene nanoplatelets comprise a surface area of at least about 15 $m^2$/g. In another exemplary embodiment, the graphene nanoplatelets comprise an average thickness ranging between about 10 nanometers (nm) and 20 nm. In another exemplary embodiment, the graphene nanoplatelets comprise a surface area ranging between about 120 $m^2$/g and 150 $m^2$/g. In another exemplary embodiment, the graphene nanoplatelets comprise an average thickness ranging between about 6 nm and 8 nm. In another exemplary embodiment, the graphene nanoplatelets comprise a surface area ranging between about 300 $m^2$/g and 750 $m^2$/g. In another exemplary embodiment, the graphene nanoplatelets comprise an average thickness ranging between about 2 nm and 3 nm.

In an exemplary embodiment, a method for preparing graphene reinforced polyethylene terephthalate (PET) comprises: obtaining graphene nanoplatelets comprising a suitable surface area; adding the graphene nanoplatelets to a dispersion medium suitable for producing PET; sonicating the dispersion medium and graphene nanoplatelets so as to cause a homogeneous dispersion of the graphene nanoplatelets within the dispersion medium; centrifuging the dispersion medium and graphene nanoplatelets to remove a portion of larger graphene nanoplatelets that are not suitably dispersed within the dispersion medium; decanting a supernatant solution of graphene nanoplatelets dispersed in the dispersion medium; and using the supernatant solution for polymerization of the graphene reinforced PET.

In another exemplary embodiment, the graphene nanoplatelets comprise a surface area of at least about 15 $m^2$/g. In another exemplary embodiment, the graphene nanoplatelets comprise a surface area ranging between about 120 $m^2$/g and 150 $m^2$/g. In another exemplary embodiment, the graphene nanoplatelets comprise a surface area ranging between about 300 $m^2$/g and 750 $m^2$/g.

In another exemplary embodiment, sonicating comprises immersing the solvent and graphene nanoplatelets in a bath sonicator for a period of time and operating the bath sonicator at a frequency suitable for dispersing the graphene nanoplatelets within the solvent. In another exemplary embodiment, sonicating comprises selecting the period of time so as desirably reduce an average length and width of the graphene nanoplatelets. In another exemplary embodiment, the frequency is a ultrasonic and the period of time ranges between at least 30 minutes and 180 minutes. In another exemplary embodiment, centrifuging comprises subjecting the solvent and graphene nanoplatelets to a rotational speed of centrifugation ranging between at least 1400 RPM and 7200 RPM.

In another exemplary embodiment, adding further comprises selecting polyethylene glycol as the dispersion medium suitable for producing the graphene reinforced PET. In another exemplary embodiment, selecting polyethylene glycol comprises selecting any one of PEG-300, PEG-400, and PEG-600 as the dispersion medium. In another exemplary embodiment, adding further comprises selecting ethylene glycol as the dispersion medium suitable for producing the graphene reinforced PET. In another exemplary embodiment, using the supernatant solution for polymerization further comprises performing an esterification reaction to produce bis(2-hydroxyl ethyl) terephthalate (BHET) with water as a by-product, followed by performing a polycondensation reaction so as to produce the graphene reinforced PET. In another exemplary embodiment, performing the polycondensation reaction further comprises including one or more catalysts comprising any one or more of Antimony (Sb), Cobalt (Co), and Phosphoric Acid.

BRIEF DESCRIPTION OF THE DRAWINGS

The drawings refer to embodiments of the present disclosure in which:

FIG. 30 illustrates a CIEL*a*b* scale used for color measurements, a), and PET and PET nanocomposites prepared at varied concentrations, b);

FIG. 31 illustrates measurements of elastic modulus and tensile strength of PET and nanocomposites prepared by melt compounding at 0.001 wt. %, and 2 wt. % concentrations of GNP-15, GNP-150, and GNP-750;

FIG. 82 illustrates luminosity data collected from the nanocomposites prepared by PEG-GNP dispersions and masterbatch pellets;

FIG. 83 illustrates measurements of the elastic modulus and tensile strength of PET, PEG, and PET nanocomposites prepared by PEG-GNP dispersions dosing method through centrifugation study;

FIG. 88 illustrates luminosity measurements of PET, PEG, and PET nanocomposites prepared by PEG-GNP dispersions dosing method through concentration study;

FIG. 89 illustrates measurements of the elastic modulus and tensile strength of PEG and PET nanocomposites fabricated by dosing PEG-GNP dispersions that were prepared at 50% and 100% amplitudes;

Figure 1:
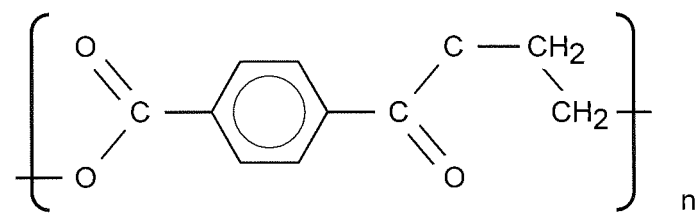
FIG. 1 is a chemical formula illustrating a molecular structure of polyethylene terephthalate in accordance with the present disclosure.
Figure 2:
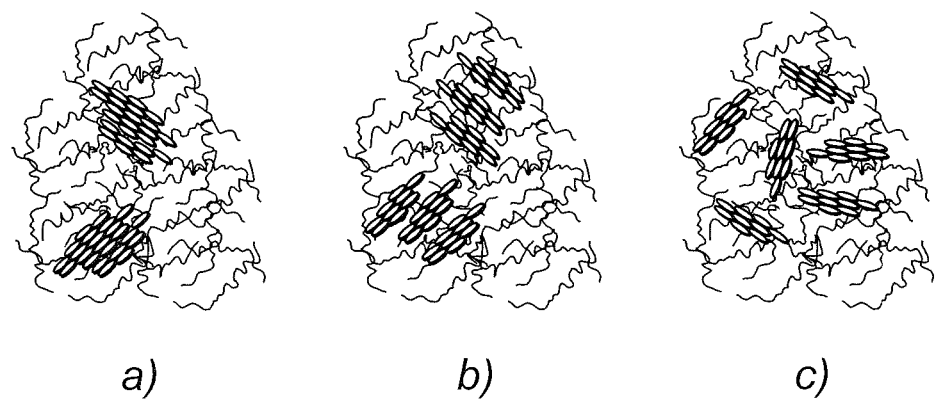
FIG. 2 illustrates a schematic representation of a) phase-separated, b) intercalated, and c) exfoliated, layered, structured filler in a polymer matrix with an amorphous structure.
Figure 3:
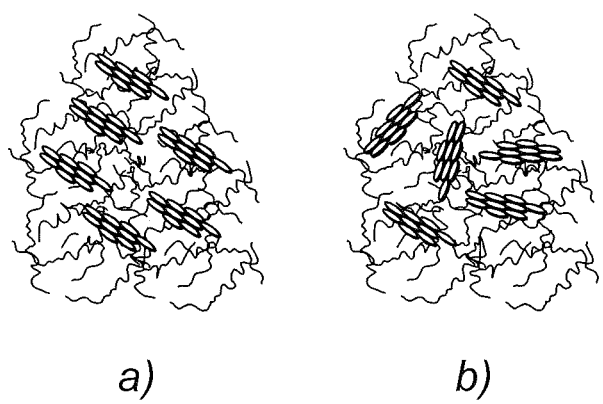
FIG. 3 illustrates a schematic representation of a) controlled alignment and b) random alignment in an exfoliated graphene-based nanocomposite.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first phase," may be made. However, the specific numeric reference should not be interpreted as a literal sequential order but rather interpreted that the "first phase" is different than a "second phase." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 4:
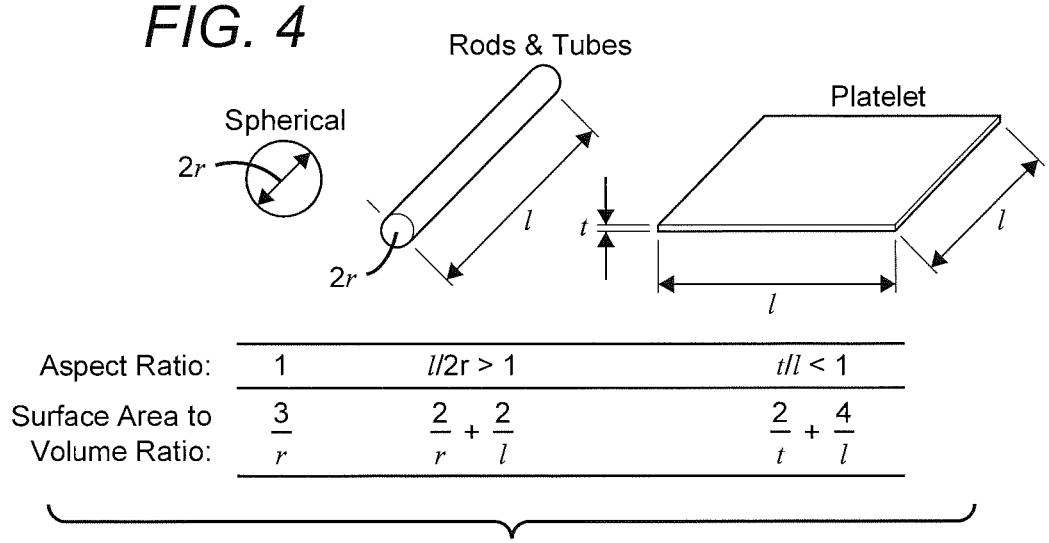
FIG. 4 illustrates a schematic representation of nanofillers' aspect ratio with respect to their shapes.

As is known in the art, some nanofillers enhance the properties of the polymer matrix, owing to their high aspect ratio. Nanofillers can be classified as either structural or functional. Lightweight materials with high elastic modulus and tensile strength are called structural nanofillers, while nanofillers with other properties such as electrical and thermal conductivity are called functional nanofillers. Nanofillers used in the development of nanocomposites can also be classified into zero-dimensional (i.e. spherical particulates), one-dimensional (i.e. fibers, rods, and nanotubes), and two-dimensional (i.e. layered-platelet) structures. FIG. 4 represents typical nanofillers and geometries with their corresponding surface-area-to-volume ratios.

Nanoparticles (zero-dimensional) are defined as particulate structures with a dimension in the range of 1 to 100 nm. Metal (Fe, Au, and Ag) and metal oxide (ZnO, $CaCO_3$, and $TiO_2$) particles have been employed in nanocomposites. Zhang et al. found that the tensile strength and elastic modulus of high-impact polystyrene (HIPS) can be increased significantly by the addition of $TiO_2$ as low as 2%. In another investigation, researchers reported a 50% increase in toughness by only adding 5% (vol. %) of $SiO_2$ in polymethylmethacrylate (PMMA) matrix. Nanoparticles also have applications in biomedical engineering. Various biodegradable polymers have been utilized in the formation of nanocomposites. While the major goals in designing nanoparticles are controlling the nanoparticles' size and properties, they can be used as potential drug delivery devices, increasing the stability of the drugs. However, some nanoparticles are known to present a toxicity risk.

Carbon nanotubes (CNTs), are allotropes of carbon with exceptional properties that have already proven valuable for several applications in industries including electronics, optics, and nanotechnology engineering. CNTs possess a high thermal conductivity of 6000 W/(m·K). The superior mechanical properties of CNTs, Young's modulus and tensile strength in the range of 0.2-0.9 TPa and 11-63 GPa, respectively, offer exciting opportunities for the development of nanocomposites. Coleman et al., investigated the addition of nanotubes in two different case studies. They reported an increase of 370% in elastic modulus, 430% in tensile strength, and 170% in toughness when added to polyvinyl alcohol (PVA) at less than 1 wt. %, and in polypropylene (PP), the addition of CNTs at equivalent loadings, resulted in an increase of 310%, 390%, and 440% in modulus, strength, and toughness, respectively.

To date, the main challenges for CNTs are to improve the dispersion and alignment in the polymer matrix when processing the nanocomposites. Analyses of these nanocomposites show that the performance of the final product is dependent on the types of CNTs (single-walled carbon nanotubes (SWNTs) or multi-walled carbon nanotubes (MWNTs)), their morphology and structure (length and chirality), and processing method. Functionalization of CNTs allows to achieve a good dispersion in the polymer matrix, therefore significant mechanical gain, as shown by Coleman et al. Nevertheless, the expensive cost to use the synthesis techniques for making CNTs remain a significant challenge. According to Breuer et al., high quality/purity CNTs currently cost $800/g, significantly higher than what has been reported for graphene (see Table 2).

Nanostructures such as nanoplatelets or layered materials can be classified as two-dimensional (2D) nanofillers. Improvement in mechanical properties of nanocomposites have been observed when a 2D nanofiller is incorporated in the polymer.

Clays are naturally found as platelets and are stacked layers ranging from few- to thousands of individual layers that possess Young's modulus from 0.18 to 0.26 TPa. One layer of clay has a thickness of 1 nm with platelet widths being in the range of 100 to 200 nm. The majority of recent research has focused on nanocomposites based on layered materials such as silicate compounds and synthetic clay. Toyota Central Research & Development Co. Inc. fabricated the first successful nanocomposites (Nylon 6/Clay) in 1994. According to Yu et al., clays can be used to enhance the mechanical and physical properties of polymers due to their high aspect ratio and large surface area-to-volume ratio.

Although clay is one of the most commonly used nanofillers for creating nanocomposites, manufacturing of polymer nanocomposites with efficient mechanical use of the clay is challenging. Organic modification of the clay is generally needed to promote improved intercalation in the polymer matrix. Additionally, nanofillers like clay are often from natural sources such as montmorillonite, which contains ions or contaminants and influences the performance of the final product. Garcia et al. showed that silicate composites possess weak electrical and thermal conductivity. In the case of polymer nanocomposites, improving several properties simultaneously, without negative impact on any key property, can be achieved when the dispersion and the interfacial interaction between the nanofiller and the matrix are controlled. Gupta et al. reported on the challenges of clay-based nanocomposites. According to them, in many cases, the performance of the final product did not meet expectations regarding the improvement in useful properties. While it has been shown that the addition of clay could increase the stiffness of thermoplastics, for example, they found that the strength of the matrix would ultimately decrease.

Figure 5:
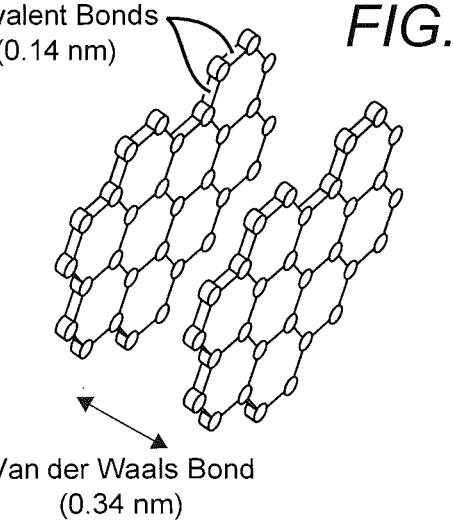
FIG. 5 illustrates an embodiment of graphene comprising a 2D mono-atomic thick carbon allotrope with a hexagonal structure.

Another type of 2D nanofiller that shows promise is graphite. Graphite is a crystalline allotrope of carbon. Graphite is chemically similar to CNTs and structurally analogous to layered silicates. When exfoliated into an individual layer, the $sp^2$ bonded carbon layers are isolated and are referred to as a "graphene sheet". Graphene is a planar, electrically conductive, elastic, crystalline allotrope of carbon that can be described as a one-atom-thick layer, arranged in a 2D, hexagonal pattern. Graphene has a very high strength-to-weight ratio, with a bond length of the C—C bond 0.14 nm and a thickness of a single graphene sheet 0.34 nm. FIG. 5 illustrates a schematic of graphene's hexagonal structure.

Carbon nanomaterials such as CNTs and graphene are advantageous over clay, due to their superior mechanical, thermal, and electrical properties. Recent research shows that graphene is even more advantageous and likely to be used as alternative nanofiller to CNTs in the production of polymer nanocomposites. As stated earlier, graphene offers enhanced mechanical properties over CNTs. This is due to the planar structure and the aspect ratio provided during the nanocomposite processing. The current research progress on graphene has helped finding potential applications for graphene-based nanocomposites. However, like the other nanofillers, the properties of graphene-polymer nanocomposites depend on the extend of distribution of graphene in the polymer matrix.

Figure 6:
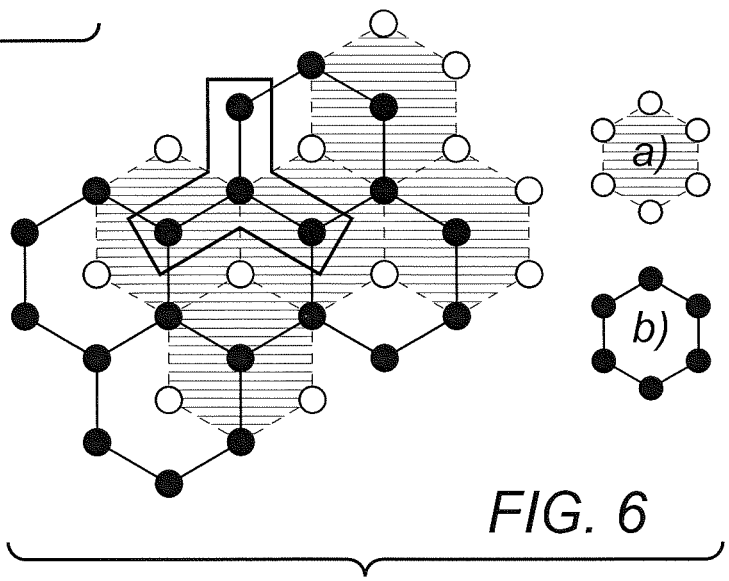
FIG. 6 illustrates chemical bonds in carbon atoms wherein Bernal stacking is formed by putting a carbon atom of the second layer marked as b) on top of a carbon of the first layer, marked as a)

FIG. 6 illustrates the crystal structure in graphene. Each carbon atom of a graphene sheet uses three atomic orbitals (s, $p_x$, and $p_y$) to form $sp^2$ bonded carbon atoms and makes a strong covalent bond with three neighboring carbon atoms, giving rise to a C—C—C bond with 120° C. angle, shown with the shaded region. Each carbon atom bonds with three other neighbor carbon atoms, comprising σ-bonds, shown in FIG. 6. The final $p_z$ orbital is responsible for the π-bond that is oriented out of plane and is due to the overlap between $p_z$ orbitals. For a multi-layer graphene, Bernal stacking forms, when half of the atoms lie over the center of a hexagon in the lower graphene's layer and half lie over an atom.

Graphene can be produced in a form called graphene nanoplatelets (GNPs). GNPs are nanoparticles in stacks of small graphene sheets between 5-50 layers thick. GNPs, with wide aspect ratio, represent a new class of graphene. The platelet shape of GNPs results in a relatively higher number of carbon edges per unit volume, making them easier to chemically bond and change the fundamental properties of the polymer matrix. At small loadings, they can create electrically and thermally conductive materials. According to Wu et al., using GNPs can improve the electrical conductivity of thin film as high as 2,200 S/cm, significantly higher than that formed by other carbon-based materials, (i.e. CNTs).

Dr. Lawrence T. Drzal, from Michigan State University, has shown that GNPs are potential candidates to improving barrier properties, modulus, and surface toughness, after being incorporated into a polymer matrix. More recently, Dr. Bor Jang, from Wright State University, investigated developing GNPs suitable for applications such as conductive composites, heat radiation, conductive inks, and rubber. Table 2 summarizes the specifications of the investigated GNPs used in the current research.

TABLE 2

XG-Sciences and Angstron GNPs physical properties.

| Grade of GNPs | Label | Surface Area ($m^2/g$) | Thickness (nm) | Average Particle Diameter (μm) | Cost ($/kg) |
|---|---|---|---|---|---|
| M | GNP-150 | 120-150 | 6-8 | 5, 15, 25 | 199 |
| C | GNP-750 | 300, 500, and 750 | 2-3 | ≤2 | 199 |
| N006 | GNP-15 | ≥15 | 10-20 | 5 | 450 |

Graphene Dispersions in Liquid Media

To incorporate graphene into composites using dispersions or in-situ polymerization it is necessary for the graphene to be dispersed in a liquid medium. Though certain specific criteria must be met to produce a graphene dispersion suitable for a particular application, exfoliation of graphene in various liquid media has been widely studied. Exfoliation can be useful for obtaining monolayer graphene that is considered the most desirable structure of graphene for many research areas. Sonication is a process of agitating particles in a liquid medium using high-intensity sound waves with frequencies above 20 kHz. Sonicators either produce the ultrasonic waves from the outside of a container into a water bath, wherein samples are submerged (called bath sonicators) or can be propagated down a probe that is immersed directly into the sample (known as probe sonicators). During sonication, the ultrasonic waves radiate through the medium with rapidly alternating low and high pressures resulting in cavitation. In the low-pressure stage, millions of micro-bubbles form and grow. The following high-pressure stage collapses the bubbles and releases a large amount of energy. To calculate the power density, the power delivered to the convertor with the probe in air (not immersed in the sample) can be recorded. Without changing the amplitude, the probe should be immersed into the sample and the amount of delivered power can be again recorded. The difference between power readings is divided by the area of the probe to calculate the power that is being delivered to the sample (power density) using the following equation:

$$P = \frac{P_2 - P_1}{\pi r^2} \quad (1)$$

where P is the power density (Watts/cm2), $P_2$ is the power when probe is immersed (Watts), $P_1$ is the power when probe is in air (Watts), and r is the radious of probe tip (cm). Using the power density, the total input energy delivered during sonication can be calculated using the following equation:

$$E = P \times t \quad (2)$$

Where E is the energy density released to the sample during sonication (J/cm2), P is power density (Watts/cm2), and t is time (s).

In probe sonication, the generator transforms AC power to a 20 kHz signal that drives a converter. In the converter, the signal is converted to a mechanical vibration, which is then amplified and transmitted through the probe's tip which is immersed in the sample. The measurement of the tip's excursion is referred to as amplitude and can be set manually during sonication. Amplitude is an important parameter in probe sonication. Operation at low or high amplitude will deliver low and high intensity, respectively. While bath sonication provides a weak sonication, with approximately 25 Watts of output power, probe sonication provides a higher output, resulting in a uniform ultrasonic transmittance and cavitation. Due to the uniform cavitation in probe sonication, the effectiveness of the sonication process is much higher, offering a potential application in dispersing nanomaterials in liquids.

Figure 7:
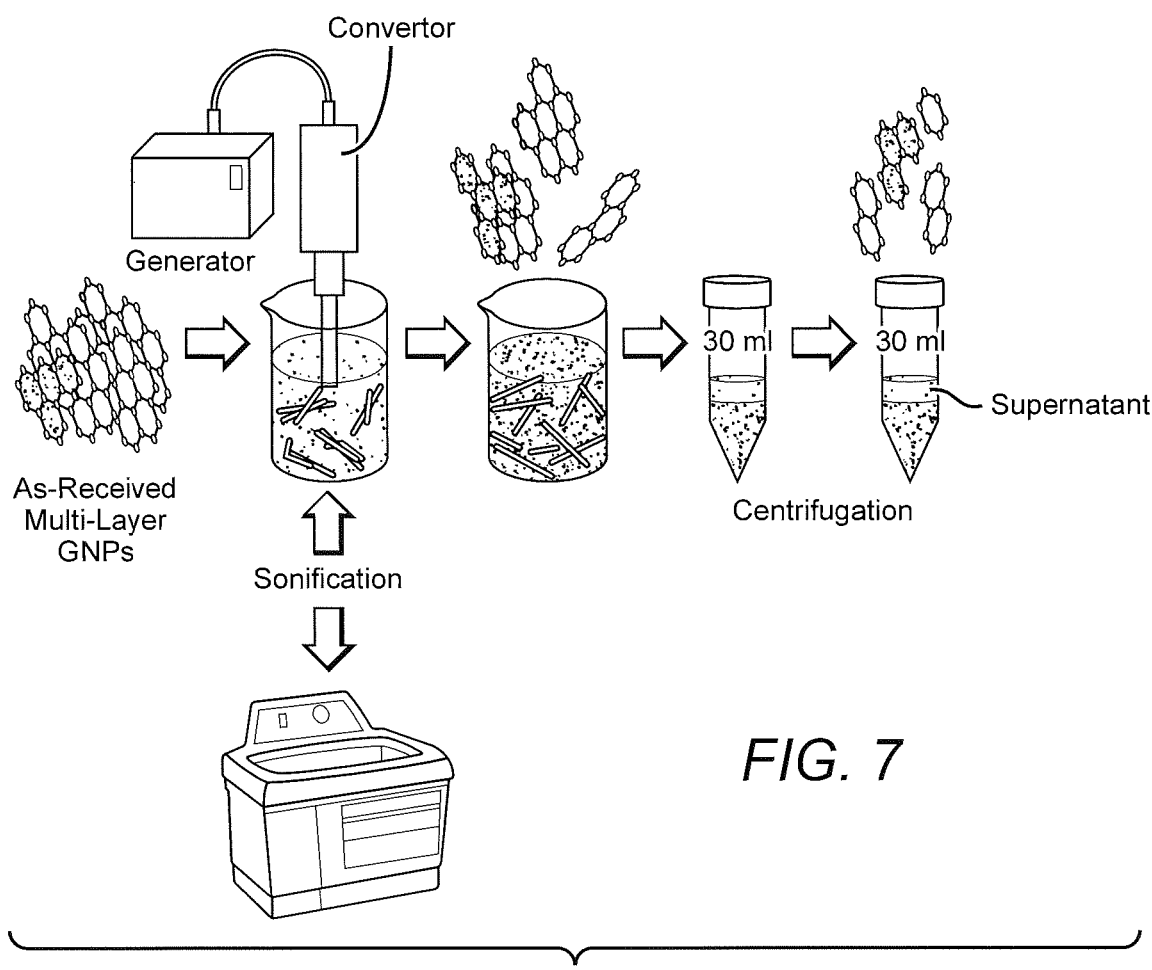
FIG. 7 illustrates a schematic representation of achieving graphene dispersion in dispersion media.

In the present research, both probe and bath sonication methods were used to create the graphene dispersions in liquids. The energy released from ultrasonic cavitation separates the graphene sheets from the multi-layer graphene. To obtain a homogeneous dispersion of few- to monolayer-graphene, the sonicated dispersion is then centrifuged. Centrifugation separates the heavier and unexfoliated multi-layer graphene, from the lighter and exfoliated few- to single-layer graphene. This results in a stable dispersion containing few- to single-layer graphene. FIG. 7 illustrates a typical graphene dispersion production through an ultrasonic exfoliation method as described in the literature and used in the current research.

Though sonication is an effective technique to disperse graphene into a solution, there are several challenges associated with the process. The radiation of ultrasonic waves in bath sonication is unevenly distributed through the tank, causing an uneven sonication effect. Due to the low power density of bath sonication, the scalability of the process is very poor. In probe sonication, however, ultrasonic processing causes the solution's temperature to elevate quickly, resulting in reduced cavitation and efficiency of the process. It is important to keep the temperature as cold as possible to improve the effectiveness. Furthermore, the effectiveness of the sonication is affected by the viscosity of the solutions. Higher viscosity results in more efficient sonication because of more efficient energy transfer from the probe to the sample, as less energy is lost to free-flowing motion of the liquid, but at the same time the higher viscosity slows the dispersion of the exfoliated platelets into the surrounding dispersion medium.

Many organic compounds have a polar hydroxyl group and a non-polar hydrocarbon chain. When placed in water, these compounds form aggregates and try to minimize the contact between the non-polar hydrocarbon and the polar water molecules. Van der Waals interactions are responsible for the solubility of the organic molecules. When the hydrocarbon portion is small, the polar hydroxyl portion is responsible for the weak Van der Waals interaction, which facilitates solubility in water. However, as the hydrocarbon's length increases, the non-polar portion dominates, affecting the interactions by reducing solubility in water. When they are large enough, they tend to aggregate, resulting in their agglomeration. This phenomenon is referred to as the hydrophobic effect. Graphene is non-polar and exhibits hydrophobicity, and thus does not interact strongly with polar solvents like water.

Creating a stable/uniform dispersion of graphene with ultrasonic exfoliation relies on using a dispersion medium whose surface energy is comparable to that of graphene. According to Hildebrand theory, materials with similar surface energies are likely to interact well and be miscible. Surface energy can be correlated with enthalpy of mixing using the Hildebrand solubility parameter, δ, from following equation:

$$\frac{\Delta H_{mix}}{V_{mix}} = \frac{2}{T_{flake}}(\delta_{graphene} - \delta_{medium})^2 \phi \quad (3)$$

where $\Delta H_{mix}$ is enthalpy of mixing per unit volume (mJ/m3), is the volume of mixture, Make is the thickness of graphene flake, $\phi$ is volume fraction of graphene, and $\delta_i$ is square root of the surface energy of phase i ($\delta_i = \sqrt{E_{surfaceenergy}^i}$)(mJ/m2).

Exfoliation happens when the energetic penalty between the medium and graphene is minimized. For multi-layer graphene sheets, surface energy can be defined as the energy per unit area required to overcome the Van der Waals forces, when peeling two sheets apart. To overcome the Van der Waals forces between graphene sheets (~61 meV per C atom), we would, in fact, need an energy input of over 2 eV/nm². As seen from Eq. (3), a good exfoliation of graphene in a dispersion medium suggests the enthalpy of mixing to be close to zero. This suggests that liquid media with surface energies matching that of graphene would lead to more exfoliated dispersions than others. In addition to surface energy, surface tension has also been used to better understand the interaction between a solvent and graphene and the wettability of graphene from a thermodynamics viewpoint. According to Lyklema, surface tension can be calculated using the value of surface energy of the materials using the following equation:

$$\gamma = E_{Sur}^{Sol} - TS_{Sur}^{Sol} \quad (4)$$

where γ is the surface tension (mJ/m²), $E_{Sur}^{Sol}$ is the solvent surface energy (mJ/m²), T is the temperature (K), and $S_{Sur}^{Sol}$ is the solvent surface entropy (mJ/(m²K)).

Adamson et al. reported that the wetting or spreading of water can happen when the spreading coefficient is positive by utilizing the following equation:

$$S_{w/g} = \gamma_g - \gamma_w - \gamma_{gw} > 0 \quad (5)$$

where $S_{w/g}$ is the spreading coefficient (mN/m), $\gamma_g$ is the surface tension of graphene (mN/m), $\gamma_w$ is the surface tension of liquid water (mN/m), and $\gamma_{gw}$ is the interfacial energy of the water/graphene interface (mN/m).

A negative spreading coefficient reflects the hydrophobicity of a material. The surface tension of water at 25° C. is about 72.8 mN/m whereas the surface energy of graphene is estimated as 46.7 mN/m. The interfacial energy has been estimated to be around 90.5 mN/m, suggesting the spreading coefficient to be negative and confirming the hydrophobicity of graphene.

There are two groups of dispersion media that can be used to disperse graphene. The first group of dispersion media are those with high surface energy. For these, the surface energy is usually close to that of graphene, which helps disperse graphene without the use of any stabilizing agents. Coleman et al. have published several studies on using sonication and centrifugation methods to disperse graphene in a wide range of dispersion media including non-polar solvents such as dimethylformamide (DMF), and n-methyl-2-pyrrolidone (NMP). Graphene can be exfoliated in these compounds due to their high surface energy, and their strong interaction with C—C bonds in graphene. As mentioned earlier, graphene is non-polar and it does interact well with non-polar solvents. Though non-polar solvents are more likely better media to achieve a graphene dispersion, many of them, (e.g. NMP), are expensive and highly toxic. Moreover, the final concentration may not be high enough for many industrial applications. In the studies by Hernandez et al., graphene was dispersed at a low concentration of 0.01 mg/mL.

The other group of dispersion media are those with low surface energy such as isopropyl alcohol (IPA) and water. Due to the hydrophobicity of graphene, these media are usually combined with stabilizing agents, (i.e. surfactants). Surfactants refer to a class of molecules that tend to adsorb onto a molecule to lower the surface tension between the molecule and the dispersion medium. To understand the effects of surfactants in graphene dispersions, we must consider the structure of these molecules. A surfactant is comprised of two regions. The first region is known as the hydrophobic tail, whereas the latter one is known as the hydrophilic head. Stabilizing the graphene dispersions with surfactants involves an interaction between the hydrophobic tails of surfactants with graphene, while the hydrophilic regions are attracted to water molecules. According to Green et al., stabilizing graphene with surfactants can increase the degree of exfoliation in aqueous dispersions up to 60% while the concentration of graphene is estimated around 0.012 mg/mL.

Figure 8:
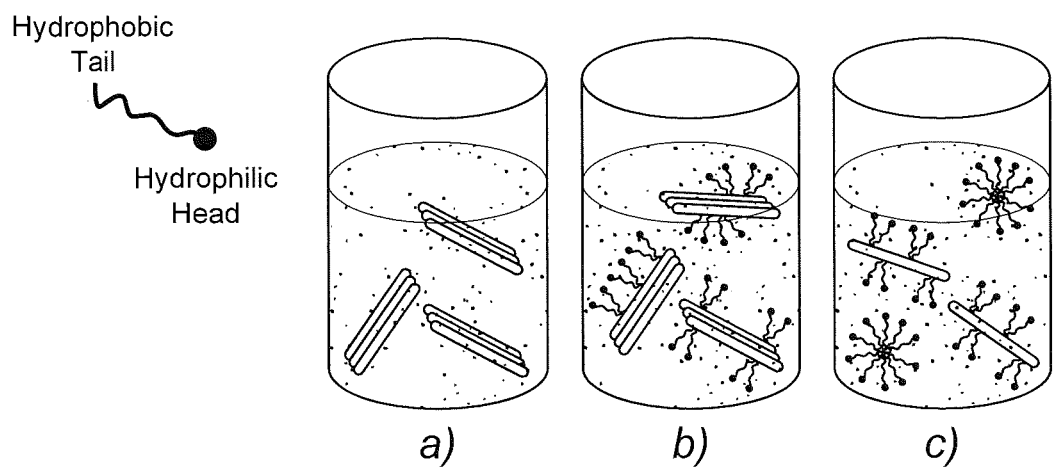
FIG. 8 illustrates graphene aqueous dispersion a) surfactant molecules, b) stabilized graphene dispersion, and c) micelle formation in the dispersion.

Until now, researchers have investigated using the following surfactants: sodium dodecyl sulfate (SDS), sodium dodecylbenzenesulfonate (SDBS), cetyltrimethyl ammoniumbromide (CTAB), sodium taurodeoxycholate (TDOC), sodium deoxycholate (DOC), Tween80, Tween85, and TritonX100. A schematic representing the addition of surfactants to graphene dispersions is illustrated in FIG. 8. A summary of solvents used and their impact on the stability and the concentration of graphene dispersions is reported in Table 3.

TABLE 3

Potential solvents and surfactants to create graphene/graphene oxide dispersions.

| Dispersion Medium | Graphene | Stabilizing Agent | Observations |
|---|---|---|---|
| Dimethylformamide (DMF) | Graphene Oxide | — | Long-term Stability |
| N-methyl-2-pyrrolidone (NMP) | | | |
| Tetrahydrofuran (THF) | | | |
| Ethylene glycol (EG) | | | |
| Acetone | Graphene Oxide | — | Short-term Stability |
| Ethanol | | | |
| Dimethyl sulfoxide (DMSO) | | | |
| Water | Graphene | Tween 80, Tween 85, Triton X-100 | Concentration up to 1 mg/mL |
| Water | Graphene | SC | Concentration up to 0.3 mg/mL Stable dispersions |
| Water | Graphite | SDS, SDBS, DOC, SC, TDOC | Concentration up to 0.03 mg/mL |

Graphene dispersions in an appropriate medium can be incorporated into polymer matrices through in-situ polymerization. Depending on the chemical structure of the host polymer, different media can be selected to create a graphene dispersion. A list of research reported on in-situ polymerization for the development of nanocomposites using graphene-based materials with different polymer matrices is summarized in Table 4. In an ideal situation, graphene would be uniformly incorporated into the polymer matrix. However, depending on the polymer molecule's chain structure, graphene may or may not affect the properties of the nanocomposite. For example, in the studies reported in polymerization of PMMA-based nanocomposites, while Jang et al. showed that graphene, due to its high surface area, can increase the glass transition temperature of the matrix, Liao et al. did not observe an increase in the glass transition temperature. To explain this behavior, the interactions between polymer chains and incorporated graphene sheets needs further investigation.

One published method uses graphene dispersions prepared primarily using non-polar solvents. The non-polar solvents typically have high boiling points, leading to difficulties in both removal of the solvent during composite preparation, and the formation of aggregations of graphene during solvent evaporation. Functionalization can improve the dispersibility of graphene. Functionalization can be divided into non-covalent (e.g. π-π interactions and surfactants) and covalent functionalization (e.g. graphene oxide (GO) and reduced graphene oxide (rGO). Using surfactants is the most promising route to improve the dispersion of graphene in a polar solvent. However, surfactants can interfere with polymerization during the formation of polymer nanocomposites. The interaction between the surfactant molecules and the polymer matrix depends on the molecular structure of both components. The presence of the surfactant molecules in a polymeric matrix can detrimentally alter the properties of the polymer. Removing surfactant molecules before the incorporation into the polymer adds complexity to the process and increases the production cost of nanocomposites.

Based on the aforementioned findings, further investigation of dispersing graphene in a polar medium, without the aid of surfactants, is needed to incorporate them into a compatible polymer matrix and create nanocomposites with higher efficiency.

TABLE 4

Research on fabrication of nanocomposites through in-situ polymerization.

| Starting Material | Polymer Matrix | Effects on Material |
|---|---|---|
| Graphene Oxide | Polypyrrole | Improved Electrical Conductivity |
| Graphene Oxide | Polystyrene | Improvements in Thermal Properties and Electrical Conductivity |
| Graphene Oxide | Polypropylene | High Electrical Conductivity |
| Graphene Oxide | Polyurethane/Epoxy | Enhancements in Mechanical and Thermal Properties |
| Graphene Oxide | Polymethyl-methacrylate | Thermal Stability, and Improvement in Electrical Conductivity |
| Graphene Oxide | Polyimides | Enhancements in Mechanical Properties and Electrical Conductivity |
| Graphene Oxide | Nylon-6 | Enhancements in Mechanical Properties |
| Reduced Graphene Oxide | Polyurethane | Increasing the Storage Modulus and Thermal Stability |
| Reduced Graphene Oxide | Polymethyl-methacrylate | Improvements in Electrical and Mechanical Properties |
| Functionalized Graphene Oxide | Epoxy | Improvement in Storage Modulus, Thermal, and Electrical Properties |
| Expanded Graphite | Polystyrene | Improvements in Thermal Properties |
| Expanded Graphite | Polyethylene | Improvements in Stiffness and Stability in Thermal Properties |
| Expanded Graphite | Polypropylene | Enhancements in Mechanical and Thermal Properties |
| Expanded Graphite | Polyethylene terephthalate | Enhancement in Electrical Conductivity |
| Graphene | Polypyrrole | Improvements in Electrochemical Properties |

EXPERIMENTAL DETAILS

Figure 9:
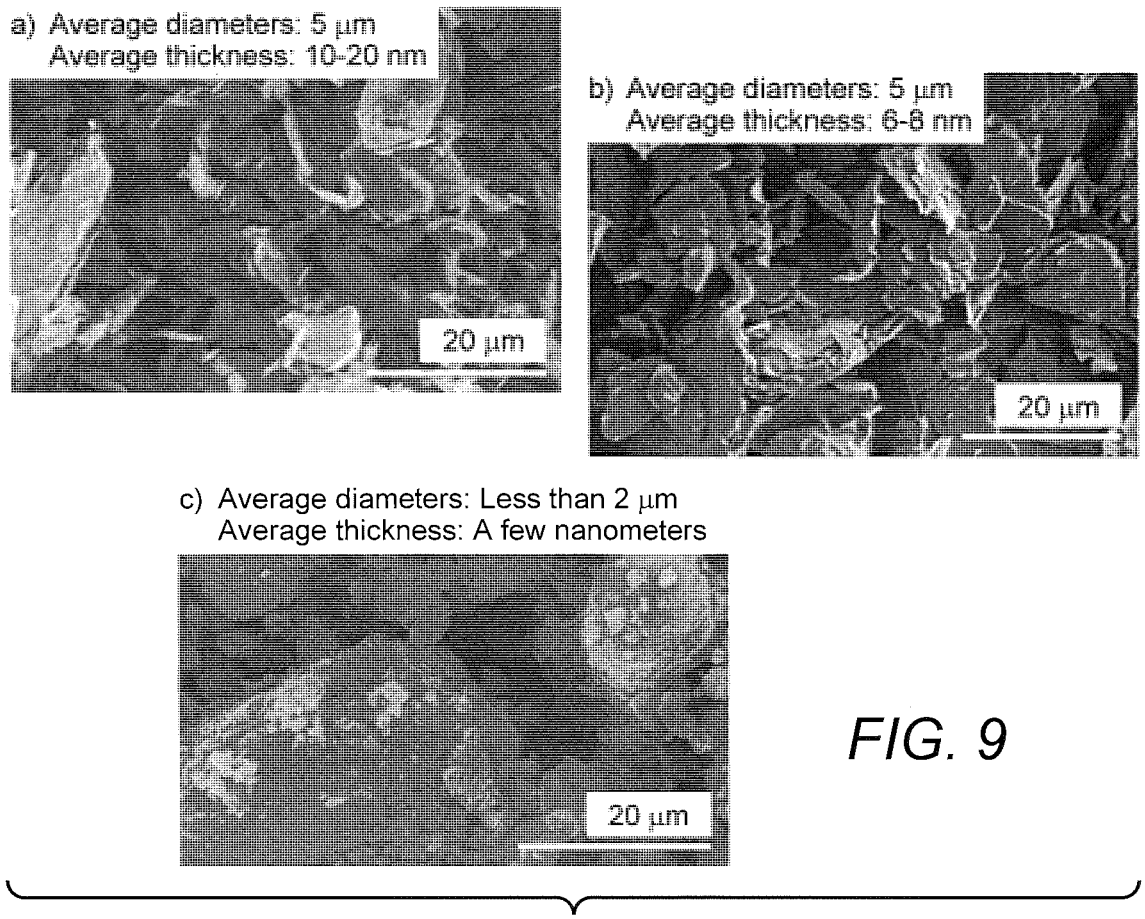
FIG. 9 comprises SEM micrographs of as-received GNPs powder showing a) N006 grade with 15 $m^2$/g (GNP-15), b) M5 grade with 150 $m^2$/g (GNP-150), and c) C grade with 750 $m^2$/g surface areas (GNP-750)

Embodiments herein utilize PET resin of a commercially available grade ($M_w$=84100 g/mol) from Leading Synthetics Australia (Oz-PET™ GG-2180) in the forms of pellets and powders. PET pellets (average pellet height and diameter of 3.10 mm and 2.10 mm, respectively) were ground into fine powders (average particle size of 0.8±0.1 mm) GNPs from XG Sciences and Nano Graphene Platelets from Angstron Materials (see Table 2) were obtained. As shown in FIG. 9, they are agglomerated particles in platelet shape, each consisting of several graphene layers stacked together. Masterbatch pellets were also utilized in this research. Using a twin-screw compounder, the GNP-15 were mixed with PET to achieve a masterbatch at final concentration of 1 wt. %. The masterbatch pellets were then diluted with PET for the preparation of the PET nanocomposites.

Herein, validating graphene dispersion in ethylene glycol (EG) and poly(ethylene glycol) (PEG) are disclosed, aiming to demonstrate how the dispersion medium affects the quality of graphene dispersion. EG ($M_w$=62.07 g/mol) was purchased from Sigma-Aldrich and Fisher Chemicals. PEG-300 ($M_w$=300 g/mol) and PEG-400 ($M_w$=400 g/mol) were obtained from Sigma-Aldrich. A high-viscosity-PEG, PEG-600, ($M_w$=600 g/mol) was purchased from the VWR and DOW Chemicals. Both PEG and EG are polar compounds due to the presence of a hydroxide group in their molecular structures. PEG possesses higher viscosity compared to EG. Table 5 summarizes the properties of EG, PEG-300, PEG-400, and PEG-600.

TABLE 5

Physical and chemical properties of the dispersion media.

| Dispersion Medium | Appearance (@ 25° C.) | Molecular Weight (g/mol) | Flash Point (° C.) | Viscosity Centipoise (cP) | Chemical Formula |
|---|---|---|---|---|---|
| EG | Clear | 62.07 | 111 | 16 | $HOCH_2CH_2OH$ |
| PEG-300 | and | 280-320 | 220 | 70 | $H(OCH_2CH_2)nOH$ |
| PEG-400 | odorless | 380-420 | 238 | 90 | |
| PEG-600 | liquid | 570-630 | 199-238 | 135 | |

Preparation of GNP Dispersions

In the present disclosure, GNP-15, GNP-150, and GNP-750 (presented in Table 2), may be used to prepare GNP dispersions for various experimental studies. EG and PEG, with varied molecular weights, were also used as liquid media for dispersion production. Probe and bath sonication techniques were used in different studies to prepare the GNP dispersions. Water temperature increases during sonication over a prolonged period, causing considerable evaporation. This leads to a decreasing water level in the sonicator and an uneven distribution of energy to the samples. To overcome this problem, a water pipe and pump were installed in the tank to circulate water between the bath and a chilled water source to keep the temperature under 40° C.

For probe sonication, the sample beaker was placed in a temperature-controlled water bath (maintained between 50 to 60° C.) for the duration of sonication. After sonication, the sample was divided into two portions to then transfer to two plastic centrifuge tubes. Each centrifuge tube was filled with 30 mL of the sonicated dispersion pipetted from the middle of the beaker to avoid sediment. Then, centrifugation was performed at rotational speeds of 1500 and 4500 RPM (revolutions per minute) for 45 minutes. During the centrifugal acceleration, sedimentation of GNPs happens in response to the forces acting on them. The force exerted on GNPs in the centrifuge is traditionally named "relative centrifugal force", G-Force (RCF), and is a simple function of the rotational speed and can be calculated using the following equation:

$$G\text{-Force} = 1.12 \times R \times (RPM/1000)^2 \quad (6)$$

where R is the radius of rotational radius in centimeters (cm), and RPM is rotational speeds measured in revolutions per minute. After centrifugation, the top 10 mL of the six supernatants was carefully pipetted and transferred for further use. Table 6 summarizes the GNP dispersions prepared by the probe and bath sonication techniques for various purposes. Table 7 summarizes the technical and experimental applications of the dispersions used in current research.

TABLE 6

Preparation of GNP dispersions in EG for lab studies.

| GNP Surface Area ($m^2/g$) | Initial Conc. (mg/mL) | Probe Sonication (min) | Bath Sonication (min) | Centrifugal Force (RCF) | Purpose of Study |
|---|---|---|---|---|---|
| 15 | 0.25 | 30-180 | 1,440-7,200 | 260 and 2350 | Spectrophotometry Raman Spectroscopy |
| 150 | 0.25 | 30-180 | 1,440-7,200 | 260 and 2350 | Electron Microscopy |
| 750 | 0.25 | 30-180 | — | 260 and 2350 | Electron Microscopy |

TABLE 7

Applications of GNP dispersions in EG, PEG-300, PEG-400, and PEG-600.

| Dispersion Medium | Application Technical | Application Experimental |
|---|---|---|
| EG | In-Situ Polymerization | Spectrophotometry Raman Spectroscopy Electron Microscopy |
| PEG-300 | n/a | Spectrophotometry Particle Size Measurements |
| PEG-400 | Injection Molding | n/a |
| PEG-600 | Injection Molding | Electron Microscopy Spectrophotometry Particle Size Measurements |

Characterization of GNP Dispersions

The absorption of transmitted light can be correlated with the amount of material that absorbs light using the Beer-Lambert (BL) Law:

$$A = \alpha CL \quad (7)$$

where A is absorbance of liquid, $\alpha$ is absorption coefficient mL/(mg·m), L is cell path length (m), and C is concentration of material (mg/mL). The BL law can be used to measure the concentration of exfoliated graphene dispersed in solvents examined with spectrophotometry analysis. The concentration of material remaining after centrifuge can be evaluated by measuring the optical absorbance and can be correlated to the concentration of graphene after centrifuge ($C_G$) using BL once the absorption coefficient is known. While the concentration of graphene depends on several factors including flake size and thickness, it is important to emphasize that BL law is only valid for dispersions with a relatively low concentration. The BL law is not obeyed when a highly-concentrated dispersion is present. Scattering, on the other hand, is another important factor that should be absent throughout spectrophotometry analysis.

Figure 10:
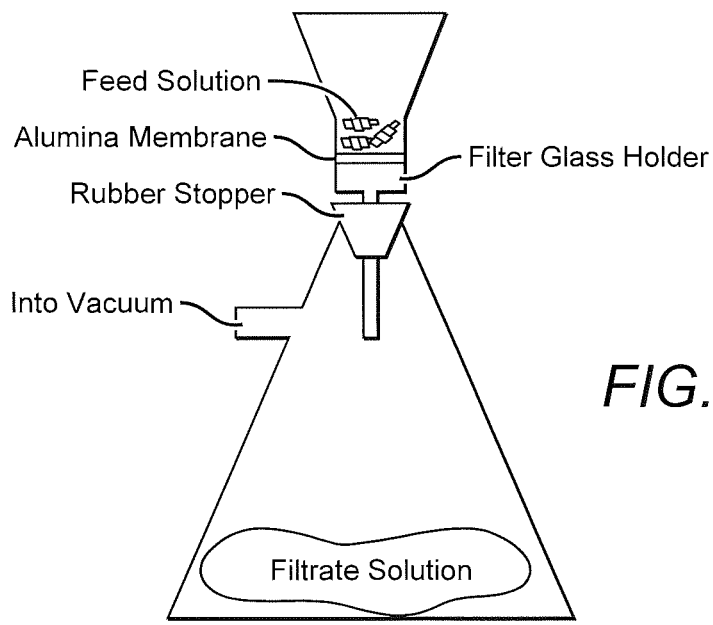
FIG. 10 illustrates filtration testing on GNP dispersions.

To find the absorption coefficient ($\alpha$) of a graphene dispersion, a series of dispersion samples were prepared using varied processing parameters, including sonication times and centrifugal forces. With a subsequent decanting, 10 mL of the supernatant of each sample was filtered through a porous (0.2 μm) Alumina filter membrane using a vacuum-assisted system (see FIG. 10). By weighing the filter membrane's weight before and after filtration at a temperature above dispersant's flash point, the concentration of actual dispersed GNPs in each sample was calculated. Measured concentrations were correlated with the ratio of the absorbance values per path length (A/L) of the corresponding sample using the BL law, to then calculate the absorption coefficient.

In this work, all samples were analyzed using a VIS-IR spectrophotometer with a cell path length of 10 mm in a cuvette. The absorbance values of samples in this study were measured at λ=660 nm. According to several studies, the absorbance of exfoliated graphene dispersion can be measured at this particular wavelength. Using this particular wavelength is useful to define the concentration of graphene in the solution when scattering is absent. Due to the low volume of the cuvette, a small quantity of GNPs might attach to the side of the cuvette while emptying between tests. To clean the cell after use, before each test was performed, the cell was rinsed off five times with distilled water and dried out with compressed air flow for one minute.

Figure 11:
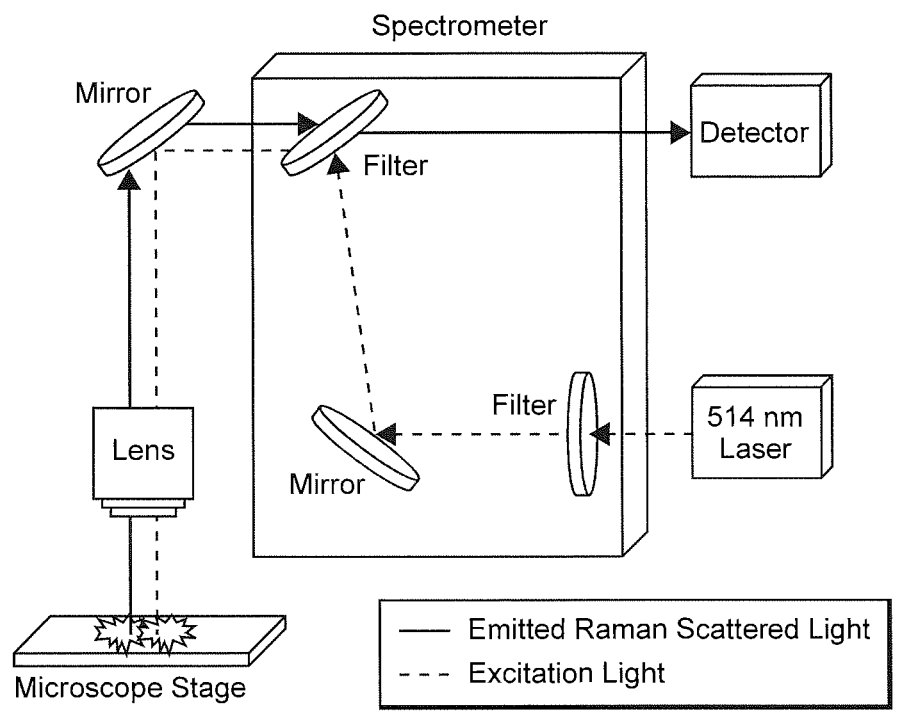
FIG. 11 illustrates an exemplary embodiment of a Renishaw RM 1000 system.

In this study, Raman spectroscopy was carried out for five different locations on each sample at room temperature (see FIG. 11). A 20× objective lens with a working distance of 12 mm and a 50% density filter were used for measurements. In Raman spectroscopy, lasers with different excitation wavelengths can be used to generate Raman scattering. The Raman signal is normally proportional to the amount of radiated laser's power. The higher the power, the stronger the signal. However, high power lasers can modify the structural or chemical properties of materials due to heat generation. To avoid this, the laser power was kept at 1 mW using 20% of the laser power. Sample preparation was done by pipetting a small quantity of the dispersion samples to glass slides, which were then heated to 200° C. for 30 minutes to dry them out.

Figure 12:
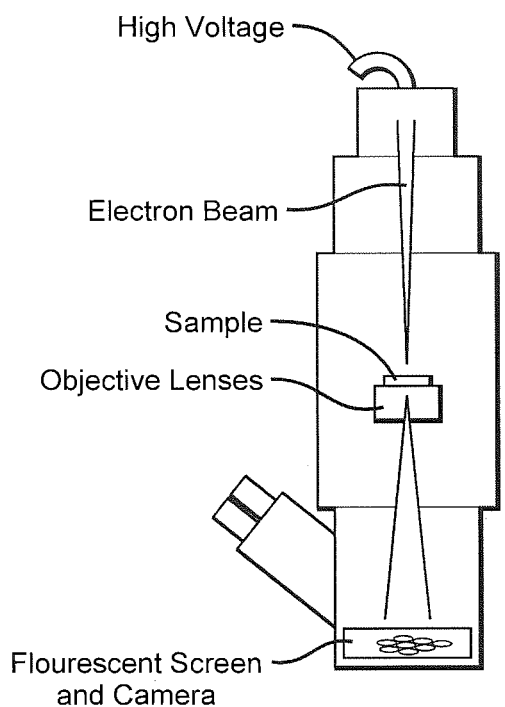
FIG. 12 illustrates an exemplary embodiment of a JEOL JEM-2100 system.

To characterize the GNP dispersions, transmission electron microscopy (TEM) was performed at 200 kV and λ=0.0025 nm to capture bright field (BF) micrographs for all dispersion samples (see FIG. 12). The boiling point of EG at atmospheric pressure is 197° C. A few drops of EG dispersion sample were placed on holey carbon grids, and then each grid was dried at 100° C. using a vacuum dryer. Through vacuum drying the solvent was evaporated at a lower temperature and a large number of GNPs remained attached to the grid, were verified for their presence and size distribution. Due to the higher boiling point of PEG compared to EG, the temperature was raised to 180° C. to coat the TEM grids with the PEG dispersions. Image J software was selected to process and analyze the TEM micrographs for further characterization. Selected area electron diffraction (SAED) was carried out to study the crystal structure of graphene.

During the analysis of the TEM micrographs, the GNPs very frequently appeared as small aggregates, instead of the expected distribution of few- to monolayer GNPs. This might have been a result of heat treatment used for the TEM grid preparation. To avoid this issue, a cryogenic condition was used to investigate direct imaging of a frozen EG dispersion using Cryo-TEM. Cryo-TEM has been increasingly investigated in studying biological samples (e.g. cells, viruses, and biological assemblies) at molecular resolution. Cryo-TEM enables direct imaging of objects in solutions under cryogenic conditions. With an objective of imaging the GNPs, while dispersed in a dispersion medium, Cryo-TEM were employed to image a frozen EG dispersion sample.

An FEI Vitrobot, a plunge freezer with an environment-controlled chamber, was used on 4 μl of a dispersion sample to prepare the Cryo-TEM grid. The sample was put on a holey carbon grid and then it was blotted away with filter paper. The thickness of the sample, coated on the TEM grid, is important and needs to meet certain criteria to result in useful images. Therefore, extra care was undertaken during blotting the dispersion to leave the thinnest possible layer of your sample on the grid without drying out (i.e. 100 to 200 nm thick). If the sample is over blotted, there will not be enough material useful for imaging. If the sample is not blotted enough, there will be a thick layer of liquid, which blocks the electron beam.

While the humidity of the chamber was set around 80-100% to avoid drying out the grid, the grid was plunged into liquid ethane to freeze the sample in a vitreous state (i.e. no crystalline ice). The grid was then transferred into a liquid nitrogen chilled grid box, in which it could be stored indefinitely. To image the frozen sample, a specific Cryo-TEM holder that could maintain −170 to −180° C. in vacuum was used. A low-dose TEM image mode (10 electrons/square angstrom) was used to avoid causing excessive electron beam damage to the sample or the frozen solvent. During the plunge freezing, it was observed that the viscosity of the dispersion medium can make the process challenging, resulting in a thick layer of sample. Cryo-TEM analysis was not conducted on PEG dispersions as the viscosity of the PEG was above the range that could be used for plunge freezing procedure. Although Cryo-TEM was useful to collect images, the use of this technique was discontinued due to technical difficulties.

The PEG dispersions were evaluated for GNP size distribution using laser diffraction. The samples for size measurements were divided into two sets based on the viscosity of the dispersion media. The as-received GNP powders were used as a reference for measurements. The Hydro MV and Aero S accessories were used to analyze the wet dispersions and the GNPs powder, respectively. For wet analysis, a few drops of dispersion were added to the Hydro MV tank until a sizable obscuration was obtained. A high disperser pressure, 4 bar, was used to complete the dry analysis. A general refractive index of 1.58/1 was used for the analyses. The dispersion samples were prepared using the GNP-15 and PEG-300 and PEG-600, at a concentration of 5 mg/mL. Table 8 summarizes the samples with the process parameters used for testing. The particle size distribution was calculated based on the Mie theory of light scattering. Based on this theory, three percentile values, which include $D_x10$, $D_x50$, and $D_x90$, are selected to define the volume-weighted distribution of the population.

TABLE 8

Dispersed GNP-15 samples evaluated for particle size measurements through laser diffraction.

| Sample Set | Samples | Dispersion Medium | Sonication (min) | Centrifugation (RCF) |
|---|---|---|---|---|
| I | Dispersion-1 | PEG-300 | 90 | n/a |
| | Dispersion-2 | | 180 | n/a |
| | Dispersion-3 | | 180 | 260 |
| II | Dispersion-4 | PEG-600 | 90 | n/a |
| | Dispersion-5 | | 180 | n/a |
| | Dispersion-6 | | 180 | 260 |

Preparation of PET-GNP Nanocomposites

Figure 13:
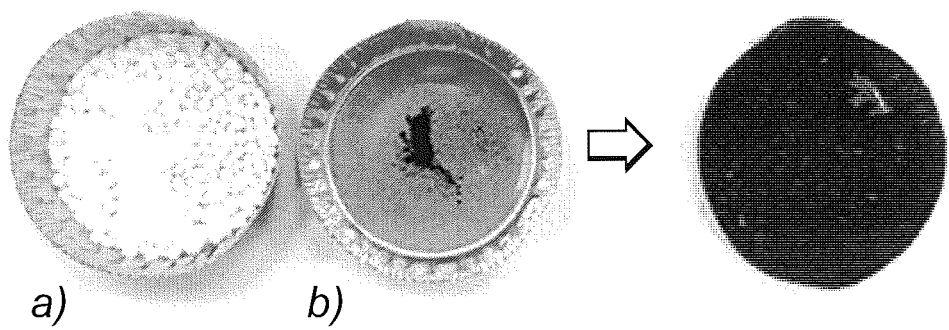
FIG. 13 illustrates a schematic representation of mixing of a) PET resin and b) GNPs.

To evaluate the effect of surface area of the GNPs on the properties of the nanocomposites, GNPs with three different surface areas were selected to make nanocomposites. The GNPs were mixed with PET pellets using two different mixing approaches: dry powder mixing and solution evaporation methods, were tested with the objective of maximizing the distribution of GNPs in PET. FIG. 13 shows the dry powder mixing approach that was selected to mix these GNPs with PET resin at a concentration of 2 wt. %.

Figure 14:
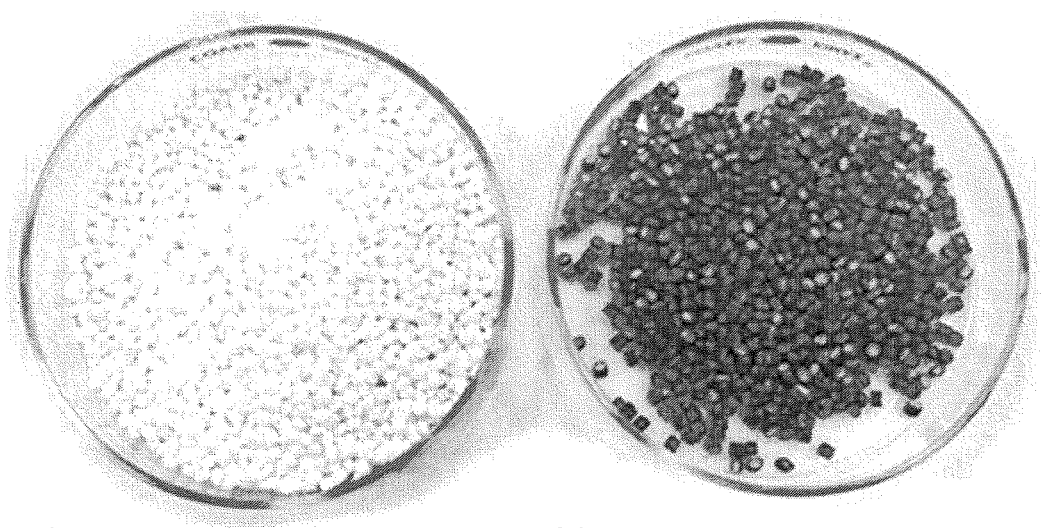
FIG. 14 illustrates a solution evaporation approach, a) PET pellets and b) PET pellets coated with GNPs.

A solution evaporation approach was used with the intention of creating an incorporated mixture at a lower concentration of GNPs. To do that, an aqueous dispersion of GNPs was prepared at a concentration of 0.1 mg/mL (0.001 wt. %). Five grams of PET resin was then mixed with the dispersion and placed in an oven at 200° C. for two hours to help evaporate the water (see FIG. 14). Though this approach is limited in terms of the final graphene weight fractions (wt. %) obtained, it was tested with the objective of evaluating the dispersion achieved by creating a uniform coating on the PET pellets. A summary of the process of sample preparation through injection molding is reported in Table 9.

TABLE 9

Summarizes the nanocomposites fabricated through injection molding.

| Sample Code | Grade of GNPs | Concentration of GNPs (wt. %) |
|---|---|---|
| A | GNP-15 | 0.001 |
| B | GNP-150 | |
| C | GNP-750 | |
| D | GNP-15 | 2 |
| E | GNP-150 | |
| F | GNP-750 | |

Figure 15:
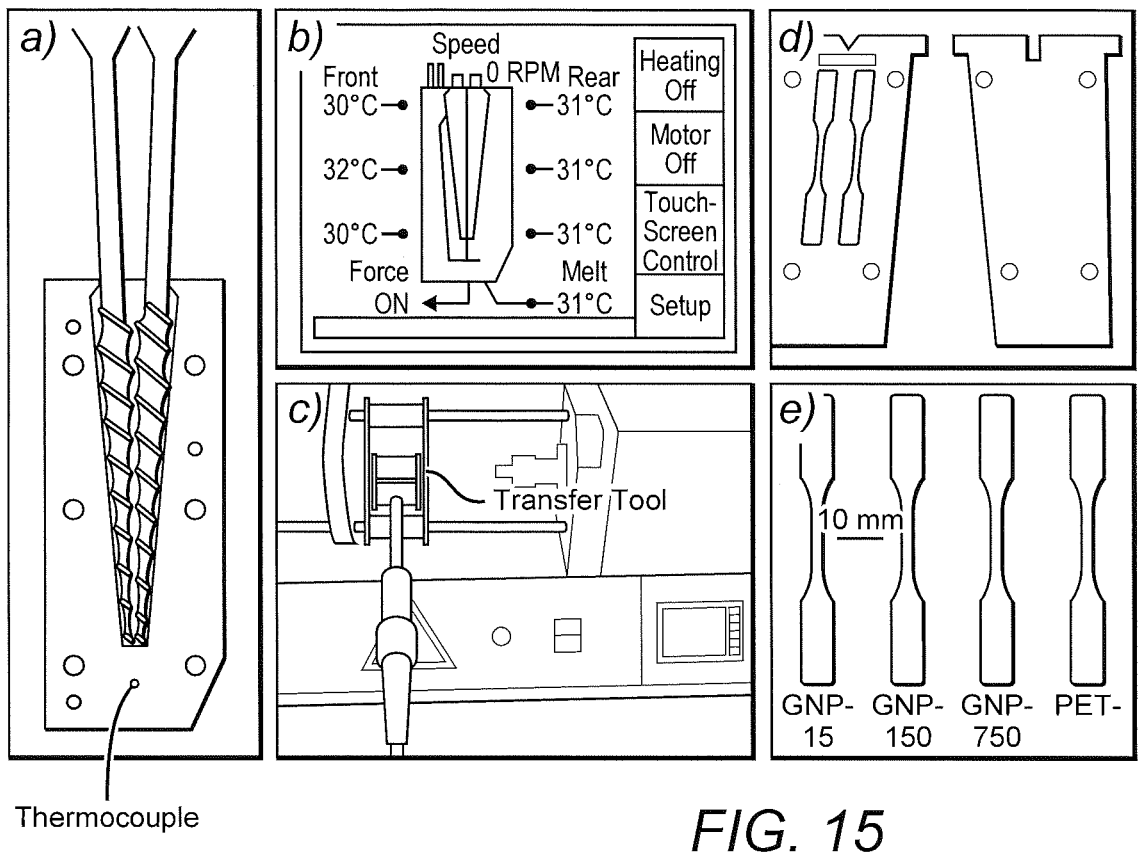
FIG. 15 illustrates a schematic representation of micro-compounding and micro-injection molding process showing a) screws, b) control panel to monitor the process parameters, c) micro injection molding unit, d) mold to create tensile bars, and e) PET and nanocomposite tensile bars prepared by melt compounding at 2 wt. % of GNP-15, GNP-150, and GNP-750.

With the barrel temperature being set at 270° C., the screw speed at 100 RPM, and process time of 1 minute, nanocomposite samples were prepared and were divided into two different groups depending upon the approach that had been selected to mix the GNPs with PET resin. A double cavity mold with a dogbone shape was used to make the tensile bars based on the ASTM D 638 standard, type I specification. Using a micro-compounder and micro-injection molder, nanocomposite tensile bars were fabricated. Nanocomposite tensile bars prepared at 2 wt. % are shown in FIG. 15.

Figure 16:
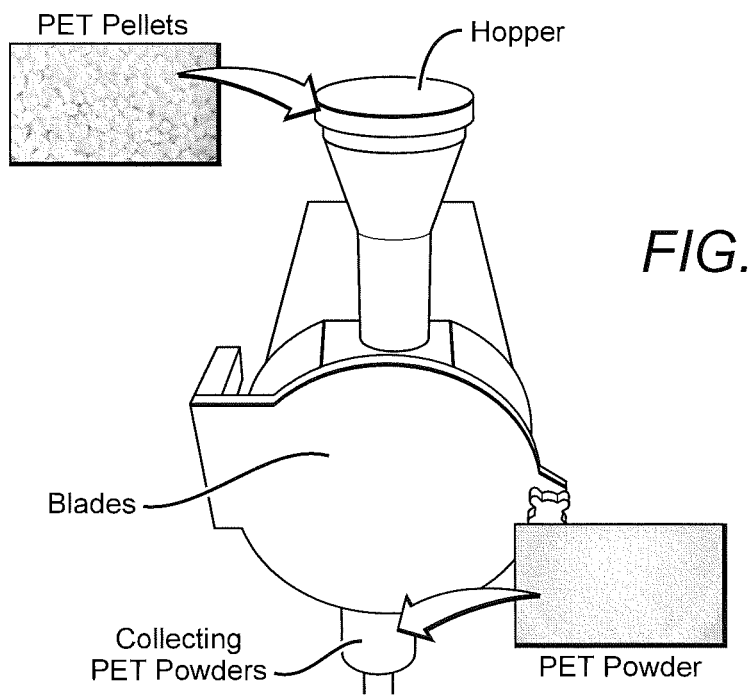
FIG. 16 illustrates a schematic representation of preparation of PET powders using a mill equipment.

Furthermore, with an objective of increasing the surface area of the PET pellets, and improving the interactions between the GNPs sheets and the PET chains, PET pellets were ground into a fine powder using a Laboratory Mill (see FIG. 16).

Figure 17:
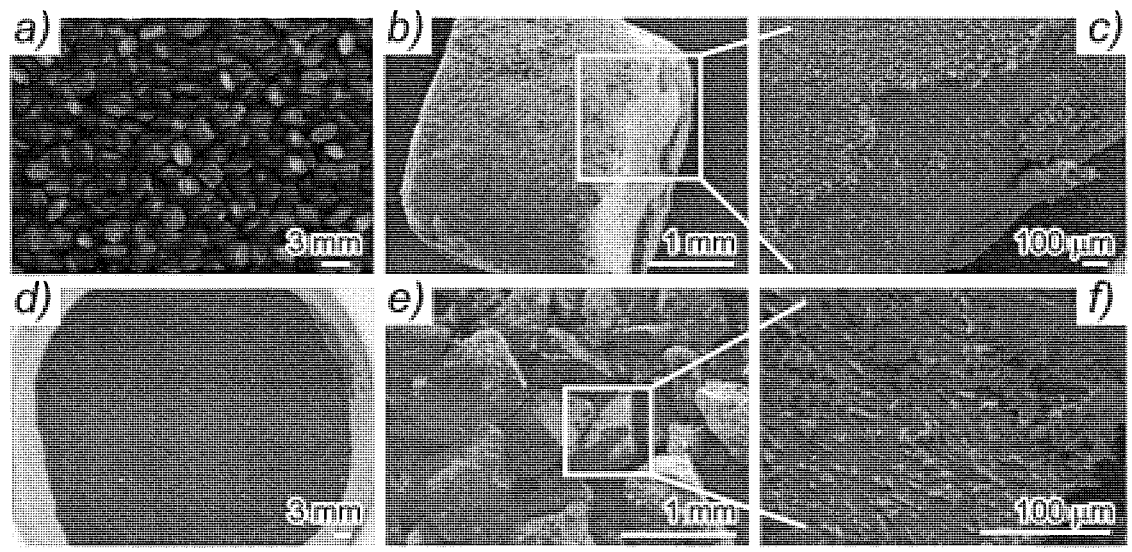
FIG. 17 illustrates exemplary photos showing dry mixed GNPs with PET pellets, a) and b), and a SEM micrograph collected from the PET pellets-GNP mixture, c), mixture of GNPs with PET powders, d) and e), and a SEM micrograph collected from the PET powders-GNP mixture, f)

FIG. 17 represents mixing methods of GNPs with PET pellets (FIGS. 17a-c) and powders (FIGS. 17d-f). To study the effects of powder mixing, the GNP-15 were taken and mixed with both PET powders and pellets at varied concentrations, summarized in Table 10.

TABLE 10

Summarizes the PET-GNP nanocomposites fabricated through melt compounding of the materials.

| Sample Code | Concentration of GNP-15 (wt. %) | PET Matrix |
|---|---|---|
| A | 2 | Powders |
| B | 5 | and |
| C | 7.5 | Pellets |
| D | 10 | |
| E | 12.5 | |
| F | 15 | |
| G | 20 | |

PET polymerization was attempted using a melt-polymerization unit, available at the polymer institute at the University of Toledo, equipped with an esterification (ES) reactor and a polycondensation (PC) reactor, each with a 3 L capacity.

Figure 18:
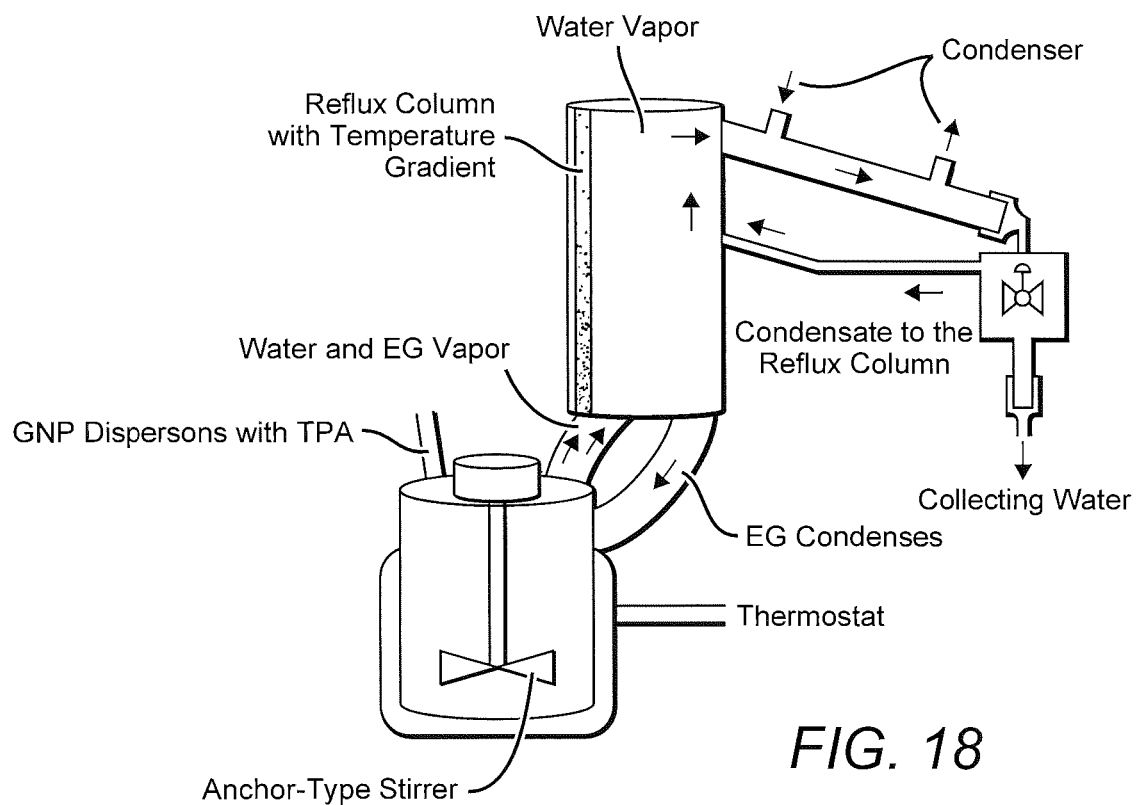
FIG. 18 illustrates a schematic representation an ES reactor.

The GNP-15 were selected to prepare the dispersions in EG. Bath sonication was utilized for 60 minutes to disperse the GNPs in EG immediately before it was introduced into the reactor. The amount of graphene needed to prepare the dispersions was calculated based on the desired graphene weight fraction in the theoretical yield of PET during the PC reaction, 1.384 kg, and it was dispersed in 0.672 kg of EG for each batch. With the EG/TPA molar ratio being set at 1.5, the dispersions were added to 1.2 kg of TPA to start with the ES reaction. FIG. 18 illustrates the components involved in the ES reactor. The reactor was pressurized with N2 to minimize the $O_2$ inside the reactor and a high pressure (2.8 kgf/cm$^2$) was used to facilitate the dissolution of TPA in EG. 295 µl of tetramethylammonium hydroxide (TMAH) was added to the mixture to act as diethylene glycol suppressor. Concentration of TMAH was set to be 40 ppm in the final PET product. An anchor-type stirrer was utilized for the reaction. The stirrer's rotational speed was set at 50 RPM and then was increased to 100 RPM during the reaction. During the reaction, the set-point and actual temperatures of the reactor, temperatures of the reflux column, pressure inside the reactor, and the stirrer's rotational speed were monitored and recorded. Initially, the reactor temperature was set at 100° C. Once the ES reactor's temperature reached the set-point, it was raised in steps of 5° C. until it reached 240° C. This was repeated throughout the reaction, and the change in the temperature was monitored every 15 minutes.

Figure 19:
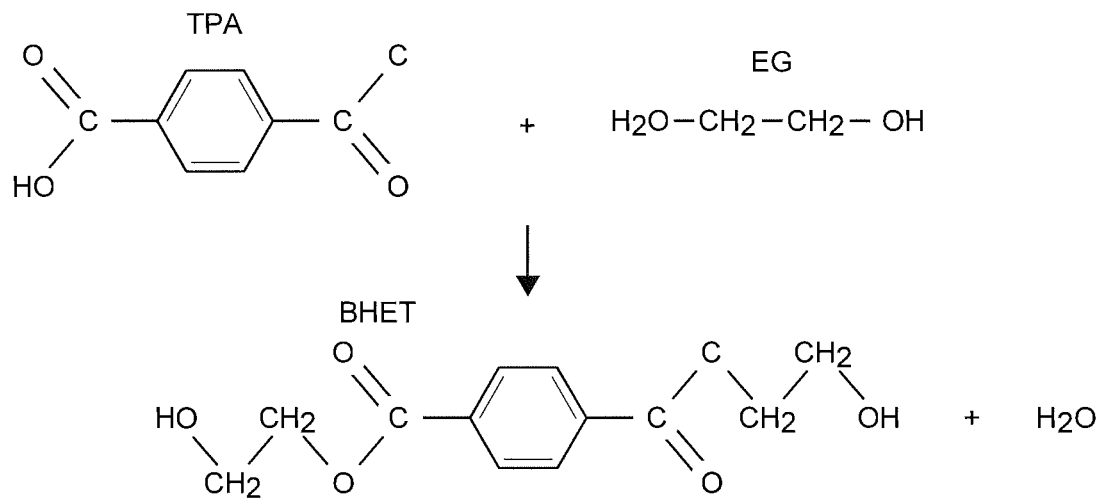
FIG. 19 illustrates a formation of BHET during an ES reaction.

During the ES reaction, EG and water (a reaction by-product) evaporate at the high temperatures in the reactor and flow into the reflux column. As the temperature of the reaction increases, the temperature of the bottom portion of the reflux column increases. Water, due to its lower boiling temperature compared to EG, starts evaporating first. The vapor travels to the condenser to form liquid. Once the temperature of the top portion of the reflux column reaches 100° C., the reflux valve, located at the end of the condenser, opens. This valve can flow the produced water either into a flask or into the top portion of the reflux column. When water returns to the reflux column, the temperature of the top portion tends to stay cooler than other portions, creating a temperature gradient in the reflux column. The bottom portion of the reflux column stays hotter than the top portion of the column. Due to the temperature gradient inside the reflux column, EG vapor condenses as it reaches the top portion of the column and comes back to the reaction chamber. The esterification reaction takes place at a high temperature between 220 to 240° C. which produced bis(2-hydroxyl ethyl) terephthalate (BHET) with water as a by-product. The schematic shown in FIG. 19 summarizes the synthesis of BHET through the ES reaction.

Figure 20:
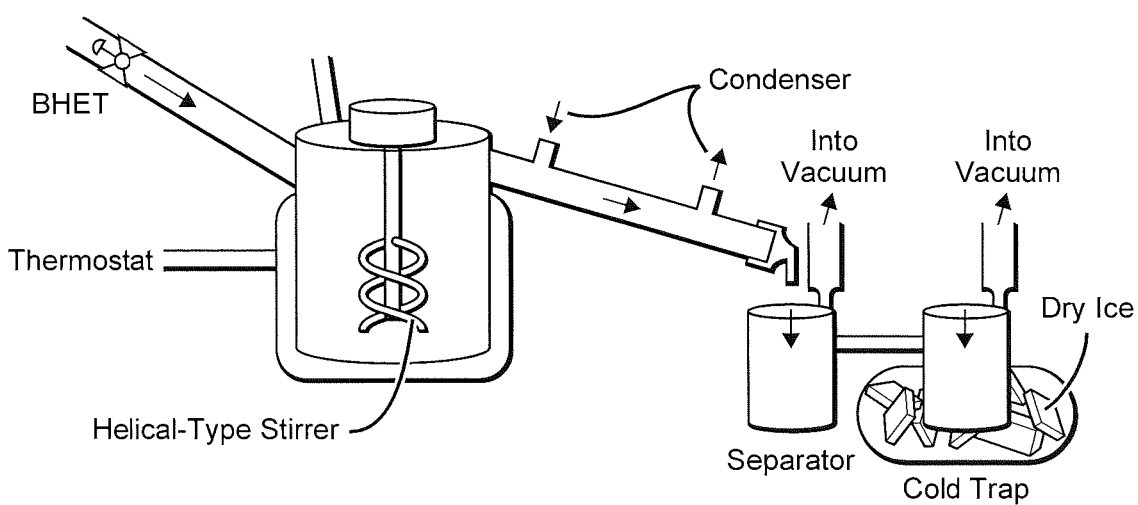
FIG. 20 illustrates a schematic representation a PC reactor.

Once a sufficient quantity of water was produced during the ES reaction (~0.2 kg), the reaction was considered finished. The BHET monomers with GNPs and water were transferred to the PC reactor. FIG. 20 illustrates the components involved in the PC reactor. A 30-minute vacuum was applied to make sure excess moisture, from the ES reaction, was pulled out. The temperature of the reactor was raised to 285° C. Antimony (Sb), Cobalt (Co), and Phosphoric Acid were added to the reactor to act as catalysts. Co was used as an agent to control the color of PET, reducing the yellowness that happens as a result of degradation. Phosphoric Acid was used to keep the acidic pH. To prepare the catalysts, antimony trioxide and cobalt acetate were added to the EG. The solutions were prepared in such a way that the final concentrations of antimony and cobalt, in the final PET product, were set to 260 ppm and 120 ppm, respectively. The solutions were then added to the mixture along with 50 µl phosphoric acid. The PC reactor, while pressurized, was used at 285° C. for 40 minutes to mix the blend using a helical-type stirrer. A high vacuum (<4 Torr) was then used during the reaction to remove the excess EG, the by-product of PC reaction, from the reactor. The excess EG and the EG formed during the PC reaction were collected in a vessel. Dry ice was used to keep the liquid solidified to prevent flowing back into the vacuum.

Figure 21:
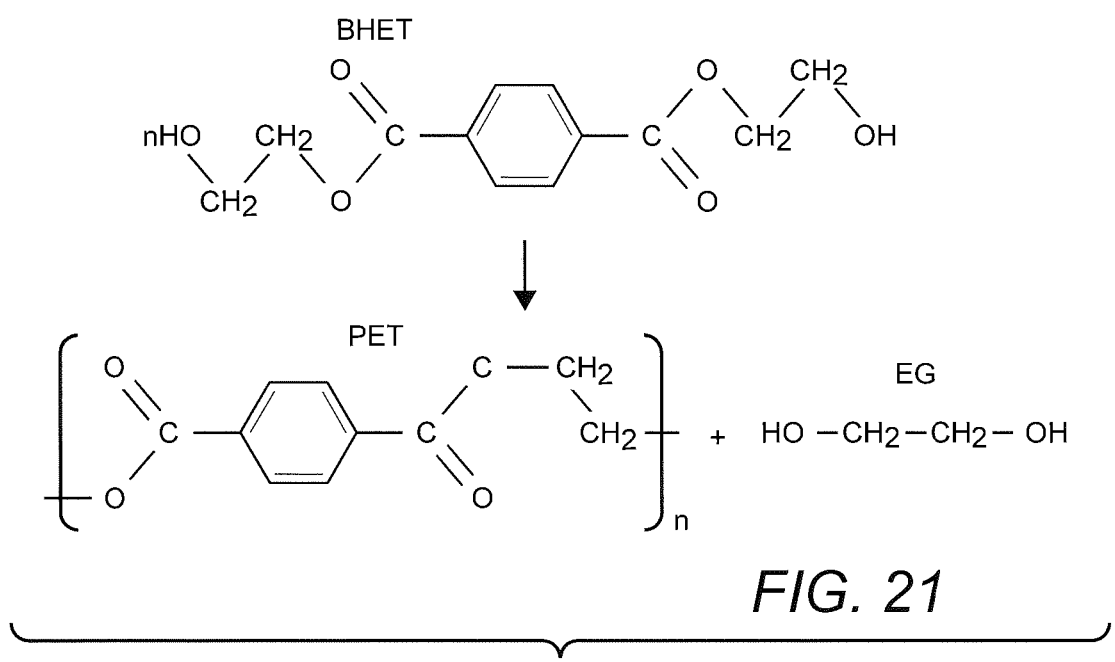
FIG. 21 illustrates a formation of PET during a PC reaction.

During the PC reaction, the intrinsic viscosity (I.V.) was monitored and recorded. The reaction was considered finished after achieving a desired I.V. (>0.60 dL/g) of the polymer melt. The polymer strands were collected from the bottom of the PC reactor on a winder, fast-cooled in an ice/water bath, and air-dried overnight to reduce the residue of water. Strands were copped for pelletizing. Pellets were vacuum-dried overnight at 120° C. The schematic shown in FIG. 21 summarizes the synthesis of PET through the PC reaction.

I.V. is a measure of the polymer's molecular weight, and is correlated with the polymer's other properties (e.g. the melting point, crystallinity, and the tensile strength). Polymers with higher I.V. often exhibit greater tensile strength compared to those with lower I.V. As mentioned in the previous section, during the PC reaction the I.V. was monitored. With an objective of improving the I.V. of the polymer obtained after polymerization, solid state polymerization (SSP) was carried out. SSP was done at 220° C. to remove volatiles (e.g. air and water) from the polymer. An inert gas ($N_2$) is purged to remove the by-products of the reactions (e.g. ethylene glycol and acetaldehyde). These by-products diffuse to the surface of the polymer and are carried away by the inert gas flow or vacuum. During the SSP the polymer chain lengths are increased, and as a result, the I.V. of the polymer improves. Depending on the desired improvements and the initial value of I.V., SSP can be carried out from 2 to 8 hours (the higher the initial I.V., the shorter the SSP and vice versa). To evaluate the I.V. of the material, and study the effects of SSP on I.V., melt viscosities were measured. A small quantity of the material before and after SSP was taken and was vacuum dried at 110° C. for 1 day. The measurements were carried out at 270° C. and 15% strain using a parallel plate dynamic analyzer. The gap between the plates (diameter: 25 mm) was set at 1.2 mm. Using a calibration curve, the I.V. value of complex viscosity at 1 rad/s is used to determine the I.V.

Including a control batch to synthesize PET, PET nanocomposite pellets were prepared by adding GNP dispersions at varied concentrations, summarized in Table 11, and processed using bath sonication for 60 minutes immediately before addition to the reactor. Additionally, a GNP dispersion, processed for 90 minutes and centrifuged at 260 RCF, was prepared using probe sonication, in 12 small batches (due to equipment size and volume constraints) approximately one week before use at a different facility. The small batches were mixed into one container before shipment to the facility with the polymerization reactors. There, the dispersion was bath sonicated for 10 minutes to re-disperse the GNPs immediately before introduction to the reactor. Table 11 summarizes the dispersion samples prepared for the polymerization experiments.

TABLE 11

Summarizes the performed polymerization reactions to fabricate the PET-GNP nanocomposite pellets.

| | Concentration | | Process Parameters | |
|---|---|---|---|---|
| Experiments | GNP Dispersions (mg/mL) | GNPs in PET (wt. %) | Sonication Time (min) | Centrifugal Force (G-Force) |
| 1 | n/a | n/a | n/a | |
| 2 | 0.03 | 0.0015% | 90 - probe | 260 |
| 3 | 0.09 | 0.004% | 60 - bath | n/a |
| 4 | 0.45 | 0.02% | " | " |
| 5 | 2.29 | 0.1% | " | " |
| 6 | 11.45 | 0.5% | " | " |
| 7 | 22.91 | 1.0% | " | " |
| 8 | 45.82 | 2.0% | " | " |

Figure 22:
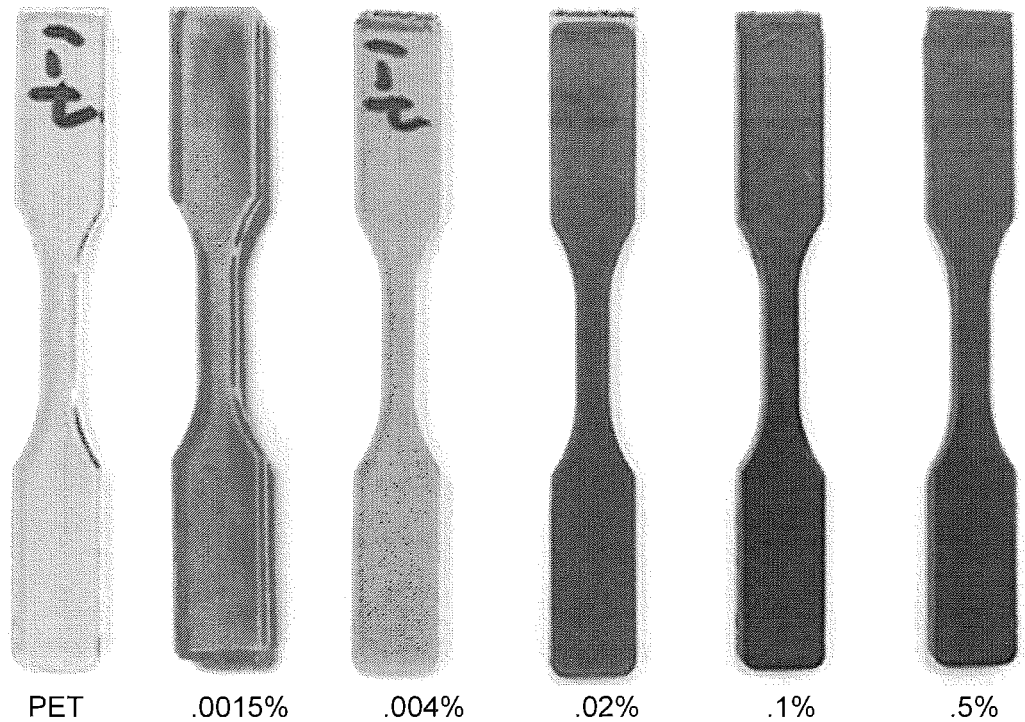
FIG. 22 illustrates a multiplicity of PET-GNP nanocomposite tensile bars prepared by in-situ polymerized PET-GNP nanocomposite pellets.

Using the experimental procedure, described hereinabove, the PET-GNP nanocomposite tensile bars were fabricated by melt compounding the PET-GNP nanocomposite pellets. FIG. 22 represents the PET-GNP nanocomposites prepared by experiments 1 to 6. The PET-GNP nanocomposites were examined for their I.V. The data collected from the samples before SSP, after SSP, and after melt compounding are presented in Table 12.

TABLE 12

Summarizes the intrinsic viscosity measured for PET and PET nanocomposites.

| Concentration of GNPs (wt. %) | Measurements of Intrinsic Viscosity (I.V.) | | |
|---|---|---|---|
| | Before SSP | After SSP | After SSP & Melt Compounding |
| Pristine PET | 0.73 | 0.76 | 0.53 |
| PET + 0.0015% | 0.64 | 0.77 | 0.69 |
| PET + 0.004% | 0.67 | 0.80 | 0.50 |
| PET + 0.02% | 0.66 | 0.86 | 0.59 |
| PET + 0.1% | 0.64 | 0.87 | 0.62 |
| PET + 0.5% | 0.67 | 0.77 | 0.56 |
| PET + 1.0% | 0.55 | 0.78 | 0.70 |
| PET + 2.0% | 0.64 | 0.82 | 0.72 |

The PET and PET nanocomposite were fabricated using the PEG-GNP dispersions and masterbatch pellets to further understand and evaluate the effects of sonication on the properties of the final product.

With an objective of exfoliating and incorporating the GNPs into PET and creating well-incorporated PET-GNP nanocomposites, GNP-15, were first dispersed in PEG-600 through probe sonication. To study the effects of the addition of GNP dispersions on the properties of the nanocomposites, the GNP dispersions were added to PET melt using dosing equipment as the screw barrel is filled with new polymer. Desired dosing rates were employed for the dosing process to achieve known concentrations of GNPs in the PET nanocomposites. The details including the concentration of the dispersions, dosing rates, and the concentrations of the nanocomposites are summarized in Table 13.

TABLE 13

Process parameters involved to fabricate PET nanocomposites.

| Sample Set | GNP Dispersions (mg/mL) | Dosing Rate (g/min) | Concentration of GNPs (wt. %) |
|---|---|---|---|
| I | 10 | 0.15 | 0.001 |
| II | 10 | 0.75 | 0.004 |
| III | 5 | 1.95 | 0.006 |
| IV | 5 | 3.90 | 0.01 |
| V | 10 | 3.00 | 0.02 |
| VI | 20 | 5.65 | 0.07 |
| VII | 30 | 5.65 | 0.10 |
| VIII | 40 | 5.65 | 0.13 |

In addition, the masterbatch pellets were diluted by PET pellets at known concentrations, and the solid-state mixtures were then used to fabricate the PET-GNP nanocomposites (Table 14).

TABLE 14

Process parameters involved to fabricate PET nanocomposites.

| Sample Set | Masterbatch Weight (g) | PET Weight (g) | Concentration of GNPs (wt. %) |
|---|---|---|---|
| I | 13.60 | 13,594.00 | 0.001 |
| II | 54.40 | 13,553.00 | 0.004 |
| III | 81.60 | 13,526.00 | 0.006 |
| IV | 136.00 | 13,472.00 | 0.01 |
| V | 272.00 | 13,336.00 | 0.02 |
| VI | 952.00 | 12,655.00 | 0.07 |
| VII | 1361.00 | 12,247.00 | 0.10 |
| VIII | 1769.00 | 11,839.00 | 0.13 |

Figure 23:
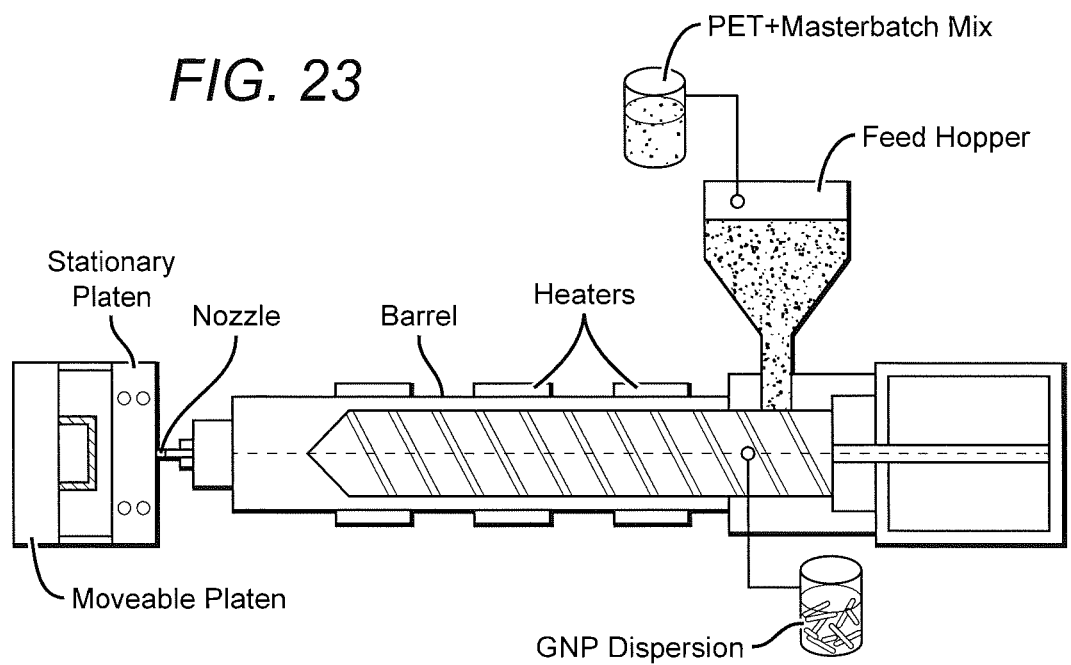
FIG. 23 illustrates a schematic representation of an injection molding process to fabricate nanocomposites using PEG-GNP dispersion and masterbatch.
Figure 24:
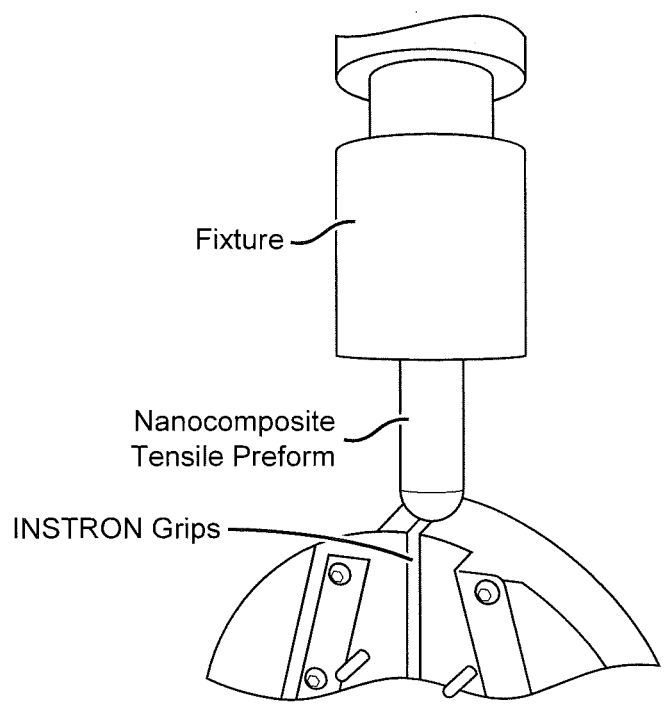
FIG. 24 illustrates mechanical testing of preforms using a designed fixture.

FIG. 23 illustrates the manufacturing process of the PET nanocomposites. The PET nanocomposites, shown in FIG. 24, were prepared based on an experimental method performed by Bandla et al. The preforms produced through injection molding have a tubular shape, making them difficult to mount on standard Instron grips. The tubular-shaped preforms were tensile-tested according to the ASTM D 638 standard. A custom-made fixture (FIG. 24) was designed for mechanical testing of nanocomposite tensile preforms.

Figure 25:
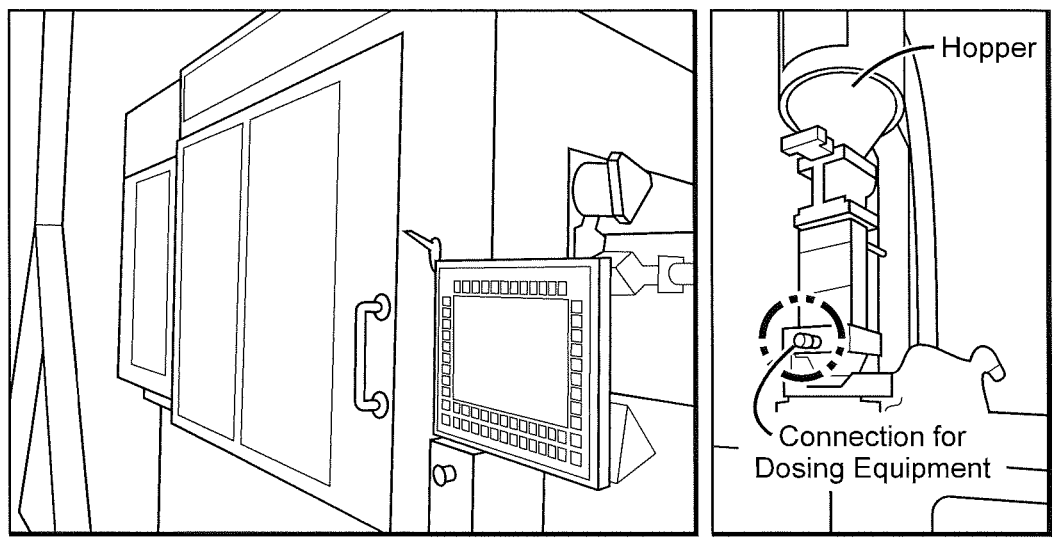
FIG. 25 illustrates an injection molding machine and a location where PEG dispersions were dosed to mix with PET.

The 90-ton injection molding machine, shown in FIG. 25 is located at Niagara Bottling LLC's research facility in Ontario CA, is equipped with a screw of 38 mm diameter. Four preforms, each 9.4 grams, were produced through each injection shot.

Furthermore, with an objective of understanding the effects of the addition of GNP dispersions and the dispersion medium on the PET's properties, several process parameters (e.g. sonication times, amplitudes, and centrifugal force) were undertaken to prepare the GNP dispersions in PEG-400 and PEG-600 for dosing experiments using a dosing equipment. The dispersions were added into PET at 1.5% dosing rate. Screw slippage occurred when the dosing rate of 2.5% was used. Table 15, Table 16, and Table 17 summarize the process parameters that were involved in each study.

TABLE 15

Summarizes the process parameters involved in centrifugation study. Pristine PEG-400 and PEG -600 were used as control samples.

| Experiment | Concentration of GNPs in Medium (mg/mL) | Sonication Time (min) | Sonication Amplitude (%) | Centrifugation Speed (RCF) | Concentration of GNPs in Preform (wt. %) |
|---|---|---|---|---|---|
| Centrifugation Study | 1 | 180 | 50 | n/a | 0.001% |
| | | | | 260 | ~0.0009% |
| | | | | 2350 | ~0.00045% |

TABLE 16

Summarizes the process parameters involved in concentration study. Pristine PEG-400 and PEG-600 were used as control samples.

| Experiment | Concentration of GNPs in Medium (mg/mL) | Sonication Time (min) | Sonication Amplitude (%) | Centrifugation Speed (RCF) | Concentration of GNPs in Preform (wt. %) |
|---|---|---|---|---|---|
| Concentration Study | 5 | 180 | 50 | n/a | 0.006% |
| | 10 | | | | 0.01% |
| | 15 | | | | 0.02% |

TABLE 17

Summarizes the process parameters involved in sonication energy study. Pristine PEG-400 was used as control samples.

| Experiment | Concentration of GNPs in Medium (mg/mL) | Sonication Time (min) | Sonication Amplitude (%) | Centrifugation Speed (RCF) | Concentration of GNPs in Preform (wt. %) |
|---|---|---|---|---|---|
| Sonication Energy Study | 10 | 30-180 | 50 and 100 | n/a | 0.01% |

Characterization of PET-GNP Nanocomposites

Figure 26:
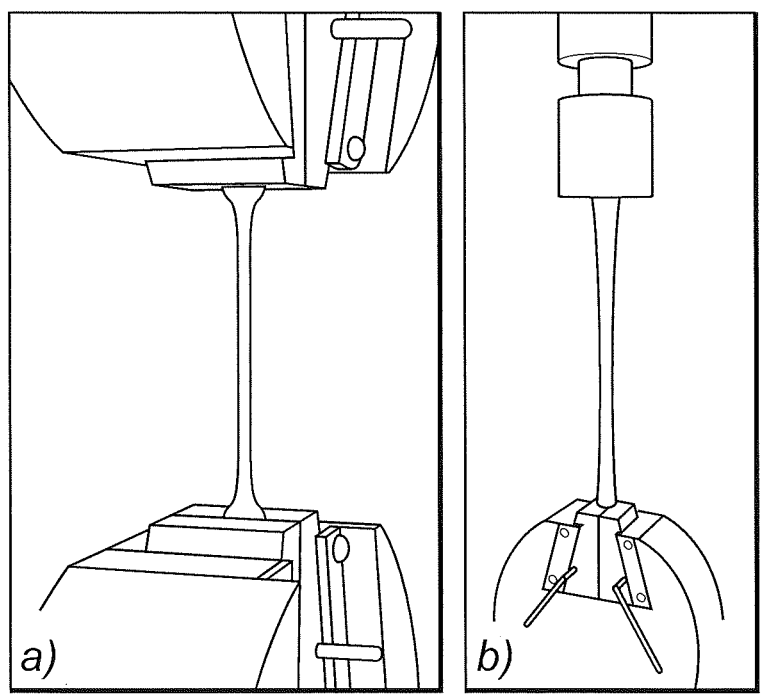
FIG. 26 illustrates mechanical testing the PET nanocomposite tensile bars, a), and preforms using the tension grips, b)
Figure 27:
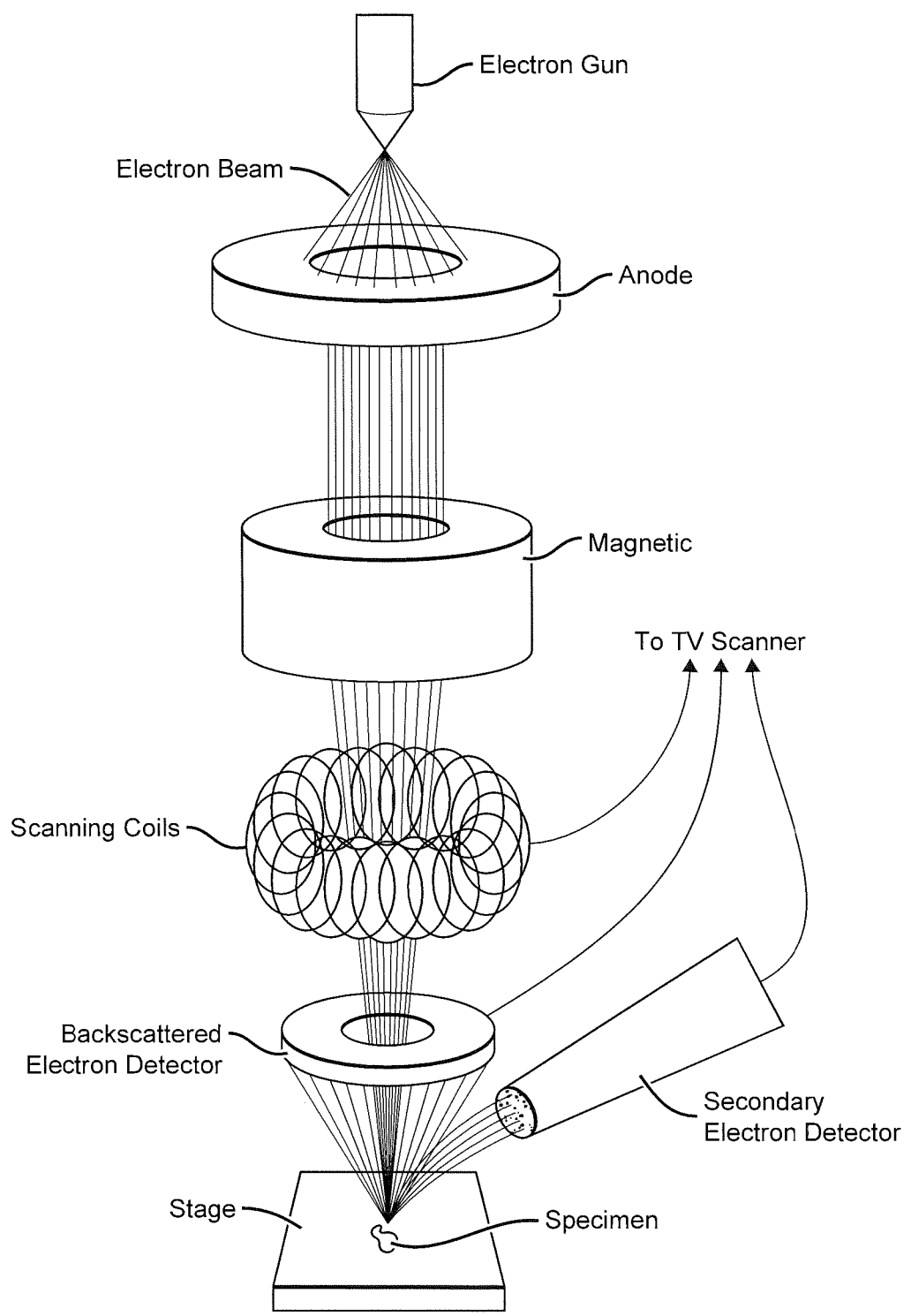
FIG. 27 illustrates a schematic of an exemplary SEM system.

Tensile testing was performed using an Instron universal testing machine equipped with a 30 kN load cell at a strain rate of 5 mm/min. A non-contact laser extensometer was used for recording strain. Based on the reflections from a self-reflective tape, the laser records the displacement to mark the gauge length during testing (FIG. 26). Engineering stress was calculated based on the cross-sectional area of the tensile bar. The stress-strain curve was plotted to measure the elastic modulus of the PET and the PET nanocomposites. In addition, toughness of the PET nanocomposites was measured by calculating the area under the stress-strain curve.

Distribution of the GNPs in PET was visualized using a light microscope at 20× and 40×. To prepare the samples for light microscopy, a microtomy method was used to cut small sections (1 mm×1 mm) with thickness of 850 nm and 1 µm. A glass knife was used to prepare the microtome sections. The thickness of the sections was verified with their color using a scale proposed by Peachey. To study the morphology of the samples, low magnification scanning electron microscopy (SEM) was performed. Samples for SEM testing were chosen from the fractured surface of the tensile bars, after mechanical testing, and were Au coated. An attempt was made to make thin sections of the sample for high resolution transmission electron microscopy (HR-TEM) testing.

X-Ray diffraction (XRD), a non-destructive analytical technique, is commonly used to evaluate the atomic structure of crystalline materials. GNPs exhibit "Graphene-2H" reflections corresponding to the (002) plane (26.54°2θ for CuKα X-rays). The triclinic crystal structure of PET can be observed with four principle reflections from the (010), ($\bar{1}$10), (100), and ($\bar{1}$05) planes (17.5°, 22.5°, 25.6°, and 42.6°2θ for CuKα X-rays). XRD analysis can also be informative to understand the effects of GNPs' content on the crystallinity of the nanocomposites. In this study, 2D diffraction frames were collected using a Bruker AXS Hi-Star 2D detector. CuKα radiation (λ=1.54184 Å) was used. Samples of PET and PET nanocomposites were prepared by cutting a cubic shape from the sections before and after mechanical testing of nanocomposites, and were fixed onto a Si single crystal substrate (zero background substrate) using Fomblin Perfluorinated grease for data collection in the reflection mode under a 60 sec scanning time.

Further, the general area diffraction detection system (GADDS) was used to investigate the crystallographic textures of the nanocomposite samples prepared by a dry mix of the GNPs with PET powders and pellets at 2 wt. % and 10 wt. %. To determine the orientation of the GNPs, 2D diffraction patterns were collected at fixed $\theta_1$ and $\theta_2$=12.5° by rotating the sample along the φ direction in steps of 5° at positions of −5° and 32° in x direction. The 2D diffraction patterns were integrated along 2θ for every 1° in χ direction. The data are plotted as pole figures and presented plane for both the PET and PET nanocomposites in terms of contours of intensity of reflections from the (002) plane.

X-Ray computed tomography (X-ray μCT or MCT) is a non-destructive technique that offers 3D imaging of materials. It involves computed X-ray measurements to produce cross-sectional (tomographic) images of specific areas of a scanned sample. The X-rays can be transmitted through the specimen and can be correlated with the specimens' properties using the following equation:

$$I = I_0 e^{-\mu_m \rho x} \quad (8)$$

where I is the transmitted X-ray intensity, $I_0$ is the initial X-ray intensity, $\mu_m$ is mass attenuation coefficient, ρ is density, and x is the material thickness. During tomography testing, the geometry information is collected and recorded as radiographs. The radiographs are then reconstructed into tomographs, which allows imaging inside the sample without cutting it. While X-ray tomography offers 3D imaging, resulting in a more effective analysis, sample preparation for optimal imaging adds difficulty to the process. For high resolution, samples larger than 2 mm×2 mm are best cut in thin squared sections. This minimizes artifact corrections needed to image larger samples.

With the objective of understanding the distribution of GNPs inside the PET matrix, MCT was performed. In this work, MCT was carried out on the PET nanocomposite sample prepared by mixing PET pellets with GNP-15 at a concentration of 2%. A bulk section of the sample (200 μm×200 μm×1000 μm) from the outer surface of the amorphous section of the sample was scanned on Zeiss Xradia 410 X-ray computed tomography system at 0.97 μm/pixel resolution. Radiographs were collected and the reconstructed tomographs were visualized using a 3D visualization software.

Figure 28:
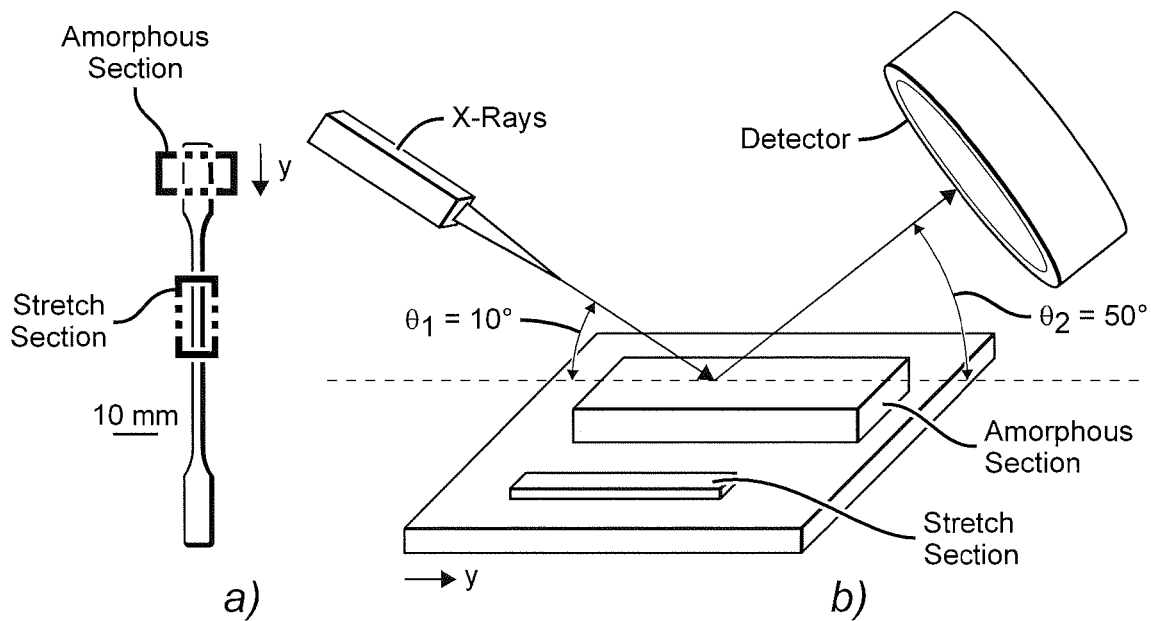
FIG. 28 illustrates a schematic representation of XRD measurements showing a) a PET nanocomposite and b) sample geometry, amorphous and stretch sections, with respect to the instrument geometry.
Figure 29:
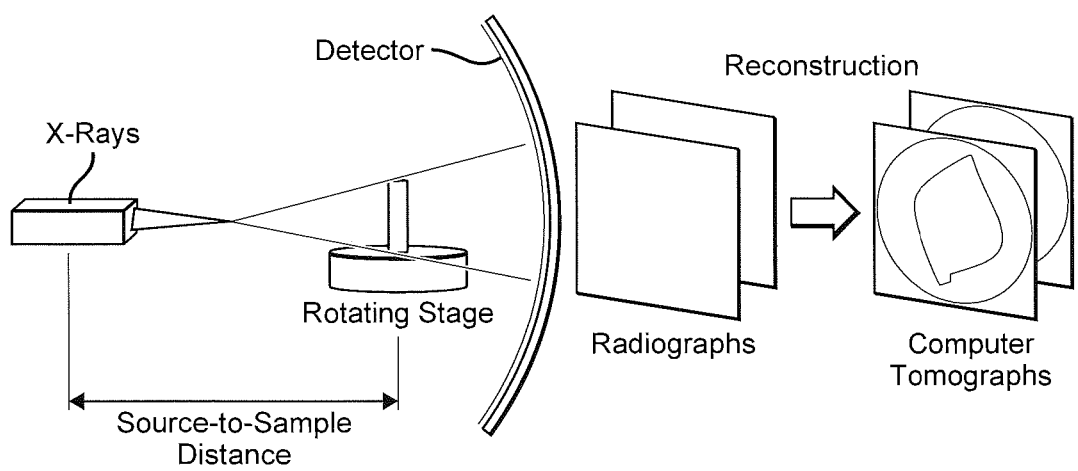
FIG. 29 illustrates a schematic representation of X-ray computed tomography illustrating the reconstruction process of radiographs into tomographs.
Figure 32:
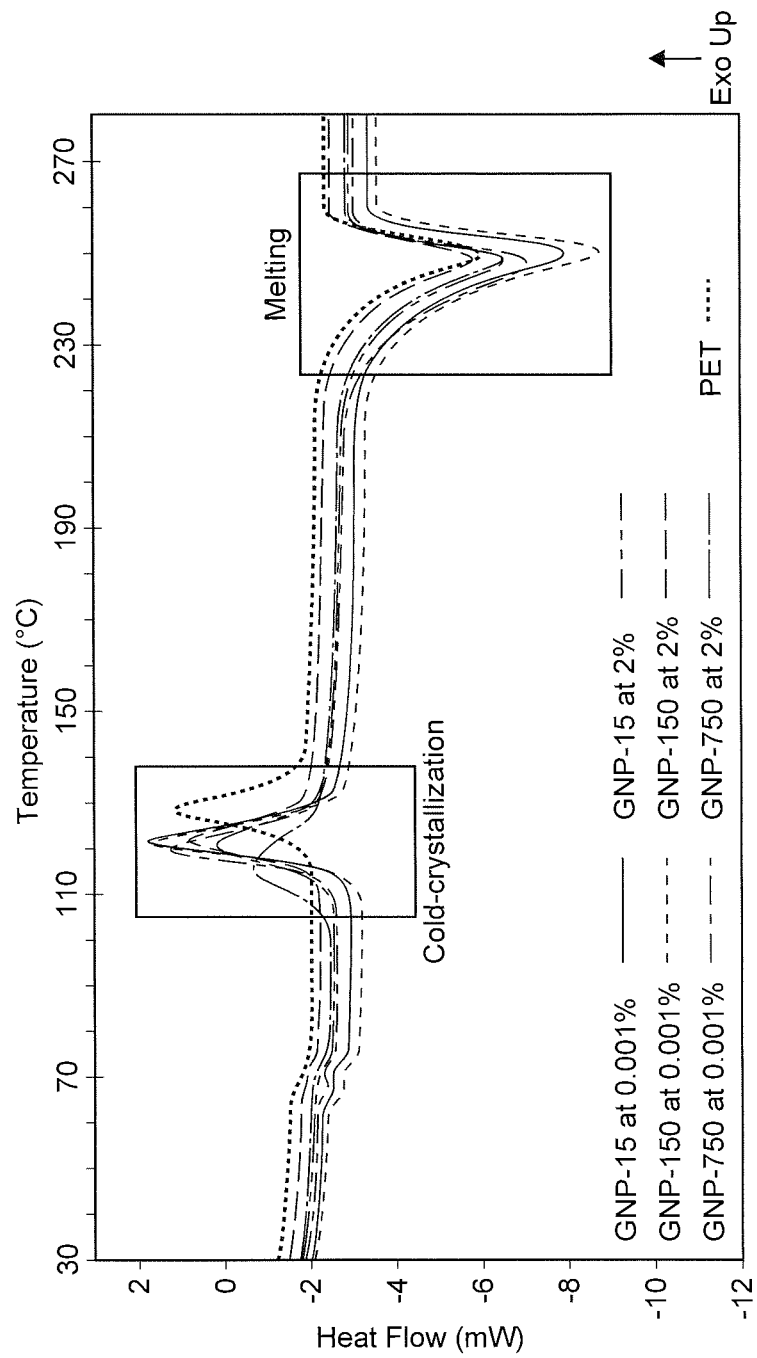
FIG. 32 illustrates DSC behavior showing the first heating cycle collected from amorphous section of the PET and PET nanocomposites prepared by melt compounding at 0.001 wt. % and 2 wt. % concentrations of GNP-15, GNP-150, and GNP-750.

Differential scanning calorimetry (DSC) was carried out to understand the effects of GNPs on thermal properties of a sample with the weight of 8 to 10 mg. Samples were taken from both amorphous and stretch sections of each nanocomposite tensile bar used for XRD measurements (FIG. 28). All samples were heated from ambient temperature to 300° C. at 10° C./min and held at 300° C. for 1 minute (first heating cycle) to erase thermal history, then cooled at a rate of 10° C./min to 25° C., subsequently held at 25° C. for 1 minute (first cooling cycle) and finally reheated to 300° C. at 10° C./min (second heating cycle) under a nitrogen atmosphere. To understand the thermal properties of the samples, melting temperature ($T_m$) and glass transition temperature ($T_g$) were determined from the second heating cycle. The crystallization temperature ($T_c$) was taken from the first cooling cycle. The heat of fusion and the heat of cold-crystallization were collected from the first heating cycle to determine the crystallinity of the samples. The crystallinity of the samples was evaluated using the following equation:

$$X_c = \left[ \frac{\Delta H_f - \Delta H_{cc}}{\Delta H^\circ_c} \right] \times 100 \quad (9)$$

where $X_c$ is percent crystallinity, $\Delta H_f$ is the heat of fusion (J/g), $\Delta H_{cc}$ is the heat of cold-crystallization (J/g), and $\Delta H^\circ_c$ is the heat of fusion for 100% crystalline polymer, 140.1 (J/g) for PET.

To describe the relationship between graphene concentration and color of the samples, PET and PET nanocomposite preforms were evaluated for their color using CIEL*a*b* scale. FIG. 30 represents the measurement scale as well as the samples used in this research. In the CIEL*a*b* scale, L* refers to luminosity and measures lightness of the samples, ranging from 100, for white, to 0, for black. In addition, a* measures redness when positive, gray when zero, and greenness when negative. The b*, however, measures yellowness when positive, gray when zero, and blueness when negative. In this work, luminosity of PET and PET nanocomposites were evaluated using a VIS-IR spectrophotometer in transmission mode.

Results

To understand the effects of the GNPs on the properties of the nanocomposite, the nanocomposite tensile bars were produced to evaluate the effects of the surface area of the GNPs and the effects of the mixing method of PET with GNPs on the properties of the final product.

Mechanical Properties

Comparison of the modulus of elasticity and tensile strength of nanocompo sites with different surface areas of GNPs prepared by dry powder and solution evaporation methods is presented in FIG. 31. As shown, GNPs at low concentration (0.001 wt. %) did not improve mechanical properties of the nanocomposites. GNP-750 (Table 2) has less of an effect on the elastic modulus of the final product compared to GNP-15 and GNP-150 (Table 2). The modulus of the PET resin increased by 11% with the addition of GNP-15 at a concentration of 2 wt. %. For the GNP-150, the modulus increased only 7%. As shown in FIG. 31, the addition of GNPs, at both concentrations, had a detrimental effect on the tensile strength of the nanocompo sites.

Thermal Properties

Figure 33:
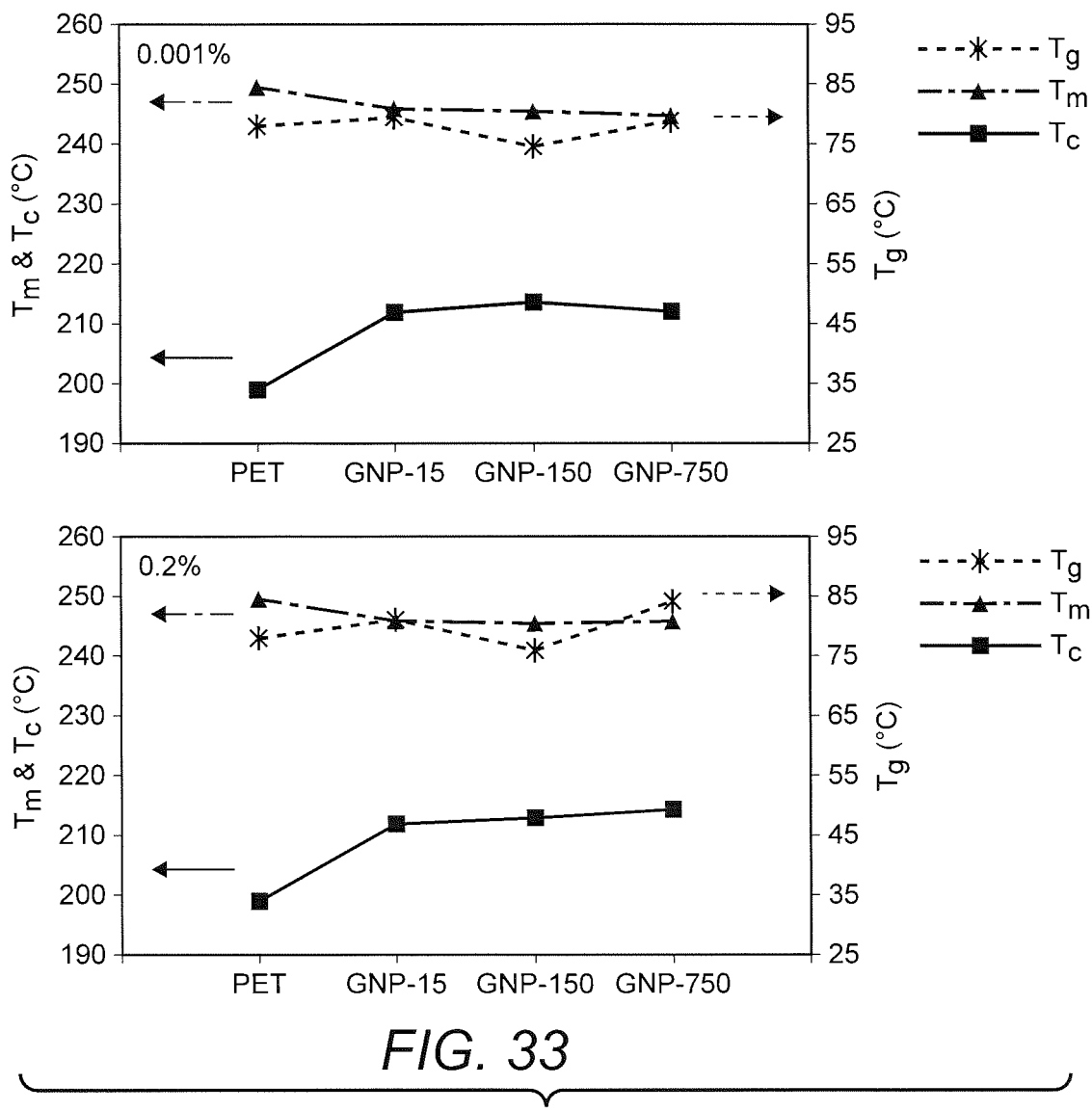
FIG. 33 illustrates GNPs surface area vs. $T_g$, $T_m$, and $T_c$ collected from the amorphous section of the PET and PET nanocomposites prepared by melt compounding at 0.001 wt. %, and 2 wt. % concentrations of GNP-15, GNP-150, and GNP-750.
Figure 34:
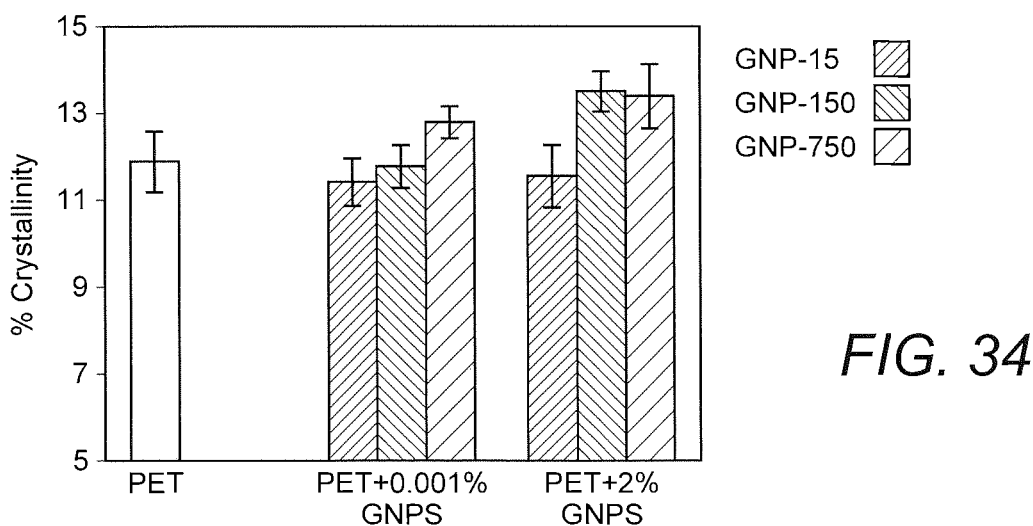
FIG. 34 illustrates crystallinity measurements of the PET and PET nanocomposites prepared by melt compounding at 0.001 wt. %, and 2 wt. % concentrations of GNP-15, GNP-150, and GNP-750.

To study the effects of GNP surface area on thermal properties of the nanocomposite tensile bars, the mechanically-stretched samples were tested from the amorphous sections. FIG. 33 presents the thermal behavior of the samples with respect to the surface area of the GNPs at concentrations of 0.001 wt. % and 2 wt. %. While increasing the concentration of the GNPs did not significantly affect the Tm, the glass transition of the PET nanocomposites prepared by GNP-150 at both concentrations showed a decreasing trend. The crystallization temperature increased with increase in the surface area of the GNPs (FIG. 33). A comparison of the percent crystallinity of the tensile bars prepared by the GNPs with varied surface areas is shown in FIG. 34. As shown, increasing the concentration from 0.001 wt. % to 2 wt. %, increases the crystallinity of the PET. At 2 wt. %, the GNP-150 and GNP-750 seem to have the highest improvements on crystallinity of PET.

Distribution Analysis

Figure 35:
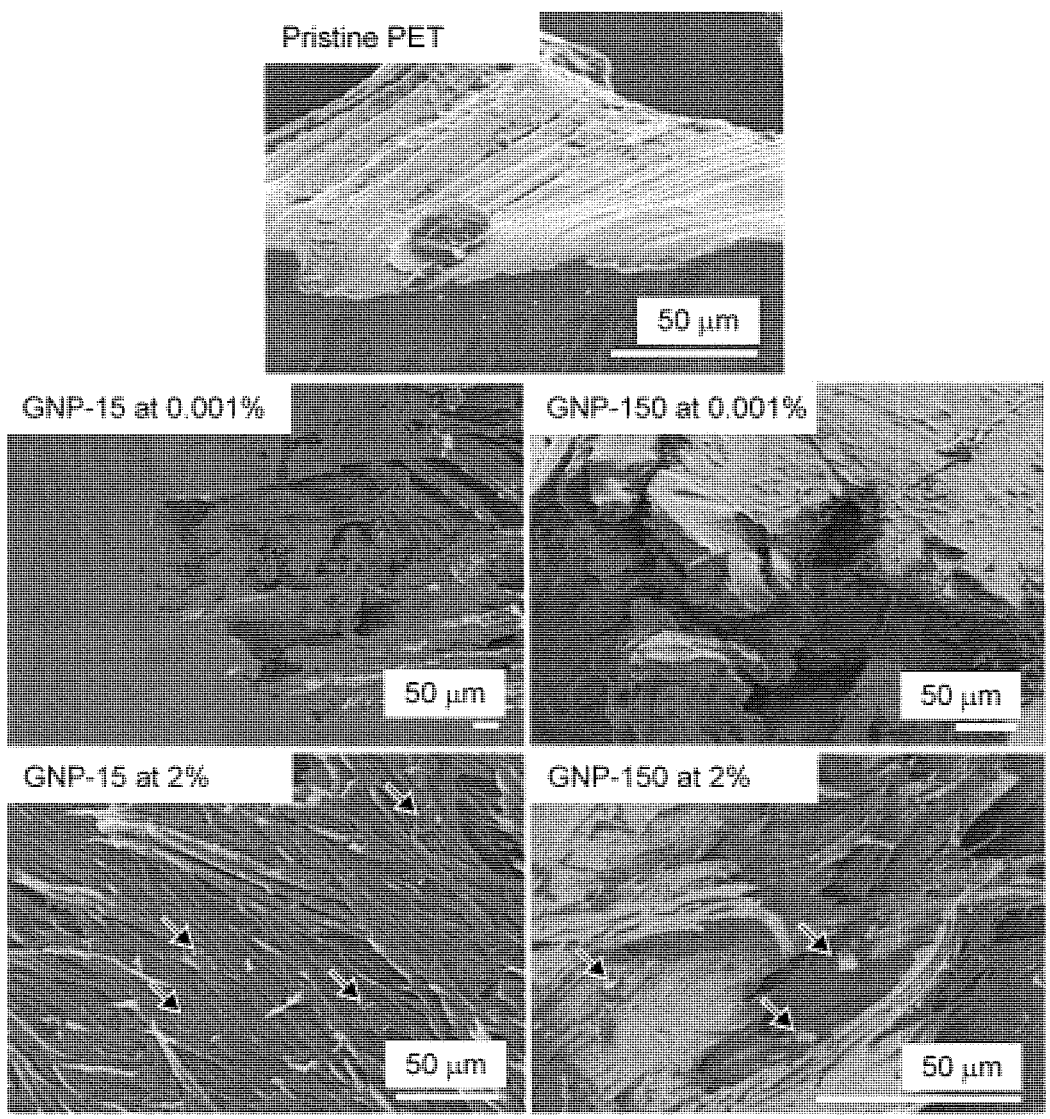
FIG. 35 illustrates SEM micrographs collected from the stretch sections of PET and PET nanocomposites prepared by melt compounding at 0.001 wt. %, and 2 wt. % concentrations of GNP-15 and GNP-150.

To study the distribution of the GNPs inside the PET matrix, also called dispersion analysis, samples were observed through SEM. When GNPs were loaded at 0.001 wt. %, the PET nanocomposites showed a fracture surface similar to pristine PET; a ragged edge which was caused by a uniform failure (see FIG. 35). However, PET nanocomposites prepared at 2 wt. % exhibited a different fracture surface. The GNPs were captured in the out-of-plane direction during imaging, possibly suggesting that they were loaded in a preferential direction corresponding PET flow during the sample preparation (see FIG. 35). This also suggests a differential failure for PET nanocomposites, indicating more interfacial interactions between PET chains and GNPs at 2 wt. %.

Figure 36:
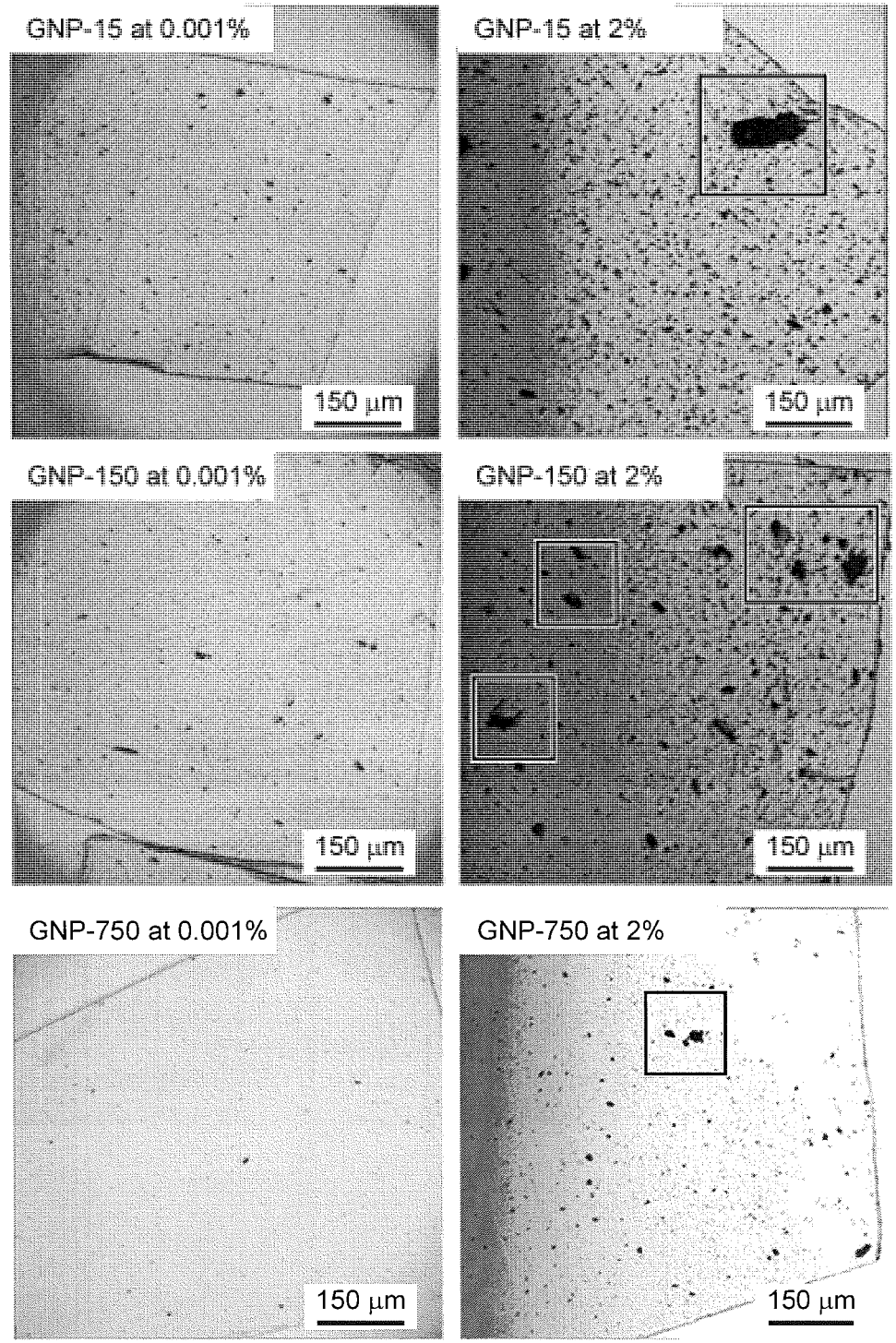
FIG. 36 illustrates confocal images collected from PET nanocomposites prepared by melt compounding at 0.001 wt. %, and 2 wt. % concentrations of GNP-15, GNP-150, and GNP-750, wherein square areas correspond to agglomerated GNPs.

Samples with 1 μm thickness were examined using confocal microscopy to study their internal structure. As shown in FIG. 36, the GNPs at 0.001 wt. % are distributed more uniformly compared to 2 wt. %. Increasing the concentration to 2 wt. % leads to the agglomeration of the GNPs in the PET matrix FIG. 36).

XRD Analysis

Figure 37:
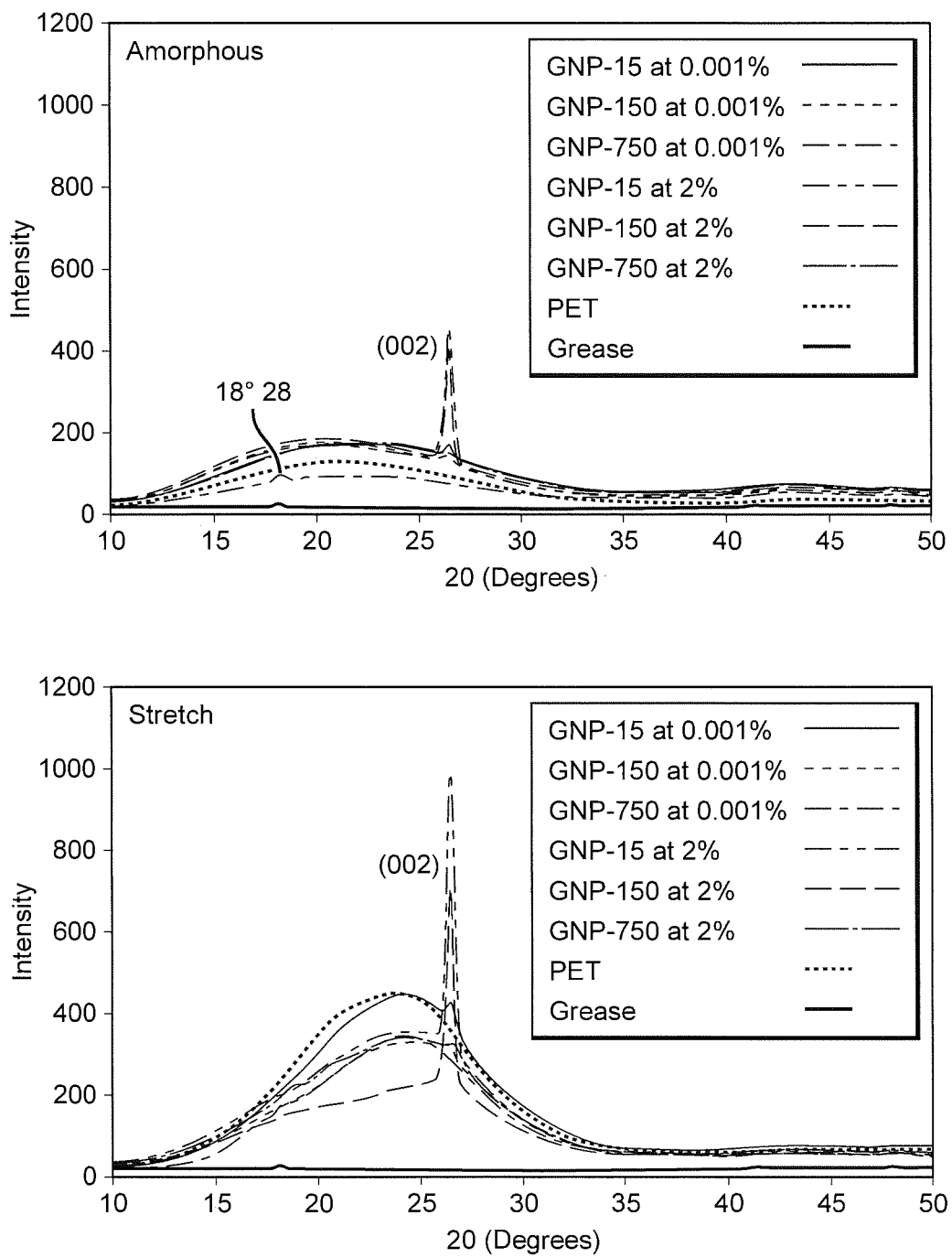
FIG. 37 illustrates comparisons of XRD 1D patterns of PET and nanocomposites collected from the amorphous and the stretch sections.
Figure 38:
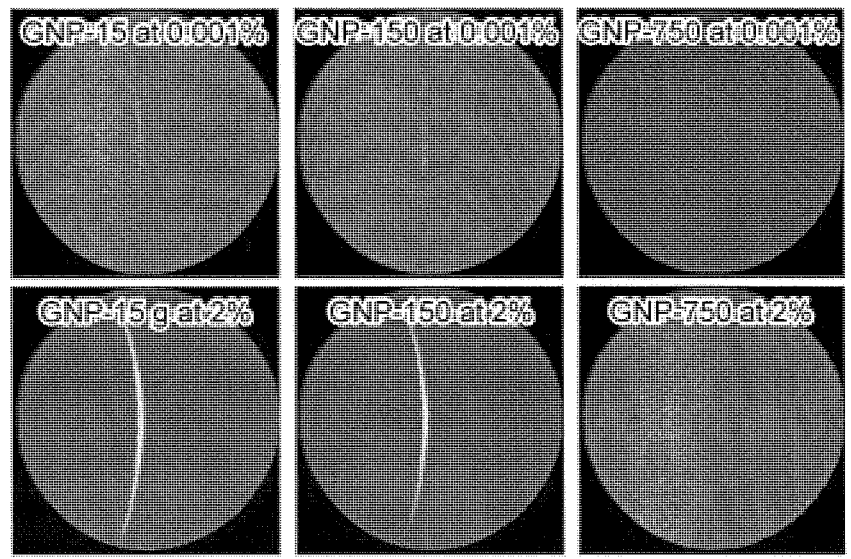
FIG. 38 illustrates 2D diffraction patterns for nanocomposite tensile bars, collected from an amorphous section.
Figure 39:
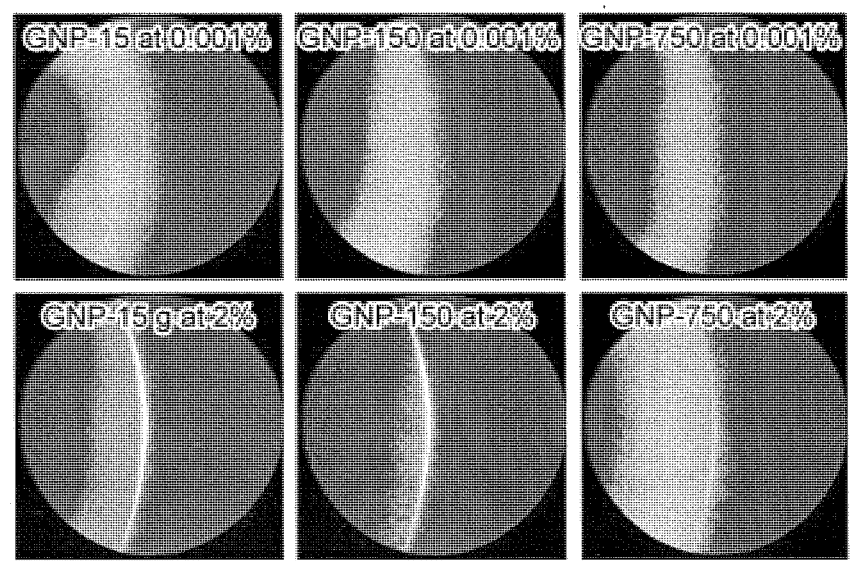
FIG. 39 illustrates 2D diffraction patterns for nanocomposite tensile bars, collected from a stretch section.

To further study the crystallinity of the nanocomposites, XRD measurements were carried out. FIG. 37 shows 1D diffraction patterns. As shown, the intensity of the graphene peak at 26.54° increased with the concentration of GNPs. A low intensity peak at 18° appears throughout the spectrum, which corresponds to the grease used to fix the samples on the Si substrate. To further understand the effect of GNPs on the crystallinity of the samples, the area under the amorphous hump associated with PET was obtained during the analysis of PET and PET nanocomposites prepared with GNP-15 and GNP-150 at 0.001 wt. % and 2 wt. %. The data were collected from the amorphous and stretch sections of the samples, shown in FIG. 28, and were normalized to the highest value obtained. The normalized data allows comparison of the crystallinity of the samples. The 2D Diffraction patterns collected from pristine PET and nanocomposites are shown in FIGS. 38 and 39. As seen, by increasing the concentration of GNPs from 0.001 wt. % to 2 wt. %, a clear ring appeared, indicating the (002) plane (d=3.35 Å) corresponding to graphene. Interestingly, the 2D patterns collected from the stretch sections showed a hump.

Figure 40:
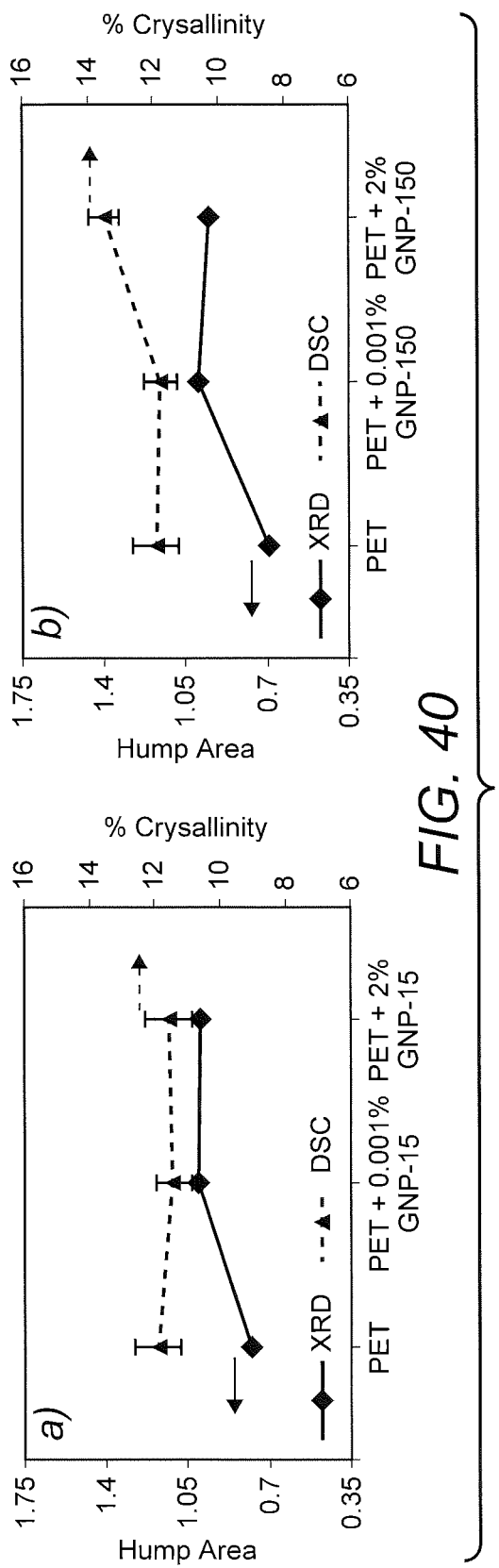
FIG. 40 illustrates evaluations of crystallinity through XRD and DSC measurements collected from the amorphous section of the samples prepared by a) GNP-15 and b) GNP-150, wherein uncertainty on XRD area measurements was estimated at 5%.
Figure 41:
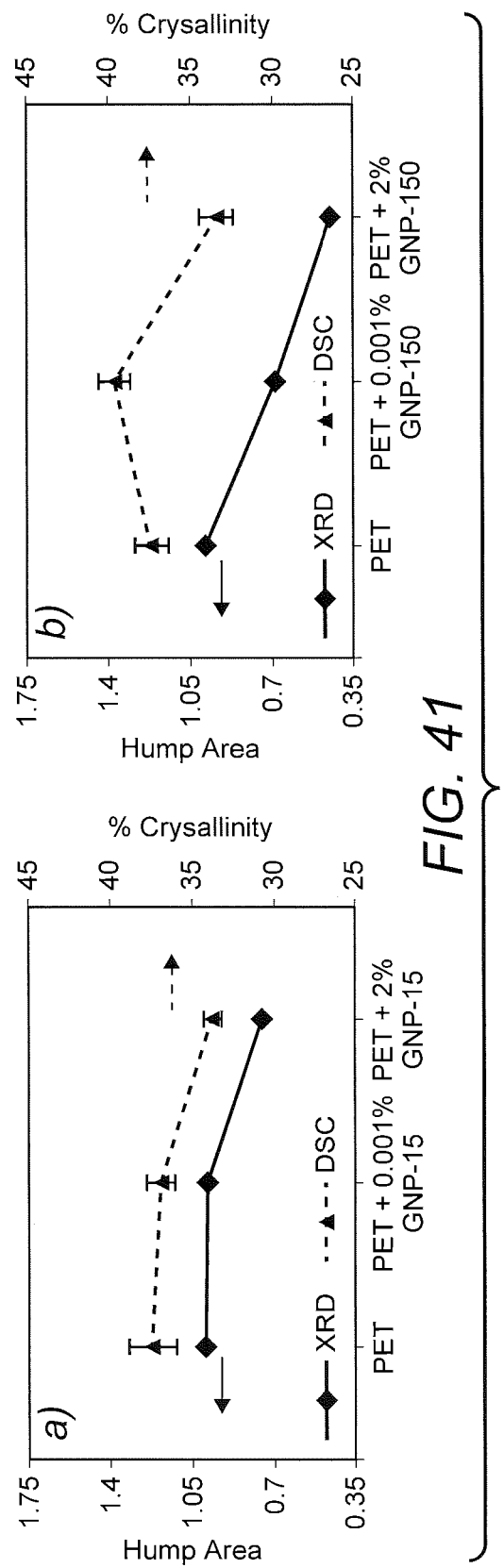
FIG. 41 illustrates evaluations of crystallinity through XRD and DSC measurements collected from the stretch section of the samples prepared by a) GNP-15 and b) GNP-150, wherein uncertainty for XRD area measurements estimated at 5%.

While the XRD measurements were not useful for absolute crystallinity measurement, they provided additional information correlating to the area under the amorphous hump or broad peak from PET. The values for the area under these humps for each sample was correlated with PET's percent crystallinity obtained using the DSC measurements. FIGS. 40 and 41 represent the correlation between the XRD and DSC results. An increasing trend for both XRD and DSC results with respect to GNP content was observed for the samples tested from the amorphous section, as shown in FIG. 28. In addition, there was a decreasing trend in the results for the samples tested from the stretch section (see FIG. 28). This indicates that GNP content in the PET matrix impacts the crystallinity of the nanocomposites.

MCT Analysis

Figure 42:
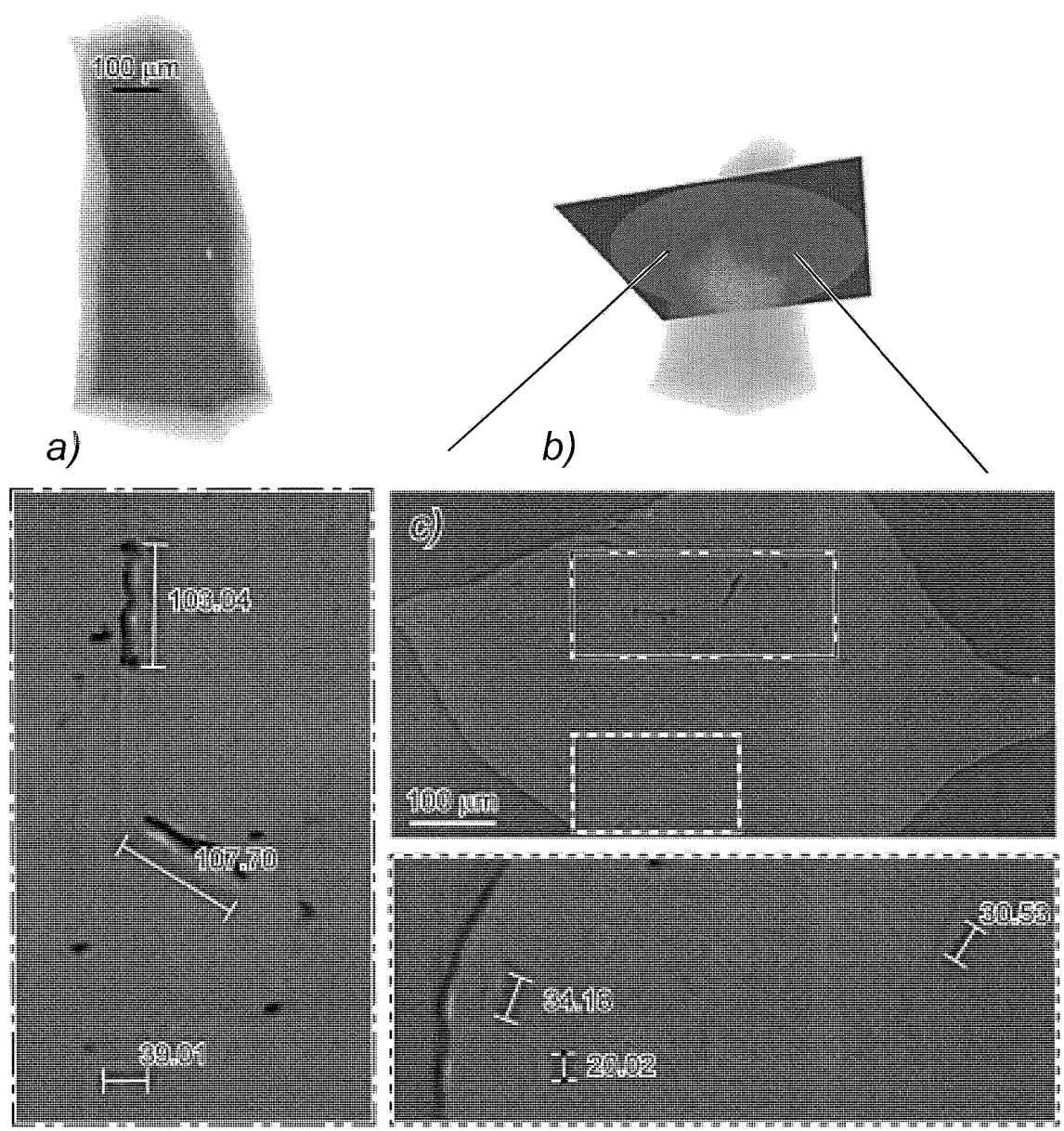
FIG. 42 illustrates a 3D visualization of PET-GNP nanocomposites, a), identifying GNPs using ortho slices and colormap, b), and representation of the GNPs in a PET matrix, c)

PET-GNP nanocomposites prepared through pellet mixing at 2 wt. % was analyzed by X-ray CT to characterize the level of distribution of GNPs. FIG. 42b shows a cross-section. Microvoids were observed at a cross-section of the sample, indicating poor processing of melt-compounded GNPs with PET during injection molding (see FIG. 42). It is unclear if this is related to the process parameters or the concentration of GNPs. Therefore, further research is required to study the effect of the concentration of GNPs in PET on the formation of microvoids. This can be done using MCT analysis.

Mechanical Properties

Figure 43:
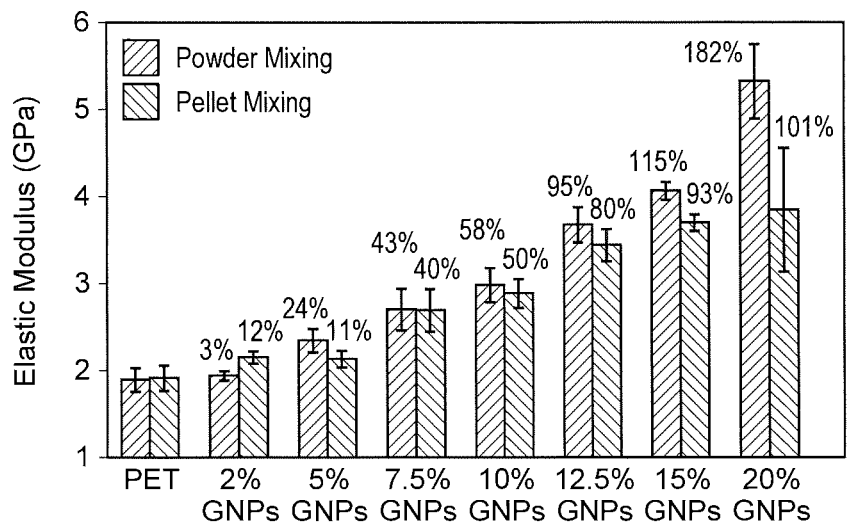
FIG. 43 illustrates measurements of elastic modulus of PET and PET nanocomposites prepared by melt compounding through powder and pellet mixing methods, wherein the horizontal axis represents nanocomposites at varied concentrations of GNPs compared with pristine PET.
Figure 44:
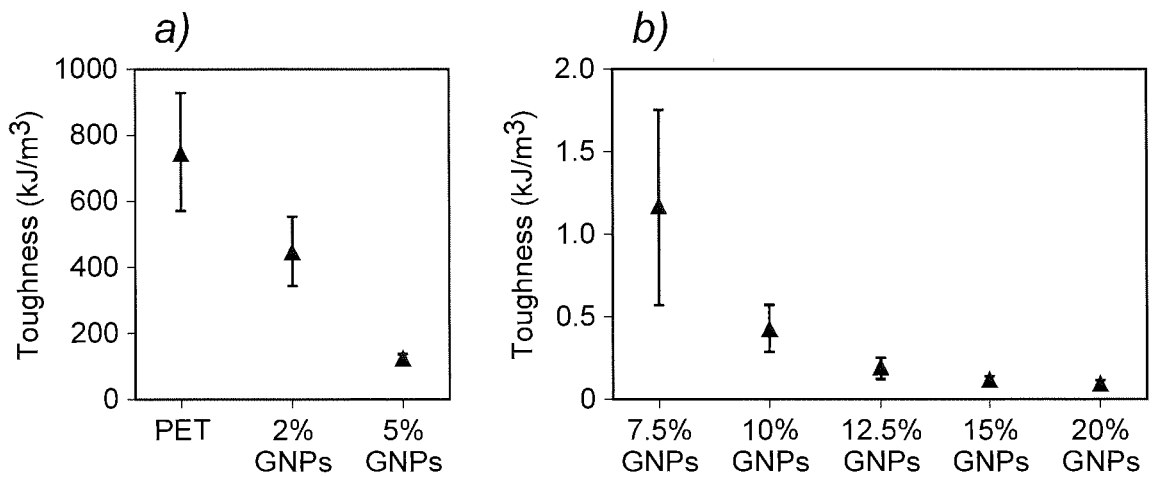
FIG. 44 illustrates measurements of toughness of a) PET and PET nanocomposites prepared at 2% and 5% concentrations of GNPs and b) nanocomposites prepared at 7.5%, 10%, 12.5%, 15%, and 20% concentrations of GNPs.
Figure 45:
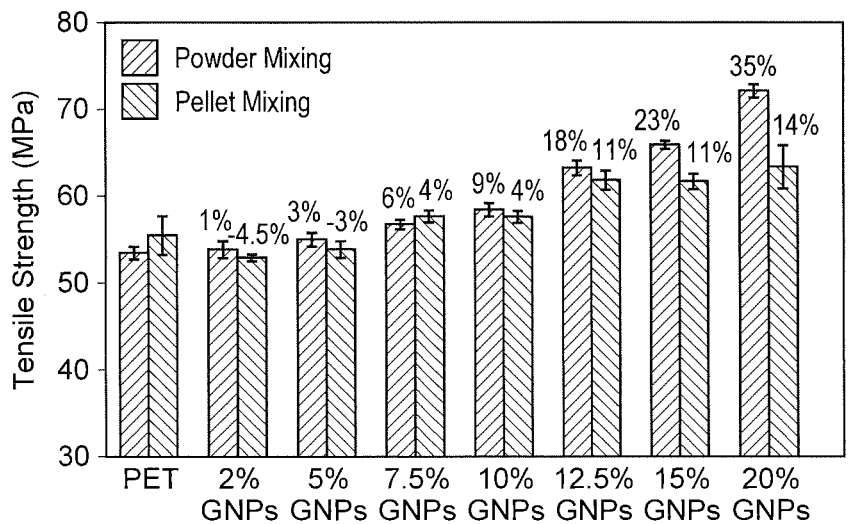
FIG. 45 illustrates measurements of tensile strength of PET and PET nanocomposites prepared by melt compounding through powder and pellet mixing methods, wherein the horizontal axis represents nanocomposites at varied concentrations of GNPs compared with pristine PET.

In the study of the effect of surface area of GNPs on the properties of PET, the GNP-15 exhibited a higher mechanical gain compared to other grades. To further study the effect of GNP-15 on nanocomposite properties, they were added to PET pellets and powders at different concentrations, as explained in section 3.4.1. As shown in FIG. 43, the elastic modulus of PET nanocomposites prepared through powder mixing shows an increasing trend and can yield a maximum of 182%, at 20 wt. % concentration of GNPs, which is 38% higher than those prepared through pellet mixing. Similarly, PET nanocomposites prepared through powder mixing significantly increased in tensile strength over PET. PET and PET nanocomposites were also examined for toughness. Measurements are shown in FIG. 44. As seen, the toughness consistently decreases as the concentration of GNPs increases.

Thermal Properties

Figures 46, 47:
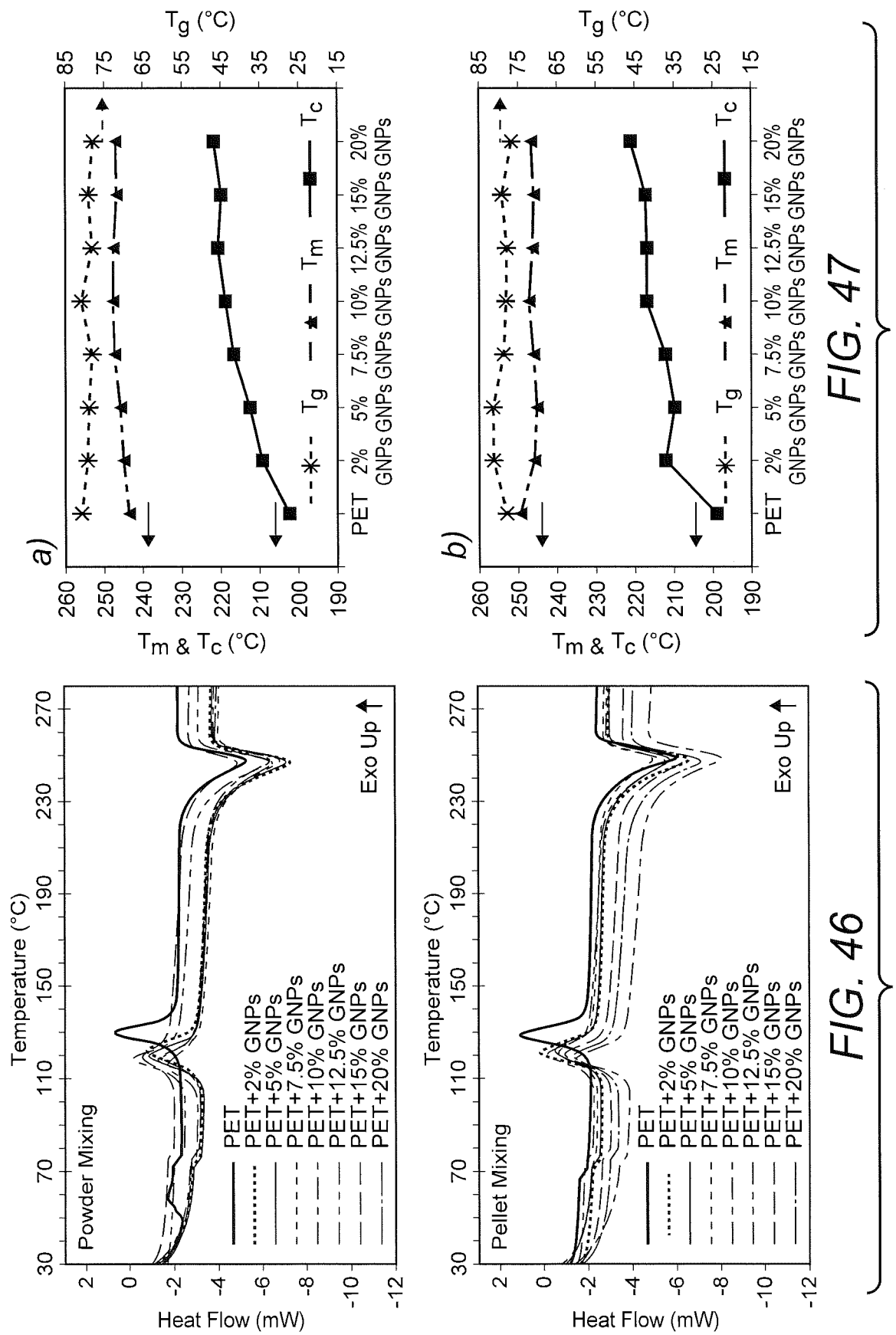
FIG. 46 illustrates DSC behavior showing the first heating cycle collected from the amorphous section of the PET and PET nanocomposites prepared by melt compounding through powder and pellet mixing methods.
FIG. 47 illustrates thermal behavior of PET nanocomposites versus concentration of GNPs compared with pristine PET prepared by melt compounding through a) powder and b) pellet mixing methods, wherein standard deviation (SD) of temperature measurements is 0.75° C.

Further, to study the effects of GNP concentration and the preparation method on nanocomposite crystallinity, tensile bars, with different GNP concentrations prepared using PET powders and pellets, were examined through DSC measurements to evaluate thermal properties. FIG. 46 summarizes the DSC behavior collected from the nanocomposites.

Figure 48:
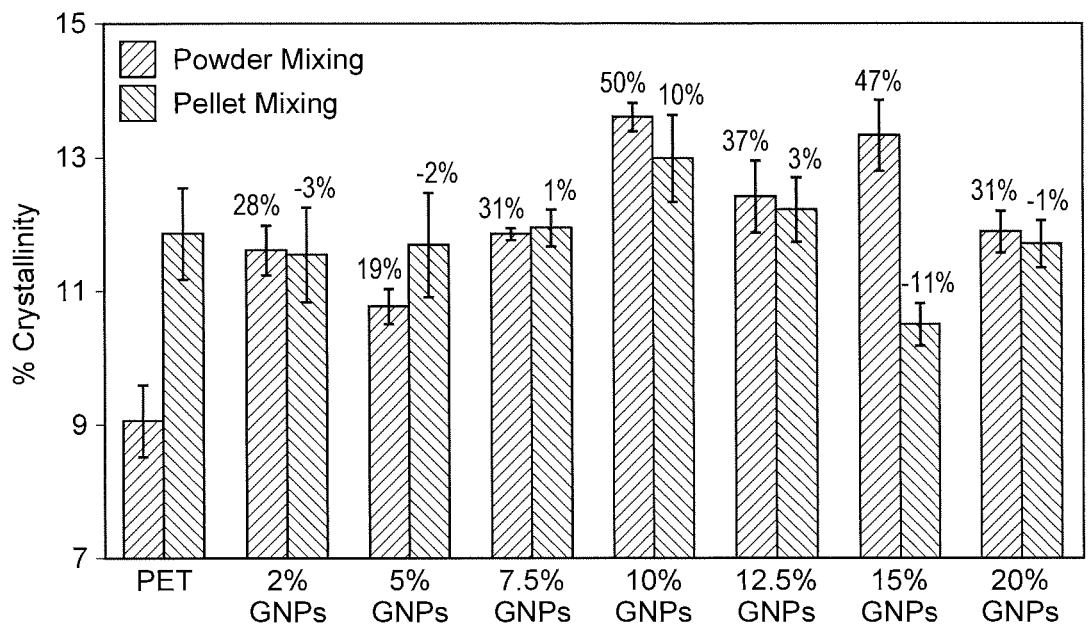
FIG. 48 illustrates crystallinity measurements of the PET and PET nanocomposites from injection molding prepared by melt compounding through powder and pellet mixing methods, wherein the horizontal axis represents nanocomposites at varied concentrations of GNPs compared with pristine PET.

FIG. 47 presents the glass transition temperature ($T_g$), melting temperature ($T_m$), and crystallization temperature ($T_c$) for the samples prepared through powder and pellet mixing methods with respect to GNP weight fractions. While increasing the concentration of the GNPs in powder mixing did not significantly affect the $T_g$, the glass transition of the PET nanocomposites prepared through a dry mix of GNPs with PET pellets showed a decreased trend at 7.5 wt. % and 10 wt. %. The crystallization temperature, however, increased to higher values by increasing the GNPs concentration. The percent crystallinity of the nanocomposite tensile bars presented in FIG. 48 showed an increasing trend with respect to GNP concentration.

Figure 49:
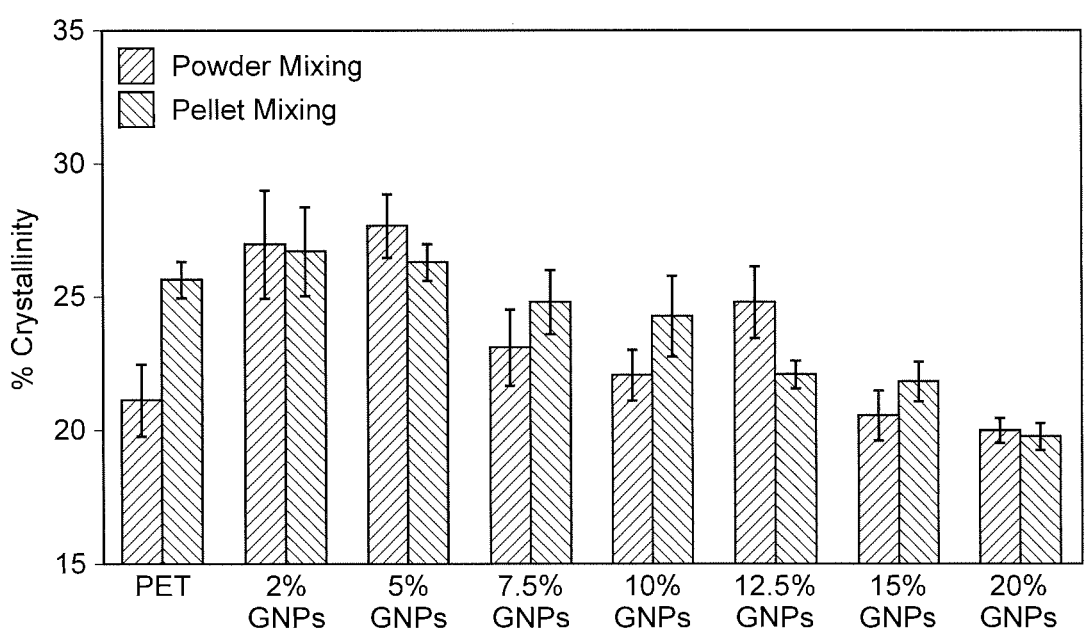
FIG. 49 illustrates non-isothermal crystallinity measurements of the PET and PET nanocomposites prepared by melt compounding through powder and pellet mixing methods, wherein horizontal axis represents nanocomposites at varied concentrations of GNPs compared with pristine PET.

The crystallinity measured for the nanocomposites from injection molding prepared through pellet mixing shows a similar increasing trend compared to powder-mixed nanocomposites. Further investigation is needed to study the effects of GNPs at higher concentrations on the crystallinity of the PET. The non-isothermal crystallinity was also obtained through DSC. As shown in FIG. 49, an increase to GNP concentration decreases the percent crystallinity of the nanocomposites.

Distribution Analysis

Figure 50:
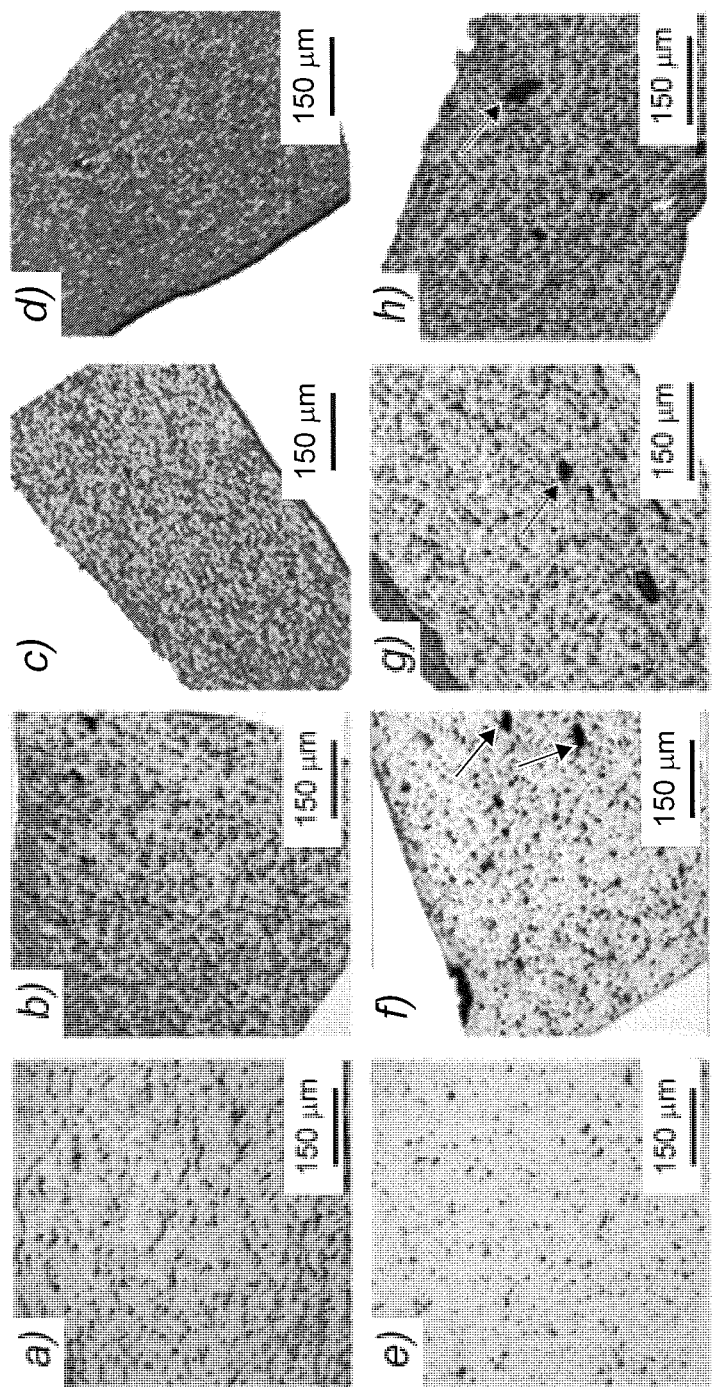
FIG. 50 illustrates confocal images collected from microtome sections of PET nanocomposites prepared through powder mixing at a) 2 wt. %, b) 5 wt. %, c) 7.5 wt. %, and d) 10 wt. % and through pellet mixing at e) 2 wt. %, f) 5 wt. %, g) 7.5 wt. %, and h) 10 wt. % GNPs, wherein agglomerated GNPs are shown in highlighted regions.

Samples with 850 nm thickness were examined by a confocal microscope to understand the effects of mixing method on the distribution of the GNPs inside the PET matrix. FIG. 50 represents the internal structures of the nanocomposites prepared at increasing concentrations of the GNPs (e.g. 2 wt. %, 5 wt. %, 7.5 wt. %, and 10 wt. %) through powder and pellet mixing methods, respectively. As seen, the distribution of GNPs inside the PET-GNP nanocomposites consisted of agglomerated GNPs; however, the samples that were prepared by a mixture PET pellets with GNPs at 7.5% and 10% concentrations did so to a greater degree. The size of the agglomerates was in the range of 50 to 60 µm (see FIG. 50g and FIG. 50h). Based on the data collected from confocal microscopy, it was found that mixing GNPs with PET powders lead to a more uniform distribution of GNPs in the matrix compared to the mixture with PET pellets. The higher improvements in the elastic modulus of the samples confirm this observation as well.

XRD Analysis

Figure 51:
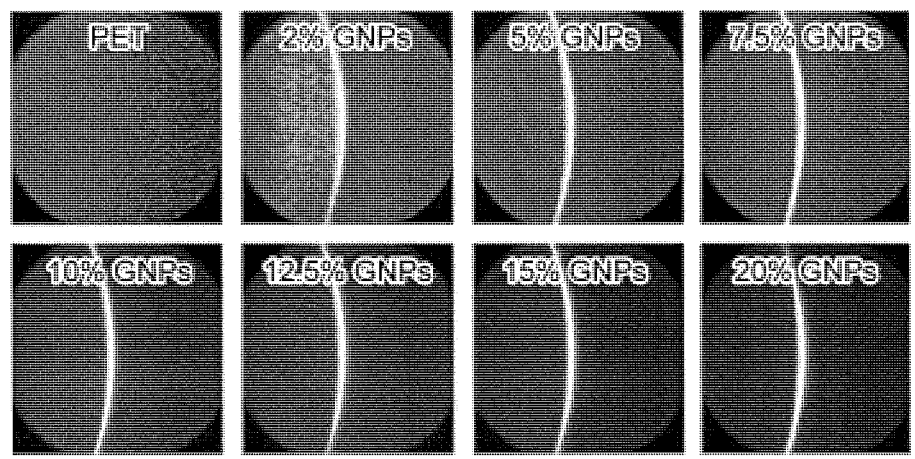
FIG. 51 illustrates comparisons of XRD 2D and 1D patterns of PET and nanocomposites prepared through powder mixing, wherein an inset graph represents the broadened peak observed for graphene at 26.54°2θ.
Figure 51:
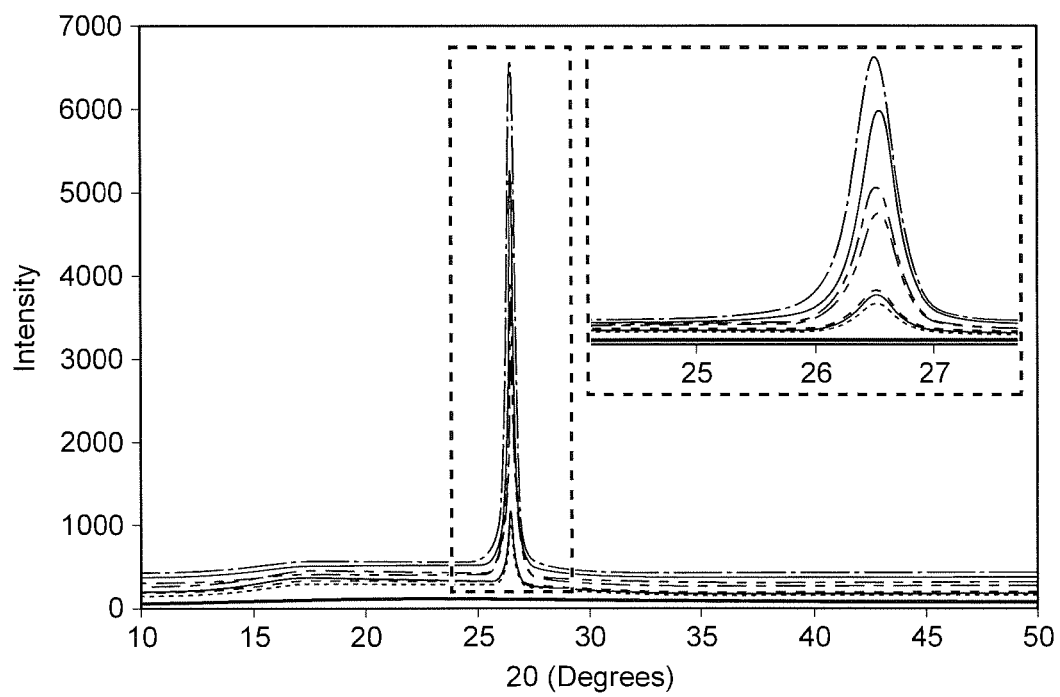
Figure 52:
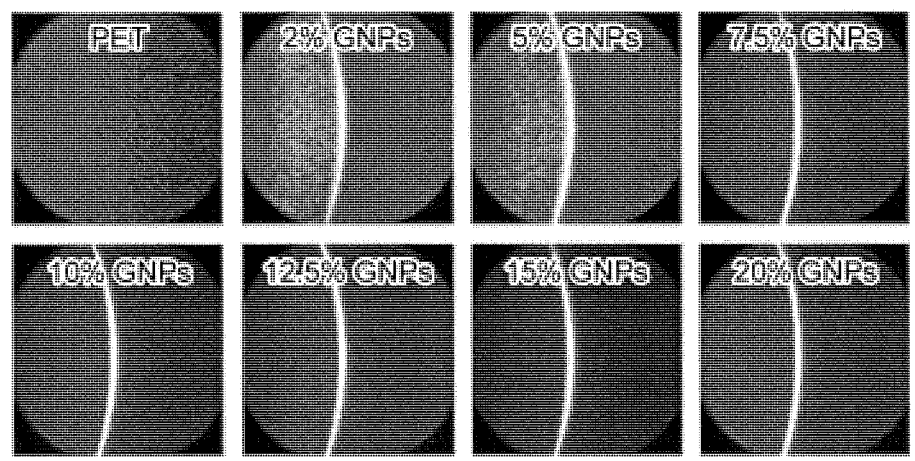
FIG. 52 illustrates comparisons of XRD 2D and 1D patterns of PET and nanocomposites prepared through pellet mixing. Inset graph represents the broadened peak observed for graphene at 26.54°2θ.
Figure 52:
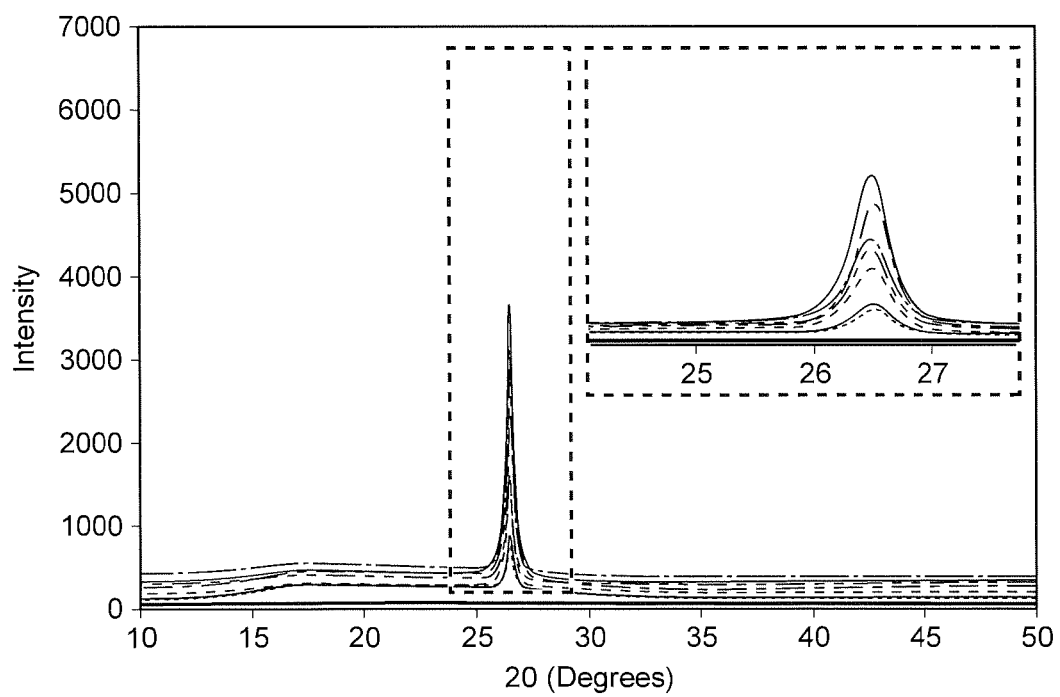
Figure 52:
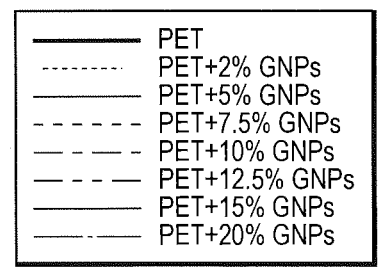

Diffraction patterns were collected from PET and PET nanocomposite tensile bars. FIGS. 51 and 52 represent the 2D and 1D diffraction patterns collected from the samples prepared through powder and pellet mixing methods, respectively. While the PET spectrum represents an amorphous structure, the peak broadening observed for the graphene peak at 26.54°2θ is indicative of the presence of platelets. The intensity of the peak increased with increasing concentration of GNPs. As seen, the nanocomposite tensile bars exhibit a broad hump around 19°2θ.

Figure 53:
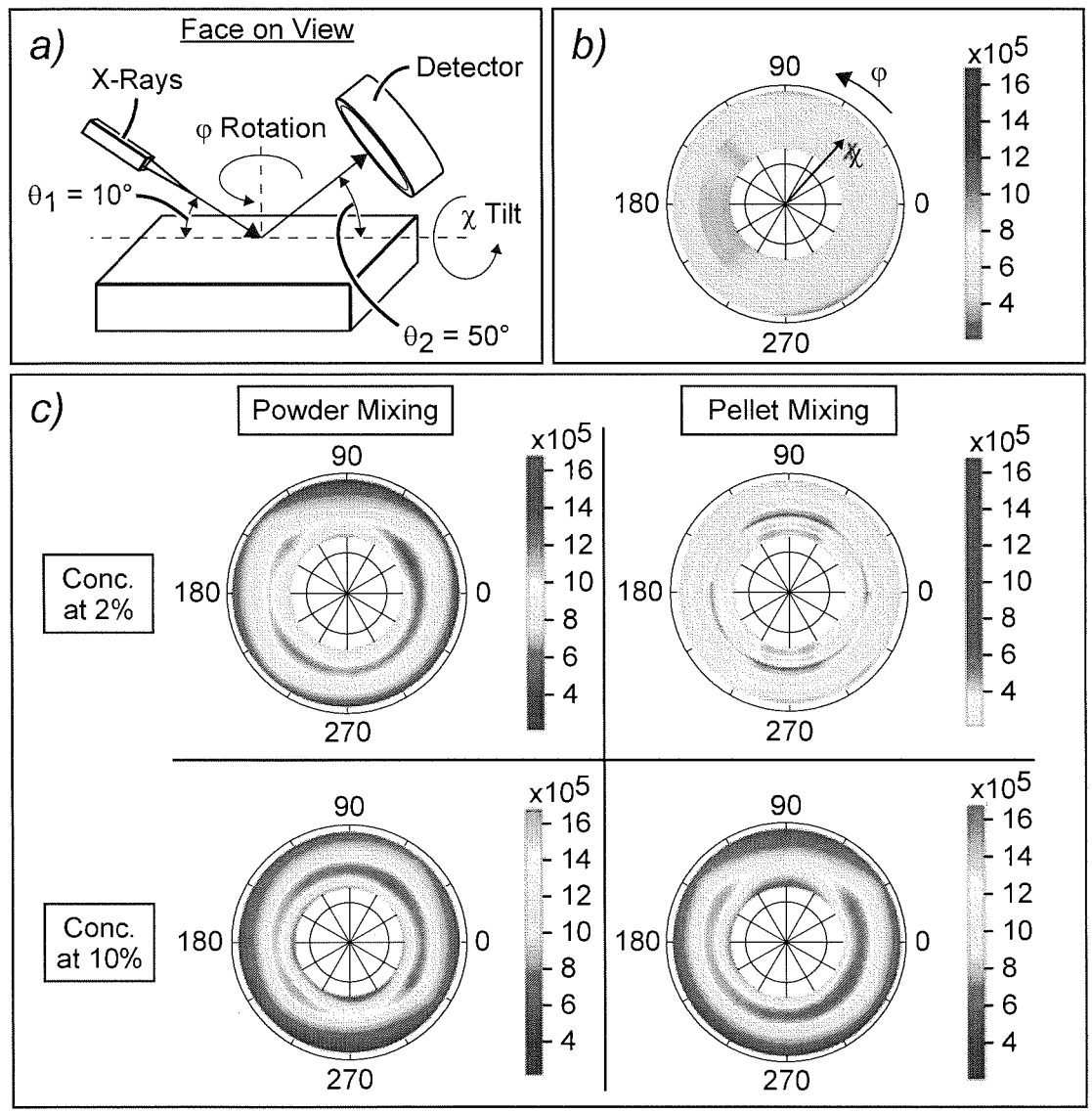
FIG. 53 illustrates a pole figure representation of a) geometry of the sample, indicating the area used for measurements in the injection flow direction, with respect to the instrument geometry, wherein data collected from b) pristine PET and c) PET nanocomposites prepared at 2 wt. % and 10 wt. % concentrations of GNPs through powder mixing and pellet mixing methods.
Figure 54:
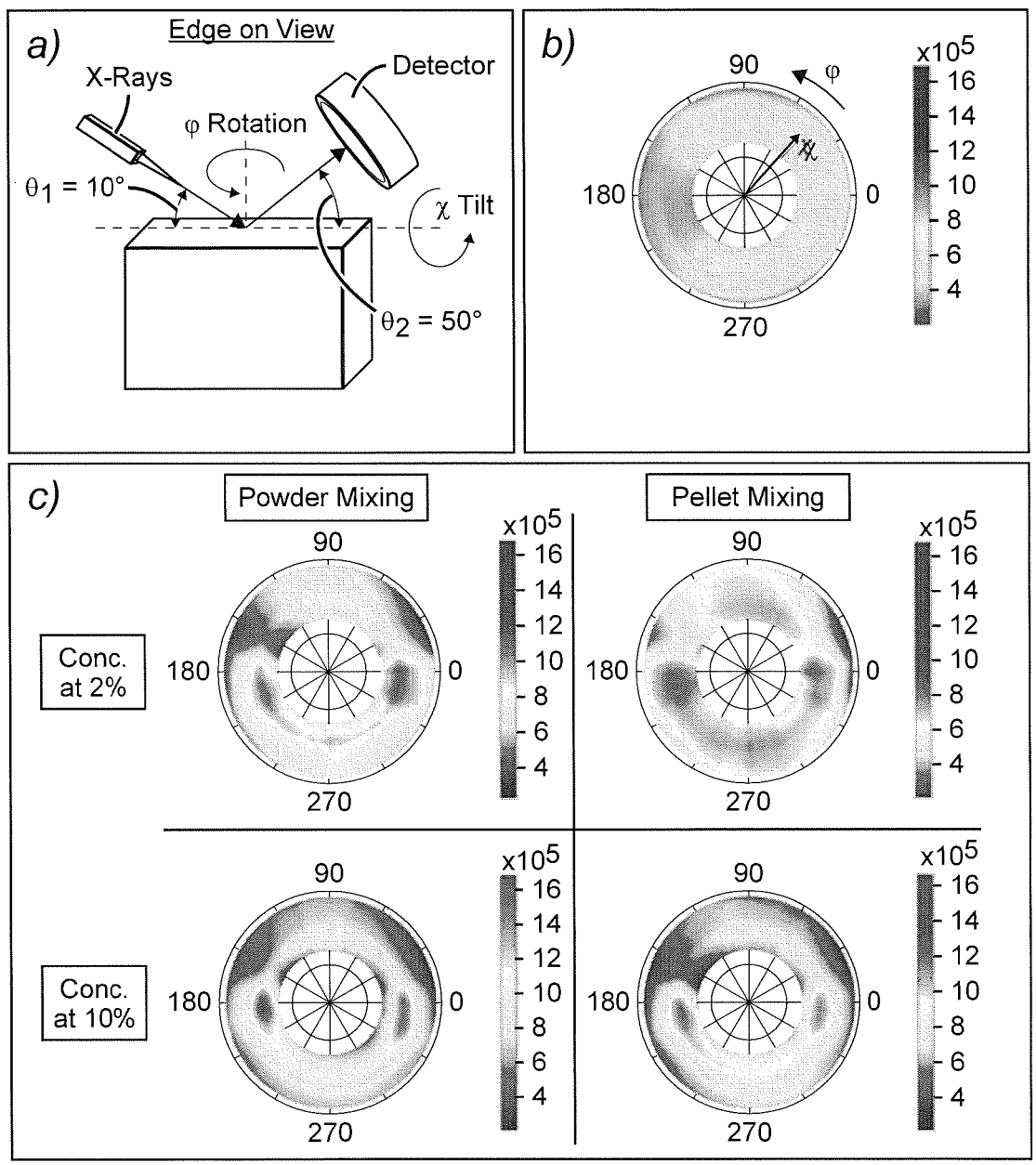
FIG. 54 illustrates a pole figure representation of a) geometry of the sample, indicating the area used for measurements in the transverse direction, with respect to the instrument geometry, wherein data collected from b) pristine PET and c) PET nanocomposites prepared at 2 wt. % and 10 wt. % concentrations of GNPs through powder mixing and pellet mixing methods.

To evaluate the orientation of the crystalline structure, pole figures for the (002) diffraction plane, representing the presence of graphene, were measured. FIGS. 53 and 54 show the pole figures for PET-GNP nanocomposites, prepared at increasing concentrations and mixing methods, on the injection flow direction (face on view) and the transverse direction (edge on view), respectively. The graphene peak in the pole figures can be used to measure the orientation of the GNPs in the PET matrix. From the pole figures, it was observed that increasing the concentration of GNPs, from 2 wt. % to 10 wt. % as well as the mixing methods have similar impact on orientation of the GNPs. The GNPs exhibited a random orientation distribution in the face on view direction, along the axial direction of the tensile bar, and a preferred orientation in the edge on view direction, along the thickness of the tensile bar.

EG-GNP Dispersions

With an interest in incorporating the GNP dispersions into a PET monomer through in-situ polymerization, EG, one of the raw materials in polymerizing PET, was selected as the dispersion medium. The following sections summarize the preliminary results obtained by characterizing the GNP dispersions in EG.

Figure 55:
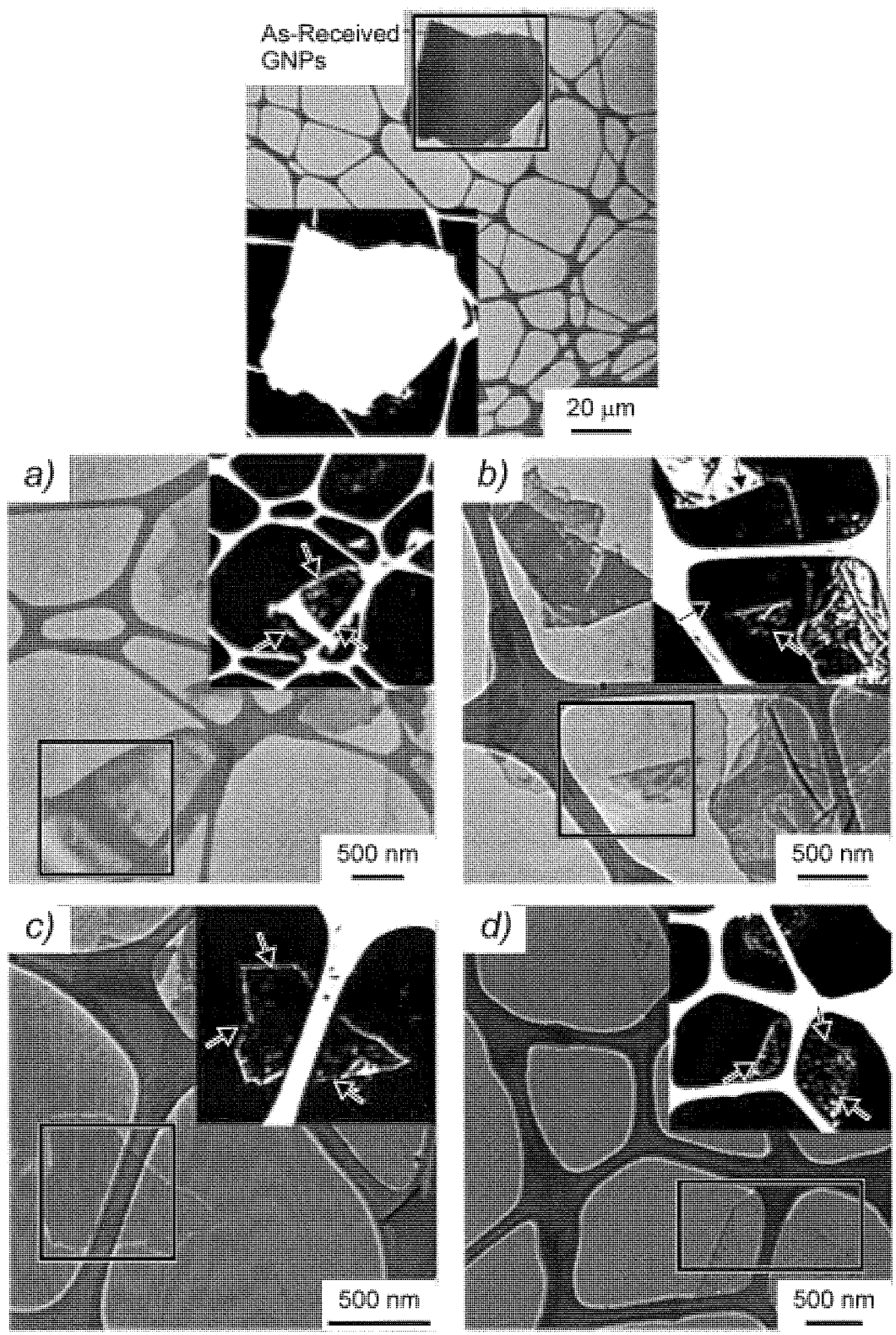
FIG. 55 illustrates TEM micrographs of an as-received GNP-15 and GNP dispersions in EG, wherein samples were sonicated for 90 minutes and centrifuged at a) 260 RCF and b) 2350 RCF, and for 180 minutes centrifuged at c) 260 RCF and d) 2350 RCF, and wherein insets represent the binary filter to distinguish the edges of the monolayer graphene.

Monolayer graphene can be identified from the bright field TEM micrographs because of their well-defined edges. Multi-layer graphene, however, can be identified from the larger objects, contiguous clumps extended over several grid openings, regularly observed in the original pre-sonication samples. TEM micrographs of the as-received GNP-15 and the dispersion samples sonicated for 90 and 180 minutes and centrifuged at 260 and 2350 RCF were taken and analyzed using binary filters. FIG. 55 represents the analysis of TEM micrographs taken using GNP-15 and the dispersion samples prepared by the same GNPs. The analysis with binary filters indicates the presence of monolayer graphene from edges, as marked with red arrows, in the dispersion samples (see FIG. 55). As seen, an isolated monolayer graphene was observed in all the dispersion samples.

Figure 56:
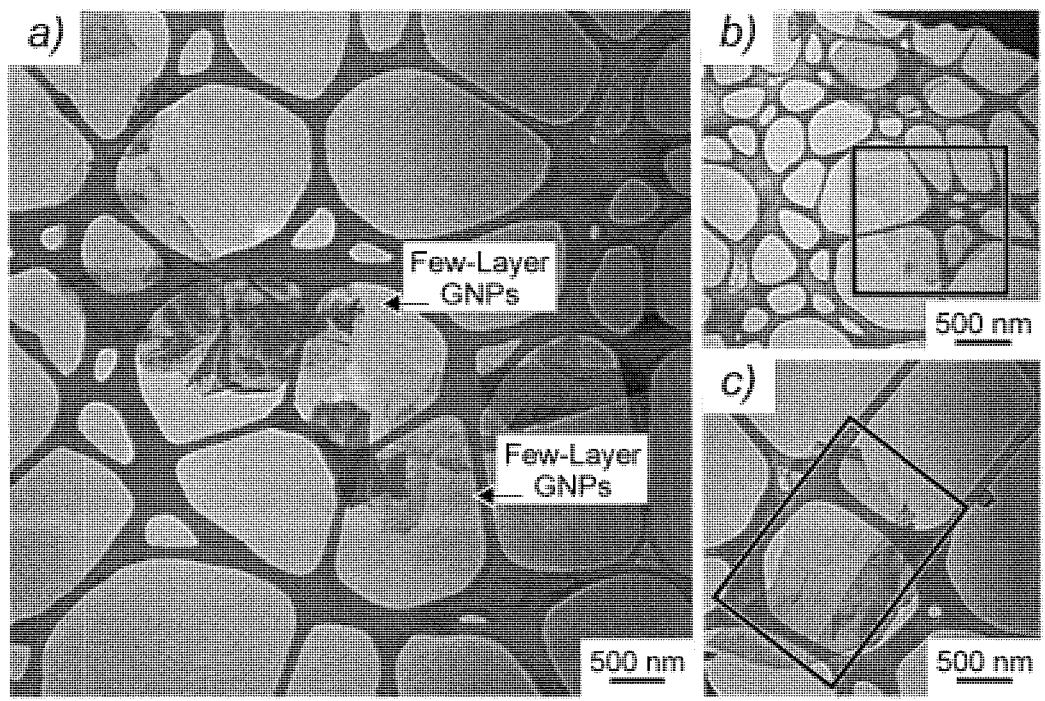
FIG. 56 illustrates a) TEM micrograph collected from a grid coated with dispersed GNP-15 in EG after sonication of 30 minutes and centrifugation at 260 RCF, b), and c) highlighted regions show isolated few-layer graphene sheets.

FIG. 56 shows micrographs of TEM grid of GNP-15 prepared using the samples that were sonicated for 30 minutes and centrifuged at 260 RCF. During the analysis of the TEM micrographs in previous work, binary filters were applied to help distinguish few-layer GNPs. Here, as shown in FIG. 56a, the isolated platelets consist of few layers.

Figure 57:
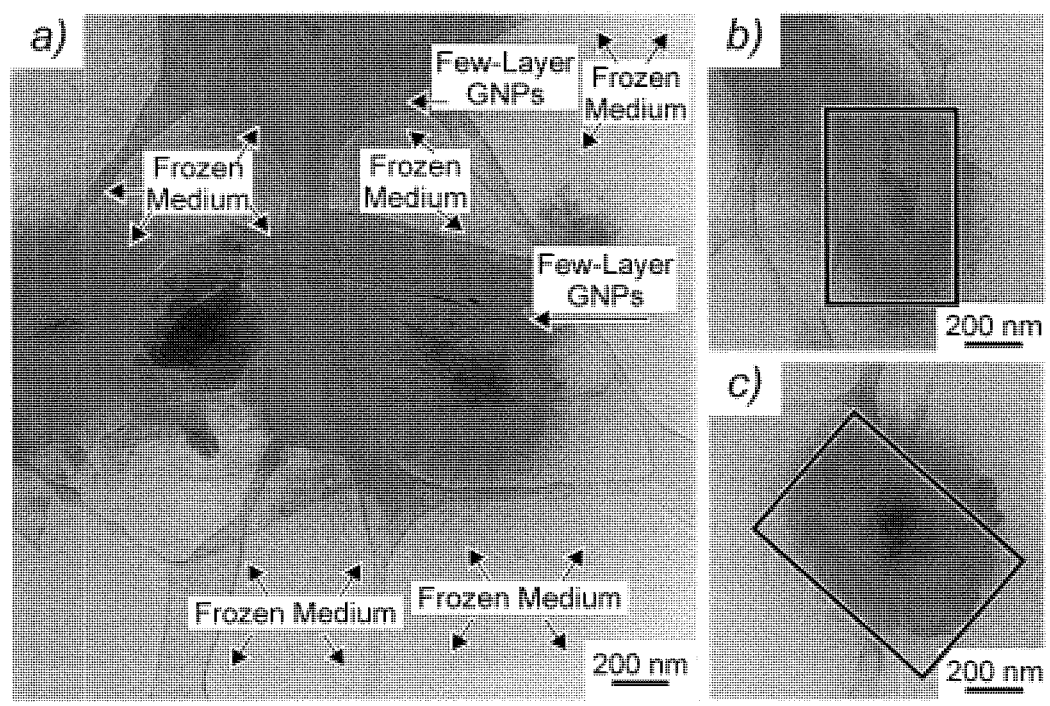
FIG. 57 illustrates a) Cryo-TEM micrograph collected from a grid coated with dispersed GNP-15 in EG after sonication of 30 minutes and centrifugation at 260 RCF, showing the areas holding the frozen EG, b), and c) highlighted regions show isolated few-layer graphene sheets.

To limit the effects of potential heat trauma from sample preparation for traditional TEM, we investigated the same type of samples from the previous section using Cryo-TEM. FIG. 57 represents the micrograph. As shown, few-layer graphene sheets, with a similar geometry to those observed in FIG. 56 were captured. A minimal surface contamination (i.e. moisture from the air) was observed during imaging, which could be attributed to blotting during sample preparation.

Figure 58:
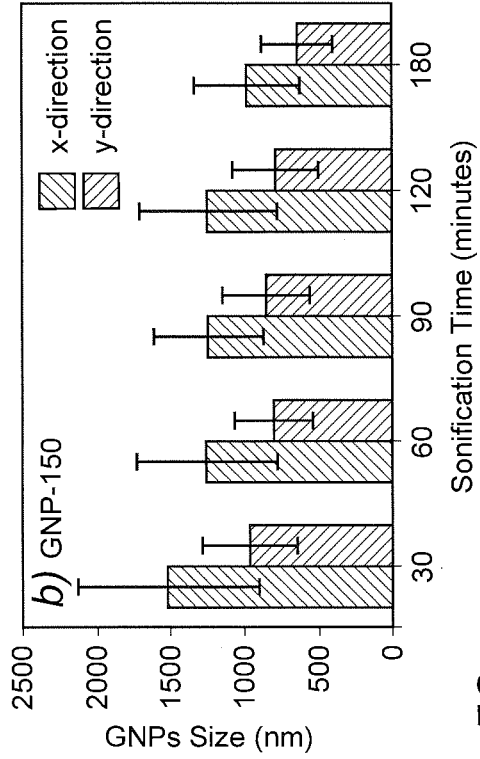
FIG. 58 illustrates an average length and width measurement of GNPs in dispersions centrifuged at 260 RCF for a) GNP-15 and b) GNP-150, wherein error bars show SD.
Figure 58:
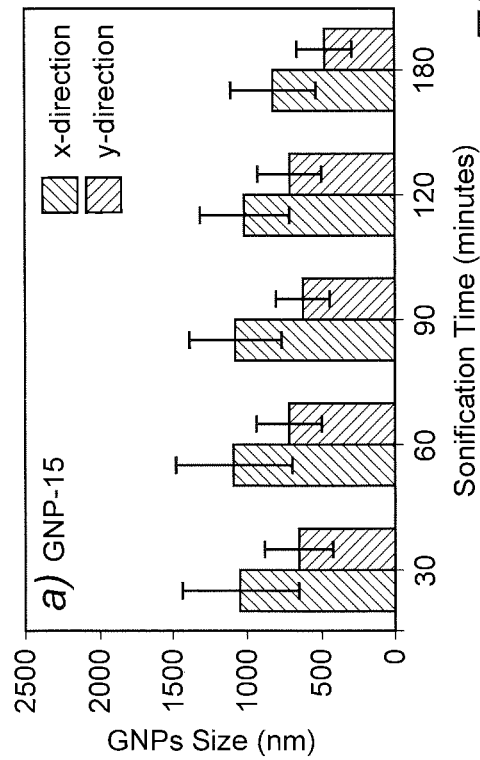
Figure 59:
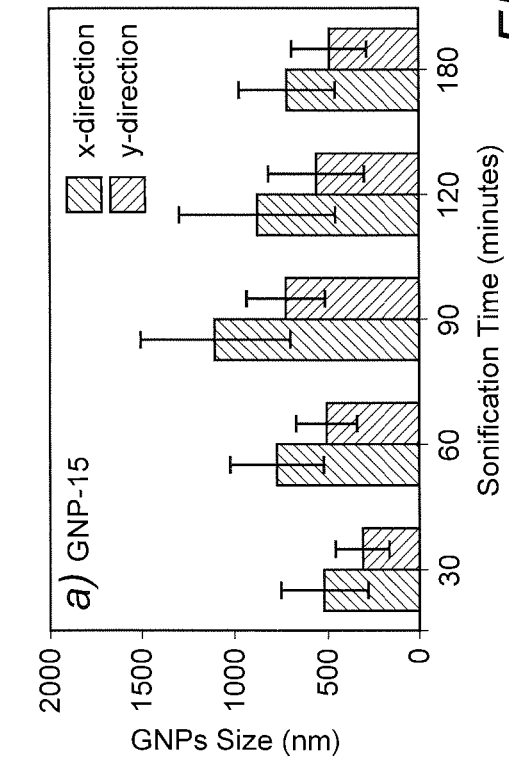
FIG. 59 illustrates an average length and width measurement of GNPs in dispersions centrifuged at 2350 RCF for a) GNP-15 and b) GNP-150, wherein error bars show SD.

According to Khan et al., Hernandez et al., and O'Neill et al. increasing the sonication time better separates the starting material into individual layers followed by a decrease in the size of the dispersed graphene. To investigate this, the lengths and widths of GNPs were collected from the TEM micrographs of all samples for more representative statistics. As shown in FIG. 55, GNPs are irregular in shape. To measure their length and width, the longest axis was considered to be the length and the shortest axis as the width. To understand the effects of sonication and centrifugation, the TEM micrographs collected from the probe-sonicated samples were analyzed to estimate the size of the GNPs. A total of 85 TEM micrographs were measured using the method explained earlier. FIGS. 58 and 59 show the size distribution of GNP-15 and GNP-150. Statistical analysis of TEM micrographs shows that by increasing the sonication time from 30 to 90 minutes, the average length of the GNPs for samples centrifuged at 260 RCF decreases from 1.5 to 1.2 µm, whereas the average width decreases from 0.9 to 0.8 µm, resulting in 20% and 11% decrease, respectively. Interestingly, for samples centrifuged at 2350 RCF the average length and width of the platelets remained almost same at 0.9 and 0.6 µm, respectively. Additional data related to the degree of exfoliation can be generated by calculating the area of the GNPs. Sonication time is negatively correlated with platelet size: the longer the sonication time, the smaller the size and area of the GNPs after sonication. Table 18 summarizes the GNPs average areas. The values significantly dropped at the 180-minute sonication time point.

TABLE 18

GNPs average area as a function of sonication time. Centrifugation was performed at 260 and 2350 RCF for both types of GNPs.

| Samples | GNP Surface Area (m²/g) | GNP Size (X & Y) µm | Probe Sonication (min) | Average Area (µm²) | |
|---|---|---|---|---|---|
| | | | | 260 RCF | 2350 RCF |
| GNP-15 | ≥15 | ≤5 | 30 | 0.72 | 0.18 |
| | | | 60 | 0.81 | 0.40 |
| | | | 90 | 0.68 | 0.84 |
| | | | 120 | 0.75 | 0.56 |
| | | | 180 | 0.42 | 0.39 |
| GNP-150 | 150 | ~5 | 30 | 1.56 | 0.65 |
| | | | 60 | 1.10 | 0.64 |
| | | | 90 | 1.10 | 0.64 |
| | | | 120 | 1.01 | 0.57 |
| | | | 180 | 0.67 | 0.46 |

To evaluate the concentration of the GNP dispersions using the optical absorbance technique, filtration testing was first examined to calculate the absorption coefficient of the samples. Table 19 summarizes the samples prepared with GNP-15 for the filtration tests. An average value of 2374 mL/(mg·m) was estimated by filtering 10 mL of the dispersions using the procedure reported in Table 20.

TABLE 19

Sample preparation for filtration testing using EG as the dispersion medium.

| Initial Conc. (mg/mL) | Sonication Time (min) | G-Force (RCF) | Sample Code |
|---|---|---|---|
| 0.25 | 40 | 120 | A |
|  | 40 | 460 | B |
|  | 60 | 260 | C |
|  | 80 | 460 | D |
|  | 120 | 120 | E |
|  | 120 | 1860 | F |
|  | 180 | 2350 | G |
| 5 | 30 | 260 | H |

TABLE 20

Absorption coefficient measurements.

| Sample | Membrane's (mg) | Membrane's (mg) | Conc. | A/L | Absorption |
|---|---|---|---|---|---|
| A | 13.60 | 13.80 | 0.020 | 62 | 3100 |
| B | 13.40 | 13.50 | 0.010 | 31 | 3100 |
| C | 13.30 | 13.50 | 0.020 | 50 | 2500 |
| D | 13.10 | 13.30 | 0.020 | 39 | 1950 |
| E | 13.20 | 13.70 | 0.050 | 124 | 2480 |
| F | 13.40 | 13.50 | 0.010 | 13 | 1300 |
| G | 13.30 | 13.40 | 0.010 | 21 | 2100 |
| H | 13.40 | 13.70 | 0.030 | 74 | 2467 |
|  |  |  |  | Average Value | 2374 |
|  |  |  |  | Std. dev | 590 |

To study the effects of sonication time and centrifugal force on the concentration of the dispersions, a series of dispersion samples was prepared with varied sonication times and centrifugal forces. The concentration of the remaining GNPs after centrifugation can be estimated knowing the average value of absorption coefficient for graphene dispersions in EG. Table 21 and Table 22 summarize the concentration results for the dispersion samples prepared by probe and bath sonication techniques, respectively. The results here show that by increasing the centrifugal force from 260 to 2350 RCF, the concentration significantly drops.

TABLE 21

The concentration of GNPs in EG dispersions as a function of sonication times and centrifugal forces. Sonication was performed using a probe sonicator in 30-min increments between 30 to 180 minutes.

| | GNP-15 | | | GNP-150 | | |
|---|---|---|---|---|---|---|
| | | Concentration of Dispersion (mg/mL) | | | Concentration of Dispersion (mg/mL) | |
| Sonication Time (min) | Absorption Coefficient mL/(mg.m) | 260 RCF | 2350 RCF | Absorption Coefficient mL/(mg.m) | 260 RCF | 2350 RCF |
| 30 | 2374 | 0.011 | 0.002 | 2374 | 0.047 | 0.008 |
| 60 |  | 0.021 | 0.004 |  | 0.087 | 0.019 |
| 90 |  | 0.030 | 0.004 |  | 0.070 | 0.019 |
| 120 |  | 0.027 | 0.004 |  | 0.080 | 0.015 |
| 180 |  | 0.043 | 0.009 |  | 0.075 | 0.015 |

TABLE 22

The concentration of GNP dispersions in EG as a function of sonication times and centrifugal forces. Sonication was performed using a bath sonicator in 24-hour increments between 24 to 120 hours, shown in minutes.

| | GNP-15 | | | GNP-150 | | |
|---|---|---|---|---|---|---|
| | | Concentration of Dispersion (mg/mL) | | | Concentration of Dispersion (mg/mL) | |
| Sonication Time (min) | Absorption Coefficient mL/(mg.m) | 260 RCF | 2350 RCF | Absorption Coefficient mL/(mg.m) | 260 RCF | 2350 RCF |
| 1,440 | 2374 | 0.017 | 0.003 | 2374 | 0.043 | 0.008 |
| 2,880 |  | 0.021 | 0.004 |  | 0.062 | 0.015 |
| 4,320 |  | 0.026 | 0.005 |  | 0.076 | 0.020 |
| 5,760 |  | 0.024 | 0.005 |  | 0.083 | 0.025 |
| 7,200 |  | 0.028 | 0.007 |  | 0.057 | 0.014 |

Figure 60:
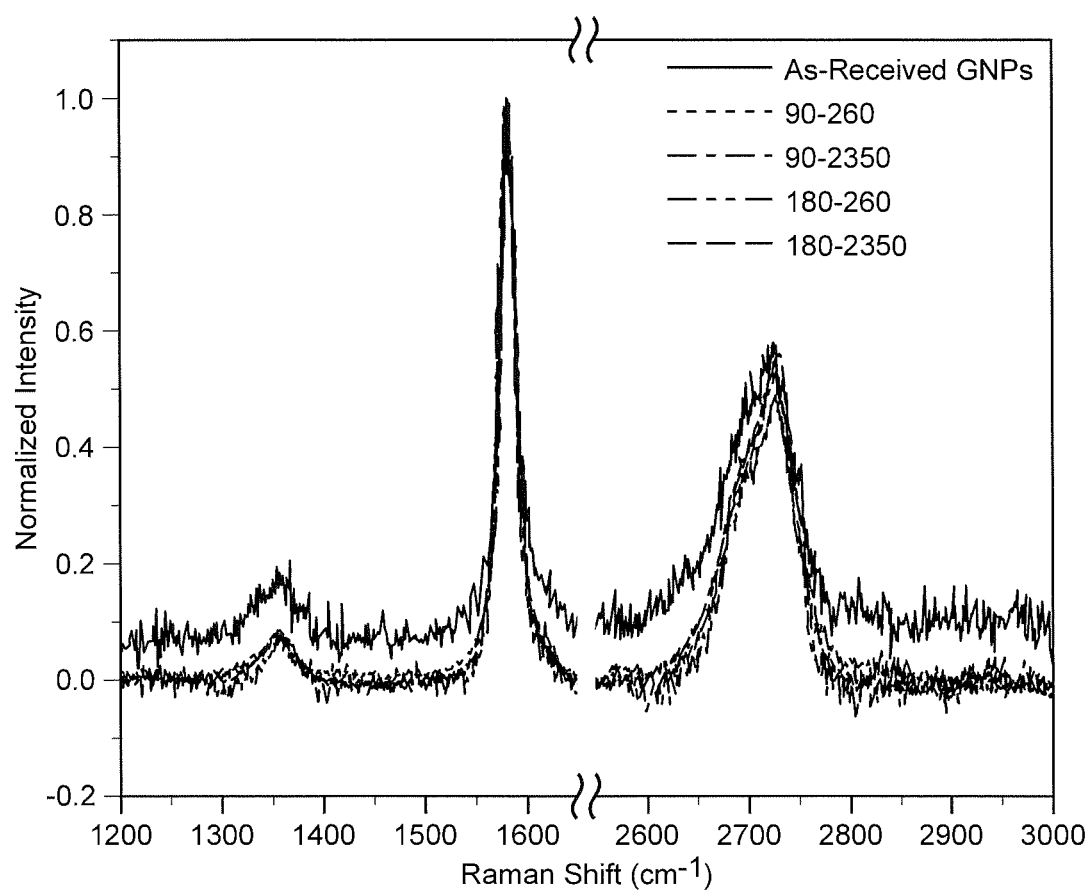
FIG. 60 illustrates Raman spectra for GNP-15 in the dispersion samples illustrating the D, G, and 2D bands shifts, wherein labels indicate: "sonication time"-"centrifugation speed"

FIG. 60 represents the evolution of the D, G, and 2D Raman bands of sonicated dispersion samples after centrifugation. The dispersion samples that were sonicated for shorter times, (e.g. 30 and 60 minutes), and centrifuged could not be used for measurements by Raman spectroscopy. It appears that after heat treatment and drying on the glass slide, there were not sufficient GNPs on the glass slide to obtain Raman spectra due to the low concentration of the GNPs in the dispersion samples. To further investigate the effects of the process parameters, Raman spectra from the aforementioned samples were collected, and analyzed for the shift in 2D band of the spectra. Band shift was determined by integrating the Gaussian peaks in the spectra.

Figure 61:
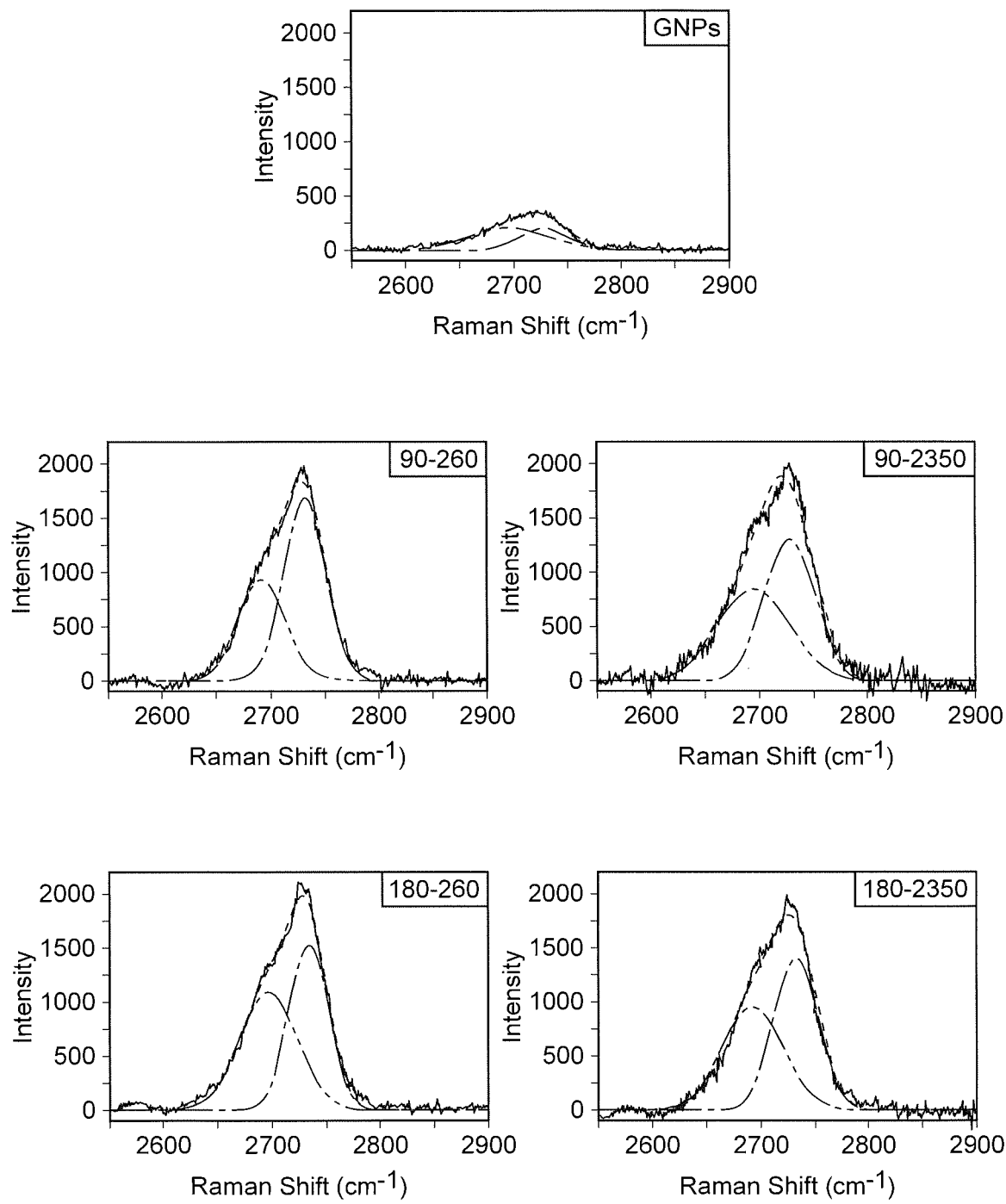
FIG. 61 illustrates a peak analysis of 2D Raman bands, wherein averaged intensity collected from five different positions of the samples ($R^2 \sim 0.98$), and labels indicate: "sonication time"-"centrifugation speed"

Prior work demonstrates that the thickness of few-layer GNPs can be revealed in by the analysis of the Raman spectra. Latil et al. and Saito et al. reported on electronic structure and determination of number of layers by using the ratio of the 2D and G bands, $I_{2D}/I_G$. Ferrari et al. investigated the evolution of monolayer and few-layer graphene by Raman spectroscopy and compared their results with graphite. They reported that the 2D band possesses a unique line shape for single-layer graphene. As the number of graphene layers increases, the electronic band structure varies and approaches that of graphite. They add that the shape and the formation of sub-components under the 2D band can be used as a graphene "fingerprint" to estimate the number of graphene layers. FIG. 61 illustrates the peak analysis of the averaged 2D band of the Raman spectra collected from the GNP dispersions in EG. The shape of the 2D bands from the Raman spectra of dispersion samples are almost identical, but significantly different from the spectra collected from the as-received GNPs.

Figure 62:
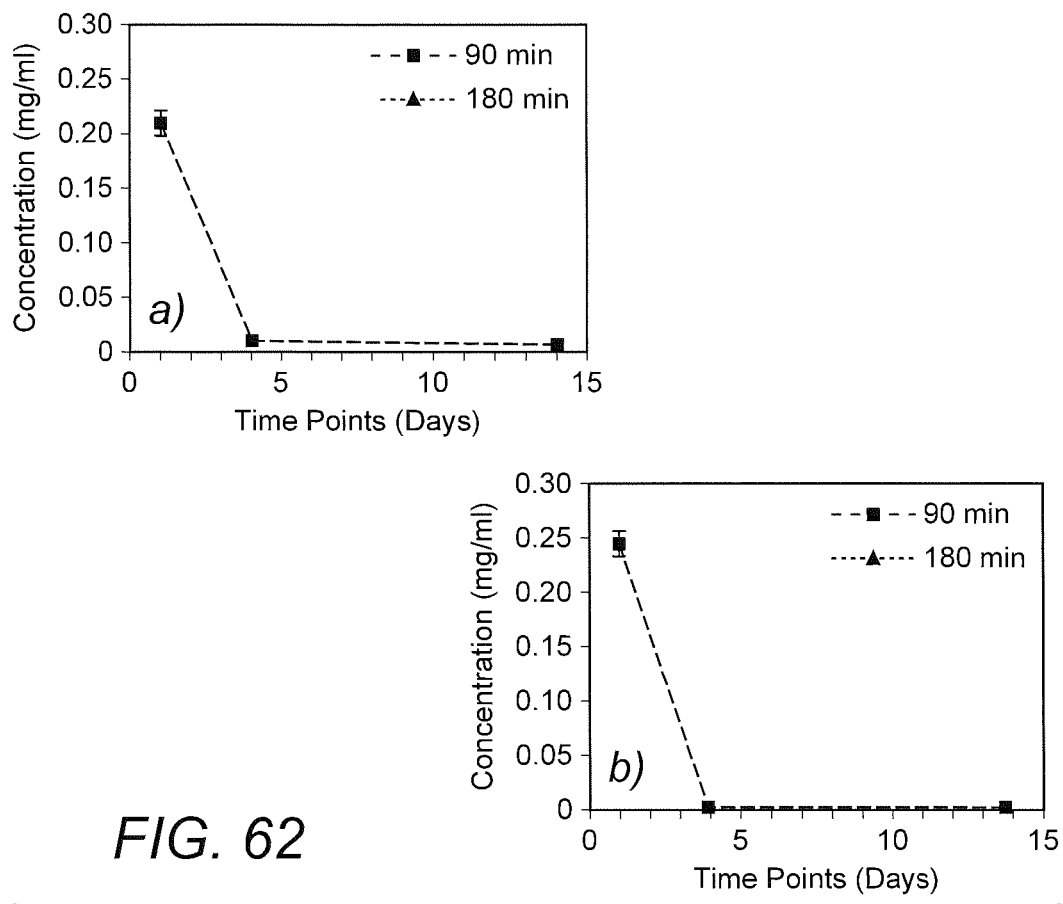
FIG. 62 illustrates and evaluation of the stability of GNP dispersions in EG using filtration tests on dispersion samples prepared at a) 0.25 mg/mL and b) 5 mg/mL.

To better understand the stability of the dispersions and effects of sonication time on the stability of the dispersions, a series of dispersions were prepared in EG medium. To quantify the settling of GNPs over time, filtration tests were performed on 10 mL of the dispersions pipetted from the top surface layer of the dispersions, while the remaining samples remained intact, at different time points. FIG. 62 presents the evaluation of the stability of the GNP dispersions in EG. With the concentration at time zero being considered as the reference, the percentage decrease in the concentration was calculated. Results are presented in Table 23. Complete or almost complete sedimentation, irrespective of the sonication time, was observed for GNP dispersions within four days. As seen, increasing the starting concentrations of the dispersions increases the sedimentation rate.

TABLE 23

Calculation of the percent decrease in the concentration of the EG dispersions.

| Initial Concentration of Dispersions (mg/mL) | Days | Sonication Time (min) 90 | 180 | Initial Concentration of Dispersions (mg/mL) | Days | Sonication Time (min) 90 | 180 |
|---|---|---|---|---|---|---|---|
| 0.25 | 1 | 0% | 0% | 5 | 1 | 0% | 0% |
|  | 4 | −95% | −95% |  | 4 | −100% | −99% |
|  | 14 | −98% | −98% |  | 14 | −100% | −100% |

Nanocomposites Prepared by In-Situ Polymerization

To further understand the effects of polymerization on the level of GNP distribution in PET and effects on properties, the in-situ polymerized pellets were produced through ES and PC reactions, as described herein, and were used to fabricate nanocomposite tensile bars through the melt compounding approach, as described herein.

Figure 63:
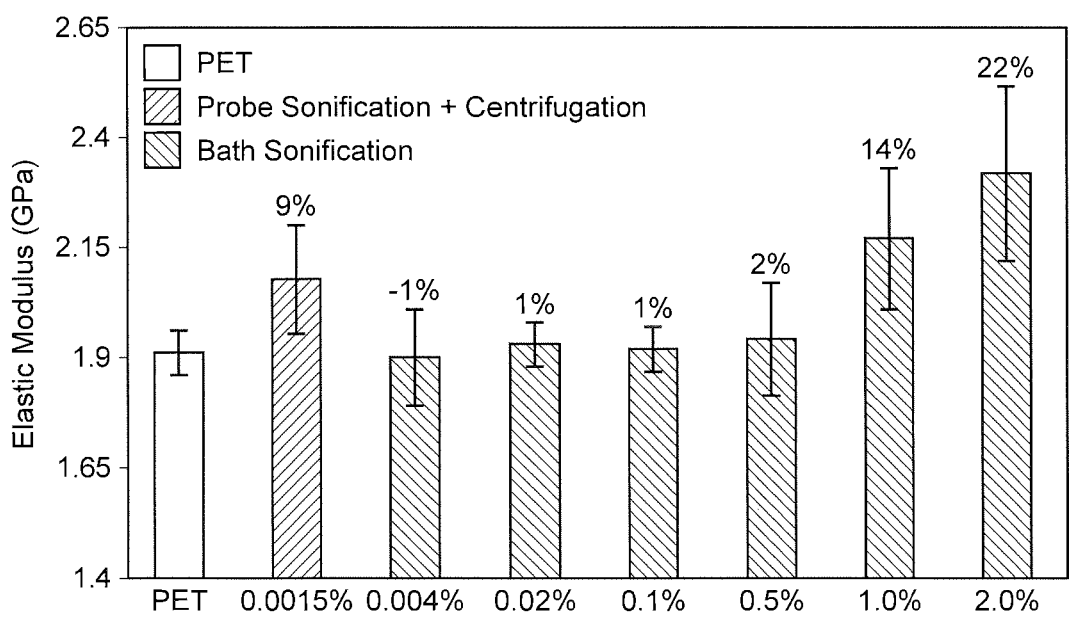
FIG. 63 illustrates measurements of the elastic modulus of the PET and PET nanocomposites prepared by melt compounding the in-situ polymerized pellets.
Figure 64:
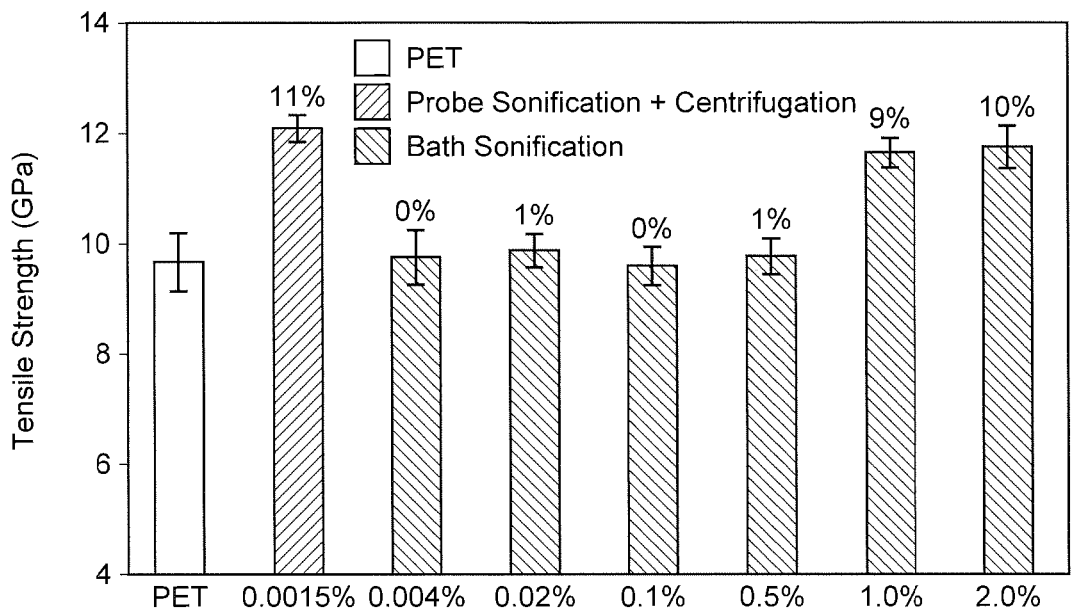
FIG. 64 illustrates measurements of the tensile strength of the PET and PET nanocomposites prepared by melt compounding the in-situ polymerized pellets.

The measurements of elastic modulus and tensile strength of the PET and PET nanocomposites are illustrated in FIGS. 63 and 64, respectively. As shown, the highest improvement in the elastic modulus of PET was achieved at 2 wt. % of GNPs. While the nanocomposites prepared at concentrations of from 0.004 wt. % to 0.5 wt. % did not show any improvement, the samples prepared at 0.0015 wt. % concentration of GNPs increased the elastic modulus by 9%. Similar behavior was observed for the tensile strength of the PET nanocomposites. Samples at 1 wt. % and 2 wt. % of GNPs increased the strength by 9% and 10%, respectively.

Figure 65:
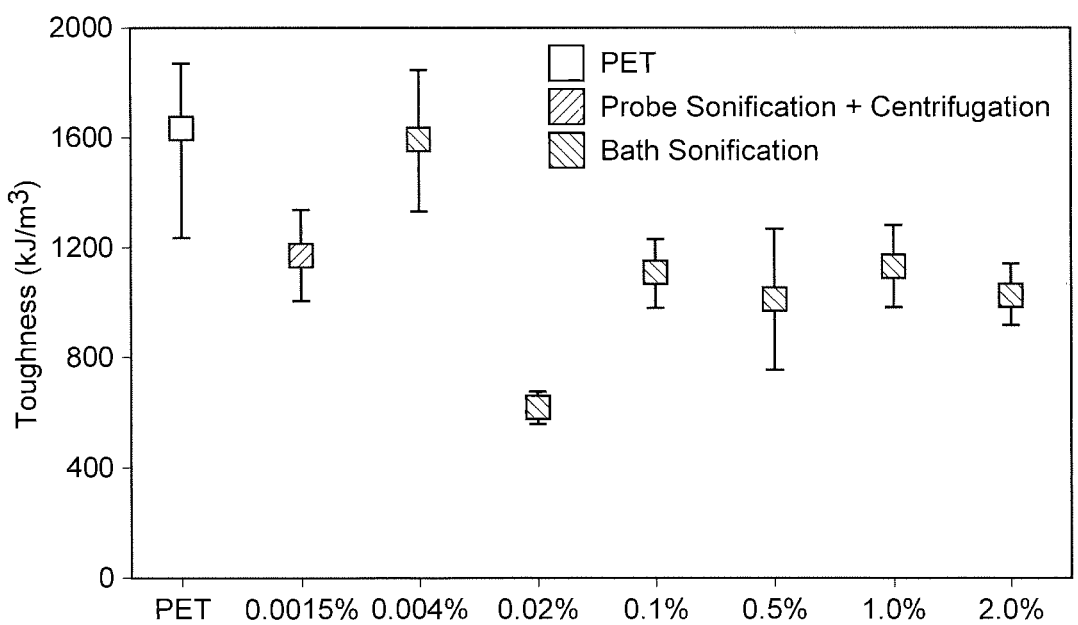
FIG. 65 illustrates measurements of the toughness of the PET and PET nanocomposites prepared by melt compounding the in-situ polymerized pellets.

PET nanocomposites were also examined for their toughness. As shown in FIG. 65, the PET nanocomposites prepared at concentrations greater than 0.1 wt. %, seems to show a more stabilized behavior in the toughness compared to those prepared at lower concentrations.

Figure 66:
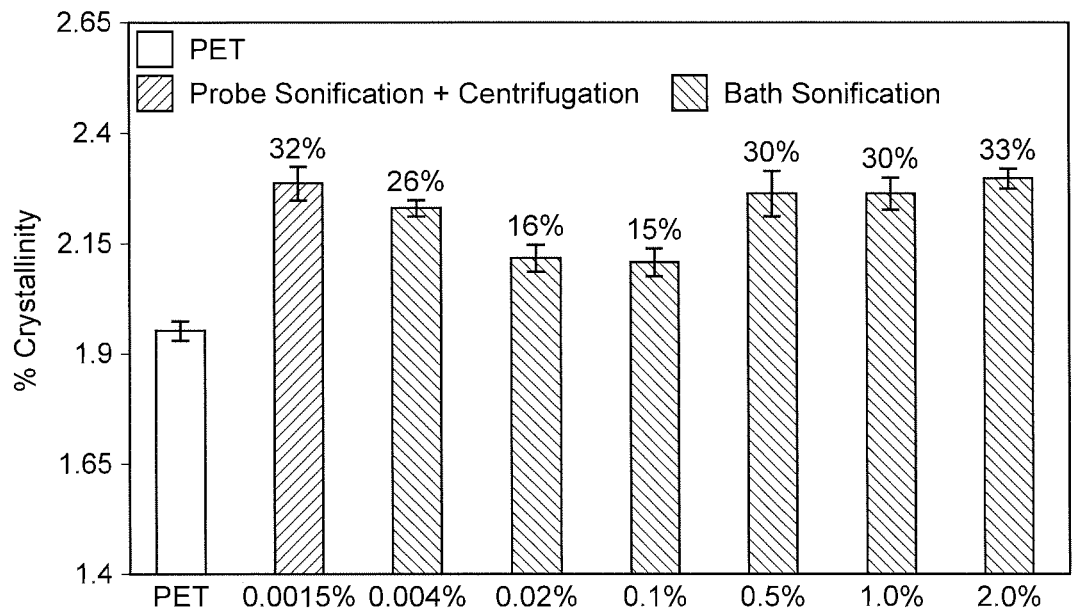
FIG. 66 illustrates crystallinity measurements of the PET and PET nanocomposites prepared by melt compounding the in-situ polymerized pellets, wherein percentile values are relative to PET.
Figure 67:
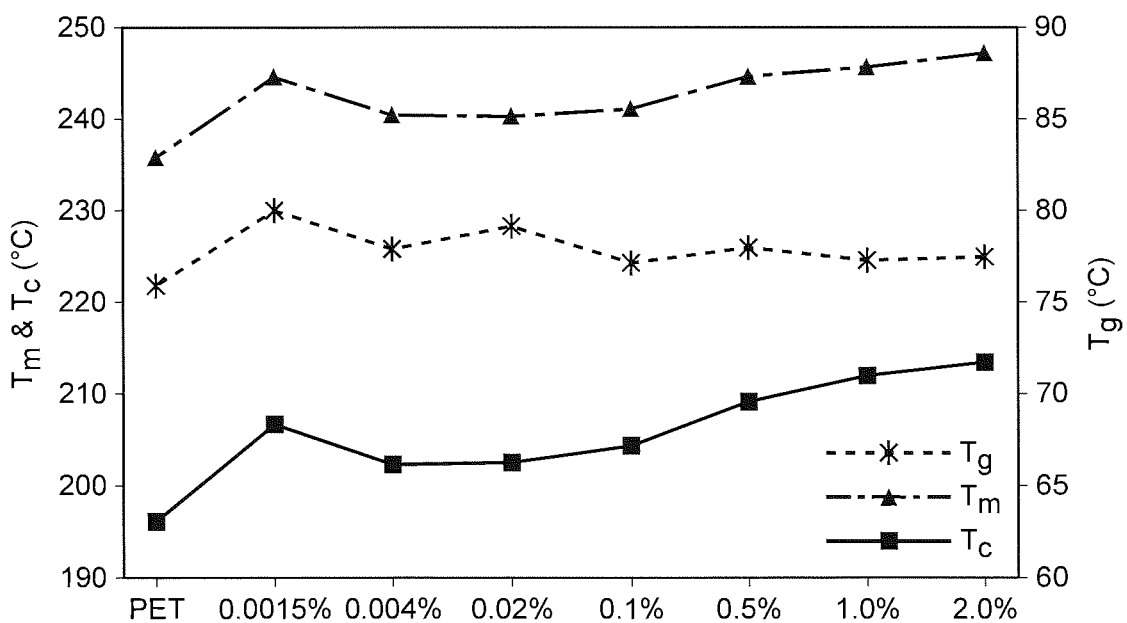
FIG. 67 illustrates thermal behavior of PET and PET nanocomposites prepared by melt compounding the in-situ polymerized pellets.

FIG. 66 represents the crystallinity measurements of PET and PET nanocomposites. As shown, the percent crystallinity of the samples, shown on the graph, seem to increase at concentration of GNPs greater than 0.1 wt. %. Thermal properties of the samples are illustrated in FIG. 67. While the $T_g$ does not show a significant change, the $T_m$ and $T_c$ exhibit increasing trend for samples that were prepared at concentrations greater than 0.1 wt. %.

Figure 68:
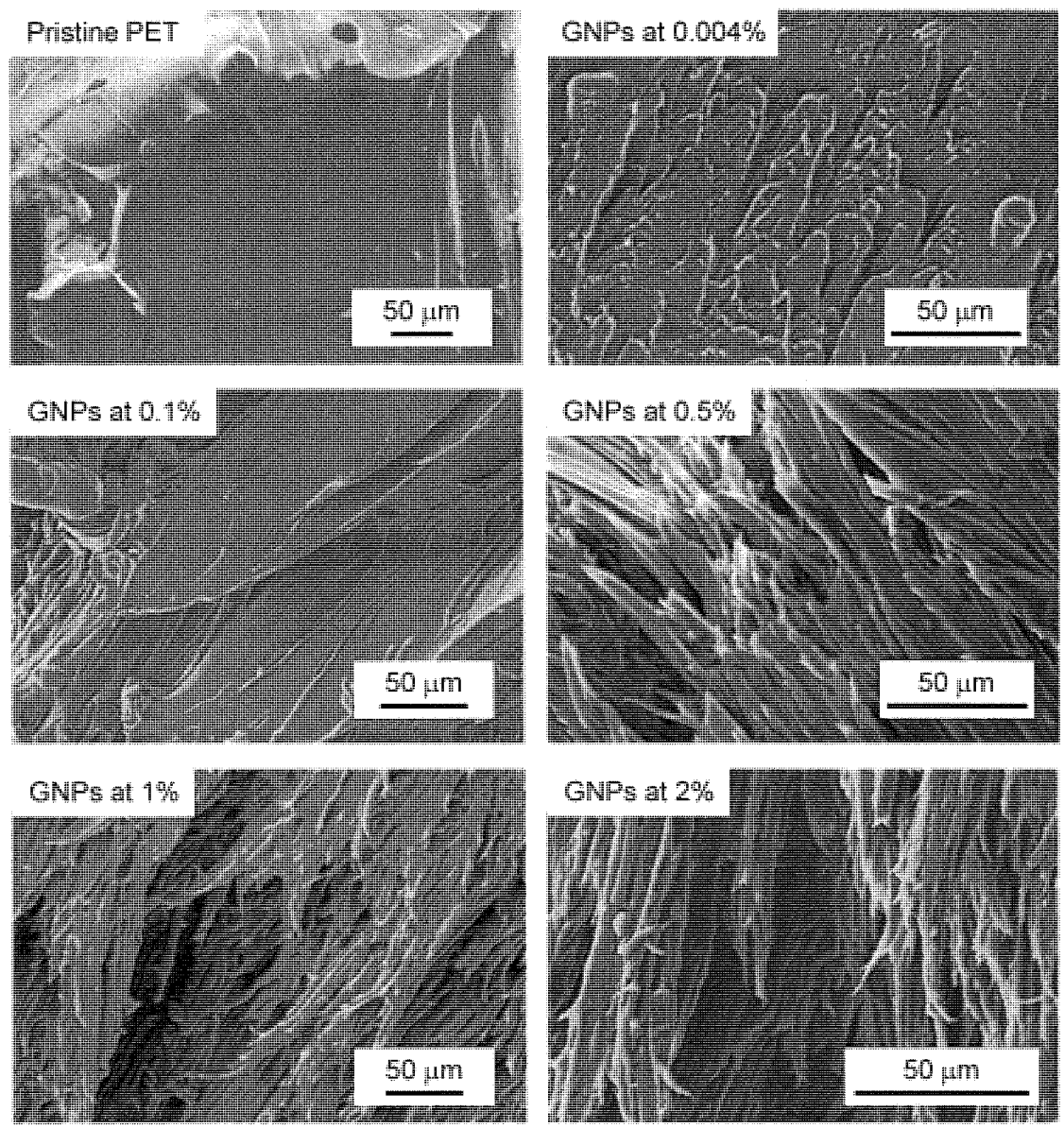
FIG. 68 illustrates SEM images collected from PET and PET nanocomposites prepared at varied concentrations of GNPs through melt compounding the in-situ polymerized pellets.

PET nanocomposites, prepared at 0.004 wt. %, 0.1 wt. %, 0.5 wt. %, 1 wt. %, and 2 wt. %, were examined by SEM to analyze their microstructure after mechanical testing. FIG. 68 represents the SEM images collected from the PET-GNP nanocomposites' fracture surfaces. The fracture analysis of the samples prepared at 0.5 wt. %, 1 wt. %, and 2 wt. % concentrations of GNPs exhibited polymer chain entanglements, which was different from the behavior observed for the samples prepared at 0.004 wt. % and 0.1 wt. %.

Figure 69:
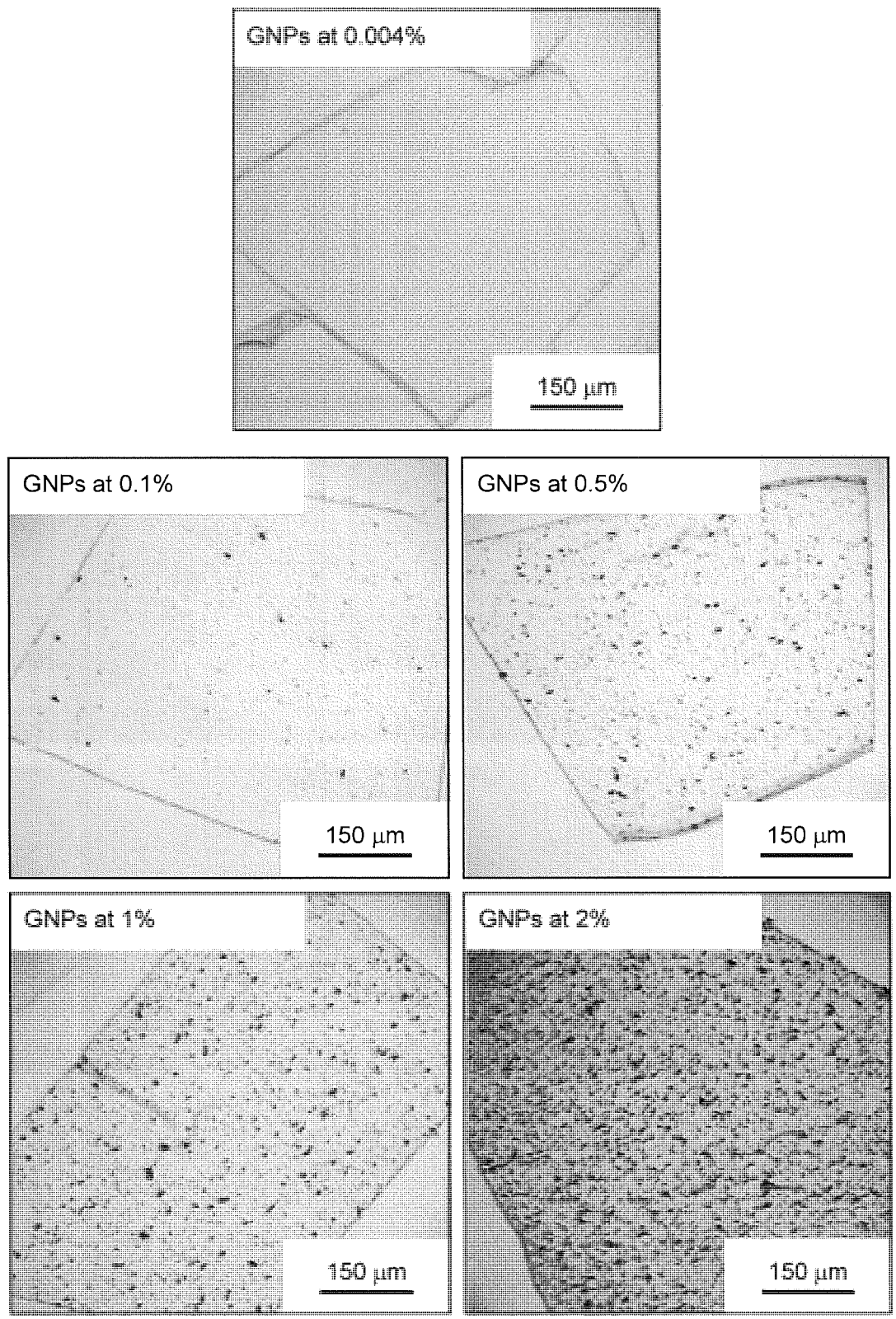
FIG. 69 illustrates confocal images collected from the PET nanocomposites prepared at varied concentrations of GNPs through melt compounding the in-situ polymerized pellets.

The nanocomposite samples with 1 μm thickness were also examined by a confocal microscope to understand the distribution of the GNPs inside the PET matrix. FIG. 69 represents the internal structures of the nanocomposites prepared at 0.004 wt. %, 0.1 wt. %, 0.5 wt. %, 1 wt. %, and 2 wt. % concentrations of GNPs. While the GNPs in the 0.004 wt. % sample were not captured during the imaging, the unexfoliated GNPs increased with an increase in the concentration of GNPs.

Figure 70:
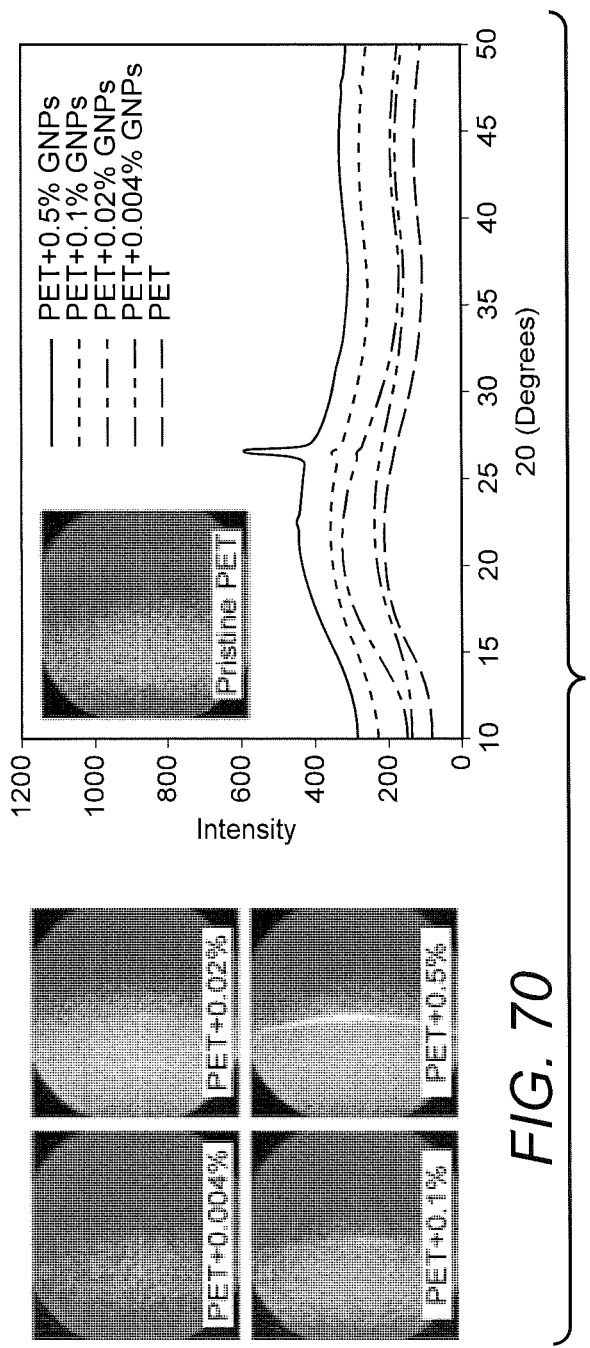
FIG. 70 illustrates comparisons of XRD 2D and 1D patterns of PET and nanocomposites prepared through melt compounding the in-situ polymerized pellets.

Diffraction patterns were collected from the PET and the PET nanocomposite tensile bars. FIG. 70 represents the 2D and 1D diffraction patterns obtained from the samples. As seen, both PET and nanocomposites exhibit a broad hump around 19°2θ. A clear ring, indicating the (002) plane (d=3.35 Å) corresponding to graphene at 26.54°2θ, was observed for the sample prepared at a concentration of 0.5 wt. %, indicative of the presence of platelets.

PEG-GNP Dispersions

With the intent of incorporating the GNPs into PET through dosing process of GNP dispersions, PEG-400 and PEG-600 were selected as the dispersion media. The following sections present the results obtained by characterizing the dispersions of GNP-15 in PEG-300 and PEG-600.

Figure 71:
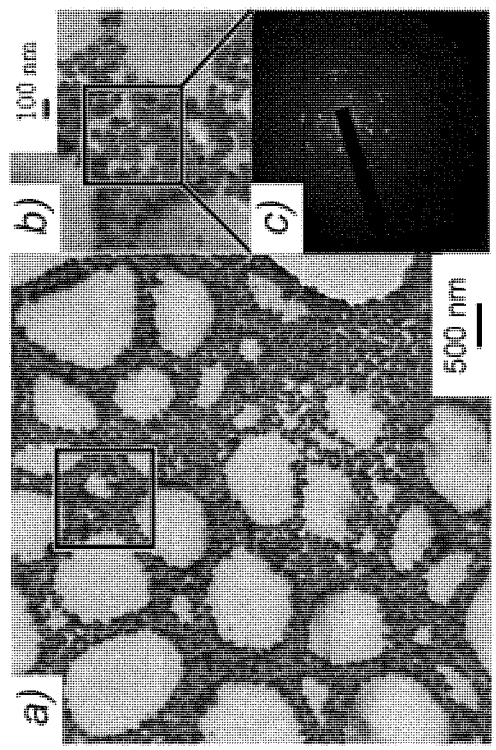
FIG. 71 illustrates a) and b) TEM micrograph of a grid coated with dispersed GNPs in PEG, and c) SAED is taken from the highlighted region.

FIG. 71 shows micrographs of a TEM grid coated with PEG-600 dispersion that was sonicated for 180 minutes and centrifuged at 260 RCF. The analysis of TEM micrographs, collected from EG dispersions sonicated for 180 minutes and centrifuged at 260 RCF, indicated the presence of monolayer graphene from edges (FIG. 55c). The dispersed GNPs in PEG are comprised of short stacks of multi-layer graphene sheets. The presence of multi-layer graphene sheets is confirmed by the SAED, shown in FIG. 71c. As shown, the geometry of the platelets seem to be significantly different than those dispersed in EG. The data here suggest that the higher viscosity of the dispersion medium can impact the exfoliation of the dispersed GNPs: the higher the viscosity of the dispersion medium, the higher the fraction of the fractured GNPs, which leads to a higher number of agglomerated GNPs.

GNP dispersions in PEG were examined for evaluation of concentration of dispersed GNPs similarly to the previous procedure for the EG dispersions. Table 24 summarizes the sample preparation for the filtration tests. An average value of 1451 mL/(mg·m) was obtained based on the data reported in Table 25.

TABLE 24

Sample preparation for filtration testing using PEG-300 as the dispersion medium.

| Initial Conc. (mg/mL) | Sonication Time (mm) | C-Force (RCF) | Sample Code |
|---|---|---|---|
| 0.25 | 40 | 460 | A |
|  | 60 | 260 | B |
|  | 60 | 2350 | C |
|  | 80 | 460 | D |
|  | 120 | 120 | E |
|  | 120 | 1860 | F |
| 5 | 30 | 260 | G |
|  | 90 | 260 | H |

TABLE 25

Absorption coefficient measurements in PEG-300.

| Sample Code | Membrane's Initial Weight (mg) | Membrane's Final Weight (mg) | Conc. (mg/mL) | A/L (m$^{-1}$) | Absorption Coefficient |
|---|---|---|---|---|---|
| A | 13.60 | 14.10 | 0.050 | 69 | 1380 |
| B | 13.97 | 14.50 | 0.053 | 99 | 1868 |
| C | 13.50 | 13.80 | 0.020 | 31 | 1550 |
| D | 13.40 | 14.10 | 0.070 | 102 | 1457 |
| E | 13.50 | 14.80 | 0.163 | 186 | 1145 |
| F | 13.60 | 13.90 | 0.038 | 61 | 1627 |
| G | 13.50 | 15.10 | 0.160 | 208 | 1300 |
| H | 13.50 | 17.00 | 0.233 | 299 | 1281 |
|  |  |  |  | Average Value | 1451 |
|  |  |  |  | Std. dev | 228 |

To study the effect of the viscosity of the dispersion medium on the concentration of the dispersed GNPs, PEG-300 was first selected to compare to EG. Concentrations of the sets of dispersions, after centrifugation, were calculated using the absorbance coefficients for EG and PEG-300 that were calculated through the filtration tests. The initial concentration was set at 0.25 mg/mL and the process parameters, (i.e. sonication times and centrifugal forces), were taken from the previous experiment to disperse GNP-15 in PEG-300. As shown in Table 26, using PEG resulted in higher values of the concentrations of dispersed GNPs. PEG resulted in higher values of the concentrations of dispersed GNPs.

TABLE 26

Comparison of GNP dispersions in EG and PEG-300 prepared at 0.25 mg/mL.

| Sonication Time | Concentration of Dispersions (mg/mL) | | | | | |
|---|---|---|---|---|---|---|
| | 260 (RCF) | | Percent Difference | 2350 (RCF) | | Percent difference |
| (min) | EG | PEG-300 | (%) | EG | PEG-300 | (%) |
| 30 | 0.011 | 0.057 | 419 | 0.002 | 0.014 | 600 |
| 60 | 0.021 | 0.068 | 224 | 0.004 | 0.021 | 425 |
| 90 | 0.030 | 0.092 | 207 | 0.004 | 0.026 | 550 |

Further, the GNP dispersions in PEG-300, prepared at higher initial concentrations, were examined to study the effects of the higher initial concentrations on the maximum achievable final concentration in the dispersion (Table 27). A quantitative analysis of the concentrations of the GNP dispersions in PEG-300 showed that increasing the initial concentration of the GNPs above 1 mg/mL would not affect the final concentration in the dispersion, suggesting a saturation limit.

TABLE 27

Effects of initial concentration of GNPs on the concentration of PEG-300 dispersions, calculated from absorbance.

| Sonication Times | Centrifugal Force | Final Concentration Obtained for Initial Concentrations (mg/mL) | | | | |
|---|---|---|---|---|---|---|
| (min) | (RCF) | 0.25 | 0.5 | 0.75 | 1 | 5 |
| 30 | 260 | 0.057 | 0.097 | 0.144 | 0.139 | 0.143 |
| | 2350 | 0.014 | 0.021 | 0.064 | 0.065 | 0.040 |
| 60 | 260 | 0.068 | 0.113 | 0.179 | 0.181 | 0.145 |
| | 2350 | 0.021 | 0.031 | 0.079 | 0.079 | 0.044 |
| 90 | 260 | 0.092 | 0.140 | 0.195 | 0.199 | 0.206 |
| | 2350 | 0.026 | 0.041 | 0.046 | 0.090 | 0.043 |

Using a similar experimental procedure as with PEG-300 dispersions, PEG-600 was used to study the effects of higher viscosity on the final concentration of the dispersed GNPs. Table 28 summarizes the concentration values and a comparison between the PEG dispersions with different viscosities.

TABLE 28

Comparison of GNP dispersions in PEG-300 and PEG-600 prepared at 0.25 mg/mL, calculated from absorbance, using the absorbance coefficient found for PEG-300 for all calculations.

| Sonication Time | Concentration of Dispersions (mg/mL) | | | | | |
|---|---|---|---|---|---|---|
| | 260 (RCF) | | Percent Difference (%) | 2350 (RCF) | | Percent Difference (%) |
| (min) | PEG-300 | PEG-600 | | PEG-300 | PEG-600 | |
| 30 | 0.057 | 0.072 | 26 | 0.014 | 0.028 | 100 |
| 60 | 0.068 | 0.085 | 25 | 0.021 | 0.035 | 67 |
| 90 | 0.092 | 0.112 | 22 | 0.026 | 0.051 | 96 |

As shown in Table 28, the PEG-600 dispersion medium results in higher values of the dispersed GNPs. To study the effects of increasing the initial concentration on the final concentration of the dispersed GNPs, a set of three samples prepared at different concentrations, but processed using the same sonication time and the centrifugal force of 90 minutes and 260 RCF, respectively, were examined for concentration measurements. The results herein showed that by increasing the concentration to 5 mg/mL, the concentration of the dispersed GNPs increases to 1.17 mg/mL. This trend is reported in Table 29.

TABLE 29

Effects of initial concentration of GNPs on the concentration of PEG-600 dispersions.

| Sonication Times | Centrifugal Force | Initial Concentration (mg/mL) | | |
|---|---|---|---|---|
| (min) | (RCF) | 0.25 | 1 | 5 |
| 90 | 260 | 0.112 | 0.500 | 1.170 |

Figure 72:
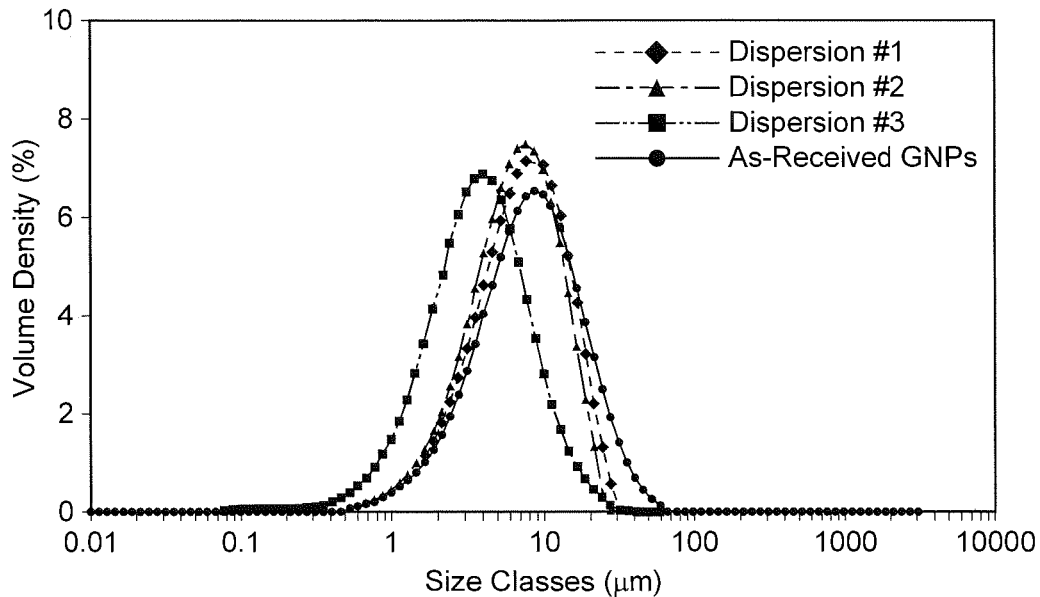
FIG. 72 is a graph illustrating volume-weighted particle size distributions of dispersed GNP-15 in PEG-300 dispersions #1, #2, and #3.

To study the effects of sonication and centrifugation and the viscosity of the dispersion media on the size of the dispersed GNPs, laser diffraction was performed. The volume-weighted particle size distributions collected from sample set I, PEG-300, are illustrated in FIG. 72. Table 30 summarizes the size distribution including the values for $D_x10$, $D_x50$, $D_x90$, and the mean value. The mean size of the as-received GNPs, 11.16 μm, shows a decreased trend after sonication in the dispersion medium. Increase in sonication time from 90 to 180 minutes has not significantly impacted the mean size of the GNPs. Centrifugation at 260 RCF, on the other hand, reduced the size by almost 40%, by pulling the larger particles out of suspension.

TABLE 30

Particle size measurements for as-received GNPs and PEG-300 dispersions 1, 2, and 3.

| Sample Set | Samples | $D_x10$ (μm) | $D_x50$ (μm) | $D_x90$ (μm) | Mean Value (μm) |
|---|---|---|---|---|---|
| I | As-Received GNPs | 2.89 | 8.71 | 22.58 | 11.16 |
| | Dispersion-1 | 2.75 | 7.75 | 17.22 | 9.00 |
| | Dispersion-2 | 2.59 | 7.02 | 15.18 | 8.06 |
| | Dispersion-3 | 1.38 | 3.96 | 10.01 | 5.07 |

Figure 73:
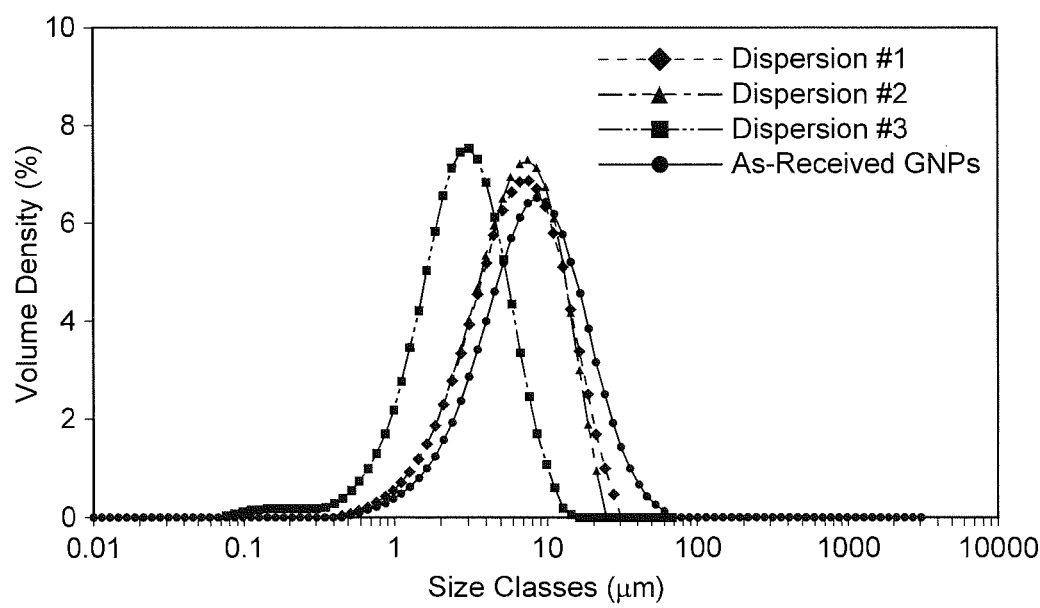
FIG. 73 is a graph illustrating volume-weighted particle size distributions of dispersed GNP-15 in PEG-600 dispersions #4, #5, and #6.

FIG. 73 and Table 31 represent the particle size measurements for the sample set II. A similar decreasing trend for the mean size of the as-received GNPs was observed for the dispersions-4, 5, and 6 with respect to sonication and centrifugation.

TABLE 31

Particle size measurements for as-received GNPs and PEG-600 dispersions 4, 5, and 6.

| Sample Set | Samples | $D_x10$ (μm) | $D_x50$ (μm) | $D_x90$ (μm) | Mean Value (μm) |
|---|---|---|---|---|---|
| II | As-Received GNPs | 2.89 | 8.71 | 22.58 | 11.16 |
|  | Dispersion-4 | 2.36 | 6.85 | 15.98 | 8.17 |
|  | Dispersion-5 | 2.35 | 6.68 | 14.46 | 7.65 |
|  | Dispersion-6 | 1.09 | 2.96 | 6.62 | 3.49 |

Figure 74:
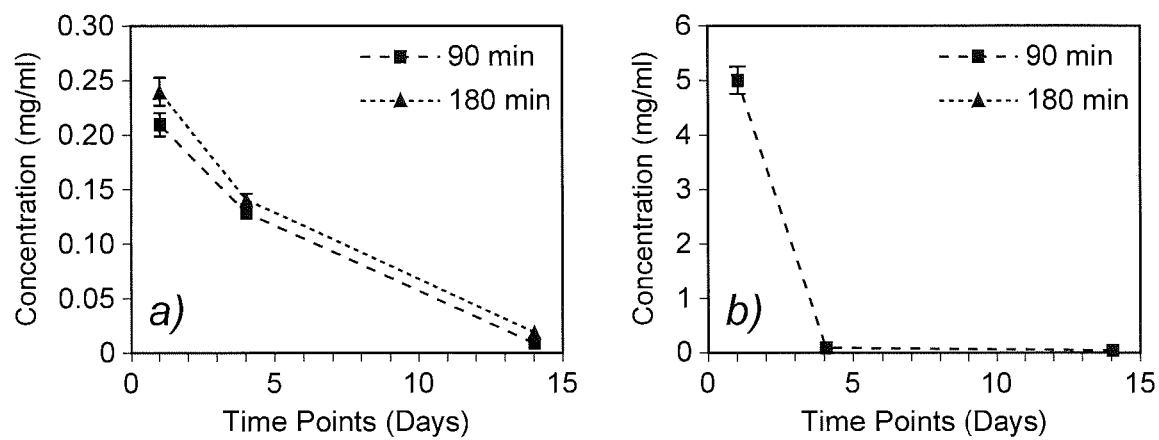
FIG. 74 illustrates an evaluation of the stability of the GNP dispersions in PEG-300 using filtration tests on dispersion samples prepared at a) 0.25 mg/mL and b) 5 mg/mL.
Figure 75:
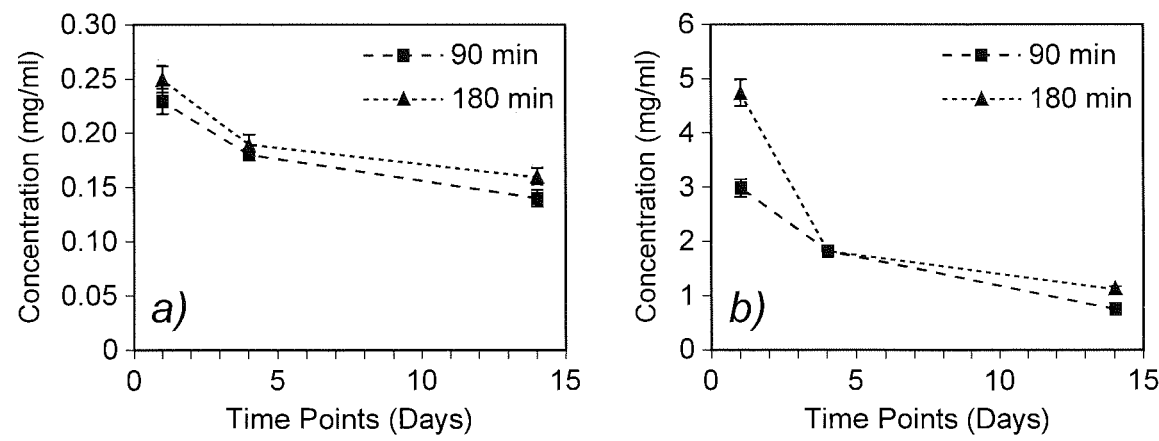
FIG. 75 illustrates an evaluation of the stability of the GNP dispersions in PEG-600 using filtration tests on dispersion samples prepared at a) 0.25 mg/mL and b) 5 mg/mL.

Similar to the EG dispersions, GNP dispersion in PEG-300 and PEG-600 were prepared and examined for stability. While the GNP dispersions in PEG-300, prepared at initial concentration of 5 mg/mL, did not change the stability of the dispersions, those prepared at initial concentration of 0.25 mg/mL showed a lower sedimentation rate compared to the dispersions in EG (FIG. 74). As shown in Table 32, the percent decrease in the concentration is smaller than EG dispersions, indicating a relatively better stability of the dispersion. Similar to the PEG-300 dispersions, GNP dispersion in PEG-600 were prepared and examined for stability. The GNP dispersions in PEG-600 showed a significantly lower sedimentation rate compared to the dispersions in EG and PEG-300 (FIG. 75). As shown in Table 33, the percent decrease in the concentration is significantly smaller than EG and PEG-300 dispersions, indicating a better stability of the dispersion.

TABLE 32

Calculation of the percent decrease in the concentration of the PEG-300 dispersions.

| Initial Concentration of Dispersions (mg/mL) | Days | Sonication Time (min) 90 | 180 | Initial Concentration of Dispersions (mg/mL) | Days | Sonication Time (min) 90 | 180 |
|---|---|---|---|---|---|---|---|
| 0.25 | 1 | 0% | 0% | 5 | 1 | 0% | 0% |
|  | 4 | 38% | −42% |  | 4 | −99% | −99% |
|  | 14 | −95% | −92% |  | 14 | −100% | −100% |

TABLE 33

Calculation of the percent decrease in the concentration of the PEG-600 dispersions.

| Initial Concentration of Dispersions (mg/mL) | Days | Sonication Time (min) 90 | 180 | Initial Concentration of Dispersions (mg/mL) | Days | Sonication Time (min) 90 | 180 |
|---|---|---|---|---|---|---|---|
| 0.25 | 1 | 0% | 0% | 5 | 1 | 0% | 0% |
|  | 4 | −22% | −24% |  | 4 | −38% | −61% |
|  | 14 | −39% | −36% |  | 14 | −74% | −76% |

Nanocomposites Prepared by Injection Molding

Figure 76:
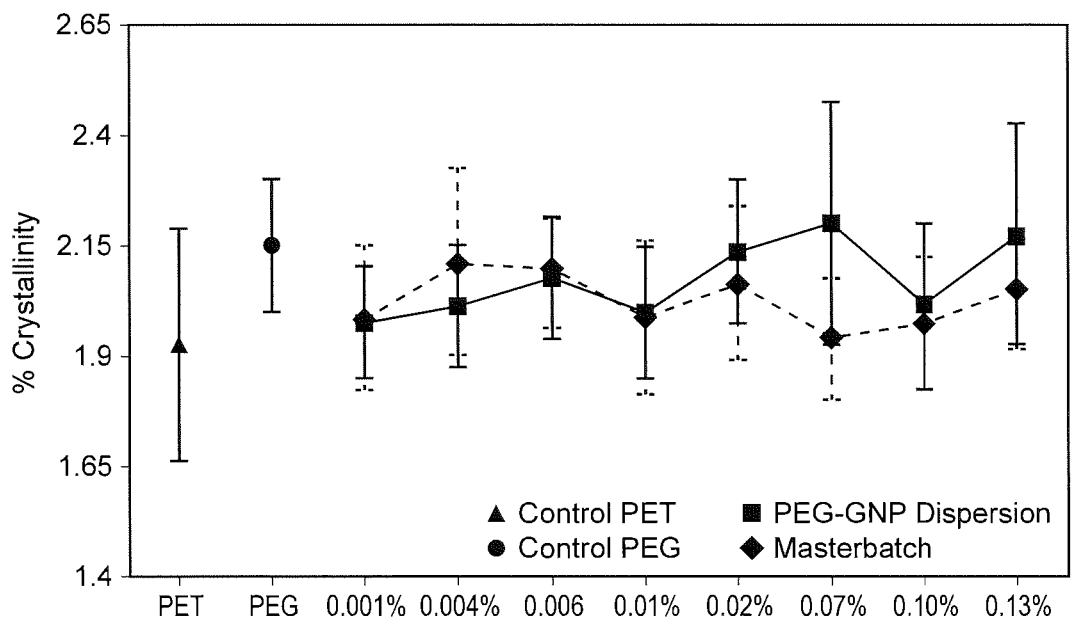
FIG. 76 illustrates measurements of elastic modulus of PET and PEG samples as well as PET nanocomposites prepared by PEG-GNP dispersions and masterbatch with respect to the concentration of the GNPs.
Figure 77:
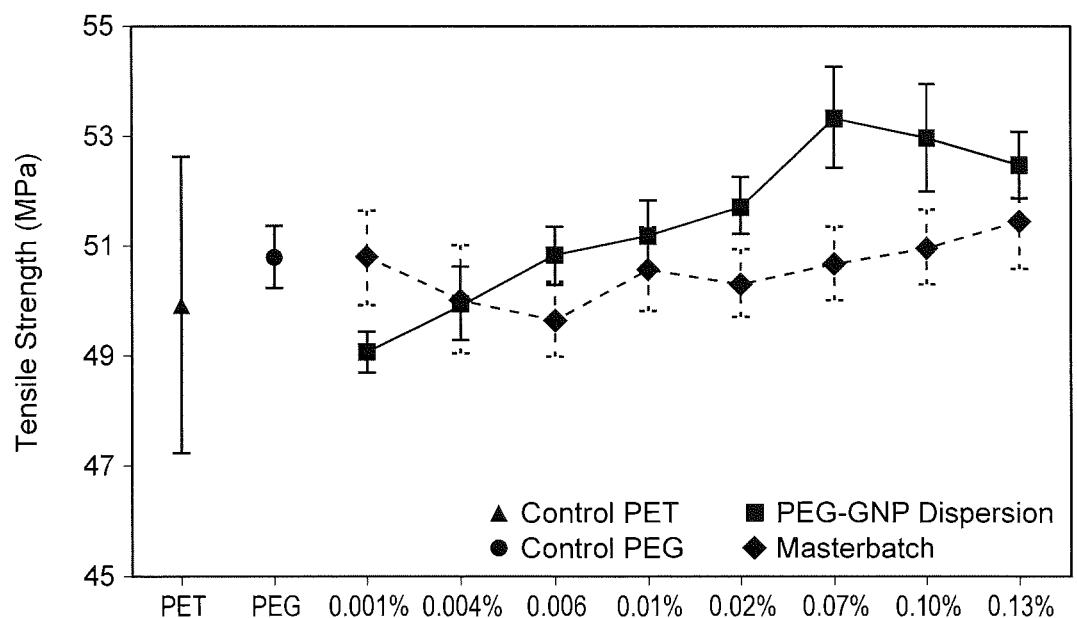
FIG. 77 illustrates measurements of tensile strength of PET and PEG samples as well as PET nanocomposites prepared by PEG-GNP dispersions and masterbatch with respect to the concentration of the GNPs.

The measurements of Elastic modulus and the tensile strength of PET and PET nanocomposites are shown in FIG. 76. PET and PEG-dosed PET (labeled as PEG) were used as baselines to evaluate the effects of addition of GNP dispersions to PET. The modulus of the nanocomposites increased with increase in the GNPs concentration. A maximum of 10% increase in the modulus of PET and 5% increase in the tensile strength of PET were achieved by an addition of PEG-GNP dispersions at 0.13 wt. %.

Figure 78:
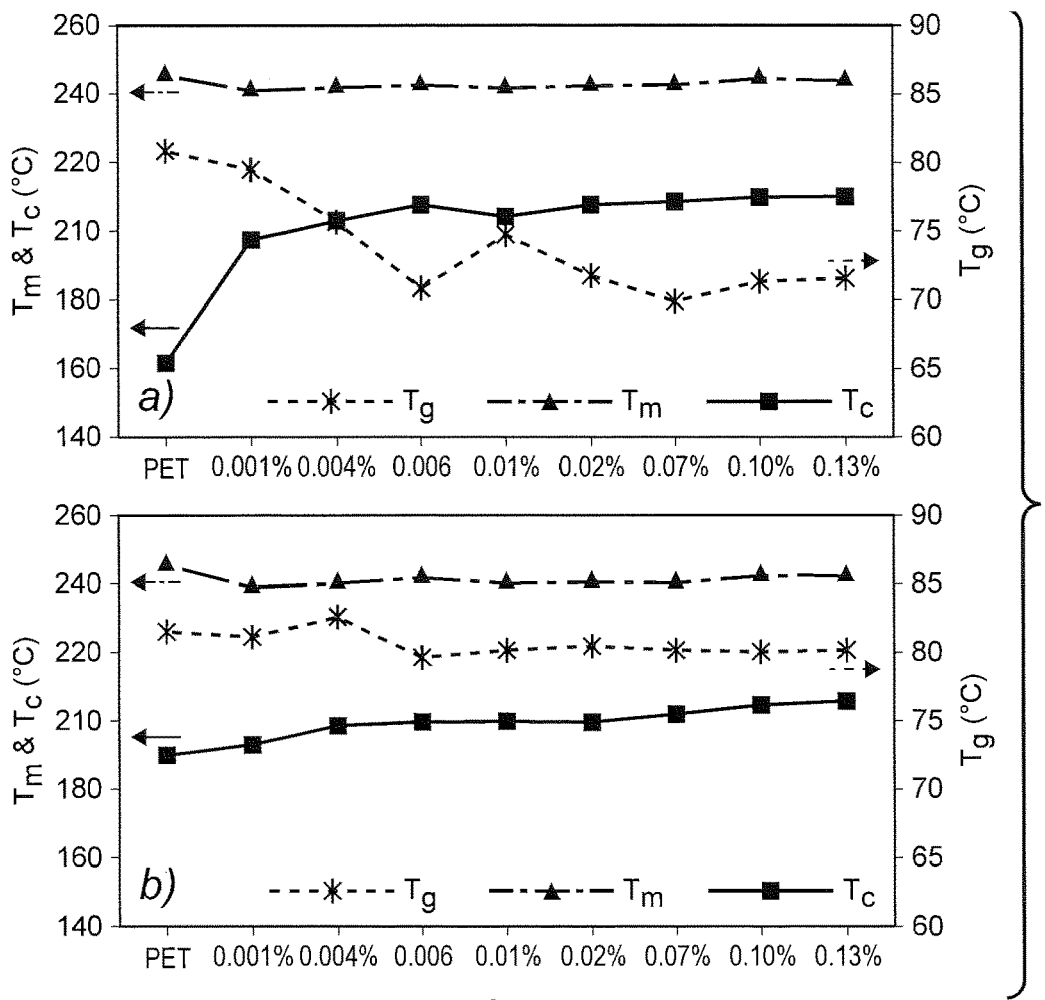
FIG. 78 illustrates thermal behavior of PET nanocomposites prepared by a) PEG-GNP dispersions and b) masterbatch pellets, wherein an error of temperature measurements is 0.8° C.

PET and the PET nanocomposites were evaluated for their crystallinity and thermal properties with respect to the GNPs concentration. FIG. 78 represents the thermal behavior of the nanocomposites prepared by PEG-GNP dispersion and masterbatch approaches. While the nanocomposites using masterbatch pellets didn't show a significant trend in the thermal properties, an increasing trend in the $T_c$ was observed for nanocomposites prepared by PEG-GNP dispersions. This indicates the presence of more crystals in the matrix due to early nucleation. The glass transition temperature, however, decreased by increasing the GNPs concentration, suggesting the presence of agglomerated GNPs inside the PET matrix.

Figure 79:
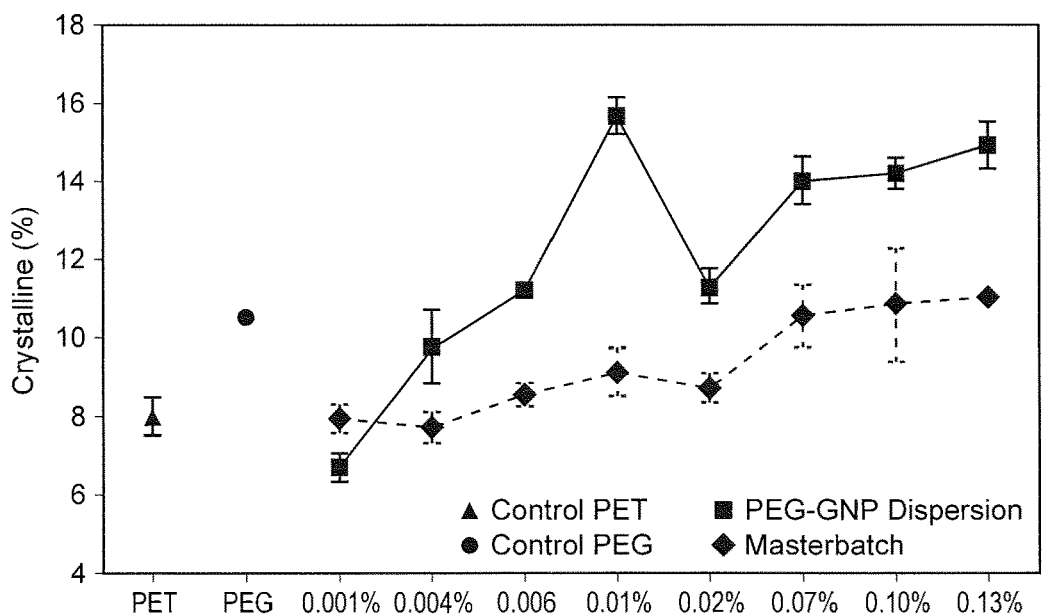
FIG. 79 illustrates crystallinity measurements of PET, PEG, and PET nanocomposites prepared by PEG-GNP dispersions and masterbatch pellets.

FIG. 79 represents the percent crystallinity of the PET, PEG, and PET nanocomposite samples. As shown, a similar increasing trend was observed for both types of nanocomposites. However, the PEG-GNP dispersions increased the crystallinity of PET to a much greater degree.

Figure 80:
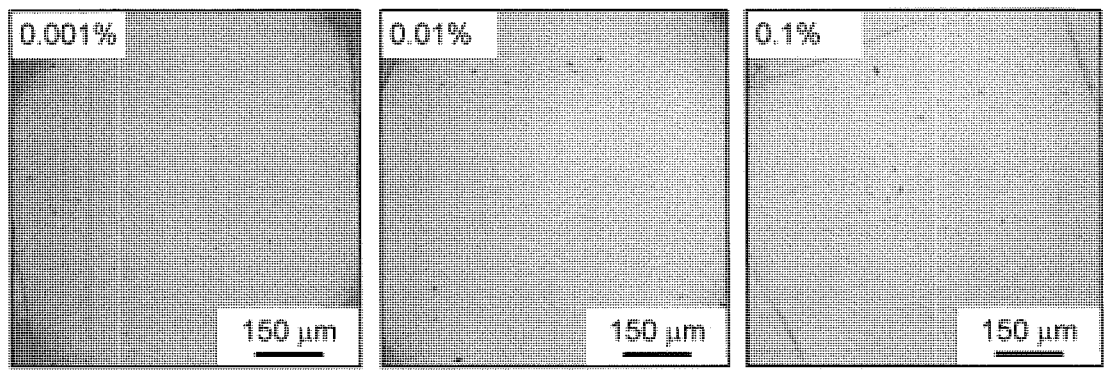
FIG. 80 illustrates confocal images collected from the PET nanocomposites prepared using PEG-GNP dispersions at varied concentrations of GNPs.

In order to evaluate the distribution of the GNPs in the PET matrix, confocal microscopy images were collected from the nanocomposite samples with 1 μm thickness. FIG. 80 represents the images taken from the internal structure of the nanocomposites prepared by PEG-GNP dispersions at 0.001 wt. %, 0.01 wt. %, and 0.1 wt. % concentrations of GNPs. The confocal images were binarized using binary filters to observe the GNP distribution. Not represented on this figure are the confocal images from the samples that were prepared by masterbatch pellets, as they were determined to be too soft to section at room temperature. Further investigation is required to section the samples in cryogenic conditions (cryoultramicrotomy). Although GNPs were captured by the confocal microscopy, distributed in the PET matrix, the micrographs were not in favor of GNPs' size distribution analysis. Even though the images reflect the low concentrations of the GNPs being dosed into PET during the process, data from mechanical testing suggests that the GNPs have had a positive impact on the mechanical properties of PET.

Figure 81:
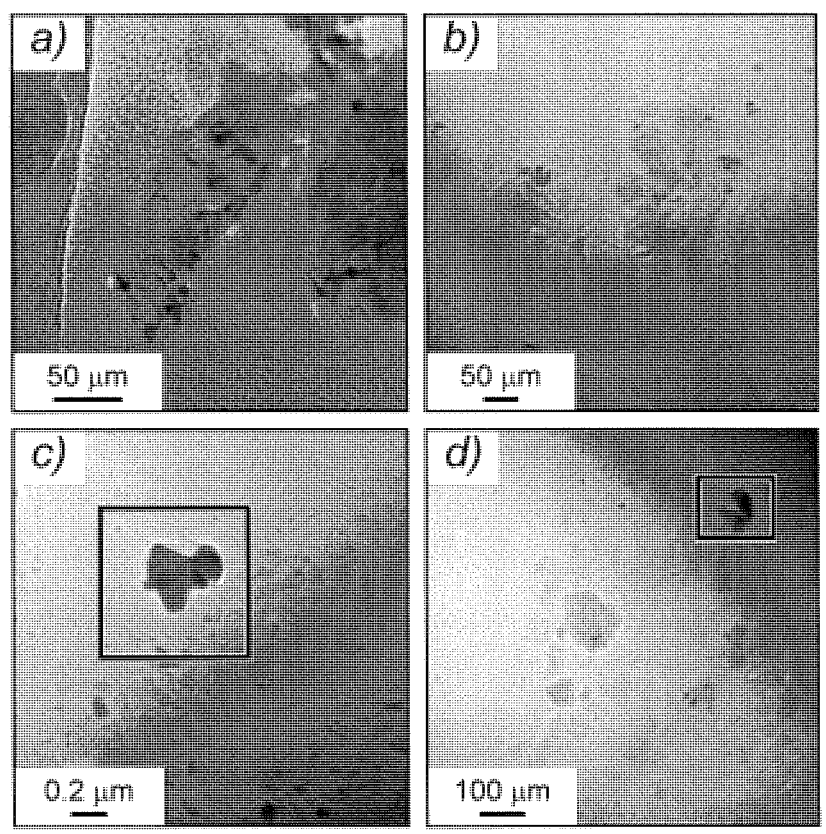
FIG. 81 illustrates HR-TEM micrographs collected from nanocomposites prepared by a) and b) PEG-GNP dispersion dosing, and c) and d) masterbatch methods at 0.02 wt. %.

To understand better the effects of ultrasonic exfoliation on the level of the distribution of GNPs, HR-TEM were utilized on samples prepared at 0.2 wt. % concentration of GNPs. As shown in FIG. 81, the GNPs in the nanocomposites prepared by masterbatch seem to be agglomerated, forming clusters in the PET matrix. This suggests that a more uniform distribution of GNPs in PET were achieved through PEG-GNP dispersion dosing. The greater improvements in mechanical and thermal properties obtained during dosing process also confirm this observation.

The PET nanocomposites were analyzed for their color using the CIEL*a*b* scale color analysis method, shown in FIG. 30a. As can be seen, the nanocomposites prepared by the PEG-GNP dispersions showed values of luminosity higher than those prepared by masterbatch pellets. This indicates that the samples are lighter in color even with higher concentration of GNPs.

Based on data collected as discussed herein, it was found that the PET-GNP nanocomposites, fabricated through PEG-GNP dispersion dosing, outperform those that were prepared using masterbatch. To further understand the effects of the dispersion dosing method, the nanocomposite tensile preforms were produced by dosing GNP dispersions, prepared by varied process parameters. Individual studies were conducted on effects of centrifugation, concentration of dispersions, and different sonication times and amplitudes, employed during the dispersion preparation, on the final properties of PET-GNP nanocomposites.

FIG. 83 represents measurements of elastic modulus and tensile strength of PET and PEG-dosed PET (labeled as PEG) as baselines, and PET nanocomposites prepared in centrifugation study. Initially, GNP dispersions were prepared at a concentration of 0.001 wt. %. Centrifugation at 260 RCF and 235 RCF were employed, resulting in final concentration of GNPs in PET estimated at 0.0009 wt. % and 0.00045 wt. % (Table 15). As shown, there seems to be an increasing trend in modulus of both PEG samples compared to pristine PET. While there is no significant improvements in modulus of the PEG samples after dosing dispersions before and after centrifugation, the tensile strength of PEG-600 samples, however, increased by 11% after dosing GNP dispersion at 0.001 wt. %.

Figure 84:
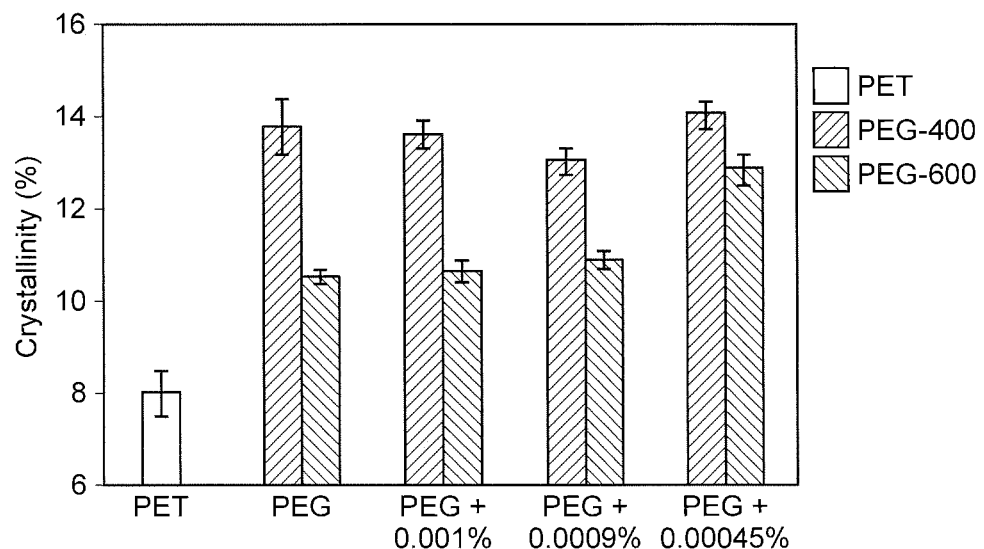
FIG. 84 illustrates crystallinity measurements of PET, PEG, and PET nanocomposites prepared by PEG-GNP dispersions dosing method through centrifugation study.

FIG. 84 represents crystallinity measurements of the PET, PEG, and PET nanocomposites prepared in centrifugation study (Table 15). As shown, the addition of PEG-400 dispersions lead to a higher improvement in crystallinity of PET matrix compared to PEG-600 dispersions. It was found that the addition of PEG-400 and PEG-600 improved the crystallinity of the PET matrix by 72% and 32%, respectively. A maximum of 22% improvement in crystallinity was observed for the sample prepared through the addition of GNP dispersions in PEG-600 at 2350 RCF.

Figure 85:
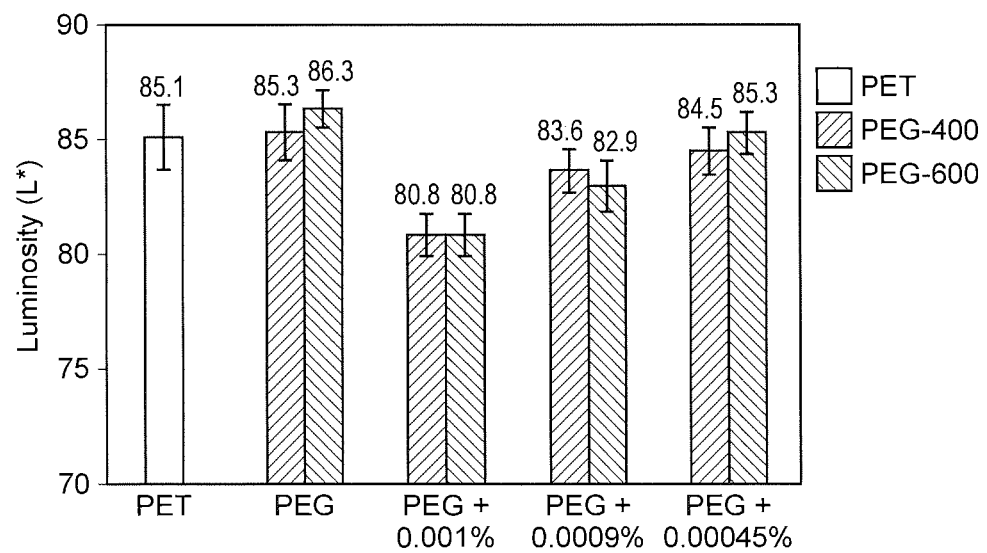
FIG. 85 illustrates luminosity measurements of PET, PEG, and PET nanocomposites prepared by PEG-GNP dispersions dosing method through centrifugation study.

FIG. 85 represents the luminosity measurements of PET, PEG, and PET nanocomposites prepared by PEG-GNP dispersions dosing method. While the addition of PEG did not affect the luminosity of PET samples, increasing the centrifugation speed of the PEG-GNP dispersions increased the luminosity, making them lighter in color. Based on the previous sections, it was found that increasing the centrifugation force from 260 RCF to 2350 RCF had a positive impact on mechanical and thermal properties of the PEG samples. Although the dispersions contained a significantly low concentration of GNPs, the data showed improvements in the tensile strength (FIG. 83) and crystallinity (FIG. 84) of the PEG samples.

Figure 86:
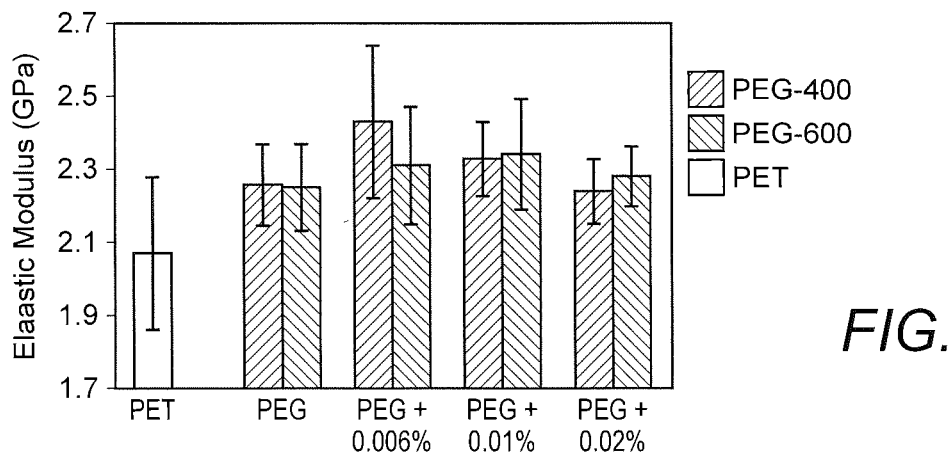
FIG. 86 illustrates measurements of the elastic modulus and tensile strength of PET, PEG, and PET nanocomposites prepared by PEG-GNP dispersions dosing method through concentration study.

Measurements of elastic modulus and tensile strength of PET, PEG, and PET nanocomposites prepared in concentration study (Table 16) are presented in FIG. 86. As shown, increasing the concentration of the GNPs in PEG medium can be detrimental to the mechanical properties of the matrix. This could be attributed to the formation of GNP agglomerates, as shown in FIG. 71. The data showed dispersion of PEG-400 and PEG-600 at 0.006 wt. % GNP concentration improved the modulus of PEG samples at 8% and 3%, respectively.

Figure 87:
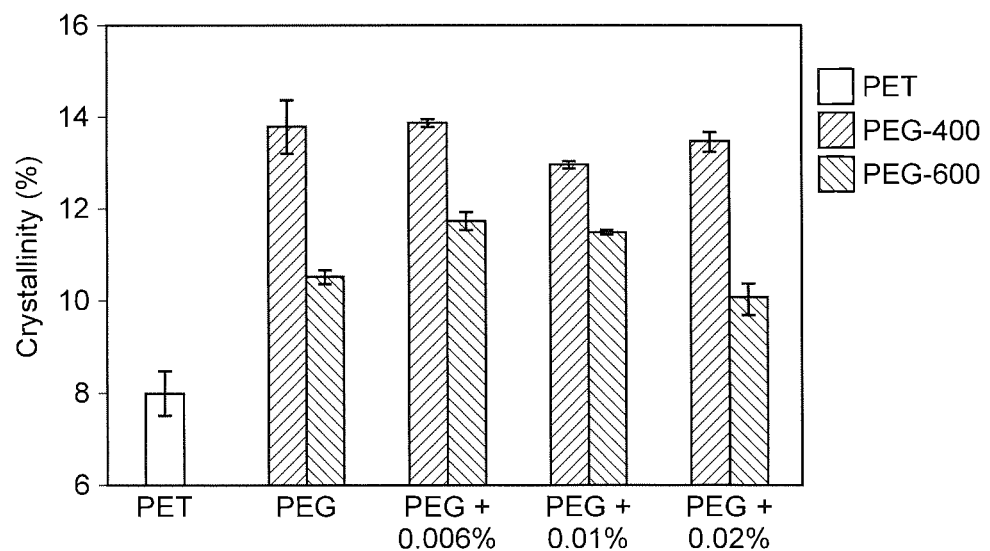
FIG. 87 illustrates crystallinity measurements of PET, PEG, and PET nanocomposites prepared by PEG-GNP dispersions dosing method through concentration study.

Crystallinity of PET, PEG, and PET nanocomposites prepared by the PEG-GNP dispersions dosing method was evaluated. Results are presented in FIG. 87. While addition of PEG-400 dispersions at concentrations ranging from 0.006 wt. % to 0.02 wt. % did not impact the crystallinity of PEG-400 samples, the PEG-600 dispersion at 0.006 wt. % concentration did increase the crystallinity by 11%.

FIG. 88 represents luminosity measurements of PEG and the nanocomposites prepared by PEG-GNP dispersions dosing. As shown, increasing the GNP concentration to 0.02 wt. %, affects the luminosity of the samples, making them much darker compared to the control sample.

With an objective of understanding the effects of sonication energy on the properties of the nanocomposites, two different amplitude settings were used to prepare the GNP dispersions in PEG-400. Using a 19 mm probe, the $P_1$ value of 5 Watts and $P_2$ values of 70 Watts and 140 Watts were recorded for the amplitude of 50% and 100%, respectively. The energy densities was estimated using the Eqs. 1 and 2, disclosed hereinabove. Table 34 summarizes the energy densities calculated for different sonication times.

TABLE 34

Calculation of energy density for PEG dispersions prepared at 50% and 100% amplitudes.

| Sonication Time (minutes) | 50% Amplitude | | 100% Amplitude | |
| --- | --- | --- | --- | --- |
| | Energy Density (kJ/cm$^2$) | Energy Density (eV/cm$^2$) | Energy Density (kJ/cm$^2$) | Energy Density (eV/cm$^2$) |
| 30 | 41.4 | 2.58E+23 | 86.4 | 5.39E+23 |
| 60 | 82.8 | 5.16E+23 | 172.8 | 10.78E+23 |
| 90 | 124.2 | 7.75E+23 | 259.2 | 16.17E+23 |
| 120 | 165.6 | 10.39E+23 | 345.6 | 21.57E+23 |
| 180 | 248.4 | 15.50E+23 | 518.4 | 32.35E+23 |

FIG. 89 represents the measurements of elastic modulus and tensile strength of samples prepared by pristine PEG (with zero sonication time) and PET nanocomposites prepared in sonication energy study (Table 17). The results shown in FIG. 89, reflect an inconclusive effect of sonication energy on the elastic modulus of samples. However, we see a 5% increase in the tensile strength of PET nanocomposites when the GNP dispersion, prepared at 180 minutes and 50% amplitude, was used. The energy densities of these data points are summarized in Table 34. The data here suggest that approximately the same amount of energy delivered over twice the duration (248.4 kJ/cm$^2$ over 180 minutes versus 259.2 kJ/cm$^2$ over 90 minutes) is more effective to improve the tensile strength of PET nanocomposites. Additionally, the delivered energy at 180 minutes and 100% amplitude (518.4 kJ/cm$^2$), results in no significant improvement in tensile strength. This suggests a certain energy threshold, used to produce the GNP dispersion, beyond which the dispersion does not improve the PET properties. Further investigation is needed to establish a relationship between other energy deliveries (kJ/cm$^2$ per min) and the properties of the PET nanocomposites.

Figure 90:
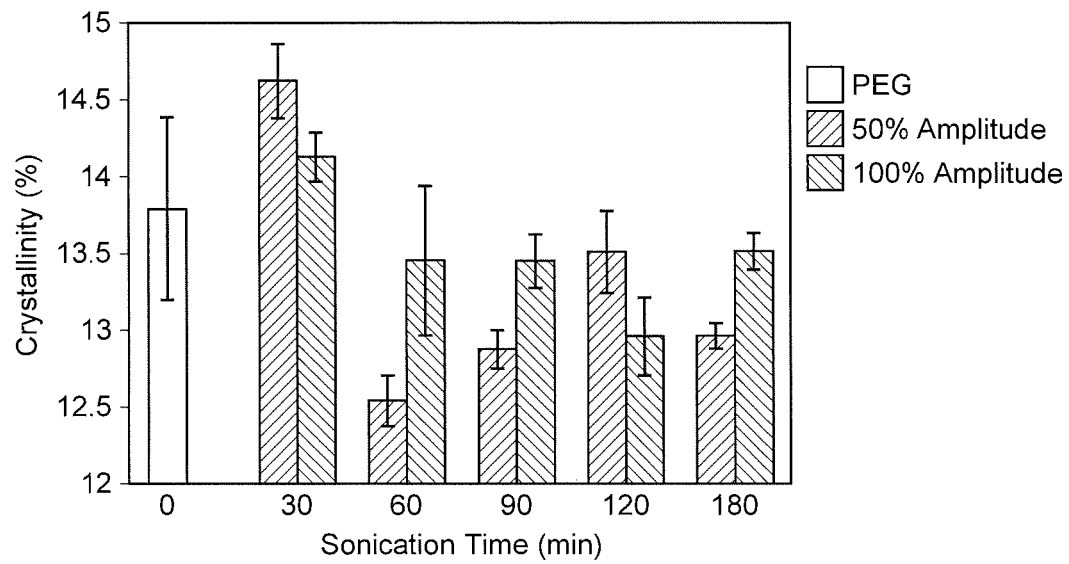
FIG. 90 illustrates crystallinity measurements of PEG and the PET nanocomposites prepared by PEG-GNP dispersions dosing through energy study.

FIG. 90 summarizes the crystallinity measurements of PEG and the PET nanocomposites prepared by PEG-GNP dispersions dosing. With an exception of 30 minutes sonication time, it was found that the crystallinity of the nanocomposites are lower than that of PEG samples.

Figure 91:
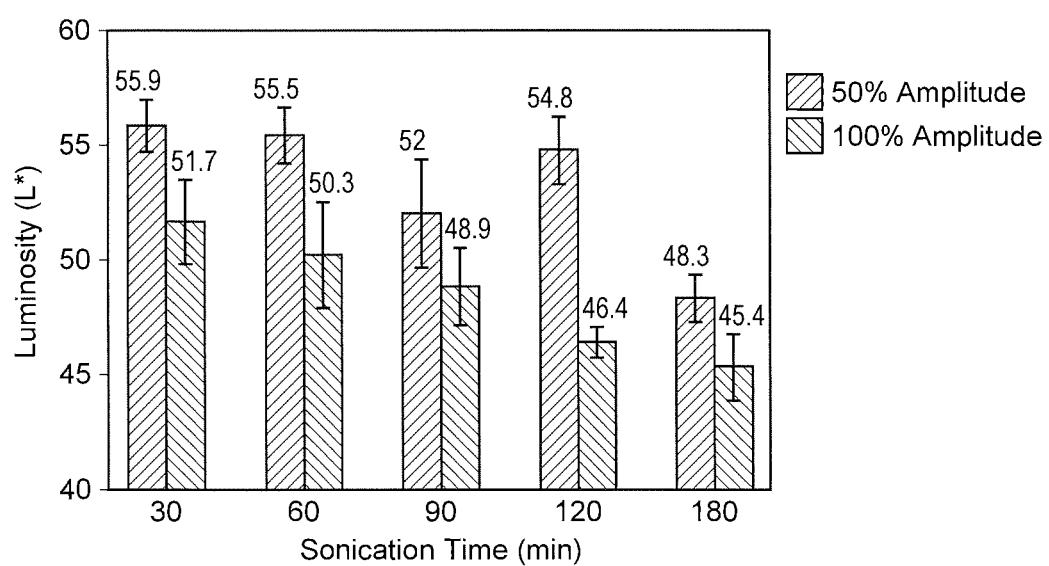
FIG. 91 illustrates luminosity measurements of PET nanocomposites prepared by PEG-GNP dispersions dosing method through energy study.

The luminosity measurements of PET nanocomposites prepared by PEG-GNP dispersions are shown in FIG. 91. As shown, the higher amplitude of the sonication leads to a lower value of luminosity, which makes the samples to be darker. This behavior could be attributed to the presence of highly-agglomerated GNPs, formed due to a high energy density caused by sonication. Additionally, it was found that an increase to sonication time, decreased the luminosity of the nanocomposites. This suggests that higher GNPs, exposed to higher sonication times, fracture and form a distribution of agglomerated GNPs, shown in FIG. 71.

Qualitative Analysis of GNP Dispersions

Ultrasonic exfoliation is an effective method to exfoliate GNPs and to create few- to monolayer graphene in a dispersion medium. This conclusion is supported in two ways. First, it was observed, from TEM, that increasing the sonication time further exfoliates the as-received GNP and separates them from each other. This is reasonably attributed to exfoliation of the GNPs due to the released energy during sonication, and is independent of centrifugation. As shown in FIG. 55, TEM analysis confirmed the presence of large graphene sheets for the as-received GNPs and monolayer graphene after sonication for 90 and 180 minutes sonication and centrifugation at 260 and 2350 RCF. This suggests that there is an optimal energy input that needs to be identified for maximum exfoliation with minimal change to the GNPs. It is important to state that the pre-existing defects of the GNPs also play an important role in GNP exfoliation. The energy input in our research is below the energy utilized by the manufacturer (150 to 250 Watts) to create these GNPs from a large graphitic material. Therefore, it is unlikely to conclude that we are significantly altering the size of the GNPs. During the binary analysis of the TEM micrographs, it was found that the observed size of the few-layer GNPs decrease with an increase in sonication time. Given the difficulty of the method used to collect the data presented in FIGS. 58 and 59, the confidence is not high enough to draw a clear conclusion about the optimal time required to exfoliate the GNPs without fracturing them at 50% amplitude. Second, the data from Raman spectroscopy indicates that the number of GNP layers is decreasing with the sonication and centrifugation process parameters used to produce the dispersion samples. The 2D bands presented herein are very similar to the spectra published by Ferrari et al. and Yoon et al. for graphene with 5 to 10 layers (FIG. 61). To rule out confounds from the regular TEM sample preparation process, Cryo-TEM was performed on a frozen dispersion to look at individual GNPs. While finding an isolated few-layer graphene was challenging, the results obtained through Cryo-TEM confirmed the results obtained by regular TEM testing. Similar to the TEM micrographs, shown in FIG. 56, the Cryo-TEM micrographs, shown in FIG. 57, showed that GNPs are often folded.

Based on the concentration data collected for EG dispersions, samples centrifuged at 2350 RCF showed almost 80% loss in the quantity of the dispersed GNPs compared to 260 RCF. Increasing the centrifugal force better separates the larger GNPs, which were sonicated but not as completely exfoliated, from the as-received powder, increasing the relative frequency of monolayer graphene.

A dispersion of GNPs with a relatively higher concentration can be achieved at higher sonication times beyond 30 minutes at both 260 and 2350 RCF (Table 19 and Table 20). Even though the concentration of the dispersed GNPs significantly drops from 260 to 2350 RCF, increasing the G-Force better separates the thicker GNPs from thinner ones. The apparent plateau in concentration after 30 minutes of sonication may reflect a saturation level of GNPs in EG. It is important to note how other measurements indicate that an increase in sonication time decreases the average platelet size, indicating that longer-sonicated samples likely have a higher number of platelets per unit volume than the shorter-sonicated samples. This also suggests that sonication may be fracturing the GNPs into smaller platelets. Further investigation is needed to understand whether or not this behavior affects the final nanocomposites. For the GNP dispersions in EG, the concentrations that can be achieved by probe sonication are in the same range as with bath sonication. This appears to be an advantage of using probe sonication: achieving approximately the same quantity of dispersed GNPs with a significantly shorter amount of time.

To estimate the energy required to exfoliate the GNP-150 in an EG dispersion during sonication process with a 19 mm probe at 50% amplitude, the energy density was calculated for different process conditions (i.e. sonication time and G-Force). Using a 19 mm probe, the $P_i$ value of 5 Watts and P2 value of 60 Watts were recorded for amplitude of 50%. Based on Eqs. 1 and 2, the power density and the energy density values were calculated. Using the average area of the dispersed GNPs, reported in Table 18, and the energy density values, the energy required to exfoliate a bilayer GNP was calculated for the corresponding sonication time and G-Force and reported as exfoliation energy. The exfoliation energy values were then compared to $8 \times 10^{11}$ eV/cm$^2$, the energy with which graphene sheets are bound, and the difference was reported as excess energy. Table 35 summarizes the comparison between the energy density, exfoliation energy, and the excess energy during sonication. As seen, this energy at each process condition is higher than what it is required to break a bilayer graphene sheet, supporting that exfoliation of GNPs occurred during the sonication process.

TABLE 35

Energy density, exfoliation density, and excess energy during sonication process.

| Sonication Process | | Centrifugation at 260 RCF | | Centrifugation at 2350 RCF | |
| --- | --- | --- | --- | --- | --- |
| Time (minutes) | Energy Density (eV/cm$^2$) | Exfoliation Energy (eV) | Excess Energy (eV) | Exfoliation Energy (eV) | Excess Energy (eV) |
| 30 | 2.1E+23 | 3.28E+15 | 3.27E+15 | 1.37E+15 | 1.36E+15 |
| 60 | 4.2E+23 | 4.62E+15 | 4.61E+15 | 2.69E+15 | 2.68E+15 |
| 90 | 6.4E+23 | 7.04E+15 | 7.03E+15 | 4.10E+15 | 4.09E+15 |
| 120 | 8.5E+23 | 8.59E+15 | 8.58E+15 | 4.85E+15 | 4.84E+15 |
| 180 | 12.8E+23 | 8.58E+15 | 8.57E+15 | 5.89E+15 | 5.88E+15 |

The stability analysis showed that the GNP dispersions in PEG-600 has a significantly lower sedimentation rate compared to the dispersions in EG and PEG-300. Even though increasing the starting concentrations of the dispersions in PEG-600 increases the sedimentation rate, the percent decrease in the concentration is smaller than EG and PEG-300 dispersions. This indicates that part of the GNPs remain dispersed over a period of two weeks (Table 33). Our preliminary studies for GNP dispersions in EG indicated that sedimentation happens over a period of four days. Due to the higher viscosity of PEG, it appears that the movement of the particles are significantly reduced, leading to a lower sedimentation rate. Our primary data showed that the maximum achievable concentration in GNP dispersions is directly related to the viscosity of the medium. In addition, higher viscosity is correlated with greater stability.

Performance Evaluation of PET-GNP Nanocomposites

Melt compounding is a promising method for the fabrication of nanocomposites due to low production cost. However, it has limitations in controlling the distribution of GNPs in PET, since flow of the GNPs is hindered by the viscosity of the molten PET. Based on the data collected from tensile bars, as described hereinabove, it was found that lower surface area GNPs leads to a greater improvement in elastic modulus of PET, suggesting that they provide a larger interface for more efficient interaction (i.e. more free edges per unit volume) with the polymer matrix. Moreover, it was found that mixing GNPs with PET powders lead to a more uniform distribution of GNPs in the matrix compared to the mixture with PET pellets, as described herein. This is attributed to a better interaction between the GNPs and PET powders, due to an increase in PET surface-area-to-volume ratio compared to PET pellets. The data here suggest that increasing the compounding time between the GNPs and PET pellets, could lead to better mixing of graphene in the melt. However, the longer mixing time results in increased PET thermal degradation. Future investigation is needed to explore alternative methods to improve the level of the distribution of dispersed GNPs in PET. One such future direction is further reduction in the PET powder size.

Figure 92:
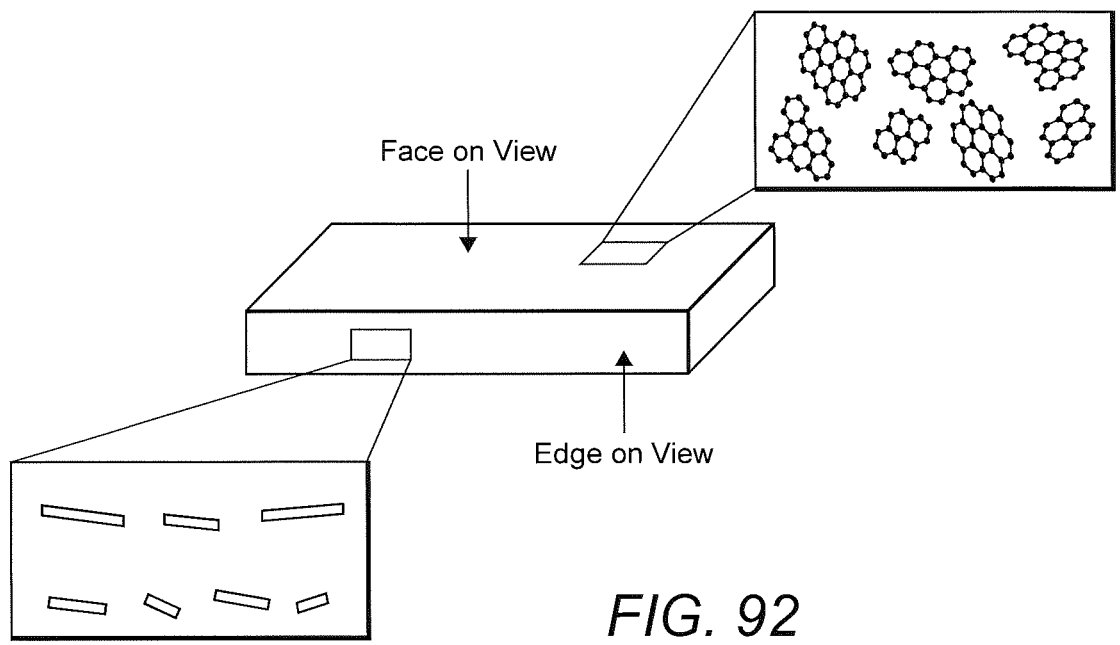
FIG. 92 illustrates sketch of patterns obtained from PET nanocomposites with random orientation of GNPs, for face-on view and preferred orientation for edge-on view.

Nawani et al. determined the orientation of a nanofiller in polymer nanocomposite films using an X-ray scattering method. According to them, for a system with some orientation the distribution of the nanofiller can be identified by a radial and an angular component, similar to what we have observed for the edge on view direction. FIG. 92 summarizes the orientations of the GNPs dispersed in PET in two directions. The GNPs exhibited preferred orientation in the edge on view direction, along the thickness of the tensile bar, and a random orientation distribution in the face on view direction, along the axial direction of the tensile bar.

Figure 93:
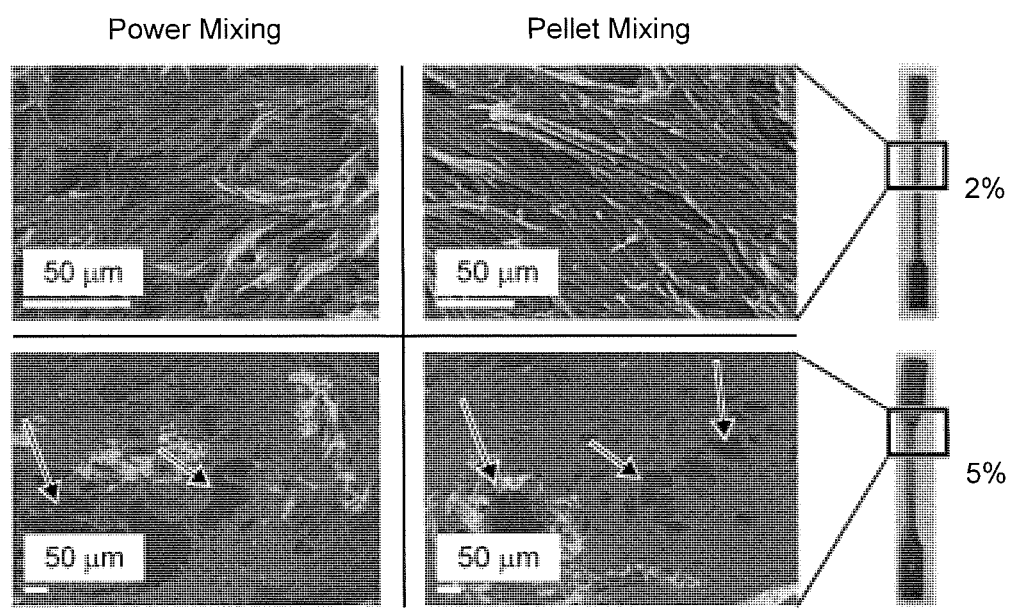
FIG. 93 illustrates SEM micrographs collected from stretch sections of PET nanocomposites prepared at 2 wt. % and 5 wt. %, wherein arrows indicate a presence of microvoids at higher concentration of GNPs.
Figure 94:
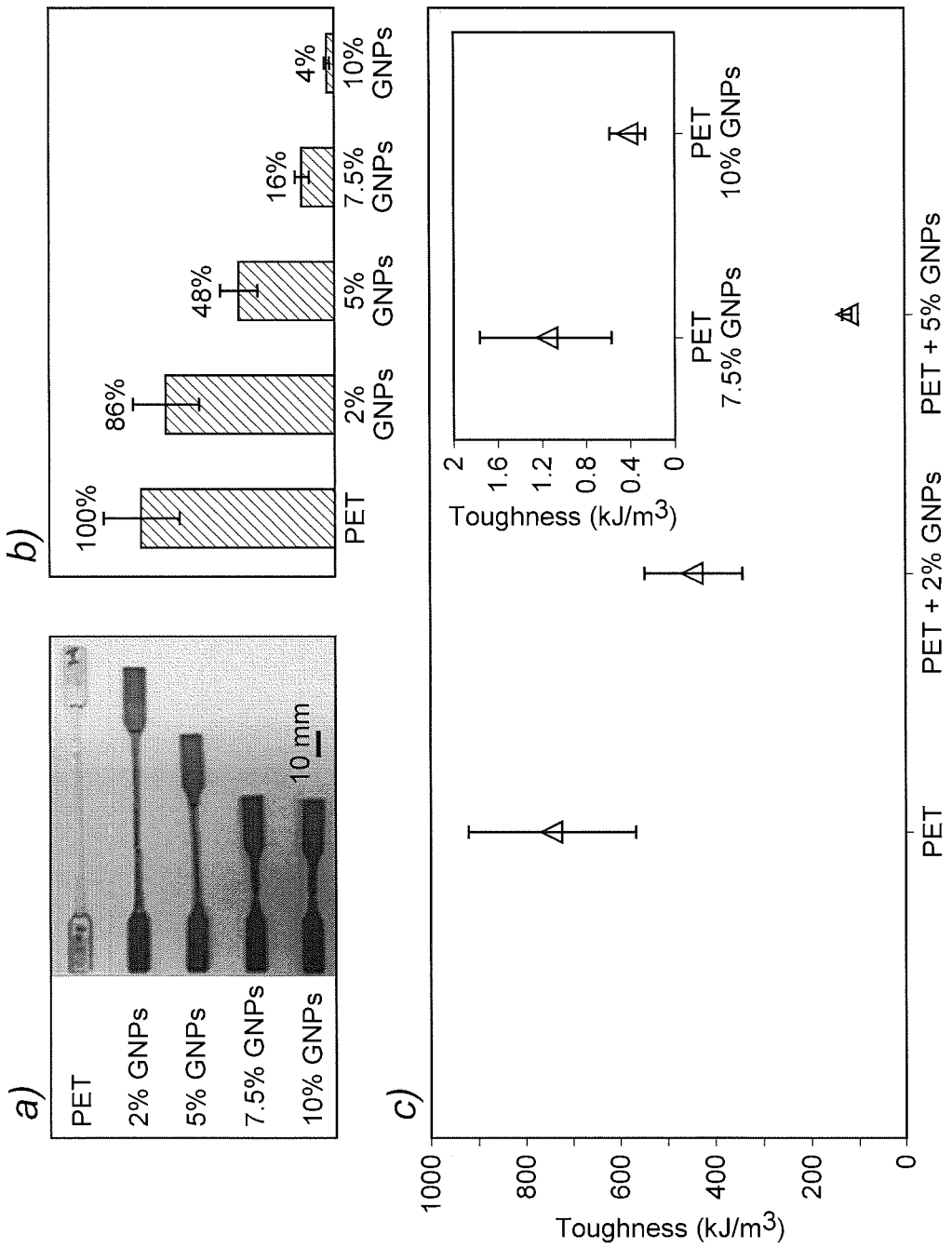
FIG. 94 illustrates a) Mechanical testing of PET and PET nanocomposites, b) percent elongation of the PET nanocomposites, assuming that the elongation of the pristine PET is 100%, and c) measurements of toughness of PET and PET nanocomposites prepared through powder mixing method.

SEM micrographs, shown in FIG. 93, were collected from the stretch sections of the nanocomposites prepared at 2 wt. % and 5 wt. % through powder and pellet mixing methods. Although increasing GNP concentration improves the stiffness of the PET matrix, a higher concentration of GNPs leads to increased formation of microvoids during processing. Further investigation is required to explore alternative processing parameters (e.g. higher temperature processing) to remove the microvoids. In earlier studies, this behavior was observed for PET-GNP nanocomposites prepared through pellet mixing at 2 wt. % (FIG. 42). In addition, it was observed that by increasing the GNP concentration, the nanocomposites exhibited a decreasing trend in the failure strain, or elongation. FIG. 94 represents the elongation behavior as well as toughness measurements of the PET nanocomposites in comparison with PET.

In order to be tough, a material must be both strong and ductile. Based on the data collected from mechanical testing, the PET nanocomposites showed improvements in tensile strength. However, fracture analysis did not consistently show ductility. The data showed that at low concentration of the GNPs, 2 wt. %, the structure of the stretch section in polymer demonstrates a ductile failure. As the GNPs concentration increases to 7.5 wt. %, the failure behavior changes, becoming predominantly brittle. This observation is consistent with an increasing void fraction at higher concentrations. The voids can act to prematurely fraction the composite. They also diminish the stiffness of the composite, suggesting the stiffness increase observed here is less than what would be possible for a fully dense composite. The improved material properties of the composites are however, already impressive. Haghnegandar et al., reported on the fracture analysis of polypropylene (PP)/ethylene propylene diene monomer (EPDM)/graphene nanocomposites using the Essential Work of Fracture (EWF) method. In that case, the multi-layer GNPs acted as stress concentration sites, facilitating crack initiation. Further investigation is required to confirm the abovementioned observation in our case of PET nancomposites. Therefore, future studies will include using the EWF method to investigate the deformation mechanism and fracture toughness behavior of PET nanocomposites with respect to the concentration of GNPs.

Based on the data collected from the PET-GNP nanocomposites that were prepared by dosing PEG-GNP dispersions, it was found that the addition of PEG dispersion medium increases the elastic modulus of the PET matrix. Both PEG-400 and PEG-600 liquid media increased the elastic modulus of PET by 9%. Increasing the concentration of dispersed GNPs in PEG media from 0.006 wt. % to 0.02 wt. %, however, had a negative impact on the mechanical properties and luminosity results. This is attributed to a poor distribution of the GNPs, caused by agglomeration of the GNPs in PEG medium, as described herein. The early studies suggest that an increase in the concentration of the GNPs in PEG dispersions, when only sonicated, can decrease the luminosity of the nanocomposites due to a high fraction of more light-absorbing unexfoliated GNPs. When centrifugation is employed, however, the fraction of light-absorbing unexfoliated GNPs lessens as the centrifugation speed increases. This results in an increased luminosity in the nanocomposites.

Based on the mechanical testing data reported herein, the PET-GNP nanocomposites at 0.0015 wt. % concentration of GNPs (experiment 2 in Table 11) increased the elastic modulus and the tensile strength of PET by 9% and 11%, respectively. More significant improvements were observed at 2 wt. % concentration of GNPs (experiment 8 in Table 11); the elastic modulus and the tensile strength improved by 22% and 10%, respectively. In experiments 3, 4, and 5, sonication for 60 minutes helped exfoliate a fraction of the GNPs. This led to a significant fraction of unexfoliated GNPs in the dispersions. Assuming that the energy density delivered to the samples, over the same volume and time, is the same, it is reasonable to expect that the resulting concentration of the exfoliated GNPs is a function of the starting concentration of unexfoliated GNPs. While the samples below 0.5 wt. % (experiments 3, 4, and 5) did not show a significant improvement in mechanical properties, at 0.5 wt. % (experiment 6) improvements in PET mechanical properties are apparent. As shown in FIG. 68, the nanocomposites from experiments 3 and 5 exhibit a fracture surface different from those prepared by experiments 6, 7, and 8 (>0.5 wt. %). Based on the XRD analysis, shown in FIG. 70, the strongest graphene peak was observed at 0.5 wt. % concentration of GNPs and is expected to increase with weight fraction.

Figure 95:
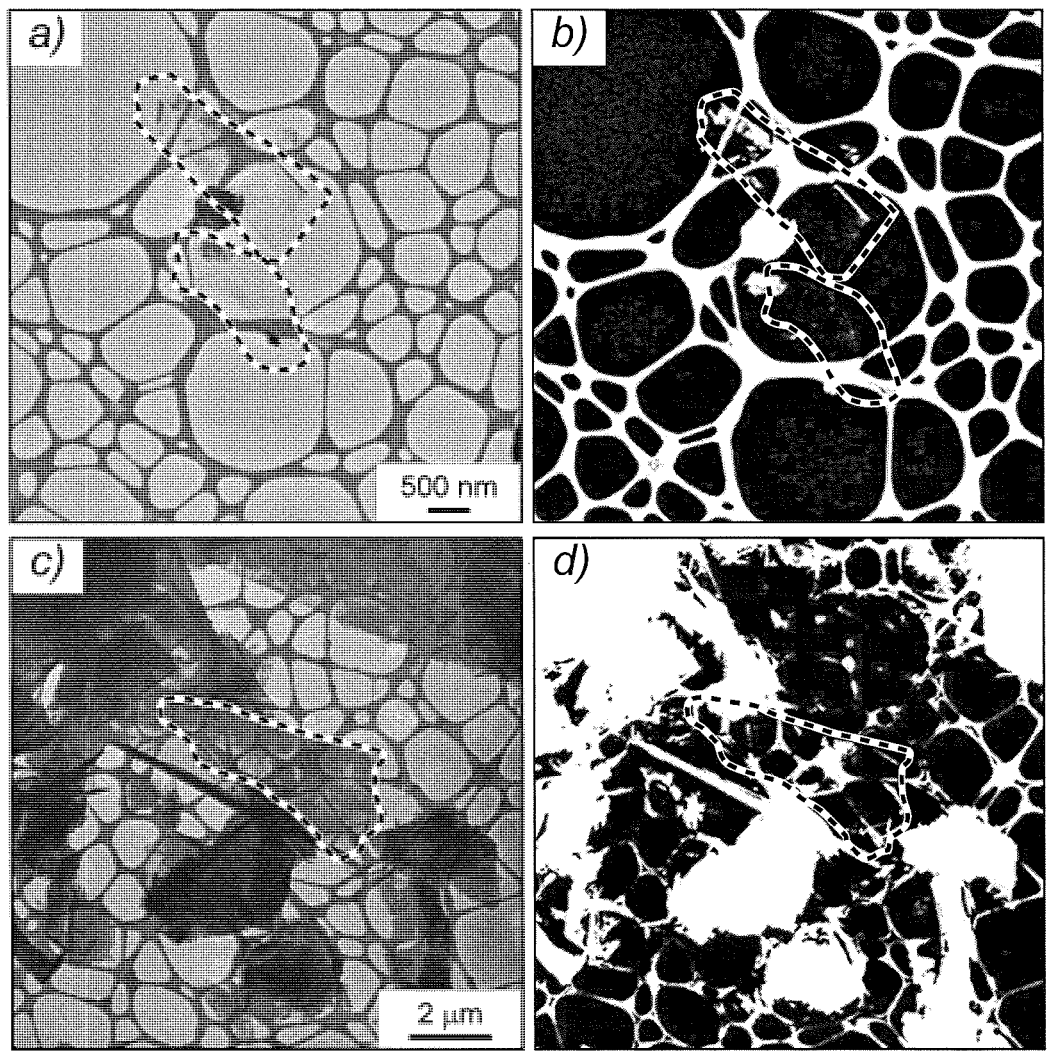
FIG. 95 illustrates TEM micrographs collected from dispersions showing a) a grid coated by a sample from experiment 2, b) the binarized image of the sample, c) a grid coated by a sample from experiment 5, and d) the binarized image of the sample, wherein highlighted regions represent a monolayer graphene sheet.
Figure 96:
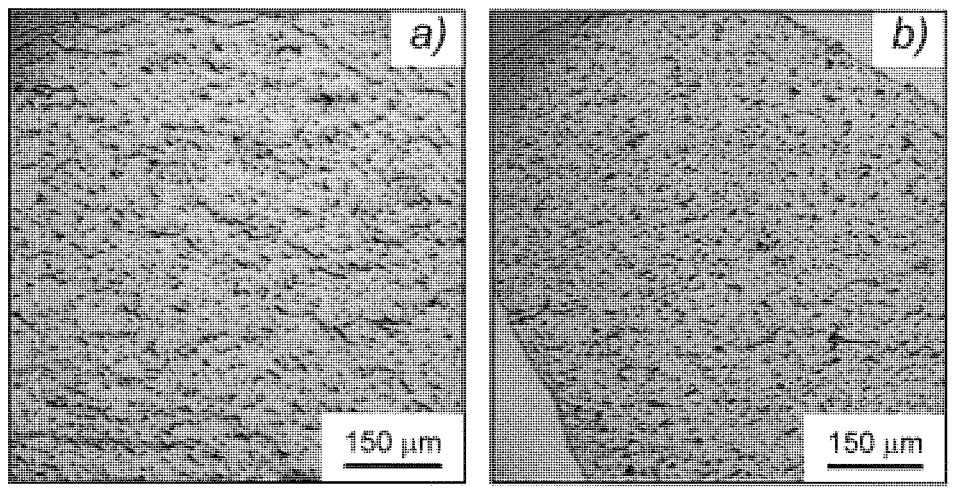
FIG. 96 illustrates comparisons of confocal images taken from a nanocomposite tensile bar prepared at 2.0% concentration of GNPs through a) melt compounding and b) in-situ polymerization.

This is attributed to a sufficient concentration of exfoliated GNPs in the PET nanocomposites. Below 0.5 wt. % concentration of GNPs, sonication for 60 minutes is insufficient to exfoliate enough GNPs to affect mechanical properties. The data here suggest that an initial concentration of GNPs at 0.5 wt. % leads to a sufficient fraction of exfoliated GNPs in 60 minutes to improve the properties of PET. To understand the effects of process parameters involved in dispersion preparation on PET-GNP nanocomposites, a qualitative analysis on the GNP dispersions was performed. The precursors used for experiments 2 and 5 (Table 11) were selected and examined by TEM and analyzed using the binary filters to evaluate the degree of exfoliation of GNPs. FIG. 95 represents the TEM micrographs and binarized images collected from the precursors used for those experiment. While the precursor used for experiment 2 was mostly comprised of few- to monolayer graphene sheets (FIGS. 95*a-b*), the one used for experiment 5, however, was comprised of a large fraction of unexfoliated multi-layer graphene sheets (FIGS. 95*c-d*). Although the concentration of the GNPs in the sample prepared by the precursor from experiment 2 is the lowest amongst other samples, the data showed significant improvements in mechanical and thermal properties.

The primary difference between the two experiments is due to centrifugation. According to several studies, exfoliation of GNPs from the starting powder is achieved through sonication and is independent of the centrifugation. During centrifugation, however, the larger, or unexfoliated, GNPs separate from the exfoliated GNPs. This indicates that centrifugation is advantageous as it can lead to achieving a dispersion with a higher fraction of few- to monolayer graphene sheets, therefore, a better distribution of active graphene surface area in the final polymer composite. These results suggest the most powerful interaction happens at the nano-scale, when exfoliated GNPs are present in the dispersions. This is not surprising, but it is useful to observe such results. This nano-interaction is dependent on the composite production process successfully exfoliating graphene. Our results here show GNP dispersions as promising candidates for the development of graphene-based PET nanocomposites, at least through in-situ polymerization.

The thermal analysis of the PET-GNP nanocomposites showed that the addition of GNPs affected PET crystallization. Crystallization occurs in two major steps. Those include nucleation, in which a crystalline phase appears, and crystal growth, which is the increase in the size of the nucleate to form a crystal state. Based on DSC data collected from the tensile bars, it was found that the addition of GNPs affected the heat flow in PET and crystallization by possibly promoting more crystals in the matrix. This was also observed in the increase in crystallization temperature. This either suggests that GNPs can serve as nucleation sites or their high thermal conductivity has affected the heat flow in PET. Examining different quenching time during injection molding of PET nanocomposites, prepared at the same GNP concentration, would help determine the underlying mechanism. Additionally, the glass transition temperature decreased with increasing GNP concentration. This could be due to agglomeration of GNPs inside the PET matrix. Agglomerated GNPs can act as plasticizer by getting in between the polymer chains, and spacing them out from each other. This causes the polymer chains to slide past each other more easily at lower temperature, $T_g$, than they would without the plasticizer. The glass transition temperature of a semi-crystalline polymer is considered to be higher and broader than that of the amorphous polymer. The glass transition temperature of a polymer is influenced by its molecular weight (chain length). According to Flory et al., the glass transition temperature can be related to the molecular weight using the Flory-Fox equation:

$$T_g = T_{g,\infty} - \frac{K}{M_n} \tag{10}$$

where $T_g$ is the glass transition temperature, $T_{g,\infty}$ is the maximum glass transition temperature that can be achieved at a theoretical infinite molecular weight, K is an empirical parameter that is related to the free volume present in the polymer sample, and $M_n$ is the molecular weight of polymer Free volume refers to polymer chain's ability to move and achieve different physical conformations, and it depends on the number of polymer chain ends. A polymer with long chain lengths (high molecular weights) will have fewer chain ends and less free volume than a polymer with short chain lengths (low molecular weight). Fewer chain ends or free volume results in a higher $T_g$. In the case of PET-GNP nanocomposites, the agglomerated GNPs can increase the free volume, therefore decrease the $T_g$. Also, the $T_m$ shifted to higher values, suggesting the presence of crystalline zones in PET. In addition, increasing GNP concentration increased percent crystallinity in the nanocomposites. Additional crystallinity also tends to improve mechanical properties. Further investigation is needed to understand the nucleation mechanism and properly attribute the effects of graphene and crystallinity on mechanical enhancement.

Even though significant progress has been made to develop polymer nanocomposites, a general understanding of the enhanced modulus and strength has yet to emerge. A major challenge in developing these nanocomposites is the lack of structure-property models. Micromechanical models are widely used to predict the behavior of composite materials based on the properties of the pure components and the morphology of the composite material. Halpin and Tsai developed a composite theory to predict the elastic modulus of unidirectional composite materials as a function of aspect ratio. According to their model, the composite modulus can be estimated based on the modulus of the matrix and filler, as well as the shape and volume fraction of filler. The longitudinal modulus of the composite material ($E_{11}$) is predicted using the following equation:

$$\frac{E_{11}}{E_m} = \frac{1 + 2A_f \eta \phi}{1 - \eta \phi} \tag{11}$$

$$\eta = \frac{E_r - 1}{E_T - 2A_f} \tag{12}$$

where $E_m$ is modulus of matrix, $A_f$ is aspect ratio of the filler (L/t=length/thickness), $\phi$ is volume fraction of the filler, and $E_r$ is the ratio of the filler's modulus to matrix's modulus.

The Hui-Shia model, suggested by Hui and Shia in 1998, is another micromechanical model that has been widely used to predict the modulus of the composites including unidirectional aligned disk-like platelets. In this theory, all moduli depend on a geometrical parameter, g, which depends on the inverse aspect ratio. The longitudinal and transverse modulus of the composite materials can be estimated using the following equations:

$$\frac{E_{11}}{E_m} = \frac{1}{1 - \frac{\phi}{\xi}} \tag{13}$$

$$\xi = \phi + \frac{E_m}{E_f - E_m} + 3(1-\phi)\left[\frac{(1-g)\alpha^2 - \left(\frac{g}{2}\right)}{\alpha^2 - 1}\right] \tag{14}$$

$$\frac{E_{22}}{E_m} = \frac{1}{1 - \frac{\phi}{4}\left[\frac{1}{\xi} + \frac{3}{\xi + \Lambda}\right]} \tag{15}$$

$$\Lambda = (1-\phi)\left[\frac{3(\alpha^2 + 0.25)g - 2\alpha^2}{\alpha^2 - 1}\right] \tag{16}$$

$$g \cong \begin{cases} 1 - \frac{[\ln(2\alpha) - 1]}{\alpha^2} & \alpha \gg 1 \\ \frac{\pi}{2}\alpha & \alpha \ll 1 \end{cases} \tag{17}$$

where $E_{11}$ is longitudinal modulus of the composite, $E_{22}$ is transverse modulus of the composite, $E_m$ is modulus of matrix, $E_f$ is the filler's modulus, $\phi$ is volume fraction of the filler, and $\alpha$ is the inverse aspect ratio (t/L).

As can be seen from the aforementioned equations, the aspect ratio (L/t) of the GNPs is one of the important input parameters that should be used to evaluate the micromechanical models. Several attempts were made to make thin sections (70 nm) of the samples for TEM testing in order to estimate the length and thickness of the GNPs. However, due to the size of the granules in the block matrix, which appeared to be relatively large, the polymer was brittle for sectioning. The larger granules appeared resistant to sectioning and tended to fragment when striking the knife edge, resulting in shredded thin sections on a glass knife. Therefore, the thin sections were not successfully produced for TEM testing.

In the current research, the effectiveness of GNPs by weight in the nanocomposites was evaluated based on the following equation:

$$\varepsilon = \frac{E_2 - E_1}{Wt. \%} \quad (18)$$

where $\varepsilon$ is the value representing the effectiveness of GNPs by weight, $E_2$ is elastic modulus of the PET-GNP nanocomposite, $E_1$ is elastic modulus of PET, and Wt. % is weight fraction of GNPs used to prepare the nanocomposites.

Figure 97:
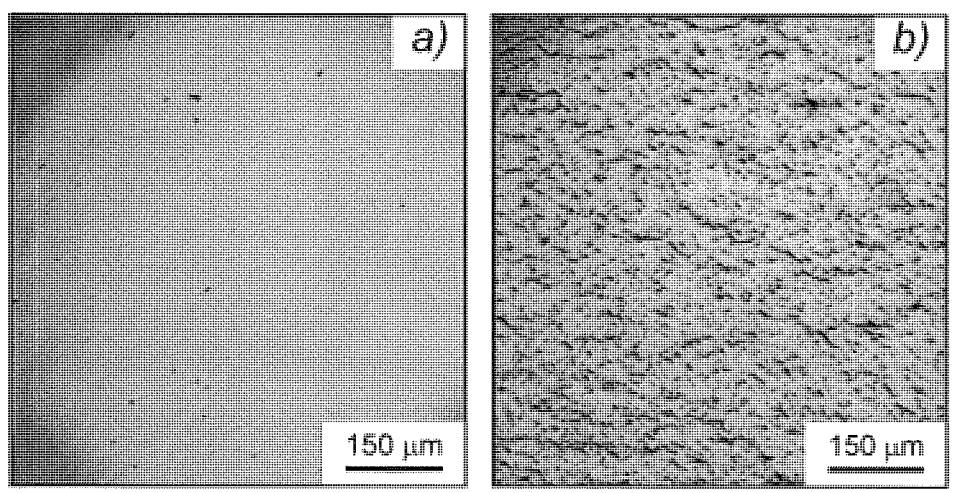
FIG. 97 illustrates comparisons of confocal images taken from a) a nanocomposite preform prepared at 0.006% concentration of GNPs and b) a nanocomposite tensile bar prepared at 2.0% concentration of GNPs through melt compounding.

FIG. 97 shows nanocomposite tensile bars prepared through melt compounding of PET powders with GNPs and in-situ polymerization at 2 wt. %. The effectiveness of GNPs for both tensile bars was evaluated using equation 17. While the c for the sample prepared by in-situ polymerization was found to be 21±7, it dropped to 3±4 for the sample prepared by melt compounding. This indicates that at the same concentration of GNPs, the in-situ polymerization leads to a better distribution of the GNPs in the PET matrix.

FIG. 97 shows nanocomposite tensile bar, prepared by melt compounding PET powders with GNPs at 2 wt. % (c=3±4), as well as the nanocomposite tensile preform prepared using the PEG-GNP dispersions, with an estimated concentration of 0.006 wt. %. For the case of the nanocomposite tensile preform, the PEG-dosed PET preform was used as baseline to isolate the effects of GNP dispersion on the properties of the nanocomposite from that of PEG alone. The GNPs similarly improved the modulus of the nanocomposites by 3% (SD=0.1) even though the concentration of the incorporated GNPs in the tensile preform is significantly lower than the tensile bar. The effectiveness of GNPs for tensile preforms was found to be 1000±600. This indicates that dispersion dosing leads to a better distribution of GNPs in the PET matrix.

It is important to note that sonication was employed in both in-situ polymerization and dispersion dosing methods. The higher effectiveness of the GNPs could be attributed to the greater level of exfoliation of the GNPs dispersed through sonication, resulting in a higher fraction of monolayer graphene.

TABLE 36

Summarizes the effectiveness of GNPs in PET nanocomposites prepared by different methods.

| Nanocomposite Preparation Method | Concentration of GNPs (wt. %) | Effectiveness of GNPs by Weight ($\varepsilon$) |
|---|---|---|
| In-Situ Polymerization | 2 | 21 ± 7 |
| Melt Compounding | 2 | 3 ± 4 |
| Dispersion Dosing | 0.006 | 1000 ± 600 |

A review of a subset of the published data of PET nanocomposite elastic modulus improvements, summarized in Table 37, allows for the same calculation of nanofiller effectiveness using Eq. 18. This indicates that the dispersion dosing is significantly more effective than the results summarized.

TABLE 37

List of PET nanocomposites reported in the literature.

| Preparation Method | $E_1$, PET (GPa) | Nanofiller | $E_2$, Nanocomposite (GPa) | Concentration (wt. %) | Effectiveness ($\varepsilon$) |
|---|---|---|---|---|---|
| In-Situ Polymerization | 2.31 | SWNTs | 2.08 | 0.0005 | −460 |
| Injection Molding | 0.90 | MMT [a] | 0.87 | 0.03 | −1 |
| Melt Blending | 1.80 | PACP [b] | 1.93 | 0.05 | 2.6 |
| Melt Extrusion | 1.58 | ZrP [c] | 1.65 | 0.02 | 3 |
| Melt Extrusion | 1.58 | ZrPP [d] | 2.22 | 0.05 | 13 |
| In-Situ Polymerization | 2.21 | MWNTs | 3.14 | 0.015 | 62 |
| In-Situ Polymerization | 2.21 | MWNTs | 2.89 | 0.01 | 68 |
| Melt Blending | 0.80 | Graphene | 1.0 | 0.0008 | 240 |
| In-Situ Polymerization | 2.40 | MWNTs | 7.30 | 0.02 | 245 |
| In-Situ Polymerization | 1.20 | POSS [e] | 4.40 | 0.01 | 320 |

[a] MontMorilloniTe
[b] Hexakis (para-allyloxyphenoxy) cyclotriphosphazene
[c] α-zirconium bis(monohydrogen orthophosphate) monohydrate
[d] Organic-inorganic hybrid layered zirconium phenylphosphonate
[e] Polyhedral oligomeric silsesquioxane

CONCLUSIONS

The main objective of this research was to achieve a uniform distribution of GNPs in PET nanocomposites via dispersion preparation followed by injection molding. The following results were derived through the applications of melt compounding, in-situ polymerization, and injection molding over the course of this research:

Melt Compounding:

Amongst the GNPs with three different surface areas, the GNP-15 (surface area=15 m$^2$/g) showed the highest improvement in elastic modulus.

The low surface area GNPs appears to provide a larger interface with more efficient interaction with the polymer matrix. This is because the GNP-15 contain larger graphene sheets per gram compared to GNP-150 and GNP-750, resulting in more free carbon edges and graphene surface area available to interact with PET chains.

Mixing PET and GNP powders resulted in a more uniform distribution of the GNPs in the matrix compared to the mixture with PET pellets. This indicates the spacing between graphene particles before melting in the compounder influences the final product.

Melt compounding GNPs with PET powders compared to PET pellets led to a greater improvement in elastic modulus and tensile strength. Based on the current literature, the powder melt compounding was newly tested, and showed significantly higher improvements than pellet melt compounding. At 20 wt. % GNPs, the elastic modulus of PET powders and pellets improved by 182% and 101%, respectively. At 20 wt. % GNPs, the tensile strength of PET powders and pellets improved by 35% and 14%, respectively.

Addition of GNPs on PET powders had a positive impact on PET crystallinity; but not an increasing trend. The crystallinity of pristine PET powders and pellets was measured 9% and 12%, respectively. An addition of 10 wt. % GNPs, amongst concentrations ranging from 2 wt. % to 20 wt. %, led to the highest improvement of 14% and 13% for PET powders and pellets, respectively. Why this occurs is unclear and is an opportunity for future research.

A decreasing trend on non-isothermal crystallinity of PET powders and pellets was observed with respect to concentration of GNPs. This is due to the presence of early nucleation sites by the addition of GNPs.

XRD analysis indicated that GNPs had a preferred orientation along the transverse direction of the PET tensile bars, likely caused by injection molding.

In-Situ Polymerization:

Ultrasonic exfoliation is effective in dispersing GNPs in EG. Either probe or bath sonication methods are effective.

Probe sonication is more effective, likely due to the higher localized energy during cavitation, but it adds much more heat to the system compared to bath sonication. Overheating can severely damage the sonicator system and negatively impact the cavitation effectiveness during sample processing.

Increasing the G-Force during centrifugation separated the larger, or unexfoliated, GNPs from the exfoliated GNPs, which is an important step for maximizing the effectiveness of graphene in a composite.

Longer sonication times are associated with a reduction in the average GNP size, indicating that exposure to sonication fractures the GNPs. It is not clear if this fracture occurs on a weakened graphene sheet or is only the consequence of separation of agglomerated, intercalated layers of an already small size.

The exfoliation of GNPs from the starting powder is achieved through sonication and is independent of centrifugation. TEM confirmed the presence of monolayer graphene after sonication for 90 and 180 minutes and centrifugation at 260 and 2350 RCF. This is an area for future study to determine the optimized sonication times and centrifugation speeds.

A combination of TEM and Raman spectroscopy techniques helped estimate the size and number of layers of the dispersed GNPs in the liquid medium after sonication and centrifugation. This combined method is easy and recommended for future applications of GNP dispersions. However, it would be useful to try both techniques on frozen dispersions to prevent agglomeration of the GNPs caused by using heat treatment in the sample preparation.

The resulting PET-GNP nanocomposite at 2 wt. % was found to be more effective ($c=21\pm7$) than nanocomposite prepared by melt compounding at the same concentration ($c=3\pm4$).

An initial concentration of GNPs at 0.5 wt. % leads to sufficient fraction of exfoliated GNPs in 60 minutes to improve the properties of PET.

Once in dispersion, unexfoliated GNPs can be removed with centrifugation. If not, they do not negatively impact the nanocomposite, as measured by the tensile strength and elastic modulus, while visually decreasing the luminosity.

There was an increasing trend in elastic modulus as the concentration of graphene increased. At 2 wt. % concentration of GNPs, the elastic modulus increased by 22%. Whether this is an upper limit, is yet to be established.

Our results here show GNP dispersions as promising candidates for the development of graphene-based PET nanocomposites through in-situ polymerization.

PEG-GNP Dispersions and Masterbatch:

The PET-GNP nanocomposites, fabricated through PEG-GNP dispersion dosing, outperform those that were prepared using masterbatch, exhibiting greater improvements in tensile strength of the PET. This is most likely due to exfoliation happening during the sonication that was used in preparation of dispersions. Exfoliation results in a higher fraction of few- to monolayer graphene sheets.

PEG shows promise to be used as dispersion medium for GNPs in creation of PET-GNP nanocomposites through the dispersion dosing approach due to its high viscosity and compatibility with PET chemistry. Improvements in crystallinity, modulus, and strength of PET observed in samples prepared by dosing PEG-400 dispersions.

Viscosity of the dispersion medium affects the stability and the achievable concentration of the dispersion, by reducing the sedimentation rate of dispersed GNPs.

The resulting PET-GNP nanocomposite at 0.006 wt. % was found to be significantly more effective ($\varepsilon=1000\pm600$) than nanocomposite prepared by melt compounding, with the same improvement in elastic modulus ($\varepsilon=3\pm4$).

GNP dispersions in PEG-400 at 0.006 wt. % improved the elastic modulus and tensile strength of PEG-dosed PET preforms by 8% and 4%, respectively. A decreasing trend in the elastic modulus and tensile strength of PEG-dosed PET preforms was observed by an increase in concentration of GNPs. This is due to the agglomeration of the dispersed GNPs, caused by the higher viscosity of PEG relative to EG.

The luminosity of nanocomposites was a function of the concentration of GNPs, specifically the number of platelets per unit volume.

An increase in the sonication time, and therefore energy density, during dispersion processing, decreases the luminosity of the preforms by also increasing the number of platelets per unit volume by fracturing the GNPs during sonication.

Centrifugation, employed during dispersion processing, has positive impact on luminosity of PET nanocomposites. Centrifugation separates out the unexfoliated GNPs from exfoliated ones. Increasing the centrifugation speed leads to a lower fraction of more light-absorbing unexfoliated GNPs, resulting in an increased luminosity of PET nanocomposites.

No significant improvement was observed for the modulus of PEG-dosed PET preforms when a GNP dispersion with an initial concentration of 1 mg/mL was dosed. Similar behavior was observed for the same dispersion after centrifugation, resulting in the final GNP dispersions with concentrations of <1 mg/mL. This is because the centrifugation leaves only a small fraction of the dispersed GNPs in the dispersions. Regardless of the degree of exfoliation, GNP dispersions at concentrations of <1 mg/mL does not impact the modulus of PET.

Significant improvement was observed for the tensile strength of PEG-dosed PET preforms when a high-viscosity dispersion medium ($M_w=600$ g/mol) with an initial concentration of 1 mg/mL was dosed. Similar behavior was observed for the same dispersions after centrifugation, resulting in the final GNP dispersions with concentrations of <1 mg/mL. The higher viscosity of the medium leads to a uniform dispersion of the exfoliated GNPs before and after centrifugation, resulting in a more uniform distribution of GNPs in the PET matrix.

No significant improvement was observed for the elastic modulus and the tensile strength of PEG-dosed PET preforms when GNP dispersions of >5 mg/mL were dosed. This is because at such high concentrations, the dispersions may never process well during sonication, resulting in a dispersion of agglomerated and poorly-distributed multi-layer GNPs.

As disclosed hereinabove, graphene-based poly(ethylene terephthalate) nanocomposites were successfully fabricated through several fabrication methods. Although extensive research has been demonstrated at lab scale, transferring the hierarchical fabrication methods to industrial scale production, is yet to be investigated. In this regard, different types of materials, GNPs and dispersion media, as well as processing routes and characterization methods through insightful analysis have a real potential for future development of PET-GNP nanocomposites. In light of the presented data disclosed herein, the following points are contemplated for future work:

Materials:

GNPs, with different surface areas, are commercially available through different manufacturing processes. While the data in this research are primarily collected from the GNP-15 (surface area=15 m²/g), it would be helpful to prepare the PET-GNP nanocomposites using the GNPs of different surface area to understand better the changes in nanocomposites properties with respect to the surface area of GNPs.

Nanocomposite Processing Methods:

Melt compounding is a promising method for the fabrication of nanocomposites due to low production cost at a moderate scale. Melt-compounded GNPs with PET pellets and powders showed significant improvement in tensile strength and elastic modulus of PET matrix. A better interaction between the GNPs and PET powders, due to an increase in PET surface-area-to-volume ratio compared to PET pellets, led to a more uniform distribution of GNPs in PET. Based on the data collected here, it is reasonable to expect to gain insight with an even smaller PET power or compounding with the PET pellets for a longer time. However, the constraint on melt time for PET must be considered as it leads to thermal degradation in ultimate applications. Future investigation is needed to further reduce the PET powder size and evaluate the level of distribution of GNPs and properties of the nanocomposites prepared by such PET matrix.

Additionally, PET-GNP nanocomposites prepared through in-situ polymerization were characterized by superior mechanical properties compared to those prepared through melt compounding. As stated earlier, bath sonication was utilized to prepare the GNP dispersions for the fabrication of nanocomposites. Effects of probe sonication on the quality of the dispersions and subsequent properties in the PET nanocomposites are still unknown. Therefore, future investigation is required to build upon and to optimize the existing results obtained through this method for commercial application. During the preparation of GNP dispersion, it was found that centrifugation had a positive effect on the mechanical properties of the nanocomposites prepared through in-situ polymerization. As shown in this research, the yield of the exfoliated GNPs after centrifugation is very low. This may limit the potential application of the GNP dispersion for the development of PET-GNP nanocomposites. According to Hernandez et al. and Paton et al., recycling the sediment separated from the supernatant, after centrifugation in the GNP dispersions, can help improve the yield of the exfoliated graphene. The process involves re-dispersing a portion of the sediment from the original sample in fresh dispersion medium in exactly the same way as the original dispersion was made. Further investigation is needed to understand this process and study the effects of sediment recycling and testing the resulting EG and PEG dispersions quality and nanocomposite products. PEG dispersions shows promise to improve the mechanical and thermal properties of PET. The nanocomposite tensile preforms were characterized to by superior mechanical and thermal properties compared to pristine PET. For our intended composites, the PEG dispersions must be stable to be uses for the industrial scale production of PET bottles during injection molding and blow molding process. Therefore, further investigation is required to fabricate and investigate the PET bottles using the PEG dispersions.

Characterization of Nanocomposites:

TEM testing was successfully performed on the GNP dispersions to evaluate the size and thickness of the GNPs dispersed in EG. As mentioned herein, TEM testing of the PET-GNP nanocomposites was not successful due to the challenges associated with sample preparation. The data disclosed herein suggests that the PET-GNP nanocomposites, fabricated through PEG-GNP dispersion dosing, outperform those that were prepared using masterbatch, exhibiting greater improvements in stiffness and tensile strength of the PET. The HR-TEM micrographs indicated a more uniform distribution of GNPs in PET for these nanocomposites, however, more statistical data is needed to further support this claim. Therefore, information related to the size and thickness of the exfoliated GNPs dispersed in PET remains unknown. Research suggests that atomic force microscopy (AFM) is a useful method to determine the number of layers and provide thickness distribution of graphene in polymer nanocomposites. Therefore, further research is needed to combine HR-TEM and AFM techniques to evaluate the size and thickness of layers of the GNPs dispersed in PET.

Raman Spectroscopy

Raman spectroscopy is by far the most straightforward method to study the level of defects and identify the number of layers in graphene materials. A typical Raman spectrum of graphene consists of three major bands including D band, G band, and 2D band near 1355 cm$^{-1}$, 1570 cm$^{-1}$, and 2700 cm$^{-1}$, respectively. The D band is a weak feature of the Raman spectrum. It is due to a one-phonon scattering from defects. It is either absent or extremely weak in a spectrum for monolayer graphene, but it becomes distinguishable when there is a significant amount of defects. The G band is due to the degeneration of the optical phonon mode in graphene. According to Yoon et al., the intensity (I) of the G band is sensitive and increases with the number of layers up to 7 layers. The shape of this band does not vary much. Childres et al., showed that the ratio of the intensity of the D band to the G band, $I_D/I_G$ in Raman spectra, can be used to characterize the level of defects in graphene related materials. According to Khan et al. and Paton et al., if defects present in graphene are edge defects or pre-existing defects in the material, then the $I_D/I_G$ of the as-received powder and the samples after the sonication and centrifugation could be approximately related to the lateral size of graphene by:

$$I_D/I_G \approx I_D/I_{G_{Powder}} + \frac{k}{\langle meanlateralsize \rangle} \qquad (19)$$

where $I_D/I_G$ is the ratio of the intensity of the Raman D and G bands, and k is estimated to be 0.17. The 2D band, on the other hand, is a strong band that is due to a two-phonon scattering. This band is also referred to as G'. The line shape of the 2D band reflects the electronic band structure and the number of layers of graphene.

Electron Band Structure in Graphene

Raman spectroscopy is a widely used characterization technique in the structural and electronic studies of graphene. To better understand the electronic structure of graphene, it is helpful to review the bond structure in graphene. As discussed earlier, three of the four atoms' electrons are involved in sp² bonding, and they contribute very little to grapheme's electronic structure. The remaining atom in a state so-called π state plays an important role in the electronic structure of graphene. Band theory has been successfully used to explain physical properties of materials like electrical conductivity and optical absorption. According to solid-state physics, there will be an energy level in a solid where no electron can exist. This is called a band gap. In general, an electronic band structure of an insulator solid, shown in FIG. 98a, describes different levels of energies that an electron may have.

Figure 98:
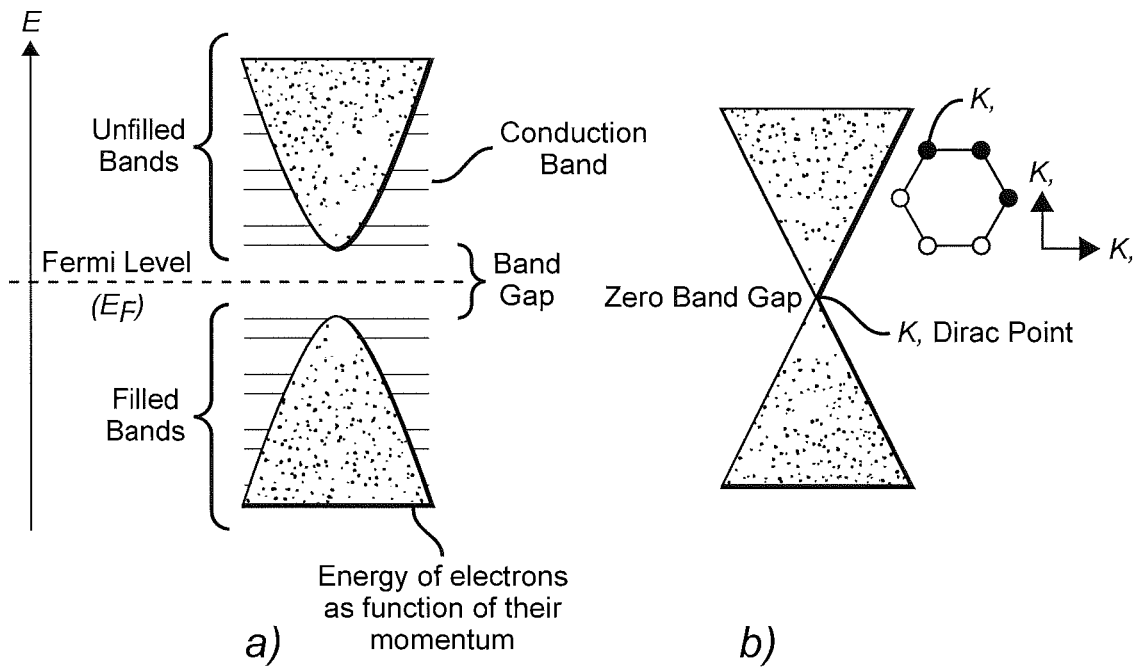
FIG. 98 illustrates an electronic structure of a) an insulator and b) graphene.

In insulator solids, the energy bands are either full or empty. Considering the momentum behavior of electrons' energy, the bands will look like parabolas (FIG. 98a). However, graphene presents an uncommon behavior. The cones will become circular, and the momentum will be connected through their extremities, showing a zero-gap structure. In this case, the valence and conduction bands meet at Dirac point (FIG. 98b). A total of six Dirac points, labeled as K, are divided into two non-equivalent sets. As for the electronic behavior of graphene, when electrons involved in the hexagon propagate through the lattice, they possess the same velocity as if they have no mass. The electrons produce an energy that can be found using a conventional model and can be calculated using the below equation:

$$E = \pm \sqrt{\gamma_0^2 \left(1 + 4\cos^2\frac{K_y a}{2} + 4\cos\frac{K_y a}{2} \cdot \cos\frac{K_x \sqrt{3}\, a}{2}\right)} \quad (20)$$

where $\gamma_0^2$ is the nearest-neighbor hopping energy≈2.8 eV, a is the lattice constant≈2.46 Å, and $E^+$ and $E^-$ represent the two energy bands for valence and conduction bands.

Transmission Electron Microscopy

Figure 99:
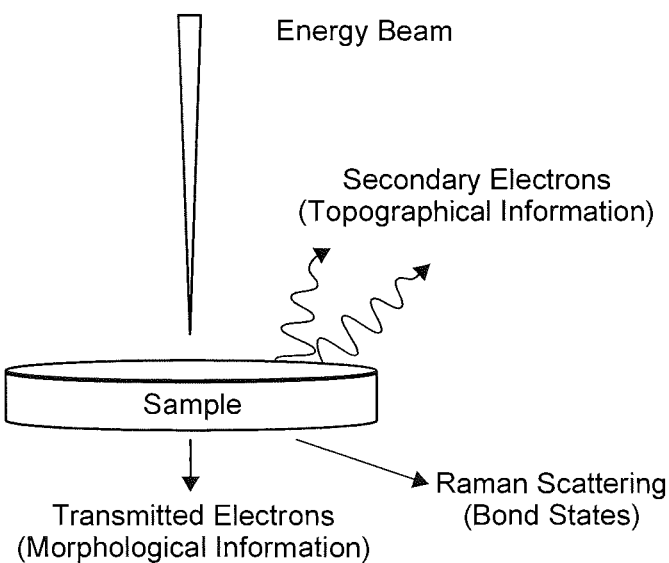
FIG. 99 illustrates a schematic representation of electron microscopy.

In TEM, a beam of electrons is used as a source of illumination. As shown in FIG. 99, the beam is transmitted through an ultra-thin specimen, resulting in a micrograph after interacting with the specimen.

When interacting with the specimen, electrons act as ionizing radiation. In particular, ionizing radiation is capable of removing tightly-bounded inner-shell electrons by transferring energy to the atoms in the specimen. The wavelength of an electron beam is significantly shorter than that of visible light, allowing visualization of the internal structure of a specimen. According to De Broglie's law, the wavelength (λ) of an electron beam is inversely proportional to the energy of the electrons (E) and can be calculated using the equation below:

$$\lambda = \frac{1.22}{\sqrt{E}} \quad (21)$$

Selected Area Electron Diffraction

Figure 100:
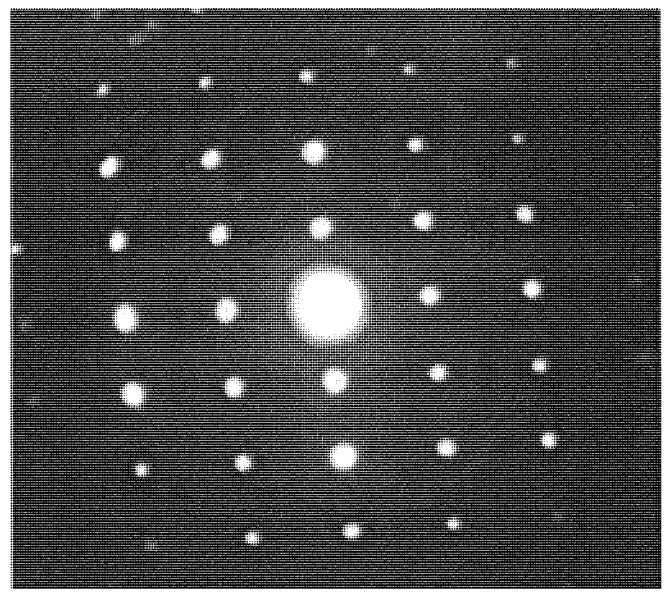
FIG. 100 illustrates a photograph of a typical electron diffraction pattern of a single crystal, wherein a transmitted spot at the center is much brighter than diffraction spots.

SAED is an experimental technique used in TEM analysis. In SAED, a diffraction pattern is formed when an electron beam passes through a crystalline specimen in a TEM. It is one of the available crystallographic techniques to study the crystal structure of graphene. SAED not only can be used to identify crystal structures, but also to examine crystal defects. With the intention of distinguishing a monolayer with a multi-layer graphene, SAED were employed during the TEM testing in this study. The diffraction pattern represents a reciprocal lattice plane, which contains the diffraction response of lattice planes belonging to one crystal zone, and reciprocal lattice points, which are shown as diffraction spots. FIG. 100 represents a diffraction pattern collected from a single crystal.

Laser Diffraction

Figure 101:
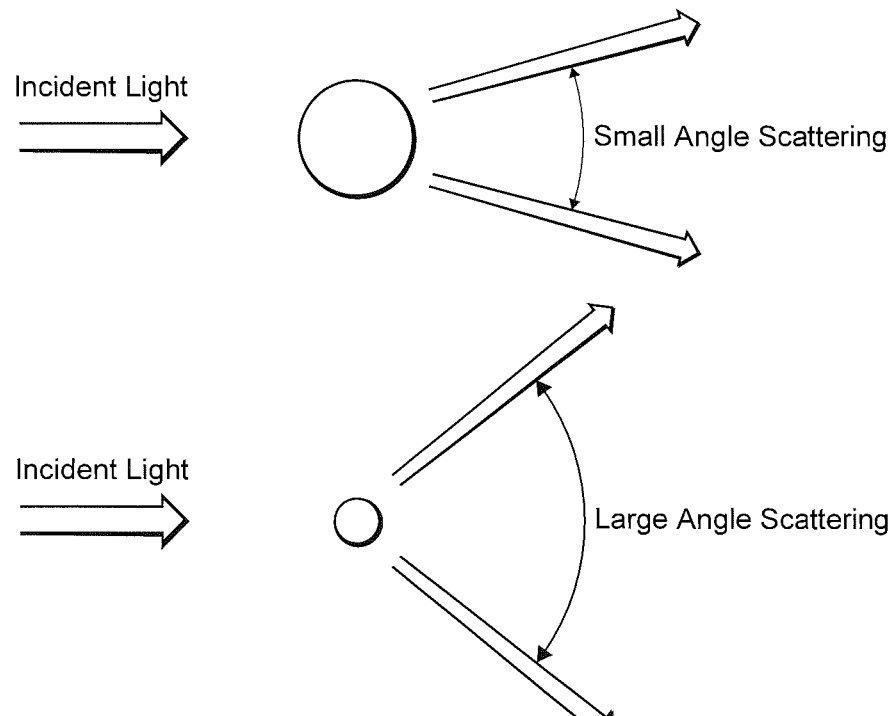
FIG. 101 illustrates a schematic representation of laser diffraction with respect to particle size.

In laser diffraction, a laser beam passes through a dispersed particle in the sample and the angular variation in intensity of the scattered light is measured. While large particles scatter light at small angles, small particles scatter light at large angles. This is illustrated in FIG. 101. The angular scattering intensity is then analyzed to calculate the size of the particles using the Mie theory of light scattering.

Figure 102:
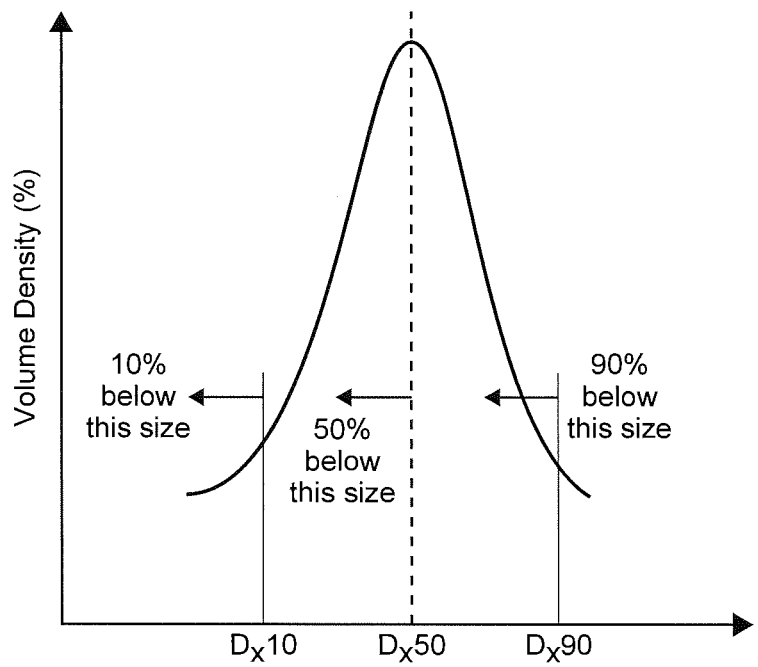
FIG. 102 illustrates a common approach to define distribution width.

One common approach to understand the particle size measurements is to report a distribution along with one or more values to describe the width of the size distribution. For the Mastersizer 3000, three different values on the x-axis are generally selected to define the volume-weighted distribution of the population. These values include $D_x10$, $D_x50$, and $D_x90$ and are shown in FIG. 102. This means that 10 percent of the population lies below the $D_x10$ and 90 percent lies below the $D_x90$, while the $D_x50$ is the median, meaning that half of the population lies below this value.

Stability of GNP Dispersions

Figure 103:
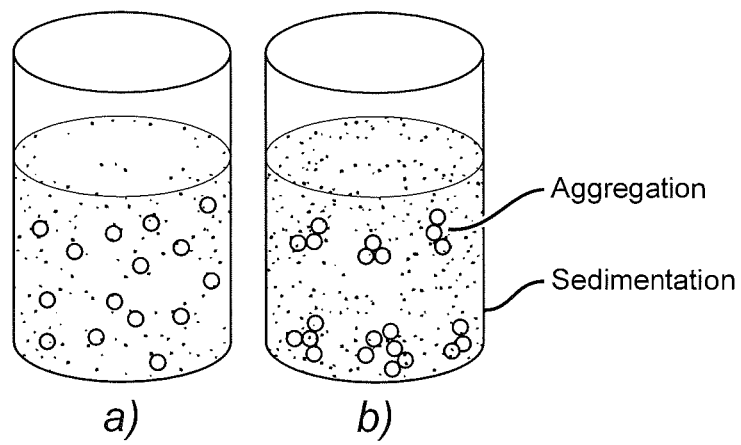
FIG. 103 illustrates schematic examples of a) a stable and b) an unstable colloidal dispersion representing aggregation and sedimentation.

With reference to FIG. 103, the stability of the GNP dispersions is an important factor that can affect the usability of the dispersions in the development of nanocomposites. In an unstable colloidal system, the dispersed phase may agglomerate, leading to precipitation of the dispersion. During this process, the dispersed-phase platelets stick to each other and form irregular clusters called aggregations. Once aggregation takes place, the aggregates will grow in size, and as a result, they settle out, which is referred to as sedimentation. Aggregation of the particles can be avoided when the repulsion forces between the particles dominate, leading to a stability of the dispersion.

Surfactants may not be an option to stabilize dispersions due to the interference they cause in subsequent processing. While sonication provides the essential activation energy required to overcome the Van der Waals forces between graphene sheets, as mentioned earlier, the surface tension of the dispersion media is key to an effective exfoliation of graphene dispersions. Surface tension of the media also impacts the stability of the dispersed graphene. To create a high-quality graphene dispersion, graphene must be dispersed at a concentration useful to the appropriate application, and remain dispersed with high stability over a reasonable period. There are several parameters affecting the stability of the dispersions that are well-established in the field of colloid science.

Colloids are two-phase systems consisting of a dispersed phase, also called a discontinuous phase, and a dispersion medium, also called a continuous phase. A system in which the dispersed phase is of the same size are called monodisperse system. If a range of sizes are present, the system is then called polydisperse. From a chemistry standpoint, colloid systems include mixtures in which the dispersed phase is insoluble, with random movement or Brownian motion, and is suspended in the dispersion medium. Compared to a bulk material, a colloidal dispersion represents a state of higher free energy. Colloidal dispersions have a tendency to reduce their free energy by reducing the surface energy, altering the stability of the dispersion. When a substantial energy barrier exists, the dispersion's free energy will not be altered, resulting in stability for a significant period of time, a phenomenon called colloidal stability. However, if the energy barrier becomes too small, the colloid will become unstable. In such cases, the collisions caused by the Brownian motion of the particles lead to aggregation. A discussion of the intermolecular forces can help with understanding the stability of the dispersions and the reasons behind aggregation. Intermolecular forces comprise electrostatic forces (repulsive) and Van der Waals forces (attractive). The intermolecular forces between two molecules can be found using the Lennard-Jones potential from the below equation:

$$V(r) = 4\varepsilon\left[\left(\frac{\sigma}{r}\right)^{12} - \left(\frac{\sigma}{r}\right)^{6}\right] \quad (22)$$

where V is the Lennard-Jones potential (J), $\varepsilon$ is a measure of how strongly two molecules attract each other (J), $\sigma$ is a constant parameter, a distance at which the intermolecular potential between two molecules is zero (nm), and r is the intermolecular distance between the two molecules (nm).

The Lennard-Jones potential describes the potential energy when two non-bonding molecules interact with each other based on their intermolecular distance. The Lennard-Jones potential is comprised of two terms: a repulsive force, $$\left(\frac{\sigma}{r}\right)^{12},$$

and an attractive force, $$\left(\frac{\sigma}{r}\right)^{6},$$

and it provides a useful overview of the total intermolecular interactions. When the two molecules are at an infinite distance, the possibility of them interacting is negligible, indicating the potential energy is zero. At this point, the molecules are most stable. As the molecules' separation distance decreases, the probability of the interaction increases. They come closer until they reach a region in which potential energy decreases from zero to a negative value. If the molecules become closer, the repulsive force will dominate, indicating an overlapping of atomic orbitals. In this case, atoms attempt to regain the space.

In the case of dispersions, when the repulsion forces dominate, the molecules do not aggregate, resulting in a stability of the dispersion. If the attractive forces prevail, the particles aggregate and alter the stability of the dispersion. In an unstable dispersion, the collisions of the particles lead to aggregate formation, followed by sedimentation or creaming Sedimentation is when the dispersed phase is denser than the dispersion medium and so the aggregations sink, whereas creaming happens when the dispersed phase is less dense, and the aggregations float.

GNPs with High Surface Area

Figure 104:
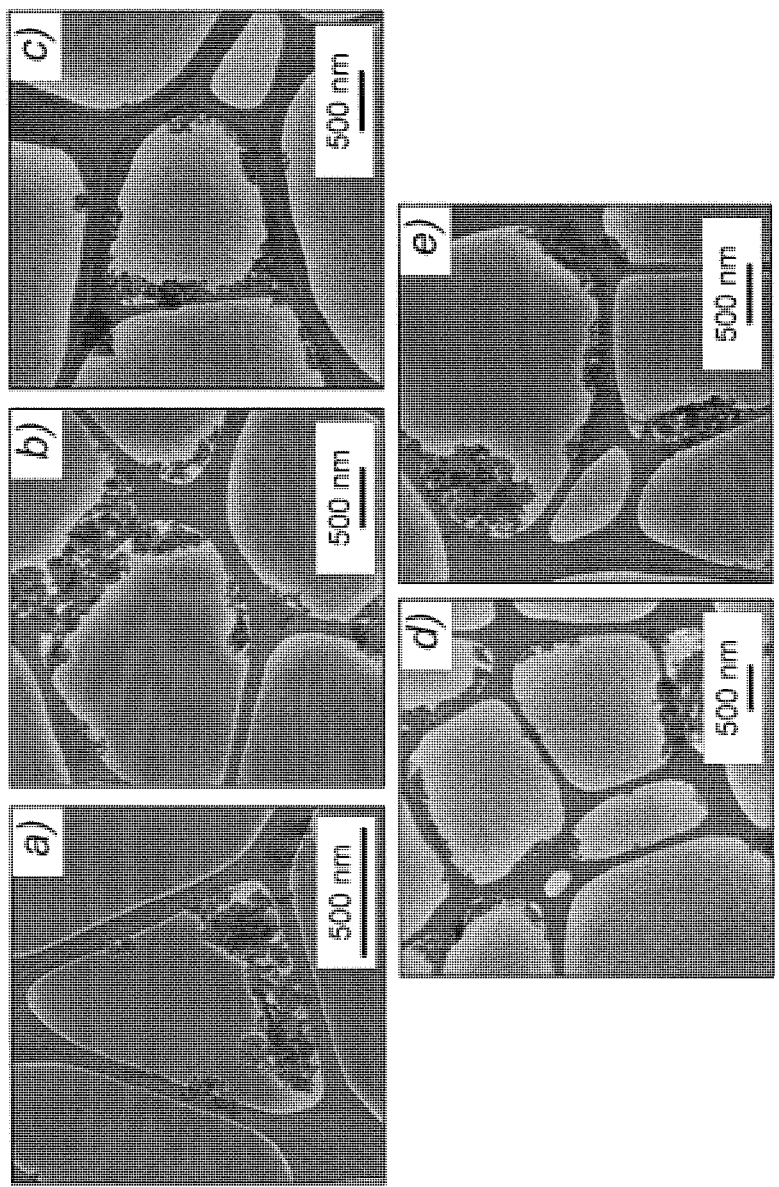
FIG. 104 illustrates TEM micrographs showing agglomeration in GNP-750, wherein samples prepared using probe sonication for a) 30, b) 60, c) 90, d) 120, and e) 180 minutes and centrifuged at 260 RCF.

FIG. 104 shows the first case study in this work. Micrographs of TEM grid indicating the GNP-750, prepared by drop casting a few droplets of the samples that were sonicated from 30 to 120 minutes and centrifuged at 260 RCF. In this grade, GNPs typically consist of aggregates of sub-micron platelets with a diameter less than two microns, which are smaller than GNP-15 and GNP-150. Due to the high amount of released acoustic energy during sonication, graphene sheets tend to be broken up, resulting in a decrease in the initial size of materials. As shown in FIG. 104, the platelets appear agglomerated, causing difficulties for sample processing. Therefore, further investigation on this grade of GNPs was discontinued.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A reinforced polymer composite, comprising:
   a continuous matrix comprising polyethylene terephthalate; and
   0.001 weight percent dispersed phase graphene nanoplatelets, the graphene nanoplatelets having an average thickness between 2 nanometers (nm) and 3 nm, between 6 nm and 8 nm, or between 10 nm and 20 nm.

2. The reinforced polymer composite according to claim 1, wherein the average thickness of the graphene nanoplatelets is between 2 nm and 3 nm.

3. The reinforced polymer composite according to claim 1, wherein the average thickness of the graphene nanoplatelets is between 6 nm and 8 nm.

4. The reinforced polymer composite according to claim 1, wherein the average thickness of the graphene nanoplatelets is between 10 nm and 20 nm.

5. A reinforced polymer composite, comprising:
   a continuous matrix comprising polyethylene terephthalate; and
   0.006 weight percent dispersed phase graphene nanoplatelets, the reinforced polymer composite having an effectiveness ($\varepsilon$) of 1000±600;
   wherein an average thickness of the graphene nanoplatelets is between 2 nm and 3 nm.

6. The reinforced polymer composite according to claim 5, wherein a surface area of the graphene nanoplatelets is 15 $m^2/g$.

7. A reinforced polymer composite, comprising:
   a continuous matrix comprising polyethylene terephthalate; and
   0.006 weight percent dispersed phase graphene nanoplatelets, the reinforced polymer composite having an effectiveness ($\varepsilon$) of 1000±600,
   wherein an average thickness of the graphene nanoplatelets is between 10 nm and 20 nm.

* * * * *